(12) United States Patent
Shen et al.

(10) Patent No.: US 12,034,561 B2
(45) Date of Patent: Jul. 9, 2024

(54) PROCESSING METHOD, DEVICE AND STORAGE MEDIUM

(71) Applicant: SHENZHEN TRANSSION HOLDINGS CO., LTD., Shenzhen (CN)

(72) Inventors: Jianfeng Shen, Shenzhen (CN); Zhiyong Wang, Shenzhen (CN); Pei Zheng, Shenzhen (CN); Chenxiong Li, Shenzhen (CN); Yating Yan, Shenzhen (CN)

(73) Assignee: SHENZHEN TRANSSION HOLDINGS CO., LTD., Shenzhen (CN)

(*) Notice: Subject to any disclaimer, the term of this patent is extended or adjusted under 35 U.S.C. 154(b) by 0 days.

(21) Appl. No.: 18/175,774

(22) Filed: Feb. 28, 2023

(65) Prior Publication Data

US 2023/0216702 A1 Jul. 6, 2023

Related U.S. Application Data

(63) Continuation of application No. PCT/CN2020/133164, filed on Dec. 1, 2020.

(30) Foreign Application Priority Data

Aug. 28, 2020 (CN) .......................... 202010881755.2
Aug. 28, 2020 (CN) .......................... 202010886785.2
(Continued)

(51) Int. Cl.
*H04L 12/28* (2006.01)

(52) U.S. Cl.
CPC ...... *H04L 12/2816* (2013.01); *H04L 12/2823* (2013.01)

(58) Field of Classification Search
CPC ....................... H04L 12/2816; H04L 12/2823
See application file for complete search history.

(56) References Cited

U.S. PATENT DOCUMENTS

| 2007/0061020 A1 | 3/2007 | Bovee et al. |
| 2014/0107932 A1* | 4/2014 | Luna ...................... G16H 50/20 702/19 |

(Continued)

FOREIGN PATENT DOCUMENTS

| CN | 201805512 U | 4/2011 |
| CN | 102684952 A | 9/2012 |

(Continued)

OTHER PUBLICATIONS

Fifth Office Action issued in counterpart Chinese Patent Application No. 202011133668.5, dated Jun. 1, 2022.

(Continued)

*Primary Examiner* — Adnan M Mirza
(74) *Attorney, Agent, or Firm* — Westbridge IP LLC

(57) ABSTRACT

Disclosed are a processing method, a device, and a storage medium. The method includes the following operations: obtaining preset information; detecting whether the preset information meets a preset rule; when the preset information meets the preset rule, performing a corresponding device control operation according to a preset strategy, so as to transfer or migrate or duplicate or backup relevant data and/or control functions of the first control center, which can make the use of the first control center and other devices controlled by the first control center more intelligent, convenient and fast.

9 Claims, 29 Drawing Sheets

(30) Foreign Application Priority Data

| Sep. 10, 2020 | (CN) | 202010948944.7 |
| Sep. 18, 2020 | (CN) | 202010989325.2 |
| Sep. 29, 2020 | (CN) | 202011051971.0 |
| Sep. 30, 2020 | (CN) | 202011062786.1 |
| Oct. 21, 2020 | (CN) | 202011133668.5 |

(56) References Cited

U.S. PATENT DOCUMENTS

| 2014/0164153 | A1 | 6/2014 | Koether et al. |
| 2016/0212665 | A1 | 7/2016 | Fukuta et al. |
| 2018/0000385 | A1 | 1/2018 | Heaton et al. |
| 2018/0277239 | A1 | 9/2018 | Johnson |
| 2018/0359337 | A1* | 12/2018 | Kodaypak ........... H04L 41/0897 |
| 2019/0132784 | A1 | 5/2019 | Thubert et al. |
| 2019/0229942 | A1 | 7/2019 | Nadathur et al. |
| 2020/0153680 | A1 | 5/2020 | Cui et al. |

FOREIGN PATENT DOCUMENTS

| CN | 103136827 A | 6/2013 |
| CN | 104035389 A | 9/2014 |
| CN | 104093050 A | 10/2014 |
| CN | 104754422 A | 7/2015 |
| CN | 104811444 A | 7/2015 |
| CN | 104898592 A | 9/2015 |
| CN | 104967560 A | 10/2015 |
| CN | 105182783 A | 12/2015 |
| CN | 105373001 A | 3/2016 |
| CN | 106209142 A | 12/2016 |
| CN | 106339083 A | 1/2017 |
| CN | 106453568 A | 2/2017 |
| CN | 106527162 A | 3/2017 |
| CN | 106707978 A | 5/2017 |
| CN | 106792984 A | 5/2017 |
| CN | 106842967 A | 6/2017 |
| CN | 106879140 A | 6/2017 |
| CN | 106919060 A | 7/2017 |
| CN | 106980274 A | 7/2017 |
| CN | 107121938 A | 9/2017 |
| CN | 107135130 A | 9/2017 |
| CN | 107483300 A | 12/2017 |
| CN | 108111563 A | 6/2018 |
| CN | 108601560 A | 9/2018 |
| CN | 108663950 A | 10/2018 |
| CN | 109240105 A | 1/2019 |
| CN | 109991858 A | 7/2019 |
| CN | 109995626 A | 7/2019 |
| CN | 110109371 A | 8/2019 |
| CN | 110119090 A | 8/2019 |
| CN | 110164436 A | 8/2019 |
| CN | 110300397 A | 10/2019 |
| CN | 110316631 A | 10/2019 |
| CN | 110488619 A | 11/2019 |
| CN | 110673505 A | 1/2020 |
| CN | 111050414 A | 4/2020 |
| CN | 111106984 A | 5/2020 |
| CN | 111123723 A | 5/2020 |
| CN | 111143683 A | 5/2020 |
| CN | 111148080 A | 5/2020 |
| CN | 111176748 A | 5/2020 |
| CN | 111372326 A | 7/2020 |
| CN | 111478832 A | 7/2020 |
| CN | 111522250 A | 8/2020 |
| CN | 111741539 A | 10/2020 |
| CN | 111812997 A | 10/2020 |
| CN | 111818667 A | 10/2020 |
| CN | 111901211 A | 11/2020 |
| CN | 111930024 A | 11/2020 |
| CN | 111935849 A | 11/2020 |
| CN | 111970766 A | 11/2020 |
| WO | 2016062174 A1 | 4/2016 |
| WO | 2019226107 A1 | 11/2019 |

OTHER PUBLICATIONS

First Office Action issued in counterpart Chinese Patent Application No. 202010881755.2, dated Oct. 14, 2020.
First Office Action issued in counterpart Chinese Patent Application No. 202010886785.2, dated Nov. 2, 2020.
First Office Action issued in counterpart Chinese Patent Application No. 202010948944.7, dated Nov. 2, 2020.
First Office Action issued in counterpart Chinese Patent Application No. 202010989325.2, dated Nov. 24, 2020.
First Office Action issued in counterpart Chinese Patent Application No. 202011062786.1, dated Nov. 25, 2020.
First Office Action issued in counterpart Chinese Patent Application No. 202011133668.5, dated Dec. 1, 2020.
First Office Action issued in counterpart Chinese Patent Application No. 202011051971.0, dated Nov. 18, 2020.
Fourth Office Action issued in counterpart Chinese Patent Application No. 202011062786.1, dated Mar. 8, 2021.
Fourth Office Action issued in counterpart Chinese Patent Application No. 202011133668.5, dated Dec. 15, 2021.
International Search Report and Written Opinion issued in corresponding PCT Application No. PCT/CN2020/133164, dated May 26, 2021.
Notification to Grant Patent Right for Invention issued in counterpart Chinese Patent Application No. 202010881755.2, dated Nov. 16, 2020.
Notification to Grant Patent Right for Invention issued in counterpart Chinese Patent Application No. 202010948944.7, dated Dec. 9, 2020.
Notification to Grant Patent Right for Invention issued in counterpart Chinese Patent Application No. 202010989325.2, dated Oct. 11, 2021.
Notification to Grant Patent Right for Invention issued in counterpart Chinese Patent Application No. 202011051971.0, dated Aug. 2, 2022.
Second Office Action issued in counterpart Chinese Patent Application No. 202010881755.2, dated Nov. 2, 2020.
Second Office Action issued in counterpart Chinese Patent Application No. 202010886785.2, dated Nov. 24, 2020.
Second Office Action issued in counterpart Chinese Patent Application No. 202010948944.7, dated Nov. 24, 2020.
Second Office Action issued in counterpart Chinese Patent Application No. 202010989325.2, dated Dec. 18, 2020.
Second Office Action issued in counterpart Chinese Patent Application No. 202011062786.1, dated Dec. 18, 2020.
Second Office Action issued in counterpart Chinese Patent Application No. 202011133668.5, dated Dec. 22, 2020.
Second Office Action issued in counterpart Chinese Patent Application No. 202011051971.0, dated Dec. 8, 2020.
Sixth Office Action issued in counterpart Chinese Patent Application No. 202011133668.5, dated Sep. 5, 2022.
Third Office Action issued in counterpart Chinese Patent Application No. 202010886785.2, dated Dec. 8, 2020.
Third Office Action issued in counterpart Chinese Patent Application No. 202011062786.1, dated Jan. 5, 2021.
Third Office Action issued in counterpart Chinese Patent Application No. 202011133668.5, dated May 6, 2021.
Third Office Action issued in counterpart Chinese Patent Application No. 202011051971.0, dated May 7, 2022.
European Search Report issued in counterpart European Patent Application No. EP 20951210.2, dated Apr. 12, 2024.

* cited by examiner

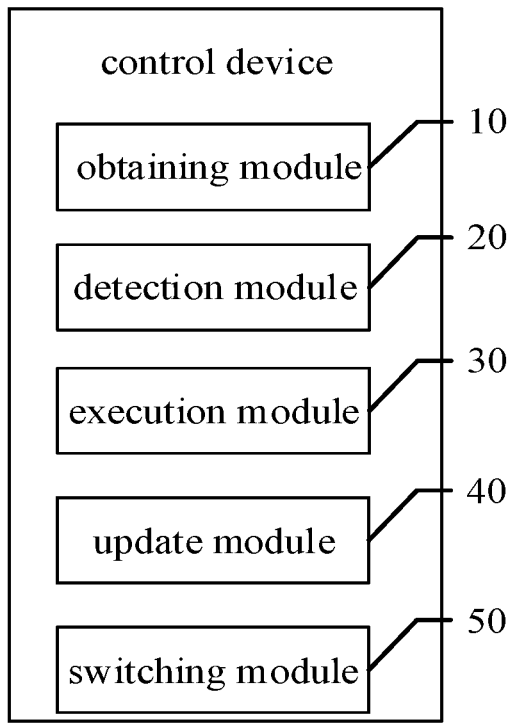

FIG. 25

| when a preset event occurs in the connection network, generating and/or determine a response instruction of the target device corresponding to the preset event | — D110 |

| obtaining control judgment information, and when the control judgment information meets the control condition, the control center sends the response instruction to the target device, and/or, the control center performs a preset control operation | — D120 |

FIG. 26

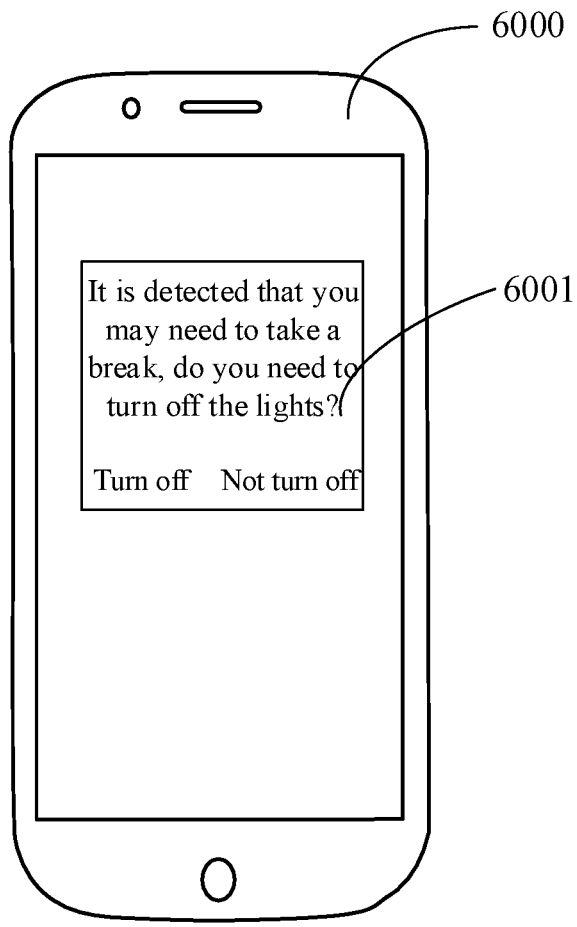

FIG. 29

| |
|---|
| when a preset event occurs in the connection network, obtaining control judgment information, and when the control judgment information meets the control condition, performing the operation D10 — D00 |

↓

| |
|---|
| obtaining preset information and/or preset strategy — D10 |

↓

| |
|---|
| determining and/or performing a corresponding control strategy according to the preset information and/or the preset strategy — D20 |

FIG. 30

PROCESSING METHOD, DEVICE AND STORAGE MEDIUM

CROSS-REFERENCE TO RELATED APPLICATIONS

This application is a continuation application of International Application No. PCT/CN2020/133164, filed on Dec. 1, 2020, which claims priority to Chinese Patent Application No. 202010886785.2, filed on Aug. 28, 2020, Chinese Patent Application No. 202010881755.2, filed on Aug. 28, 2020, Chinese Patent Application No. 202010948944.7, filed on Sep. 10, 2020, Chinese Patent Application No. 202010989325.2, filed on Sep. 18, 2020, Chinese Patent Application No. 202011051971.0, filed on Sep. 29, 2020, Chinese Patent Application No. 202011062786.1, filed on Sep. 30, 2020, and Chinese Patent Application No. 202011133668.5, filed on Oct. 21, 2020. The disclosures of the above-mentioned applications are incorporated herein by reference in their entireties.

TECHNICAL FIELD

The present application relates to the technical field of electronics, and in particular to a processing method, a device and a storage medium.

BACKGROUND

With the popularity of wearable smart devices (such as smart watches, smart earphones, smart bracelets, etc.), smart home devices (such as smart TVs, smart speakers, etc.) and Internet of Vehicles devices (such as smart cars, vehicle terminals, etc.), it has brought great convenience to people's lives.

However, for the processing between devices, such as device connection, device control, device switching, device operation and device prompts, there are still some problems, such as not smart, inconvenient and not fast, resulting in poor user experience.

Exemplarily, in a network composed of terminal devices such as mobile phones and devices such as wearables, smart homes, and Internet of Vehicles, generally, there is only one fixed control center (such as a mobile phone) to control other devices in the network, and it is impossible to adjust the control devices according to the specific conditions of each device in the network.

Exemplarily, the way of establishing connections between devices is relatively simple, which is not flexible and intelligent enough.

Exemplarily, after the devices are connected to each other, the control interaction between the devices is relatively simple or fixed, which is not flexible, intelligent, convenient and fast enough.

Exemplarily, after the devices are connected to each other, the information (such as events) received by each device is processed by each device itself, or each device responds to the information collected by its own device, received instructions, etc. The processing method is relatively simple or fixed, not smart enough, convenient and flexible.

Exemplarily, after a device is disconnected from its connection network, the user cannot obtain the corresponding information immediately or conveniently. Often only when the user cannot use the function of the device in the connection network, the user can know that the device has been disconnected from the connection network where it is located, which is not smart, convenient and fast enough.

Exemplarily, after the devices are connected to each other, the connection relationship cannot be adjusted more intelligently and conveniently by combining the binding relationship between the devices. The control center cannot combine directly and/or indirectly connected device information with relevant information on the network server to make intelligent recommendations, and the group switching function formed by connected devices cannot be supported.

The above contents are only used to assist in understanding the technical solution of the present application, and the above contents are not admitted as prior art.

SUMMARY

The main purpose of the present application is to provide a processing method, a device and a storage medium, aiming at solving the technical problems that the processing among the devices is not intelligent, inconvenient and not fast.

In order to achieve the above objective, the present application provides a processing method applied to a first control center, including following operations:
S10, obtaining preset information, the preset information is provided by the first control center and/or other devices controlled by the first control center;
S11, detecting whether the preset information meets a preset rule; and
S12, in response that the preset information meets the preset rule, performing a corresponding device control operation according to a preset strategy.

In an embodiment, the purpose of performing the corresponding device control operation according to the preset strategy may be to transfer or migrate or duplicate or backup the relevant data and/or the control function of the first control center, or to output prompt and the like.

In an embodiment, the preset information includes at least one of the following:
connection information including at least one of the following: connection state information, and network rate information;
state information including at least one of the following: device state information, power information, and storage space information;
environment information including at least one of the following: external environment information, and use environment information;
use information including at least one of the following: traffic information, use habit information, and currently used application information;
distance information; and
user physiological information.

In an embodiment, the operation S11 includes at least one of the following:
detecting whether the connection state information meets a first preset rule;
detecting whether the network rate information meets a second preset rule;
detecting whether the device state information meets a third preset rule;
detecting whether the power information meets a fourth preset rule;
detecting whether the storage space information meets a fifth preset rule;
detecting whether the external environment information meets a sixth preset rule;
detecting whether the use environment information meets a seventh preset rule;

detecting whether the traffic information meets an eighth preset rule;
detecting whether the use habit information meets a ninth preset rule;
detecting whether the currently used application information meets a tenth preset rule;
detecting whether the distance information meets an eleventh preset rule; and
detecting whether the user physiological information meets a twelfth preset rule.

In an embodiment, the operation S12 includes at least one of the following:
in response that the connection state information meets the first preset rule, performing the corresponding device control operation according to a first preset strategy;
in response that the network rate information meets the second preset rule, performing the corresponding device control operation according to a second preset strategy;
in response that the device state information meets the third preset rule, performing the corresponding device control operation according to a third preset strategy;
in response that the power information meets the fourth preset rule, performing the corresponding device control operation according to a fourth preset strategy;
in response that the storage space information meets the fifth preset rule, performing the corresponding device control operation according to a fifth preset strategy;
in response that the external environment information meets the sixth preset rule, performing the corresponding device control operation according to a sixth preset strategy;
in response that the use environment information meets the seventh preset rule, performing the corresponding device control operation according to a seventh preset strategy;
in response that the traffic information meets the eighth preset rule, performing the corresponding device control operation according to an eighth preset strategy;
in response that the use habit information meets the ninth preset rule, performing the corresponding device control operation according to a ninth preset strategy;
in response that the currently used application information meets the tenth preset rule, performing the corresponding device control operation according to a tenth preset strategy;
in response that the distance information meets the eleventh preset rule, performing the corresponding device control operation according to an eleventh preset strategy; and
in response that the user physiological information meets the twelfth preset rule, performing the corresponding device control operation according to a twelfth preset strategy.

The present application provides a processing method applied to a second device connected to a first device, including the following operations:
G10, obtaining at least one third device information connected to the second device through the first device;
G20, detecting whether at least one of the first device information, the second device information, and the third device information meets a preset condition; and
G30, when at least one of the first device information, the second device information, and the third device information meets a preset condition, performing corresponding processing according to the preset strategy.

In an embodiment, the second device and the first device are directly or indirectly connected.

In an embodiment, the third device and the second device are directly connected or indirectly connected.

In an embodiment, the general connection method or type includes direct connection and indirect connection. For example, the first device is directly connected to the second device, and the second device is directly connected to the third device, so the connection method or type between the first device and the third device can be understood as an indirect connection.

In an embodiment, the operation G20 includes at least one of the following:
a first preset event occurs on the first device;
a second preset event occurs on the second device; and
a third preset event occurs on the third device.

In an embodiment, the first preset event or the second preset event or the third preset event includes at least one of the following:
the user physiological parameter information meets the first preset condition;
the corresponding device system information meets the second preset condition;
the corresponding device communication information meets the third preset condition;
the corresponding device application information meets the fourth preset condition;
the corresponding device reminder information meets the fifth preset condition;
the corresponding device detection information meets the sixth preset condition;
the corresponding device state information meets the seventh preset condition;
the corresponding device environment information meets the eighth preset condition.

The present application further provides a processing method applied to a second device applied to a first device, including the following operations:
G100, obtaining at least one third device information through the first device and/or a server;
G200, detecting whether the first device and/or the third device information meets a preset rule; and
G300, when the first device and/or the third device information meets a preset rule, performing corresponding processing according to the preset strategy.

In an embodiment, the second device and the first device are directly or indirectly connected.

In an embodiment, the third device and the first device are directly connected or indirectly connected.

In an embodiment, the general connection method or type includes direct connection and indirect connection. For example, the first device is directly connected to the second device, and the second device is directly connected to the third device, so the connection method or type between the first device and the third device can be understood as an indirect connection.

In an embodiment, the operation G200 includes at least one of the following:
a first preset event occurs on the first device;
a second preset event occurs on the second device; and
a third preset event occurs on the third device.

In an embodiment, the first preset event or the second preset event or the third preset event includes at least one of the following:
the user physiological parameter information meets the first preset condition;

the corresponding device system information meets the second preset condition;

the corresponding device communication information meets the third preset condition;

the corresponding device application information meets the fourth preset condition;

the corresponding device reminder information meets the fifth preset condition;

the corresponding device detection information meets the sixth preset condition;

the corresponding device state information meets the seventh preset condition;

the corresponding device environment information meets the eighth preset condition.

The present application provides a processing method applied to a processing device, including the following operations:

H10, detecting whether a preset event occurs;

H20, when the preset event occurs, detecting whether the device corresponding to the preset event meets the preset condition;

H30, when the preset event occurs, outputting prompt information corresponding to the preset event according to the prompt strategy.

In an embodiment, the processing device is in a connection network, the connection network includes the processing device, the first device, and the second device, and the occurrence of a preset event includes at least one of the following:

a first preset event occurs on the processing device;

a second preset event occurs on the first device;

a third preset event occurs on the second device.

In an embodiment, the first preset event or the second preset event or the third preset event includes at least one of the following:

at least one of the processing device, the first device and the second device is in or switched to a preset mode;

at least one of the processing device, the first device and the second device is in or switched to a preset environment;

at least one of the processing device, the first device, and the second device detects that the user physiological information meets a first preset condition;

at least one of the processing device, the first device, and the second device detects that the user state meets a second preset condition;

at least one preset parameter detected by at least one of the processing device, the first device, and the second device meets a parameter condition;

at least one device is newly added in the connection network or the maximum number of connected devices has been reached;

at least one device in the connection network is disconnected or the minimum number of connected devices has been reached;

at least one of the processing device, the first device and the second device receives at least one message;

the power value of at least one of the processing device, the first device and the second device is lower than or equal to a preset power threshold;

the connection signal value of at least one of the processing device, the first device and the second device is less than or equal to a preset signal threshold;

the resource occupancy value of at least one of the processing device, the first device, and the second device is greater than or equal to a preset resource threshold;

the running state of at least one of the processing device, the first device and the second device is stuck or not smooth;

the preset application and/or preset function of at least one of the processing device, the first device, and the second device is turned on;

the security level of at least one of the processing device, the first device, and the second device is less than or equal to a preset security level threshold;

the working duration of at least one of the processing device, the first device and the second device is greater than or equal to a preset working duration threshold;

at least one of the processing device, the first device and the second device is at a preset position.

In an embodiment, the present application further provides a processing method applied to a processing device, including the following operations:

H100, detecting whether a preset event occurs;

H200, when the preset event occurs, obtaining prompt strategy;

H300, outputting prompt information corresponding to the preset event according to the prompt strategy.

In an embodiment, the processing device is in a connection network, the connection network includes the processing device, the first device, and the second device, and the occurrence of a preset event includes at least one of the following:

a first preset event occurs on the processing device;

a second preset event occurs on the first device;

a third preset event occurs on the second device.

In an embodiment, the first preset event or the second preset event or the third preset event includes at least one of the following:

at least one of the processing device, the first device and the second device is in or switched to a preset mode;

at least one of the processing device, the first device and the second device is in or switched to a preset environment;

at least one of the processing device, the first device, and the second device detects that the user physiological information meets a first preset condition;

at least one of the processing device, the first device, and the second device detects that the user state meets a second preset condition;

at least one preset parameter detected by at least one of the processing device, the first device, and the second device meets a parameter condition;

at least one device is newly added in the connection network or the maximum number of connected devices has been reached;

at least one device in the connection network is disconnected or the minimum number of connected devices has been reached;

at least one of the processing device, the first device and the second device receives at least one message;

the power value of at least one of the processing device, the first device and the second device is lower than or equal to a preset power threshold;

the connection signal value of at least one of the processing device, the first device and the second device is less than or equal to a preset signal threshold;

the resource occupancy value of at least one of the processing device, the first device, and the second device is greater than or equal to a preset resource threshold;

the running state of at least one of the processing device, the first device and the second device is stuck or not smooth;

the preset application and/or preset function of at least one of the processing device, the first device, and the second device is turned on;

the security level of at least one of the processing device, the first device, and the second device is less than or equal to a preset security level threshold;

the working duration of at least one of the processing device, the first device and the second device is greater than or equal to a preset working duration threshold;

at least one of the processing device, the first device and the second device is at a preset position.

In an embodiment, the outputting prompt information corresponding to the preset event according to the prompt strategy includes at least one of the following:

outputting operation options and/or prompt information corresponding to the preset event on the processing device;

outputting operation options and/or prompt information corresponding to the preset event on the first device;

outputting operation options and/or prompt information corresponding to the preset event on the second device.

In an embodiment, the method further includes: receiving operation information for the operation option, and updating and/or transmitting and/or outputting the preset event according to the operation information.

In an embodiment, the present application further provides a processing method, including the following operations:

when the first preset connection information of the connection network meets the preset connection rule and/or when the second preset connection information of the connection network meets the preset connection condition, obtaining preset prompt information;

outputting the preset prompt information according to a preset prompt strategy.

In an embodiment, the first preset connection information includes at least one of the following:

power information, timing shutdown information, location information, time information, user identity information and use habit information, connection state information, use state information and environment information.

In an embodiment, the method includes:

in response that the first preset connection information includes the power information and the power information meets a first preset connection rule, obtaining first preset prompt information;

in response that the first preset connection information includes the timing shutdown information and the timing shutdown information meets a second preset connection rule, obtaining second preset prompt information;

in response that the first preset connection information includes the location information and the location information meets a third preset connection rule, obtaining third preset prompt information;

in response that the first preset connection information includes the time information and the time information meets a fourth preset connection rule, obtaining fourth preset prompt information;

in response that the first preset connection information includes the user identity information and the user identity information meets a fifth preset connection rule, obtaining fifth preset prompt information;

in response that the first preset connection information includes the use habit information and the use habit information meets a sixth preset connection rule, obtaining sixth preset prompt information;

in response that the second preset connection information includes the device type information and the device type information meets a seventh preset connection rule, obtaining seventh preset prompt information;

in response that the second preset connection information includes the connection state information and the connection state information meets an eighth preset connection rule, obtaining eighth preset prompt information;

in response that the second preset connection information includes the use state information and the use state information meets a ninth preset connection rule, obtaining ninth preset prompt information; and in response that the second preset connection information includes the environment information and the environment information meets a tenth preset connection rule, obtaining tenth preset prompt information.

In order to achieve the above objective, the present application further provides a processing device, including a memory, a processor and a processing program stored on the memory and executable on the processor, when the processing program is executed by the processor, the operations of the above-mentioned processing method are implemented.

In order to achieve the above objective, the present application further provides a computer-readable storage medium. The computer-readable storage medium stores a program for realizing the processing method, and the program for realizing the processing method is executed by a processor to realize the operations of the above-mentioned processing method.

In order to achieve the above objective, the present application also provides a computer program product, the computer program product includes computer program code, and when the computer program code is run on the computer, the computer is made to execute the above-mentioned method.

In order to achieve the above objective, the present application also provides a chip, including a memory and a processor. The memory is used to store a computer program, and the processor is used to call and run the computer program from the memory, so that the device installed with the chip performs the above-mentioned method.

The present application provides a processing method, including: S10, obtaining preset information, the preset information is provided by the first control center and/or other devices controlled by the first control center; S11, detecting whether the preset information meets a preset rule; S12, when the preset information meets a preset rule, performing a corresponding device control operation according to a preset strategy. A network is formed between the first control center and other devices controlled by the first control center. The first control center acquires preset information provided by the first control center and/or other devices controlled by the first control center. When the preset information meets the preset rule, the first control center can automatically perform corresponding device control operations on other devices controlled by it in the network according to the preset strategy, such that the use of the first control center and other devices controlled by the first control center is more intelligent, convenient and faster.

The present application provides a processing method, including: A1, obtaining connection information, the connection information is provided by a terminal connected to the initiator device; A2, connecting to the target device according to the first preset connection rule and/or the second preset connection rule, and the connection information. After obtaining the connection information provided by the terminal, the target device is connected through the first preset connection rule and/or the second preset connection rule and the connection information, providing more optional connection schemes for the connection between the initiator device and the target device, which makes the initiator device more flexible and intelligent when establishing a connection with the target device.

The present application provides a processing method, including: obtaining first connection reference information; when the first connection reference information meets a preset connection condition, obtaining connection information, the connection information being provided by the target device; establishing a connection with the target device according to the connection information and/or a first preset strategy, and/or updating the first preset strategy according to a connection result, which realizes establishing a connection with the target device through the first preset strategy, and provides more optional connection schemes when connecting with the target device, so that the initiator device is more flexible and intelligent when establishing a connection with the target device.

The present application provides a processing method, including: C10, if a preset event occurs, outputting at least one first control information and at least one second control information, the first control information corresponds to a first device directly connected to the management device, and the second control information corresponds to a second device indirectly connected to the management device; C20, receiving operation information, performing corresponding control according to the operation information and/or a first preset strategy, and/or updating the first control information and/or the second control information. After the management device is connected with the first device and/or the second device, by outputting corresponding first control information and/or second control information and receiving operation information corresponding to the first control information and/or second control information, so as to execute corresponding control through the operation information and the first preset strategy, it avoids that after the management device is connected with the first device and/or the second device, only simple control interaction can be performed, so that the control interaction between the devices after establishing connection with each other is more intelligent, convenient and fast. In addition, because it can support the control interaction between directly connected devices and indirectly connected devices, the function is more powerful, and the experience is more intelligent, convenient and fast.

The present application provides a processing method, including: when a preset event occurs in the connection network, generating and/or determining a response instruction of the target device corresponding to the preset event; obtaining control judgment information, when the control judgment information meets a control condition, the control center sends the response instruction to the target device, and/or, the control center performs a preset control operation. When a preset event occurs in the connection network, the control center can generate a corresponding response instruction, and control itself or the target device to make a corresponding response through the response instruction, which makes the control interaction between the devices more flexible and intelligent after the devices are connected to each other.

The present application provides a processing method, including: detecting whether a preset event is received; when the preset event is received, performing corresponding processing according to a preset strategy, and/or performing the first processing on at least one first device directly connected to the processing device according to a first rule, and/or performing the second processing on at least one second device indirectly connected to the processing device according to the second rule. After receiving the preset event, perform corresponding processing through the preset strategy, and perform the first processing on the first device, and/or perform the second processing on the second device, which avoids that after the connection is established through the network, only simple information processing can be performed between each device, so that the information processing after each device establishes a connection with each other is more intelligent, convenient and flexible. In addition, because it can support information processing between directly connected devices and indirectly connected devices, the function is more powerful, and the experience is more intelligent, convenient and flexible.

BRIEF DESCRIPTION OF THE DRAWINGS

The accompanying drawings, which are incorporated in and constitute a part of this specification, illustrate embodiments consistent with the application and together with the description serve to explain the principles of the application. In order to more clearly illustrate the technical solutions of the embodiments of the present application, the following will briefly introduce the drawings that need to be used in the description of the embodiments. Apparently, those skilled in the art can also obtain other drawings based on these drawings without any creative effort.

FIG. 25 is a schematic diagram of another functional module of the processing device according to a preferred embodiment of the present application.

FIG. 26 is a schematic flowchart of the processing method according to an embodiment of the present application.

FIG. 29 is a schematic diagram of the effect of the output optional processing items of the processing method of the present application.

FIG. 30 is a schematic flowchart of the processing method according to another embodiment of the present application.

The realization, functional features and advantages of the present application will be further described in conjunction with the embodiments and with reference to the accompanying drawings. By means of the above drawings, specific embodiments of the present application have been shown, which will be described in more detail hereinafter. These drawings and text descriptions are not intended to limit the scope of the concept of the application in any way, but to illustrate the concept of the application for those skilled in the art by referring to specific embodiments.

DETAILED DESCRIPTION OF THE EMBODIMENTS

It should be understood that the specific embodiments described here are only used to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be used in combination.

The mobile terminal can be implemented in various forms. For example, the mobile terminal described herein can include a mobile phone, a tablet computer, a notepad computer, a hand-held computer, a personal digital assistants (PDA), a portable media player (PMP), a navigation device, a wearable device, a smart bracelet, a pedometer and other mobile terminals, as well as a fixed terminal such as a digital TV and a desktop computer.

The present application takes a mobile terminal as an example to illustrate. Those skilled in the art will understand that, in addition to elements specifically used for mobile purposes, the configuration according to the embodiments of the present application can also be applied to the fixed terminal.

Figure 1:
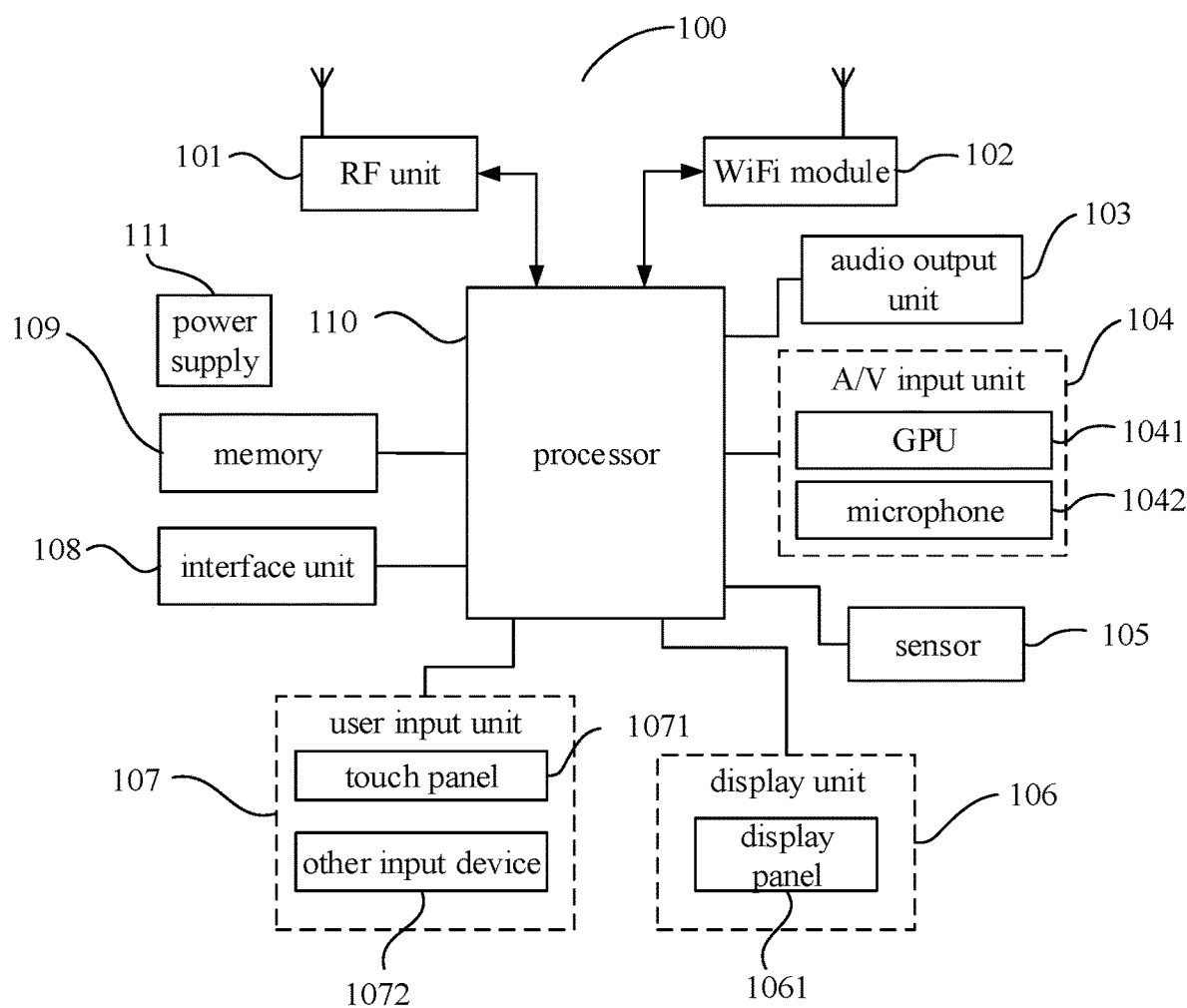
FIG. 1 is a schematic structural diagram of a hardware of a mobile terminal according to embodiments of the present application.

As shown in FIG. 1, FIG. 1 is a schematic structural diagram of a hardware of a mobile terminal according to embodiments of the present application. The mobile terminal 100 includes a Radio Frequency (RF) unit 101, a Wi-Fi module 102, an audio output unit 103, an audio/video (A/V) input unit 104, a sensor 105, a display unit 106, a user input unit 107, an interface unit 108, a memory 109, a processor 110, a power supply 111 and other components. Those skilled in the art can understand that the structure of the mobile terminal shown in FIG. 1 does not constitute a limitation on the mobile terminal. The mobile terminal can include more or fewer components, or a combination of some components, or differently arranged components than shown in the figure.

Hereinafter, each component of the mobile terminal will be specifically introduced with reference to FIG. 1.

The radio frequency unit 101 can be used for transmitting and receiving signals during the process of transceiving information or talking. Specifically, after receiving the downlink information of the base station, the downlink information is processed by the processor 110; in addition, the uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 can also communicate with the network and other devices through wireless communication. The above-mentioned wireless communication can use any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), or the like.

Wi-Fi is a short-range wireless transmission technology. The mobile terminal can help users transmit and receive email, browse webpage, and access streaming media through the Wi-Fi module 102, and Wi-Fi provides users with wireless broadband Internet access. Although FIG. 1 shows the Wi-Fi module 102, it is understandable that it is not a necessary component of the mobile terminal and can be omitted as needed without changing the essence of the present application.

When the mobile terminal 100 is in a call signal receiving mode, a call mode, a recording mode, a voice recognition mode, a broadcast receiving mode, or the like, the audio output unit 103 can convert the audio data received by the radio frequency unit 101 or the Wi-Fi module 102 or stored in the memory 109 into an audio signal and output the audio signal as sound. Moreover, the audio output unit 103 can also provide audio output related to a specific function performed by the mobile terminal 100 (for example, call signal reception sound, message reception sound, or the like). The audio output unit 103 can include a speaker, a buzzer, or the like.

The A/V input unit 104 is configured to receive audio or video signals. The A/V input unit 104 can include a graphics processing unit (GPU) 1041 and a microphone 1042. The graphics processing unit 1041 processes image data of still pictures or videos obtained by an image capture device (such as a camera) in a video capture mode or an image capture mode. The processed image frame can be displayed on the display unit 106. The image frame processed by the graphics processing unit 1041 can be stored in the memory 109 (or other storage medium) or sent via the radio frequency unit 101 or the Wi-Fi module 102. The microphone 1042 can receive sound (audio data) in operation modes such as a call mode, a recording mode, a voice recognition mode, and the like, and can process such sound into audio data. The processed audio (voice) data can be converted into a format that can be sent to a mobile communication base station via the radio frequency unit 101 in the case of a call mode for output. The microphone 1042 can implement various types of noise cancellation (or suppression) algorithms to eliminate (or suppress) noise or interference generated during the process of transceiving audio signals.

The mobile terminal 100 also includes at least one sensor 105, such as a light sensor, a motion sensor, and other sensors. Specifically, the light sensor includes an ambient light sensor and a proximity sensor. The ambient light sensor can adjust the brightness of the display panel 1061 according to the brightness of the ambient light. The proximity sensor can turn off the display panel 1061 and/or the backlight when the mobile terminal 100 is moved to the ear. A gravity acceleration sensor, as a kind of motion sensor, can detect the magnitude of acceleration in various directions (usually three axes). The gravity acceleration sensor can detect the magnitude and direction of gravity when it is stationary, and can identify the gesture of the mobile terminal (such as horizontal and vertical screen switching, related games, magnetometer attitude calibration), vibration recognition related functions (such as pedometer, tap), or the like. The mobile terminal can also be equipped with other sensors such as a fingerprint sensor, a pressure sensor, an iris sensor, a molecular sensor, a gyroscope, a barometer, a hygrometer, a thermometer, an infrared sensor and other sensors, which will not be repeated here.

The display unit 106 is configured to display information input by the user or information provided to the user. The display unit 106 can include a display panel 1061, and the display panel 1061 can be configured in the form of a liquid crystal display (LCD), an organic light emitting diode (OLED), or the like.

The user input unit 107 can be configured to receive inputted numeric or character information, and generate key signal input related to user settings and function control of the mobile terminal. Specifically, the user input unit 107 can include a touch panel 1071 and other input devices 1072. The touch panel 1071, also called a touch screen, can collect user touch operations on or near it (for example, the user uses fingers, stylus and other suitable objects or accessories to operate on the touch panel 1071 or near the touch panel 1071), and drive the corresponding connection device according to a preset program. The touch panel 1071 can include two parts: a touch detection device and a touch controller. The touch detection device detects the user's touch position, detects the signal brought by the touch operation, and transmits the signal to the touch controller. The touch controller receives the touch information from the touch detection device, converts the touch information into contact coordinates, and sends it to the processor 110, and can receive and execute the instructions sent by the processor 110. In addition, the touch panel 1071 can be implemented in multiple types such as resistive, capacitive, infrared, and surface acoustic wave. In addition to the touch panel 1071, the user input unit 107 can also include other input devices 1072. Specifically, the other input devices 1072 can include, but are not limited to, one or more of physical keyboard, function keys (such as volume control buttons, switch buttons, etc.), trackball, mouse, joystick, etc., which are not specifically limited here.

Further, the touch panel 1071 can cover the display panel 1061. After the touch panel 1071 detects a touch operation on or near it, the touch operation is transmitted to the processor 110 to determine the type of the touch event, and then the processor 110 provides a corresponding visual output on the display panel 1061 according to the type of the touch event. Although in FIG. 1, the touch panel 1071 and the display panel 1061 are used as two independent components to realize the input and output functions of the mobile terminal, in some embodiments, the touch panel 1071 and the display panel 1061 can be integrated to implement the input and output functions of the mobile terminal, which is not specifically limited here.

The interface unit 108 serves as an interface through which at least one external device can be connected to the mobile terminal 100. For example, the external device can include a wired or wireless earphone port, an external power source (or battery charger) port, a wired or wireless data port, a memory card port, a port for connecting devices with identification modules, an audio input/output (I/O) port, a video I/O port, an earphone port, or the like. The interface unit 108 can be configured to receive input (such as data information, electricity, or the like) from an external device and transmit the received input to one or more elements in the mobile terminal 100 or can be configured to transfer data between the mobile terminal 100 and the external device.

The memory 109 can be configured to store software programs and various data. The memory 109 can mainly include a program storage area and a data storage area. The program storage area can store the operating system, at least one application required by the function (such as sound play function, image play function, etc.), or the like. The data storage area can store data (such as audio data, phone book, etc.) created based on the use of the mobile phone. In addition, the memory 109 can include a high-speed random access memory, and can also include a non-volatile memory, such as at least one magnetic disk storage device, a flash memory device, or other volatile solid-state storage devices.

The processor 110 is a control center of the mobile terminal, and uses various interfaces and lines to connect the various parts of the entire mobile terminal. By running or performing the software programs and/or modules stored in the memory 109, and calling the data stored in the memory 109, various functions and processing data of the mobile terminal are executed, thereby overall monitoring of the mobile terminal is performed. The processor 110 can include one or more processing units; and the processor 110 may integrate an application processor and a modem processor. The application processor mainly processes an operating system, a user interface, an application, or the like, and the modem processor mainly processes wireless communication. It can be understood that the foregoing modem processor may not be integrated into the processor 110.

The mobile terminal 100 can also include a power source 111 (such as a battery) for supplying power to various components. The power supply 111 can be logically connected to the processor 110 through a power management system, so that functions such as charging, discharging, and power consumption management can be managed through the power management system.

Although not shown in FIG. 1, the mobile terminal 100 can also include a Bluetooth module, or the like, which will not be repeated here.

In order to facilitate the understanding of the embodiments of the present application, the following describes the communication network system on which the mobile terminal of the present application is based.

Figure 2:
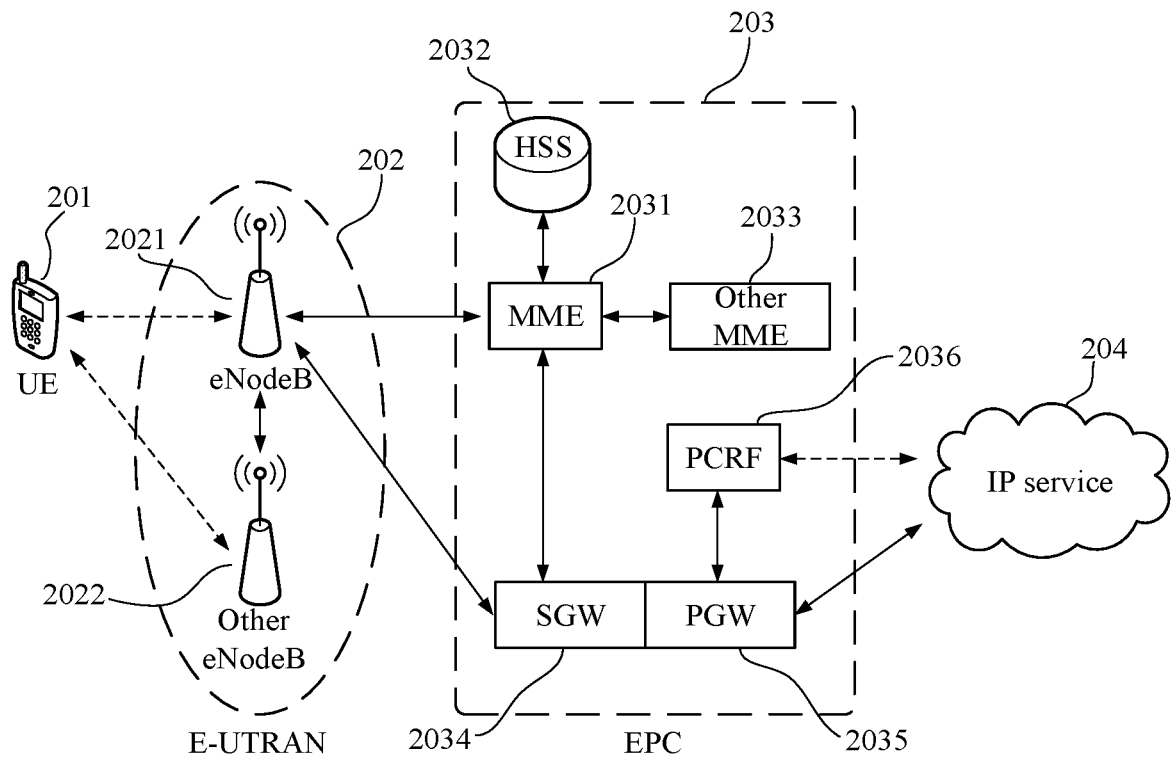
FIG. 2 is a system architecture diagram of a communication network according to an embodiment of the present application.

As shown in FIG. 2, FIG. 2 is an architecture diagram of a communication network system according to an embodiment of the present application. The communication network system is an LTE system of general mobile communication network technology. The LTE system includes a User Equipment (UE) 201, an Evolved UMTS Terrestrial Radio Access Network (E-UTRAN) 202, an Evolved Packet Core (EPC) 203, and an operator's IP service 204 that are sequentially connected in communication.

Specifically, the UE 201 can be the aforementioned terminal 100, which will not be repeated here.

E-UTRAN 202 includes eNodeB 2021 and other eNodeBs 2022. The eNodeB 2021 can be connected to other eNodeBs 2022 through a backhaul (for example, an X2 interface), the eNodeB 2021 is connected to the EPC 203, and the eNodeB 2021 can provide access from the UE 201 to the EPC 203.

The EPC 203 can include Mobility Management Entity (MIME) 2031, Home Subscriber Server (HSS) 2032, other MMES 2033, Serving Gate Way (SGW) 2034, PDN Gate Way (PGW) 2035, Policy and Charging Rules Function (PCRF) 2036, and so on. MME 2031 is a control node that processes signaling between UE 201 and EPC 203, and provides bearer and connection management. HSS 2032 is configured to provide some registers to manage functions such as the home location register (not shown), and save some user-specific information about service feature, data rates, and so on. All user data can be sent through SGW 2034, PGW 2035 can provide UE 201 IP address allocation and other functions. PCRF 2036 is a policy and charging control policy decision point for service data flows and IP bearer resources, which selects and provides available policy and charging control decisions for policy and charging execution functional units (not shown).

The IP service 204 can include the Internet, an intranet, IP Multimedia Subsystem (IMS), or other IP services.

Although the LTE system is described above as an example, those skilled in the art should know that, the present application is not only applicable to the LTE system, but also applicable to other wireless communication systems, such as GSM, CDMA2000, WCDMA, TD-SCDMA, and new network systems in the future, or the like, which is not limited herein.

Based on the above mobile terminal hardware structure and communication network system, various embodiments of the present application are proposed.

Figure 3:
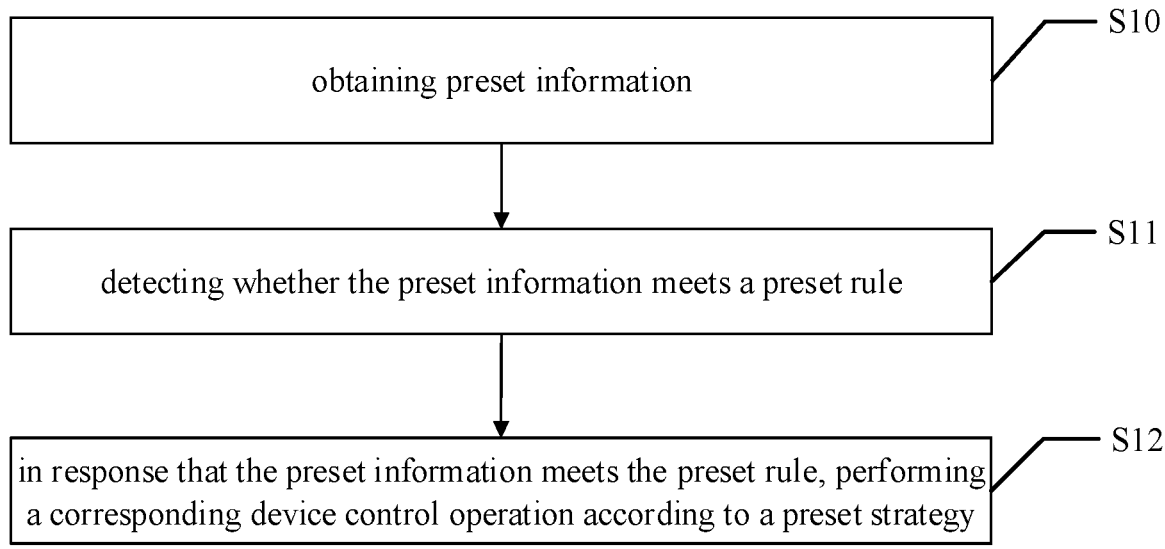
FIG. 3 is a schematic flowchart of a processing method according to an embodiment of the present application.

The present application provides a processing method. As shown in FIG. 3, FIG. 3 is a schematic flowchart of a processing method according to an embodiment of the present application.

The embodiment of the present application provides a processing method. Although a logical order is shown in the flowcharts, in some cases the operations shown or described may be performed in an order different from that shown or described herein. The processing method is applied in the first control center. The processing method includes:

Operation S10, obtaining preset information. The preset information is provided by the first control center and/or other devices controlled by the first control center, and the other devices include wearable smart devices.

In an embodiment, during the use of the wearable smart devices, terminal devices (such as mobile phone, Portable Android Device (PAD), tablet computer), etc.) will generally establish a connection relationship with wearable smart devices (such as smart watches, smart bracelets, smart earphones, etc.), smart home devices (such as smart TVs, smart speakers, etc.), and car networking devices (such as smart cars, vehicle terminals, etc.) to form a network. A control center is set up. The control center can be any device in the networked devices, so as to facilitate the management and use of the networked devices by users. In this embodiment, the control function is provided by the first control center, and the managed devices are the first control center itself and other devices controlled by the first control center. In addition, the first control center may be a terminal device, or may be a wearable smart device, a smart home device, or an Internet of Vehicles device. The control center is not static, which can switch between networked devices (such as wearable smart devices and terminal devices), the switching of the control center is based on preset information. The preset information is provided by the first control center and other devices controlled by the first control center, that is, whether the control center needs to switch can be independently determined by the devices in the network according to their own preset information. It can be understood that the specific situation of the preset information determines whether the corresponding device is qualified to be the control center.

In an embodiment, the above connection relationship includes direct connection, indirect connection. For example, a smart watch is directly connected to a smart speaker, a smart watch is directly connected to a smart phone, and a smart phone is indirectly connected to a smart speaker. Then, the smart phone can be connected to the smart speaker through the smart watch, and the connection relationship is an indirect connection, and the above-mentioned devices are used as nodes, and each connection relationship is used as a connection between nodes to form a network.

In an embodiment, after the switching of the control center, the original control center continues to be connected to the network as other devices controlled by the new control center, that is, each device in the network can be used as the control center or controlled by the control center. For example, the first control center is a smart phone, which controls smart watches and smart TVs. After the control center is switched to the smart TV, the smart TV acts as the control center to control the previous first control center, namely the smart phone, and the smart watch.

In an embodiment, the first control center acquires preset information. The preset information is provided by the first control center and/or other devices controlled by the first control center, and the other devices include wearable smart devices, smart home devices or Internet of Vehicles devices.

In an embodiment, before the operation S10, the method includes:
Operation S14, determining whether it is a preset mode;
Operation S15, when it is the preset mode, performing the operation S10.

In an embodiment, the first control center determines whether it is currently in the preset mode, and if it is currently in the preset mode, the operation of obtaining the preset information is performed; if it is not currently in the preset mode, the operation of obtaining the preset information is not performed. The preset modes include smart mode, automatic switching mode and other modes that support switching of the control center.

In an embodiment, the preset information includes at least one of the following: connection information, state information, environment information, use information, distance information, and user physiological information.

The connection information includes at least one of the following: connection state information, and network rate information.

In an embodiment, regarding the connection information, the connection information includes at least one of connection state information and network rate information.

In the above network, there are terminal devices or other devices that newly join the network (such as wearable devices, smart home devices, or Internet of Vehicles devices), and there are also terminal devices or other devices that exit the network. In order to grasp the connection state information of each device joining or exiting in the network in real time, the first control center can maintain a connection information table. The connection information table records device information of all networked devices, and the device information may be at least one of device physical address, device name, and device code, or other information that can represent the device. The device code can be set by the first control center, for example, the device code of the first device connected with the first control center is 001, and the device code of the second device connected with the first control center is 002. Devices in the network generally have the function of connecting to the Internet, such as smart watches, mobile phones, smart TVs, smart cars, etc. The corresponding network rate information will be affected by the device itself (for example, the device is downloading data or there are many current Internet applications, etc., resulting in a slow network) or by external factors (such as poor signal at the location of the device), resulting in a low network rate.

The state information includes at least one of the following: device state information, power information, and storage space information.

In an embodiment, for the state information, the state information includes at least one of device state information, power information, and storage space information.

The environment information includes at least one of the following: external environment information, and use environment information.

In an embodiment, regarding the environment information, the environment information includes at least one of the external environment information and the use environment information.

The use information includes at least one of the following: traffic information, use habit information, and currently used application information.

In an embodiment, regarding the use information, the use information includes at least one of the traffic information, the use habit information, and the currently used application information.

In the above network, the device may have the ability to provide data network services, such as mobile phones and PADs, which are capable of providing data network services, and are used to obtain data from the Internet, such as updating applications in the device, and the current data network costs are not low. Therefore, when using data network services, special attention should be paid to traffic information. For use habit information, users may be accustomed to using a certain device on the Internet, that is, they use a certain device frequently, or are used to using a certain device on the Internet during a specific period of time, at a specific location, or for a specific purpose of use. For example, users are used to watching videos with PAD, but not with mobile phones. For the currently used application information, during the use of the device, the user will install some corresponding applications according to the use requirements, such as video applications and game applications.

Operation S12, detecting whether the preset information meets a preset rule.

In an embodiment, the operation S12 includes at least one of the following:

detecting whether the connection state information meets a first preset rule.

In an embodiment, it is detected whether the connection state information meets the first preset rule. The first preset rule is to determine whether the first control center in the network exits the network by detecting connection state information. If the first control center withdraws from the network, the connection state information meets the first preset rule, and/or, if the first control center does not withdraw from the network, the connection state information does not meet the first preset rule.

In an embodiment, it may be that the number of connections of the first control center exceeds a preset threshold or maximum value, then the connection state information meets the first preset rule.

In another embodiment, it may be that the connection state of the first control center is not smooth or the number of disconnections exceeds a preset number of times, then the connection state information meets the first preset rule.

Detecting whether the network rate information meets a second preset rule.

In an embodiment, detecting whether the network rate information meets the second preset rule. The second preset rule is a rule determined by detecting network rate information that the first control center in the network is not suitable to continue to serve as a control center to provide control functions. In order not to affect the linkage of each device in the network, it is necessary to select a device with a high network rate as the control center.

For example, it may be that the network rate of other devices controlled by the first control center in the network is greater than the network rate of the first control center, it is determined that the network rate information meets the second preset rule. For example, the network rate of the first control center is 500 KB/s, if other devices controlled by the first control center in the network have a network rate greater than 500 KB/s, it can be determined that the network rate information meets the second preset rule.

In other embodiments, a second network rate threshold can also be set, and the second network rate threshold is the minimum network rate that does not affect the ability of the first control center to provide management services. In an embodiment, if the network rate of the first control center is greater than or equal to the second network rate threshold, it is determined that the network rate information does not meet the second preset rule. If the network rate of the first control center is less than the second network rate threshold, it is determined that the network rate information meets the second preset rule.

For example, the network rate of the first control center is 400 KB/s, the second network rate threshold is 500 KB/s. Since the network rate of the first control center is less than the second network rate threshold, it may be determined that the network rate information meets the second preset rule.

Detecting whether the device state information meets a third preset rule.

In an embodiment, detecting whether the device state information meets the third preset rule. The third preset rule is a rule determined by detecting device state information that the first control center in the network is not suitable to continue to serve as a control center to provide control functions. In order not to affect the linkage of each device in the network, it is necessary to select a device with a short response time corresponding to the device state as the control center.

In an embodiment, the device state information can be the data processing capability of the device, such as the number or frequency of Central Processing Unit (CPU), the number or frequency of Graphic Processing Unit (GPU), the number or frequency of Neural Networks Process Unit (NPU), memory capacity, memory processing speed, etc. If the data processing capability of the first control center is not the strongest or does not belong to a strong category, it is determined that the device state information meets the third preset rule.

In another embodiment, for the current data processing capability of the device, it may be that the response time corresponding to the device state of other devices controlled by the first control center in the network is shorter than the response time corresponding to the device state of the first control center, it is determined that the device state information meets the third preset rule. For example, the response time corresponding to the device state of the first control center is 50 ms, if other devices controlled by the first control center in the network have a device whose state corresponds to a response time of 40 ms, it may be determined that the device state information meets the third preset rule.

For example, the response time corresponding to the device state of the first control center is 50 ms, and the first response time threshold is 10 ms. Other devices controlled by the first control center in the network have device whose response time corresponding to the device state is 40 ms. When other devices controlled by the first control center in the network have the response time corresponding to the device state and the first response time threshold equal to the response time corresponding to the state of the first control center, it is determined that the device state information meets the third preset rule.

In other embodiments, a second response time threshold may also be set, and the second response time threshold is the maximum response time that does not affect the ability of the first control center to provide management services. If the response time corresponding to the device state of the first control center is shorter than or equal to the second response time threshold, it is determined that the device state information does not meet the third preset rule; and/or, if the response time corresponding to the device state of the first control center is longer than the second response time threshold, it is determined that the device state information meets the third preset rule.

For example, the response time corresponding to the device state of the first control center is 60 ms, and the second response time threshold is 50 ms. Since the response time corresponding to the device state of the first control center is longer than the second response time threshold, it may be determined that the device state information meets the third preset rule.

In other embodiments, for a device in a charging state, the power consumption of the device at this time should be reduced as much as possible to prevent the battery from being depleted. Therefore, if the device is in the charging state, it is determined that the device state information meets the third preset rule; and/or, if the device is in the non-charging state, it is determined that the device state information does not meet the third preset rule.

In other embodiments, for a device in a moving state, because it is inconvenient for the user to operate or control, it may be determined that the device state information meets the third preset rule.

In other embodiments, for a device in a stuck state, since the first control center may not be able to well control other devices because it cannot respond well to the user's operation, it may be determined that the device state information meets the third preset rule.

Detecting whether the power information meets a fourth preset rule.

In an embodiment, detecting whether the power information meets the fourth preset rule. The fourth preset rule is a rule determined by detecting power information that the first control center in the network is not suitable to continue to serve as a control center to provide control functions. In order not to affect the linkage of each device in the network, it is necessary to select a device with a long available time corresponding to the power as the control center. It may be that the available time corresponding to the power of other devices controlled by the first control center in the network is longer than the available time corresponding to the power of the first control center, it is determined that the power information meets the fourth preset rule. It may also be that the remaining power value of other devices controlled by the first control center in the network is greater than the power of the first control center, it is determined that the power information meets the fourth preset rule.

In this embodiment, a first available time threshold may also be set for the comparison between the available time corresponding to the power of other devices controlled by the first control center in the network and the available time corresponding to the power of the first control center. For example, when other devices controlled by the first control center in the network have an available time corresponding to the power of the device that is longer than or equal to the sum of the available time corresponding to the power of the first control center and the first available time threshold, it is determined that the power information meets the fourth preset rule. When there is no other device controlled by the first control center in the network, the available time corresponding to the power of the device is longer than or equal to the sum of the available time corresponding to the power of the first control center and the first available time threshold, that is, when the available time corresponding to the power of other devices controlled by the first control center in the network is less than the sum of the available time corresponding to the power of the first control center and the first available time threshold, it is determined that the power information does not meet the fourth preset rule.

In other embodiments, a second available time threshold may also be set, and the second available time threshold is the minimum available time that does not affect the ability of the first control center to provide management services. If the available time corresponding to the power of the first control center is longer than or equal to the second available time threshold, it is determined that the power information does not meet the fourth preset rule; and/or, if the available time corresponding to the power of the first control center is shorter than the second available time threshold, it is determined that the power information meets the fourth preset rule.

For example, the available time corresponding to the power of the first control center is 180 minutes, and the second available time threshold is 200 minutes. Since the available time corresponding to the power of the first control center is shorter than the second available time threshold, it may be determined that the power information meets the fourth preset rule.

Detecting whether the storage space information meets a fifth preset rule.

In an embodiment, detecting whether the storage space information meets the fifth preset rule. The fifth preset rule is a rule determined by detecting storage space information that the first control center in the network is not suitable to continue to serve as a control center to provide control functions. In order not to affect the linkage of each device in the network, it is necessary to select a device with a large remaining storage space as the control center. It may be that the remaining storage space of other devices controlled by the first control center in the network is greater than the remaining storage space of the first control center, it is determined that the storage space information meets the fifth preset rule.

In this embodiment, a first remaining storage space threshold may also be set for the comparison between the remaining storage space of other devices controlled by the first control center in the network and the remaining storage space of the first control center. For example, when the remaining storage space of other devices controlled by the first control center in the network is greater than or equal to the sum of the remaining storage space of the first control center and the first remaining storage space threshold, it is determined that the storage space information meets the fifth preset rule; and/or, when the remaining storage space of other devices controlled by the first control center in the network is not greater than or equal to the sum of the remaining storage space of the first control center and the first remaining storage space threshold, that is, the remaining storage space of other devices controlled by the first control center in the network is less than the sum of the remaining storage space of the first control center and the first remaining storage space threshold, it is determined that the storage space information does not meet the fifth preset rule.

For example, the remaining storage space of the first control center is 2000 MB, the threshold of the first remaining storage space is 300 MB, other devices controlled by the first control center in the network have a remaining storage space of 2300 MB. At this time, when the remaining storage space of other devices controlled by the first control center in the network is equal to the sum of the remaining storage space of the first control center and the first remaining storage space threshold, it is determined that the storage space information meets the fifth preset rule.

In other embodiments, a second remaining storage space threshold may also be set, and the second remaining storage space threshold is the minimum remaining storage space that does not affect the ability of the first control center to provide management services. If the remaining storage space of the first control center is greater than or equal to the second remaining storage space threshold, it is determined that the storage space information does not meet the fifth preset rule; and/or, if the remaining storage space of the first control center is smaller than the second remaining storage space threshold, it is determined that the storage space information meets the fifth preset rule.

For example, the remaining storage space of the first control center is 1800 MB, and the second remaining storage space threshold is 2000 M B. Since the remaining storage space of the first control center is smaller than the second remaining storage space threshold, it may be determined that the storage space information meets the fifth preset rule.

Detecting whether the external environment information meets a sixth preset rule.

In an embodiment, detecting whether the external environment information meets the sixth preset rule. The sixth preset rule is a rule that determines by detecting external environment information that the first control center in the network is not suitable for continuing to serve as a control center to provide control functions.

In an embodiment, when it is detected that the brightness of the external ambient light reaches the brightness threshold and/or the loudness of the external environmental noise reaches the loudness threshold, it is determined that the external environment information meets the sixth preset rule; and/or, when it is detected that the brightness of external ambient light does not reach the brightness threshold and/or the loudness of external environmental noise does not reach the loudness threshold, it is determined that the external environment information does not meet the sixth preset rule.

In another embodiment, the external environment information may be time information and/or geographic information. If it is inconvenient to use the first control center (for example, it is inconvenient to use mobile phones during working duration, or in the early hours of the morning), or the place where the first control center is not allowed to be carried (such as the place where the mobile phone is not allowed to enter), it is determined that the external environment information meets the sixth preset rule.

Detecting whether the use environment information meets a seventh preset rule.

In an embodiment, detecting whether the use environment information meets the seventh preset rule. The seventh preset rule is a rule determined by detecting the use environment information that the first control center in the network is not suitable to continue to serve as the control center to provide control functions.

In an embodiment, if the user is in a sports environment, it is obvious that the user is inconvenient to use devices such as mobile phones and PADs, but it is convenient to use wearable devices such as smart bracelets and smart watches. Therefore, before the user is in the exercise environment, when the first control center is one of the devices that are inconvenient for the user to use when exercising, such as mobile phones and PADs, it is determined that the use environment information meets the seventh preset rule; and/or, before the user is in the exercise environment, when the first control center is one of the devices that are convenient for the user to use during exercise, such as smart bracelets and smart watches, it is determined that the use environment information does not meet the seventh preset rule.

Detecting whether the user is in a sports environment can be determined according to the scene mode (such as sports mode, outdoor mode, etc.) of the first control center, or according to the motion sensor of the first control center and/or other devices, or according to the camera data of the first control center and/or other devices.

In another embodiment, if the user is in a driving environment, it is obvious that the user is inconvenient to use devices such as mobile phones and PADs, but it is convenient to use devices such as smart watches, smart earphones, and vehicle terminals. Therefore, before the user is in the driving environment, when the first control center is one of the mobile phones, PADs and other devices that are inconvenient for the user to use, it is determined that the use environment information meets the seventh preset rule; and/or, before the user is in the driving environment, when the first control center is one of the devices that are convenient for the user to use in the driving environment, such as smart watches, smart earphones, and vehicle terminals, it is determined that the use environment information does not meet the seventh preset rule.

Detecting whether the user is in the driving environment can be determined according to the scene mode (such as driving mode, navigation mode, etc.) of the first control center, or according to motion sensors or geographical information of the first control center and/or other devices, or according to the camera data of the first control center and/or other devices, or according to the first control center and/or other device wireless connection information (such as accessed WIFI hotspots, paired and connected Bluetooth devices, etc.).

In another embodiment, if the user is in a meeting environment, it is inconvenient for the user to use devices such as smart earphones that need to be controlled by voice instructions, but it is convenient to use devices such as mobile phones and smart watches that can be controlled by touch instructions. Therefore, before the user is in the meeting environment, when the first control center is one of the devices such as smart earphones that are inconvenient for the user to use during the meeting, it is determined that the use environment information meets the seventh preset rule; and/or, before the user is in the meeting environment, when the first control center is one of the mobile phones, smart watches and other devices that are convenient for the user to use during the meeting, it is determined that the use environment information does not meet the seventh preset rule.

Detecting whether the traffic information meets an eighth preset rule.

In an embodiment, detecting whether the traffic information meets the eighth preset rule. The eighth preset rule is a rule determined by detecting traffic information that the first control center in the network is not suitable to continue to serve as a control center to provide control functions. In order not to affect the linkage of each device in the network, it is necessary to select a device with a large amount of remaining traffic as the control center. It may be that the remaining traffic of other devices controlled by the first control center in the network is greater than the remaining traffic of the first control center, it is determined that the traffic information meets the eighth preset rule.

In this embodiment, a first remaining traffic threshold may also be set for the comparison between the remaining traffic of other devices controlled by the first control center in the network and the remaining traffic of the first control center. For example, when the remaining traffic of other devices controlled by the first control center in the network is greater than or equal to the sum of the remaining traffic of the first control center and the first remaining traffic threshold, it is determined that the traffic information meets the eighth preset rule; and/or, when there is no other devices controlled by the first control center in the network, the remaining traffic of the device is greater than or equal to the sum of the remaining traffic of the first control center and the first remaining traffic threshold, that is, the remaining traffic of other devices controlled by the first control center in the network is less than the sum of the remaining traffic of the first control center and the first remaining traffic threshold, and it is determined that the traffic information does not meet the eighth preset rule.

Detecting whether the use habit information meets a ninth preset rule.

In an embodiment, detecting whether the use habit information meets the ninth preset rule. The ninth preset rule is a rule for determining that the first control center in the network is not suitable for continuing to serve as a control center to provide control functions by detecting use habit information.

In an embodiment, if users are used to running with smart earphones or smart watches at a certain time in the morning, watching videos on a PAD at a certain time in the evening, and using mobile phones to read at a certain time in the morning on weekends, the first control center at the corresponding time point is not a device conforming to the user habits, it may be determined that the ninth preset rule is met.

In another embodiment, if users are used to using different devices in different environments, such as watching smart TV at home, watching vehicle terminals in the car, and using smartphones in the company, etc., and the first control center in the corresponding environment is not a device conforming to user habits, it may be determined that the ninth preset rule is met.

detecting whether the currently used application information meets a tenth preset rule.

In an embodiment, detecting whether the currently used application information meets the tenth preset rule. The tenth preset rule is a rule for determining that the first control center in the network is not suitable to continue to serve as a control center to provide control functions by detecting the currently used application information.

In an embodiment, if the user is using the first control center to watch videos or play games, etc., in general, when watching videos and playing games, the corresponding device interfaces are displayed in full screen, which is inconvenient for users to switch to the corresponding application interface of the first control center to use the control functions of the first control center. Therefore, if the first control center is running video applications, game applications and other applications that are inconvenient to switch to other interfaces, it is determined that the currently used application information meets the tenth preset rule; and/or, if the first control center is running an application that facilitates switching to other interfaces, it is determined that the currently used application information does not meet the tenth preset rule.

In another embodiment, if the user is making a phone call, video chatting, or conference call, and it is inconvenient for the user to switch interfaces or controls at this time, it is determined that the currently used application information meets the tenth preset rule.

Detecting whether the distance information meets an eleventh preset rule.

In an embodiment, detecting whether the distance information meets the eleventh preset rule. The eleventh preset rule is a rule for determining that the first control center in the network is not suitable for continuing to serve as a control center to provide control functions by detecting distance information.

In an embodiment, when the distance between the user and the first control center exceeds a preset range, it is determined that the distance information meets the eleventh preset rule.

detecting whether the user physiological information meets a twelfth preset rule.

In an embodiment, detecting whether the user physiological information meets the twelfth preset rule. The twelfth preset rule is a rule for determining that the first control center in the network is not suitable to continue to serve as a control center to provide control functions by detecting user physiological information.

In an embodiment, when it is detected that the user physiological information reaches a preset physiological information threshold, it is determined that the user physiological information meets the twelfth preset rule. The user physiological information may be detected by the first control center and/or other devices. Physiological information may be at least one of heart rate, blood pressure, pulse, blood oxygen, and blood sugar.

Operation S30, in response that the preset information meets the preset rule, performing a corresponding device control operation according to a preset strategy.

The purpose of performing the corresponding device control operation according to the preset strategy may be to transfer or migrate or duplicate or backup the relevant data and/or control functions of the first control center, or to output prompts and the like.

If the preset information meets the preset rule, the first control center performs corresponding control-related operations according to the preset strategy.

The operation S13 includes at least one of the following:
if the connection state information meets the first preset rule, performing a corresponding device control operation according to the first preset strategy.

In an embodiment, if the connection state information meets the first preset rule, the first control center performs a corresponding device control operation according to the first preset strategy.

The first preset strategy includes: switching to a new control center and/or outputting prompt information. The device for outputting prompt information may be the first control center or the new control center or other devices controlled by the first control center in the network.

In an embodiment, the new control center includes at least one of the following:
at least one of the other devices controlled by the first control center in the network; or at least one of other devices controlled by the first control center in the network that do not meet the first preset rule; or a device with the least number of connections among other devices controlled by the first control center in the network; or among other devices controlled by the first control center in the network, the device has the smoothest connection state or the least number of disconnections.

If the network rate information meets the second preset rule, a corresponding device control operation is executed according to the second preset strategy.

If the network rate information meets the second preset rule, the first control center performs a corresponding device control operation according to the second preset strategy.

The second preset strategy includes: switching to a new control center and/or outputting prompt information. The device for outputting prompt information may be the first control center or the new control center or other devices controlled by the first control center in the network.

The new control center includes at least one of the following:
at least one of the other devices controlled by the first control center in the network; or
at least one of other devices controlled by the first control center in the network that do not meet the second preset rule; or
the device with the best network rate among other devices controlled by the first control center in the network.

If the device state information meets the third preset rule, a corresponding device control operation is performed according to the third preset strategy.

If the device state information meets the third preset rule, the first control center performs the corresponding device control operation according to the third preset strategy.

The third preset strategy includes: switching to a new control center and/or outputting prompt information. The device for outputting prompt information may be the first control center or the new control center or other devices controlled by the first control center in the network.

The new control center includes at least one of the following:
at least one of the other devices controlled by the first control center in the network; or
at least one of other devices controlled by the first control center in the network that do not meet the third preset rule; or
the device with the largest number of CPUs or the highest frequency among other devices controlled by the first control center in the network; or
the device with the largest number of GPUs or the highest frequency among other devices controlled by the first control center in the network; or
the device with the largest number of NPUs or the highest frequency among other devices controlled by the first control center in the network; or
the device with the largest memory capacity or the fastest processing speed among other devices controlled by the first control center in the network; or
the device with the shortest response time among other devices controlled by the first control center in the network; or
a device in a charging or non-charging state among other devices controlled by the first control center in the network; or
a device in a state of motion or non-motion among other devices controlled by the first control center in the network; or
a device in a non-stuck state among other devices controlled by the first control center in the network.

If the power information meets the fourth preset rule, a corresponding device control operation is executed according to the fourth preset strategy.

If the power information meets the fourth preset rule, the first control center performs a corresponding device control operation according to the fourth preset strategy.

The fourth preset strategy includes: switching to a new control center and/or outputting prompt information. The device for outputting prompt information may be the first control center or the new control center or other devices controlled by the first control center in the network.

The new control center includes at least one of the following:
at least one of the other devices controlled by the first control center in the network; or
at least one of other devices controlled by the first control center in the network that do not meet the fourth preset rule; or
the device with the most remaining power among other devices controlled by the first control center in the network; or
the device with the largest battery capacity among other devices controlled by the first control center in the network; or
the device with the longest available time corresponding to the power among other devices controlled by the first control center in the network.

If the storage space information meets the fifth preset rule, a corresponding device control operation is executed according to the fifth preset strategy.

If the storage space information meets the fifth preset rule, the first control center performs a corresponding device control operation according to the fifth preset strategy.

The fifth preset strategy includes: switching to a new control center and/or outputting prompt information. The device for outputting prompt information may be the first control center or the new control center or other devices controlled by the first control center in the network.

The new control center includes at least one of the following:
at least one of the other devices controlled by the first control center in the network; or
at least one of other devices controlled by the first control center in the network that do not meet the fifth preset rule; or
the device with the largest remaining storage space among other devices controlled by the first control center in the network; or
the device with the fastest storage space access speed among other devices controlled by the first control center in the network.

If the external environment information meets the sixth preset rule, a corresponding device control operation is executed according to the sixth preset strategy.

If the external environment information meets the sixth preset rule, the first control center performs corresponding device control operations according to the sixth preset strategy.

The sixth preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or,
- at least one of other devices controlled by the first control center in the network that do not meet the sixth preset rule; or
- a device that meets the time limit condition among other devices controlled by the first control center in the network; or
- a device that meets the geographic restriction condition among other devices controlled by the first control center in the network.

If the use environment information meets the seventh preset rule, the corresponding device control operation is executed according to the seventh preset strategy.

If the use environment information meets the seventh preset rule, the first control center performs a corresponding device control operation according to the seventh preset strategy.

The seventh preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or
- at least one of other devices controlled by the first control center in the network that do not satisfy the seventh preset rule; or
- one of the devices that are convenient to use in the user's environment among the other devices controlled by the first control center in the network.

If the traffic information meets the eighth preset rule, a corresponding device control operation is executed according to the eighth preset strategy.

If the traffic information meets the eighth preset rule, the first control center performs a corresponding device control operation according to the eighth preset strategy.

The eighth preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or
- at least one of other devices controlled by the first control center in the network that do not meet the eighth preset rule; or
- the device with the most remaining traffic among other devices controlled by the first control center in the network.

If the use habit information meets the ninth preset rule, a corresponding device control operation is performed according to the ninth preset strategy.

If the use habit information meets the ninth preset rule, the first control center performs the corresponding device control operation according to the ninth preset strategy.

The ninth preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or
- at least one of other devices controlled by the first control center in the network that do not meet the ninth preset rule; or
- one of the other devices controlled by the first control center in the network that meets the user use habits; or
- one of the other devices controlled by the first control center in the network that meets the use habits in the environment.

If the currently used application information meets the tenth preset rule, a corresponding device control operation is executed according to the tenth preset strategy.

If the currently used application information meets the tenth preset rule, the first control center performs a corresponding device control operation according to the tenth preset strategy.

The tenth preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or
- at least one of other devices controlled by the first control center in the network that do not meet the tenth preset rule; or
- one of the other devices controlled by the first control center in the network that is not currently running video applications or game applications or other preset applications; or
- one of the other devices controlled by the first control center in the network that is not currently in a call or video chat or conference call or other preset use state.

If the distance information meets the eleventh preset rule, a corresponding device control operation is executed according to the eleventh preset strategy.

If the distance information meets the eleventh preset rule, the first control center performs the corresponding device control operation according to the eleventh preset strategy.

The eleventh preset strategy includes: switching to a new control center and/or outputting prompt information. The device for outputting prompt information may be the first control center or the new control center or other devices controlled by the first control center in the network.

The new control center includes at least one of the following:
- at least one of the other devices controlled by the first control center in the network; or
- at least one of other devices controlled by the first control center in the network that do not meet the eleventh preset rule; or
- one of the devices currently closest to the user among other devices controlled by the first control center in the network; or,
- one of the devices with the shortest total distance to other devices among the other devices controlled by the first control center in the network.

If the user physiological information meets the twelfth preset rule, a corresponding device control operation is executed according to the twelfth preset strategy.

If the user physiological information meets the twelfth preset rule, the first control center performs the corresponding device control operation according to the twelfth preset strategy.

The twelfth preset strategy includes: switching to a new control center and/or outputting prompt information. The device for outputting prompt information may be the first control center or the new control center or other devices controlled by the first control center in the network.

In this embodiment, S10, obtaining preset information, the preset information is provided by the first control center and/or other devices controlled by the first control center; S11, detecting whether the preset information meets a preset rule; S12, when the preset information meets the preset rule, performing a corresponding device control operation according to a preset strategy. A network is formed between the first control center and other devices controlled by it, and the first control center obtains preset information provided by the first control center and/or other devices controlled by the first control center. When the preset information meets the preset rules, the first control center can automatically perform corresponding device control operations on other devices controlled by the first control center in the network according to the preset strategy, such that the use of the first control center and other devices controlled by it is more intelligent, convenient and faster.

Based on the above-mentioned embodiment, another embodiment of the processing method of the present application is proposed, and the processing method further includes:

performing the corresponding device control operation.

Operation A10, in response that the preset information does not meet the first preset rule, the second preset rule, the third preset rule, the fourth preset rule, the fifth preset rule, the sixth preset rule, the seventh preset rule, the eighth preset rule, the ninth preset rule, the tenth preset rule, the eleventh preset rule, or the twelfth preset rule, setting the corresponding device as a second control center. The corresponding device is one of the devices controlled by the first control center.

In an embodiment, the first preset strategy sets the corresponding device as the second control center when the above-mentioned connection state information in the network does not meet the first preset rule. The second preset strategy sets the corresponding device as the second control center when the network rate information in the above-mentioned network does not meet the second preset rule. The third preset strategy sets the corresponding device as the second control center when the state information of the above-mentioned devices in the network does not meet the third preset rule. The fourth preset strategy sets the corresponding device as the second control center when the above-mentioned power information in the network does not meet the fourth preset rule. The fifth preset strategy sets the corresponding device as the second control center when the above-mentioned storage space information in the network does not meet the fifth preset rule. The sixth preset strategy sets the corresponding device as the second control center when the above-mentioned internal and external environment information in the network does not meet the sixth preset rule. The seventh preset strategy sets the corresponding device as the second control center when the above-mentioned use environment information in the network does not meet the seventh preset rule. The eighth preset strategy sets the corresponding device as the second control center when the above-mentioned traffic information in the network does not meet the eighth preset rule. The ninth preset strategy sets the corresponding device as the second control center when the use habit information in the above-mentioned network does not meet the ninth preset rule. The tenth preset strategy sets the corresponding device as the second control center when the application information currently used in the network does not meet the tenth preset rule. The eleventh preset strategy sets the corresponding device as the second control center when the above-mentioned distance information in the network does not meet the eleventh preset rule. The twelfth preset strategy sets the corresponding device as the second control center when the physiological information of the above-mentioned users in the network does not meet the twelfth preset rule. The corresponding device is one of the devices in the network other than the first control center, that is, one of the devices controlled by the first control center.

In an embodiment, for the case where the above-mentioned connection state information in the network does not meet the first preset rule, the corresponding device is set as the second control center through the first preset strategy. Since the first control center withdraws from the network, other devices controlled by the first control center can select the second control center through negotiation. The specific negotiation is to select the second control center according to the second preset rule, the third preset rule, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case where the above-mentioned network rate information in the network does not meet the second preset rule, the corresponding device is set as the second control center through the second preset strategy, the device with the best network rate among other devices controlled by the first control center in the network can be taken as the second control center.

For the case where the corresponding device is set as the second control center when the state information of the above-mentioned devices in the network does not meet the third preset rule through the third preset strategy, among the other devices controlled by the first control center in the network, the device with the shortest response time corresponding to the device state or one of the devices in the non-charging state among the other devices controlled by the first control center in the network can be taken as the second control center. If there is only one device in the non-charging state among other devices controlled by the first control center in the network, then the device is taken as the second control center. If there are multiple devices in the non-charging state among other devices controlled by the first control center in the network, the second control center can be selected according to the second preset rule, the third preset rule, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case of setting the corresponding device as the second control center when the power information in the network does not meet the fourth preset rule through the fourth preset strategy, among the other devices controlled by the first control center in the network, the device with the longest available time corresponding to the electricity can be taken as the second control center.

For the case where the above-mentioned storage space information in the network does not meet the fifth preset rule, the corresponding device is set as the second control center through the fifth preset strategy, among the other devices controlled by the first control center in the network, the device with the largest remaining storage space can be taken as the second control center.

For the case where the above-mentioned networked internal and external environment information does not meet the sixth preset rule, the corresponding device is set as the second control center through the sixth preset strategy. If there is only one device that is conveniently obtained when the user wakes up from a sleep state in the network, the device is taken as the second control center. If there are multiple devices that are conveniently obtained when the user wakes up from a sleep state in the network, the second control center can be selected according to the second preset rule, the third preset rule, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case where the above-mentioned use environment information in the network does not meet the seventh preset rule and the corresponding device is set as the second control center through the seventh preset strategy, if there is only one device that is convenient for the user to use in the driving environment in the network, this device will be taken as the second control center. If there are multiple devices that are convenient for the user to use in the driving environment in the network, the second control center can be selected according to the second preset rule, the third preset rule, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case where the above-mentioned traffic information in the network does not meet the eighth preset rule and the corresponding device is set as the second control center through the eighth preset strategy, among the other devices controlled by the first control center in the network, the device with the most remaining traffic can be taken as the second control center.

For the case where the above-mentioned use habit information in the network does not meet the ninth preset rule and the corresponding device is set as the second control center through the ninth preset strategy, the device that triggers the use habit condition in the network can be taken as the second control center.

For the case where the corresponding device when the application information currently used in the above-mentioned network does not meet the tenth preset rule is set as the second control center through the tenth preset strategy. Other devices controlled by the first control center can select the second control center through negotiation. The specific negotiation is to select the second control center according to the second preset rule, the third preset rule corresponding to the device state part, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case where the above-mentioned distance information in the network does not meet the eleventh preset rule and the corresponding device is set as the second control center through the eleventh preset strategy. Other devices controlled by the first control center can select the second control center through negotiation. The specific negotiation is to select the second control center according to the second preset rule, the third preset rule corresponding to the device state part, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is taken as the second control center.

For the case where the corresponding device when the physiological information of the above-mentioned users in the network does not meet the twelfth preset rule is set as the second control center through the twelfth preset strategy, if there is only one device that is conveniently obtained when the user wakes up from a sleep state in the network, the device is used as the second control center. If there are multiple devices that are conveniently obtained when the user wakes up from a sleep state in the network, the second control center can be selected according to the second preset rule, the third preset rule, the fourth preset rule, the fifth preset rule, the eighth preset rule or the ninth preset rule. The device with the longest available time corresponding to the electricity among other devices controlled by the first control center in the network that does not meet the fourth preset rule is taken as the second control center. The device with the largest remaining storage space among other devices controlled by the first control center in the network that does not meet the fifth preset rule is used as the second control center.

In an embodiment, the processing method further includes:

Operation A12, migrating relevant data in the first control center to the second control center; and/or transferring the control functions of the first control center to the second control center.

The first control center migrates relevant data in the first control center to the second control center; and/or the first control center transfers the control function of the first control center to the second control center.

When the first control center transfers the control function of the first control center to the second control center, the relevant data in the first control center can be migrated to the second control center, so that the second control center can perform the control function according to the relevant data. In addition, all devices in the network have the ability to act as a control center. Therefore, when the first control center does not migrate the relevant data in the first control center to the second control center, but only transfers the control function of the first control center to the second control center, the second control center can also perform the control function.

When the first control center is performing the control function, it can synchronize relevant data to the cloud, and if the first control center meets the first preset rule, since the first control center has not yet had time to migrate relevant data to the second control center, it has withdrawn from the Internet, other devices controlled by the first control center in the network can continue to use the relevant data before the first control center exits the network, such as maintaining the setting item parameters. The second control center obtains relevant data from the cloud before the first control center exits the network. For the case where the first control center meets the eleventh preset rule, the first control center starts to migrate relevant data when the distance from other devices it controls is greater than or equal to a preset distance threshold, so as to ensure that the relevant data migration is completed before the first control center is disconnected from the network.

In an embodiment, the relevant data includes at least one of the following: connection information data, setting item parameter data and relevant download data.

In an embodiment, the relevant data includes at least one of connection information data, setting item parameter data and relevant download data.

In an embodiment, the relevant data further includes at least one first relevant data and/or at least one second relevant data, and the operation A12 includes at least one of the following:
 only backing up or transferring the first relevant data in the first control center to the second control center;
 only backing up or transferring second relevant data corresponding to the first relevant data in the first control center to the second control center;
 in addition to backing up or transferring the first relevant data in the first control center to the second control center, backing up or transferring the second relevant data corresponding to the first relevant data to the second control center;
 backing up or transferring the first relevant data and corresponding update data in the first control center to the second control center;
 backing up or transferring the second relevant data corresponding to the first relevant data and the corresponding update data in the first control center to the second control center; and
 backing up or transferring the first relevant data and the corresponding update data in the first control center, and the update data of the second relevant data corresponding to the first relevant data to the second control center.

The relevant data also includes at least one first relevant data and/or at least one second relevant data. After the second control center is determined, the relevant data in the first control center can be selectively backed up or transferred to the second control center, so that the second control center can perform control functions according to the relevant data. The way of backing up or transferring the first relevant data and the second relevant data may include at least one of the following: only backing up or transferring the first relevant data in the first control center to the second control center; only backing up or transferring the second relevant data in the first control center to the second control center; in addition to backing up or transferring the first relevant data in the first control center to the second control center, backing up or transferring the second relevant data corresponding to the first relevant data to the second control center; backing up or transferring the first relevant data and corresponding update data in the first control center to the second control center; backing up or transferring the second relevant data and corresponding update data in the first control center to the second control center; backing up or transferring the first relevant data and the corresponding update data in the first control center, and the update data of the second relevant data to the second control center.

In an embodiment, when the first control center transfers the control functions of the first control center to the second control center, at least one of connection information data, setting item parameter data and relevant download data in the first control center can be migrated to the second control center. For example, the connection information data is migrated to the second control center, so that the second control center can establish a connection relationship with other devices controlled by the first control center according to the connection information data. For example, according to the physical address of the device in the connection information data, the second control center directly initiates a connection request to the device corresponding to the physical address of the device, which is not necessary to first search for devices within the connectable range of the second control center to obtain the physical addresses of the devices, so as to initiate a connection request.

In an embodiment, the migration manner of the relevant data includes at least one of the following: synchronous, asynchronous, real-time, appointment time, according to user settings, according to user habits, same as last selection or setting.

In an embodiment, the migration methods of relevant data may be different, and may include at least one of synchronous, asynchronous, real-time, appointment time, according to user settings, according to user habits, same as last selection or setting.

In an embodiment, the processing method further includes:
 operation A13, before migrating or transferring or duplicating or backing up the control function of the first control center to the second control center, obtaining first corresponding information related to the second control center.

In an embodiment, before the control function of the first control center is migrated or transferred or copied or backed up to the second control center, the first corresponding information related to the second control center is obtained.

Operation A14, processing the first corresponding information.

In an embodiment, the first corresponding information is processed.

In an embodiment, the processing the first corresponding information includes at least one of the following:
 If the first corresponding information meets the first preset condition, then performing the operation of transferring the control function of the first control center to the second control center;
 If the first corresponding information does not meet the first preset condition, not performing the operation of transferring the control function of the first control center to the second control center, and/or outputting prompt information at the first control center and/or the second control center.

In an embodiment, if the first corresponding information meets the first preset condition, the operation of transferring the control function of the first control center to the second control center is performed; and if the first corresponding information does not meet the first preset condition, the operation of transferring the control function of the first control center to the second control center is not performed, and/or the prompt information is output at the first control center and/or the second control center.

In an embodiment, the first corresponding information includes the first instruction information input on the second control center and/or at least one of connection state information, network rate information, device state information, power information, storage space information, external environment information, use environment information, traffic information, use habit information, currently used application information, distance information, and user physiological information of the second control center. The meeting the first preset condition includes at least one of the following:

If the first instruction information is biometric information, and the biometric information meets preset biometric information, meeting the first preset condition;

If the first instruction information is password information, and the password information meets preset password information, meeting the first preset condition;

If at least one of the connection state information, the network rate information, the device state information, the power information, the storage space information, the external environment information, the use environment information, the traffic information, the use habit information, the currently used application information, the distance information, and the user physiological information of the second control center meets the second preset condition, meeting the first preset condition.

In an embodiment, the first corresponding information includes the first instruction information input on the second control center and/or at least one of the connection state information, the network rate information, the device state information, the power information, the storage space information, the external environment information, the use environment information, the traffic information, the use habit information, the currently used application information, the distance information, and the user physiological information of the second control center.

For the case where the first corresponding information is the first instruction information input on the second control center, before the first control center transfers the control function, whether the control function can be transferred to the second control center needs to be determined according to whether the first instruction information input by the user on the second control center meets the first preset condition.

When the first corresponding information is at least one of the connection state information, the network rate information, the device state information, the power information, the storage space information, the external environment information, the use environment information, the traffic information, the use habit information, the currently used application information, the distance information, and the user physiological information of the second control center, before the first control center transfers the control function, whether the control function can be transferred to the second control center needs to be determined according to at least one of the connection state information, the network rate information, the device state information, the power information, the storage space information, the external environment information, the use environment information, the traffic information, the use habit information, the currently used application information, the distance information, and the user physiological information of the second control center meeting the second preset condition. In an embodiment, at least one of the connection state information, the network rate information, the device state information, the power information, the storage space information, the external environment information, the use environment information, the traffic information, the use habit information, the currently used application information, the distance information, and the user physiological information of the second control center meets the second preset condition, the first preset condition is met. The second preset condition is to satisfy the condition that the control function is switched from the first control center to the second control center.

In an embodiment, the processing method further includes:

Operation A15, after migrating or transferring or duplicating or backing up the control function of the first control center to the second control center, receiving second instruction information sent by other devices controlled by the second control center. In an embodiment, the second instruction information is input by a user on other devices controlled by the second control center.

In an embodiment, other devices controlled by the second control center include at least the first device, the second instruction information includes at least third instruction information, and the third instruction information includes at least one of the following:

The first voice instruction information, the first interface operation instruction information, the first preset screen touch gesture instruction information, the first preset space gesture instruction information, and the first gesture instruction information.

Other devices controlled by the second control center include at least the first device. The second instruction information includes at least third instruction information. The third instruction information includes at least one of first voice instruction information, first interface operation instruction information, first preset screen touch gesture instruction information, first preset air gesture instruction information, and first gesture instruction information. In an embodiment, the first device is a device with a display function among other devices controlled by the second control center in the network, such as a PAD.

In an embodiment, the first voice instruction information is the instruction information input by the user through voice, including "play music on the mobile phone", "turn down the volume of the earphone by 10%" and so on. The first interface operation instruction information is the interface operation instruction information issued by the user by operating the corresponding control center application interface displayed on the display screen of the first device. The first preset screen touch gesture instruction information is the screen touch gesture instruction information sent by the user through the corresponding control center application operation interface displayed on the display screen of the first device to make a touch gesture. For example, draw a "circle" on the application operation interface of the control center to open the application or function of the corresponding device in the network, such as opening the camera function of the mobile phone. The first preset air gesture instruction information is similar to the first preset screen touch gesture instruction information, but the user does not need to touch the display screen of the first device. In the identifiable area above the application operation interface of the control center, you can issue an air gesture instruction to draw a "circle" to open the application or function of the corresponding device in the network, such as turning on the camera function of the mobile phone. The first gesture instruction information is the instruction information obtained by recognizing the user's gesture, for example, the user quickly swipes the first device to the left to start the application or function of the corresponding device in the network, such as turning on the camera function of the mobile phone.

In an embodiment, other devices controlled by the second control center also include a second device, and the second instruction information also includes fourth instruction information, and the fourth instruction information includes at least one of the following:

the second voice instruction information and the second gesture instruction information.

Other devices controlled by the second control center also include a second device, the second instruction information further includes fourth instruction information, and the fourth instruction information includes at least one of second voice instruction information and second gesture instruction information. The second device is a device without a display function among other devices controlled by the second control center in the network, such as a smart earphone.

In an embodiment, the second voice instruction information is instruction information input by the user through voice, including "play music using the mobile phone", "turn down the volume of the earphone by 10%" and so on. The second gesture instruction information is instruction information acquired by recognizing the user's gesture. For example, the user takes off the smart earphone to control the smart earphone to stop playing audio, or control the device that inputs audio to the smart earphone to stop outputting audio to the smart earphone.

Operation A16, responding to the second instruction information.

After receiving the second instruction information, the second control center responds to the second instruction information.

The second control center analyzes the second instruction information, and sends a corresponding control instruction to the networked device corresponding to the instruction according to the analyzed specific instruction, to respond to the second instruction information sent by the user. If the user enters the instruction information of "play music on the mobile phone" by voice, the second control center parses out that the specific instruction of the "play music with mobile phone" instruction information is to control the mobile phone to play music, and then sends an instruction to play music to mobile phones in the network, to respond to the "play music with mobile phone" instruction information sent by the user.

In other embodiments, in addition to other devices controlled by the second control center in the network as user instruction input devices, the second control center can also be directly used as user instruction input devices. The second control center acquires fifth instruction information input by the user on the second control center.

In an embodiment, the fifth instruction information includes at least one of the following: the third voice instruction information, the third interface operation instruction information, the third preset screen touch gesture instruction information, the third preset air gesture instruction information and the third gesture instruction information.

In an embodiment, the processing method further includes:

Operation A17, after migrating or transferring or duplicating or backing up the control function of the first control center to the second control center, outputting relevant prompt information at the first control center and/or the second control center.

The relevant prompt information includes at least one of the following: text information, voice information, lighting information, and vibration information.

Figure 4:
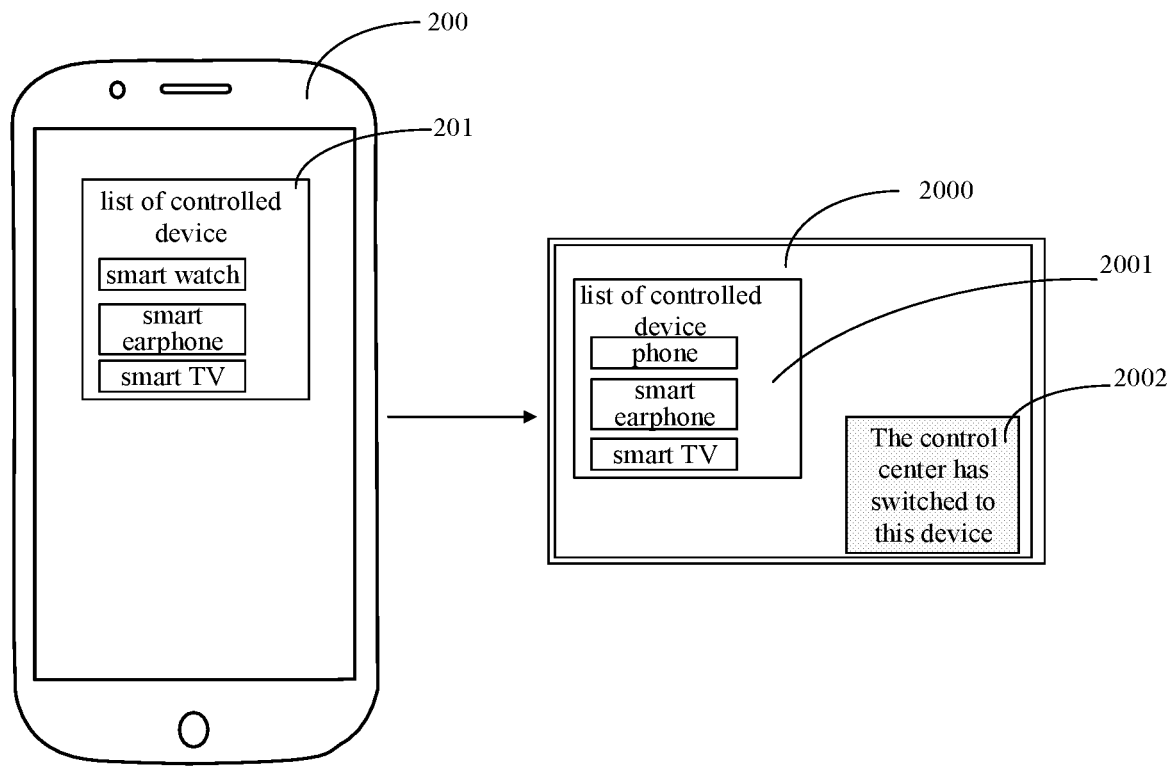
FIG. 4 is a schematic diagram of outputting text prompt information of the processing method of the present application.

For example, as shown in FIG. 4, 200 is the first control center, which is a mobile phone, and 201 is a list of devices controlled by the mobile phone, including smart watches, smart earphones and smart TVs. 2000 is the second control center, which is a smart watch controlled by a mobile phone. 2001 is the list of devices controlled by the smart watch after the control center is switched to the smart watch, including the first control center mobile phone, smart earphones and smart TV. 2002 is the pop-up box prompt information output by the second control center after the control center is switched from the first control center to the second control center. Of course, the pop-up box can also be output by the first control center.

Figure 5:
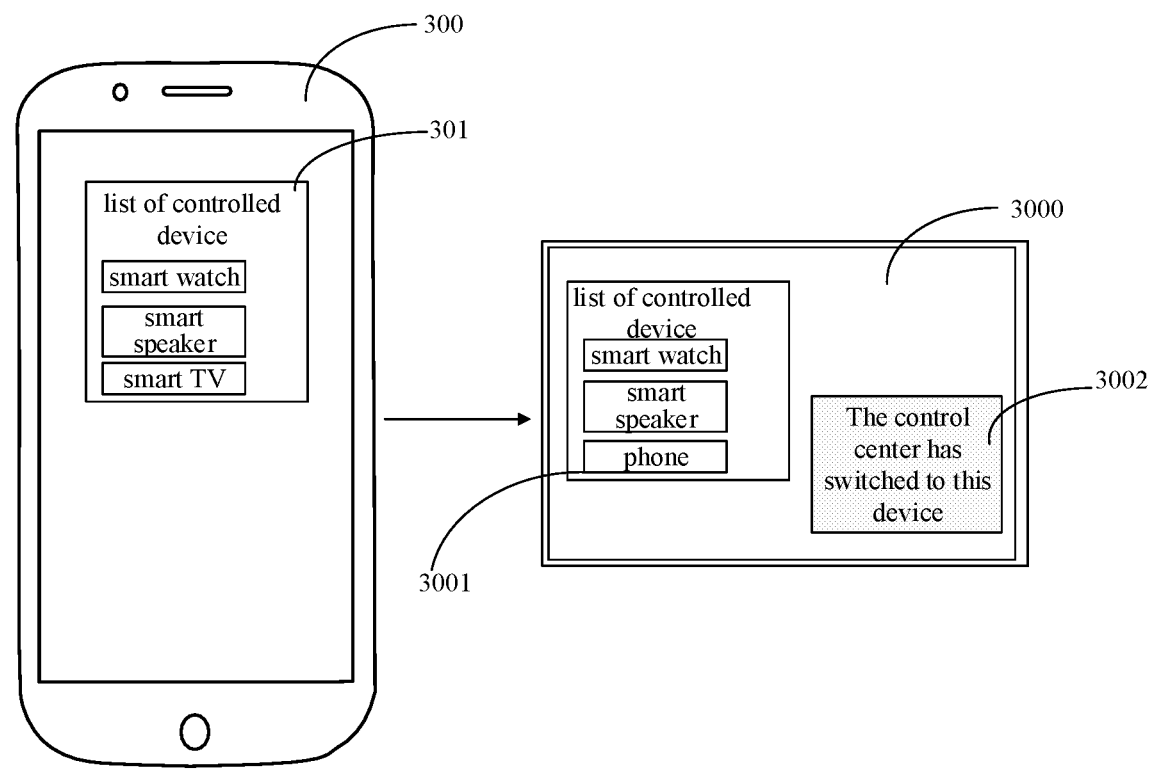
FIG. 5 is a schematic diagram of another output text prompt information of the processing method of the present application.

For another example, as shown in FIG. 5, 300 is the first control center, which is a mobile phone. 301 is a list of devices controlled by the mobile phone, including smart watches, smart speakers and smart TVs. 3000 is the second control center, which is a smart TV controlled by a mobile phone. 3001 is the list of devices controlled by the smart TV after the control center is switched to the smart TV, including the first control center mobile phone, smart speakers and smart watches. 3002 is the pop-up box prompt information output by the second control center after the control center is switched from the first control center to the second control center. Of course, the pop-up box can also be output by the first control center.

Figure 6:
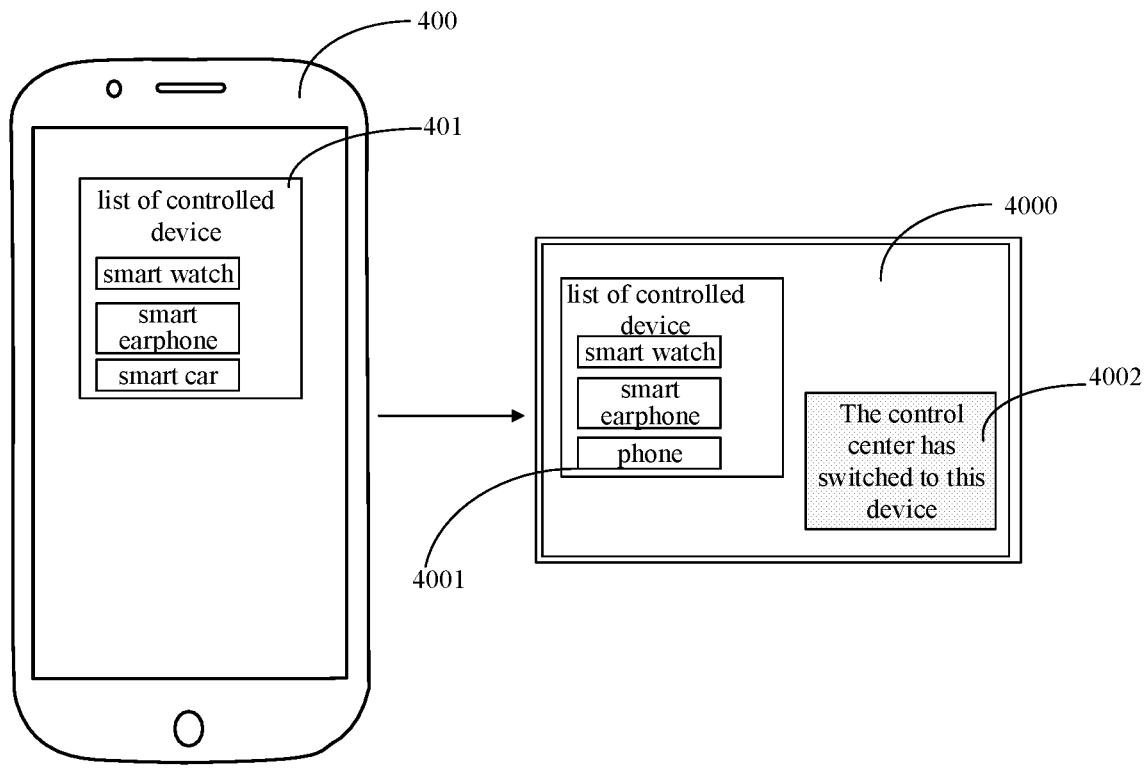
FIG. 6 is a schematic diagram of yet another output text prompt information of the processing method of the present application.

For another example, as shown in FIG. 6, 400 is the first control center, which is a mobile phone. 401 is a list of devices controlled by the mobile phone, including smart watches, smart earphones and smart cars. 4000 is the second control center, which is the central control display corresponding to the smart car controlled by the mobile phone. 4001 is the list of devices controlled by the smart car after the control center is switched to the smart car, including the first control center mobile phone, smart earphones and smart watches. 4002 is the pop-up box prompt information output by the central control display corresponding to the smart car in the second control center after the control center is switched from the first control center to the second control center. The pop-up box can also be output by the first control center.

In this embodiment, by migrating relevant data from the first control center to the second control center, identifying whether the user of the second control center is a registered user and obtaining at least one of one of the connection state information, the network rate information, the device state information, the power information, the storage space information, the external environment information, the use environment information, the traffic information, the use habit information, the currently used application information, the distance information, and the user physiological information through the second control center to determine whether the second control center is suitable as a control center again, to ensure that the second control center can better perform the control function and is suitable as the control center. In addition, after the control center is switched, relevant prompt information is output to remind the user, which improves the user experience.

Figure 7:
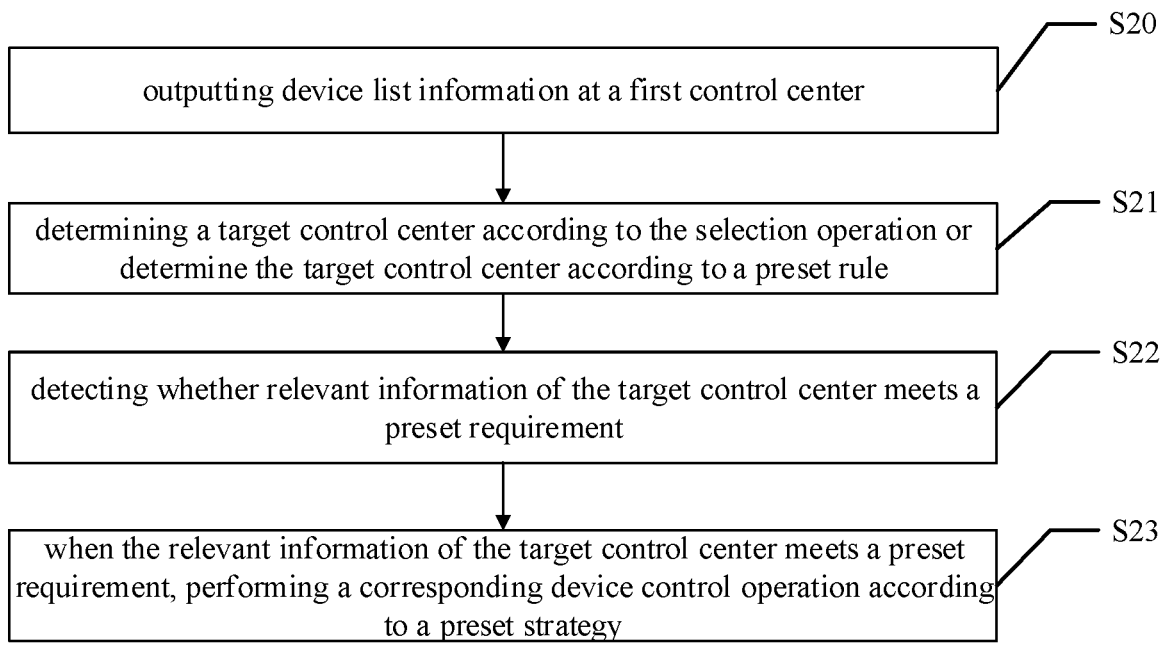
FIG. 7 is a schematic flowchart of the processing method according to another embodiment of the present application.

In an embodiment, the present application provides another embodiment of the processing method. As shown in FIG. 7, the processing method includes:

S20, outputting device list information at the first control center, the device includes at least one other device controlled by the first control center.

The device list information is output at the first control center. The device includes at least one other device controlled by the first control center, and the device list information may be list information consisting of icons and names representing devices.

Before the operation S20, the method includes:
Operation S24, determining whether it is a preset mode;
Operation S25, if yes, performing the operation S20.

The first control center determines whether it is currently in the preset mode, and if it is currently in the preset mode, the operation of outputting the device list information at the first control center is performed. If it is not currently in the preset mode, the operation of outputting the device list information at the first control center is not performed. The preset modes include smart mode, automatic switching mode and other modes that support switching control centers.

S21, determining the target control center according to the selection operation, or determining the target control center according to preset rules.

The first control center determines the target control center according to the user's selection operation. The first control center selects a certain device as the target control center through the user's selection operation in the output device list information.

The preset rule can be the same as the user's last selection, or can be the first, middle or last one in the default selection device list, can also be set as the one with the most successes or the least failures of the target control center within a certain period of time (such as the past week, or the past month, or the complete historical period), can also choose one at random, can also be the one that is most convenient (such as being used) according to the user's use habits or operations, can also be one of at least one of network rate information, state information, environment information, use information, distance information, and user physiological information that meets the requirements (if multiple devices meet the requirements at the same time, they can also be sorted according to the corresponding parameter values, and the largest one is preferred).

S22, detecting whether the relevant information of the target control center meets the preset requirement.

During the use of wearable smart devices, terminal devices (such as mobile phone, Portable Android Device (PAD), tablet computer) will establish a connection relationship with wearable smart devices (such as smart watches, smart bracelets, smart earphones, etc.), smart home devices (such as smart TV, smart speakers, etc.), and Internet of Vehicles devices (such as smart cars, vehicle terminals, etc.) to form a network and set up a control center. The control center can be any device in the networked devices, so as to facilitate the management and use of the networked devices by the user. In this embodiment, the control function is provided by the first control center, and the managed devices are the first control center itself and other devices controlled by the first control center. In addition, the first control center may be a terminal device, or may be a wearable smart device, a smart home device, or an Internet of Vehicles device. When the control center is not static, it can be switched between connected devices such as wearable smart devices and terminal devices. The switch of the control center is based on the user's selection operation and the relevant information of the target control center, which is provided by the first control center and other devices controlled by the first control center.

After the first control center determines the target control center according to the user's selection operation, it detects whether the relevant information of the target control center meets the preset requirement.

The relevant information includes at least one of the following: network rate information, state information, environment information, use information, distance information, and user physiological information.

In this embodiment, a first available time threshold may be set for the comparison between the available time corresponding to the power of other devices controlled by the first control center in the network and the available time corresponding to the power of the first control center. For example, when other devices controlled by the first control center in the network have an available time corresponding to the power of the device that is longer than or equal to the sum of the available time corresponding to the power of the first control center and the first available time threshold, it is determined that the power information meets the power requirements. When there is no other device controlled by the first control center in the network, the available time corresponding to the power of the device is longer than or equal to the sum of the available time corresponding to the power of the first control center and the first available time threshold, that is, when the available time corresponding to the power of other devices controlled by the first control center in the network is less than the sum of the available time corresponding to the power of the first control center and the first available time threshold, it is determined that the power information does not meet the power requirement.

For example, the available time corresponding to the power of the first control center is 200 minutes, the threshold of the first available time is 30 minutes, and other devices controlled by the first control center in the network have a corresponding available time of 170 minutes. When other devices controlled by the first control center in the network have an available time corresponding to the power of the device equal to the sum of the available time corresponding to the power of the first control center and the first available time threshold, it is determined that the power information meets the power requirement.

In other embodiments, a second available time threshold may also be set, and the second available time threshold is the minimum available time that does not affect the ability of the first control center to provide management services. If the available time corresponding to the power of the first control center is longer than or equal to the second available time threshold, it is determined that the power information does not meet the power requirement. If the available time corresponding to the power of the first control center is shorter than the second available time threshold, it is determined that the power information meets the power requirement.

For example, the available time corresponding to the power of the first control center is 180 minutes, and the second available time threshold is 200 minutes. Since the available time corresponding to the power of the first control center is shorter than the second available time threshold, it can be determined that the power information meets the power requirement.

Detect whether the storage space information meets the storage space requirements.

In other embodiments, a second remaining storage space threshold may also be set, and the second remaining storage space threshold is the minimum remaining storage space that does not affect the ability of the first control center to provide management services. If the remaining storage space of the first control center is greater than or equal to the second remaining storage space threshold, it is determined that the storage space information does not meet the storage space requirements. If the remaining storage space of the first control center is smaller than the second remaining storage space threshold, it is determined that the storage space information meets the storage space requirement.

For example, the remaining storage space of the first control center is 1800 MB, and the second remaining storage space threshold is 2000 MB. Since the remaining storage space of the first control center is smaller than the second remaining storage space threshold, it may be determined that the storage space information meets the storage space requirement.

Detecting whether the external environment information meets external environment requirements.

Detect whether the external environment information meets the external environment requirements. The external environment requirements are rules for providing control functions by determining that the first control center in the network is not suitable to continue to be a control center by detecting external environment information. When it is detected that the brightness of the external ambient light reaches the brightness threshold and the loudness of the external environmental noise reaches the loudness threshold, it is determined that the external environment information meets the external environment requirements. When it is detected that the brightness of the external environment light does not reach the brightness threshold and/or the loudness of the external environment noise does not reach the loudness threshold, it is determined that the external environment information does not meet the external environment requirements.

Detecting whether the use environment information meets the use environment requirements.

Whether the use environment information meets the use environment requirements is detected. The use environment requirement is to determine that the first control center in the network is not suitable to continue to be the control center by detecting the use environment information, so as to provide rules for control functions. When the first control center detects that the user is in a sports environment, it is obvious that the user is inconvenient to use devices such as mobile phones and PADs, but it is convenient to use devices such as smart bracelets and smart watches. Therefore, if before the user is in the exercise environment, the first control center is one of the devices that are inconvenient for the user to use when exercising, such as mobile phones and PADs, then it is determined that the use environment information meets the use environment requirements. If the user is in the exercise environment and the first control center is one of the devices that are convenient for the user to use during exercise, such as smart bracelets and smart watches, it is determined that the use environment information does not meet the use environment requirements.

Detecting whether the traffic information meets the traffic requirement.

For example, the remaining traffic of the first control center is 2000 MB, the threshold of the first remaining traffic is 300 MB, and other devices controlled by the first control center in the network have a remaining traffic of 2300 MB. When the remaining traffic of other devices controlled by the first control center in the network is equal to the sum of the remaining traffic of the first control center and the first remaining traffic threshold, it is determined that the traffic information meets the traffic requirements.

In other embodiments, a second remaining traffic threshold may also be set, and the second remaining traffic threshold is the minimum remaining traffic that does not affect the ability of the first control center to provide management services. If the remaining traffic of the first control center is greater than or equal to the second remaining traffic threshold, it is determined that the traffic information does not meet the traffic requirement; if the remaining traffic of the first control center is less than the second remaining traffic threshold, it is determined that the traffic information meets the traffic requirement.

For example, the remaining traffic of the first control center is 1800 MB, and the second remaining traffic threshold is 2000 M B. Since the remaining traffic of the first control center is less than the second remaining traffic threshold, it may be determined that the traffic information meets the traffic requirement.

Detecting whether the use habit information meets the use habit requirements.

Detecting whether the currently used application information meets the requirements of the currently used application.

Detecting whether the distance information meets the distance requirement.

Detect whether the distance information meets the distance requirement. The distance requirement is a rule for providing control functions by determining that the first control center in the network is not suitable to continue to be a control center by detecting distance information. Each device in the network will have a certain relative distance when the user uses it. When the distance between the first control center and other devices controlled by the first control center is greater than or equal to a preset distance threshold, it is determined that the distance information meets the distance requirement. When the distance between the first control center and other devices controlled by the first control center is less than a preset distance threshold, it is determined that the distance information does not meet the distance requirement.

Detecting whether the user physiological information meets the user physiological requirements.

Detect whether the user physiological information meets the user physiological requirements. The user physiological requirement is to determine by detecting the user physiological information that the first control center in the network is not suitable to continue to serve as the control center, so as to provide rules for controlling functions. When the first control center detects that the user physiological information sent by each device in the network reaches the preset physiological information threshold. When it is detected that the user's heart rate is less than or equal to the preset heart rate threshold, it means that the user is in a sleep state, and it is determined that the user physiological information meets the user physiological requirements. When it is detected that the user's heart rate is not less than or equal to the preset heart rate threshold, it means that the user is in a non-sleeping state, and it is determined that the user physiological information does not meet the user physiological requirements.

Operation S23, if yes, performing a corresponding device control operation according to a preset strategy.

The purpose of performing the corresponding device control operation according to the preset strategy strategy be to transfer or migrate or copy or backup the relevant data and/or control functions of the first control center, or to output prompts and the like.

Understandably, the target control center selected by the user or automatically determined is not necessarily the best control center device. In order to achieve smarter and more flexible device control effects, before performing corresponding device control operations (such as transferring or migrating or copying or backing up relevant data and/or control functions of the first control center to the target control center), according to the technical solution of this embodiment, it is also necessary to determine whether the relevant information of the target control center meets the preset requirements.

If the relevant information of the target control center meets the preset requirements, the corresponding equipment control operation is performed according to the preset strategy; and/or, if the relevant information of the target control center does not meet the preset requirements, the corresponding device control operation is not performed.

The operation S23 includes:

Operation 5231, if the relevant information of the target control center meets the preset requirements, and the target control center is different from the first control center, the control function of the first control center is transferred to the target control center.

In order to avoid confusion with whether the relevant information of the above-mentioned first control center meets the preset requirements, the relevant information of the target control center may be the same as or different from the relevant information of the above-mentioned first control center. However, whether the relevant information of the target control center meets the preset requirements is to overcome the defects existing when the relevant information of the first control center meets the preset requirements. Taking the distance requirement as an example, the first control center meets the distance requirement means that the first control center is far away from other devices it controls (for example, exceeding the first preset distance threshold, such as 10 meters), the distance requirement of the target control center means that the distance between the target control center and other devices to be controlled is relatively close. (For example, it is lower than the second preset distance threshold, such as 5 meters. In an embodiment, the second preset distance threshold and the first preset distance threshold may or may not be the same). For other relevant information and requirements, it can be understood in the same way as the distance example above, and will not be repeated here.

The processing method further includes:

Operation S26, migrating relevant data in the first control center to the target control center.

The first control center migrates relevant data in the first control center to the target control center.

When the first control center transfers the control functions of the first control center to the target control center, relevant data in the first control center can also be migrated to the target control center, to facilitate the second control center to exercise control functions based on the relevant data. In addition, all devices in the network have the ability to act as a control center. Therefore, when the first control center does not migrate the relevant data in the first control center to the target control center, but only transfers the control function of the first control center to the target control center, the target control center can also perform the control function.

In particular, for the case where the first control center meets the distance requirement, the first control center starts to migrate relevant data when the distance from other devices it controls is greater than or equal to a preset distance threshold, so as to ensure that the relevant data migration is completed before the first control center is disconnected from the network.

The relevant data includes at least one of the following: connection information data, setting item parameter data and relevant download data.

The relevant data includes at least one of connection information data, setting item parameter data and relevant download data.

The relevant data also includes at least one first relevant data and/or at least one second relevant data, and the operation S26 includes at least one of the following:

only backing up or transferring the first relevant data in the first control center to the target control center;

only backing up or transferring the second relevant data corresponding to the first relevant data in the first control center to the target control center;

in addition to backing up or transferring the first relevant data in the first control center to the target control center, backing up or transferring second relevant data corresponding to the first relevant data to the target control center;

backing up or transferring the first relevant data and corresponding update data in the first control center to the target control center;

backing up or transferring the second relevant data corresponding to the first relevant data and the corresponding update data in the first control center to the target control center; and backing up or transferring the first relevant data and the corresponding update data in the first control center, and the update data of the second relevant data corresponding to the first relevant data to the target control center.

For connection information data, the first relevant data may be connection information between the first control center and other devices controlled by the first control center in the network. The second relevant data may be connection information between other devices controlled by the first control center in the network. The update data may be the data corresponding to the relevant data updated by the first control center during the process of backing up or transferring the relevant data. During the process of backing up or transferring relevant data, if there is a device outside the network joining the network and connecting with the first control center, then the update data at this time is the connection information between the device joining the network and the first control center corresponding to the first relevant data.

In an embodiment, the migration manner of the relevant data includes at least one of the following: synchronous, asynchronous, real-time, scheduled time, according to user settings, according to user habits, same as last selection or setting.

The migration methods of relevant data may be different, and may include at least one of synchronous, asynchronous, real-time, scheduled time, according to user settings, according to user habits, same as last selection or setting.

The processing method further includes:

Operation S27, before migrating or transferring or duplicating or backing up the control function of the first control center to the target control center, obtaining first corresponding information related to the target control center and responding to the first corresponding information.

Before the control function of the first control center is migrated or transferred or copied or backed up to the target control center, first corresponding information related to the target control center is obtained and the first corresponding information is responded to.

The processing method further includes:

Operation S28, after migrating or transferring or duplicating or backing up the control function of the first control center to the target control center, receiving seventh instruction information sent by other devices controlled by the target control center, and responding to the seventh instruction information.

After migrating or transferring or duplicating or backing up the control function of the first control center to the target control center, the target control center receives the seventh instruction information sent by other devices it controls, and responds to the seventh instruction information. The seventh instruction information is input by the user on other devices controlled by the target control center.

Other devices controlled by the target control center in the network can be used as user instruction input devices. The user instruction input device obtains the seventh instruction information through the corresponding control center application, and then sends the obtained seventh instruction information to the target control center. Specifically, which other device controlled by the target control center in the network obtains the seventh instruction information can be determined according to the actual usage of the user. If the user is currently using the smart watch, the smart watch obtains the seventh instruction information. Whether the user is using the device can be determined by whether the device is unlocked (such as smartphone fingerprint unlocking), or whether the device is used as an output unit to provide services for the user, such as the user listening to music through smart earphones.

Other devices controlled by the target control center include at least a third device. The seventh instruction information includes at least eighth instruction information. The eighth instruction information includes at least one of the following: the fourth voice instruction information, the fourth interface operation instruction information, the fourth preset screen touch gesture instruction information, the fourth preset air gesture instruction information, and the fourth gesture instruction information.

Other devices controlled by the target control center include at least a third device. The seventh instruction information includes at least the eighth instruction information. The eighth instruction information includes at least one of the fourth voice instruction information, the fourth interface operation instruction information, the fourth preset screen touch gesture instruction information, the fourth preset air gesture instruction information, and the fourth gesture instruction information. The third device is a device with a display function among other devices controlled by the target control center in the network, such as a PAD.

Other devices controlled by the target control center also include a fourth device, and the seventh instruction information also includes ninth instruction information, and the ninth instruction information includes at least one of the following:

Fifth voice instruction information, fifth gesture instruction information.

The other devices controlled by the target control center further include a fourth device, the seventh instruction information further includes ninth instruction information, and the ninth instruction information includes at least one of fifth voice instruction information and fifth gesture instruction information. The fourth device is a device without a display function among other devices controlled by the target control center in the network, such as a smart earphone.

The fifth voice instruction information is the instruction information input by the user through voice, including "play music on the mobile phone", "let the smart earphone turn down the volume by 10%" and so on. The fifth gesture instruction information is the instruction information obtained by recognizing the user's gesture, such as the user takes off the smart earphone to control the smart earphone to stop playing audio, or control the device that inputs audio to the smart earphone to stop outputting audio to the smart earphone.

The target control center responds to the seventh instruction information after receiving the seventh instruction information.

The target control center analyzes the seventh instruction information, and sends a corresponding control instruction to the networked device corresponding to the instruction according to the analyzed specific instruction, to respond to the seventh instruction information sent by the user. If the user enters the instruction information of "play music on the mobile phone" by voice, the target control center parses out that the specific instruction of the "play music on the mobile phone" instruction information is to control the mobile phone to play music, and then sends an instruction to play music to the mobile phone in the network in response to the user's "play music on the mobile phone" instruction information.

In other embodiments, in addition to other devices controlled by the target control center in the network as user instruction input devices, the target control center can also be directly used as user instruction input devices. The target control center obtains the tenth instruction information input by the user on the target control center.

The tenth instruction information includes at least one of the following: sixth voice instruction information, sixth interface operation instruction information, sixth preset screen touch gesture instruction information, sixth preset air gesture instruction information, and sixth gesture instruction information.

After migrating or transferring or duplicating or backing up the control function of the first control center to the target control center, it further includes at least one of the following:

outputting relevant prompt information at the first control center and/or the target control center.

After the control function of the first control center is migrated or transferred or copied or backed up to the target control center, relevant prompt information is output at the first control center and/or the target control center.

The relevant prompt information is used to prompt the user that the control center has been switched from the first control center to the second control center, the device that outputs relevant prompt information may be the second control center, or other devices controlled by the second control center in the network, including the first control center. The relevant prompt information can also be used to ask the user whether to transfer the control function from the second control center back to the first control center to meet the user's needs. If the first control center is a mobile phone, and the mobile phone does not satisfy the fourth preset rule, the control function is automatically transferred to the PAD so that the PAD acts as the second control center. But the user must use the mobile phone at this time and is not convenient to use the PAD, then the user can transfer the control function from the PAD to the mobile phone through the relevant prompt information. The relevant prompt information can also be used to ask the user whether to use the second control center regularly to manage other devices in the network. In other embodiments, after the control function is transferred from the first control center to the second control center, relevant prompt information may not be output. However, when the second control center receives user instruction information for the first time, the second control center prompts the user to transfer the control function from the first control center to the second control center.

The relevant prompt information includes at least one of the following: text information, voice information, lighting information, and vibration information.

For example, as shown in FIG. 4, 200 is the first control center, which is a mobile phone. 201 is a list of devices controlled by the mobile phone, including smart watches, smart earphones and smart TVs. 2000 is the target control center, which is a smart watch controlled by a mobile phone. 2001 is the list of devices controlled by the smart watch after the control center is switched to the smart watch, including the first control center mobile phone, smart earphones and smart TV. 2002 is the pop-up box prompt information output by the target control center after the control center is switched from the first control center to the target control center. The pop-up box can also be output by the first control center.

For another example, as shown in FIG. 5, 300 is the first control center, which is a mobile phone. 301 is a list of devices controlled by the mobile phone, including smart watches, smart speakers and smart TVs. 3000 is the target control center, which is a smart TV controlled by a mobile phone. 3001 is the list of devices controlled by the smart TV after the control center is switched to the smart TV, including the first control center mobile phone, smart speakers and smart watches. 3002 is the pop-up box prompt information output by the target control center after the control center is switched from the first control center to the target control center. The pop-up box can also be output by the first control center.

For another example, as shown in FIG. 6, 400 is the first control center, which is a mobile phone. 401 is a list of devices controlled by the mobile phone, including smart watches, smart earphones and smart cars. 4000 is the target control center, which is the central control display corresponding to the smart car controlled by the mobile phone. 4001 is the list of devices controlled by the smart car after the control center is switched to the smart car, including the first control center mobile phone, smart earphones and smart watches. 4002 is the pop-up box prompt information output by the central control display corresponding to the smart car in the target control center after the control center is switched from the first control center to the target control center. The pop-up box can also be output by the first control center.

Updating the device list information.

The device list information is updated. After the control function of the first control center is transferred to the target control center, the first control center can withdraw from the network or be controlled by the target control center. If the first control center exits the network, the information of the target control center in the device list is deleted. If the first control center is controlled by the target control center, add the information of the first control center in the device list is added, and the information of the target control center in the device list information is deleted.

In this embodiment, the processing method includes: S20, outputting device list information at the first control center, the device includes at least one other device controlled by the first control center; S21, determining the target control center according to the selection operation; S22, detecting whether the relevant information of the target control center meets the preset requirements; S23, if yes, performing the corresponding device control operation according to the preset strategy. Thus, the user can determine the target control center by selecting the output device list information of the first control center. The first control center determines again whether the target control center is suitable as a control center based on the relevant information of the target control center, so as to ensure that the switched control center is suitable as a control center to control other devices except the target control center.

Figure 8:
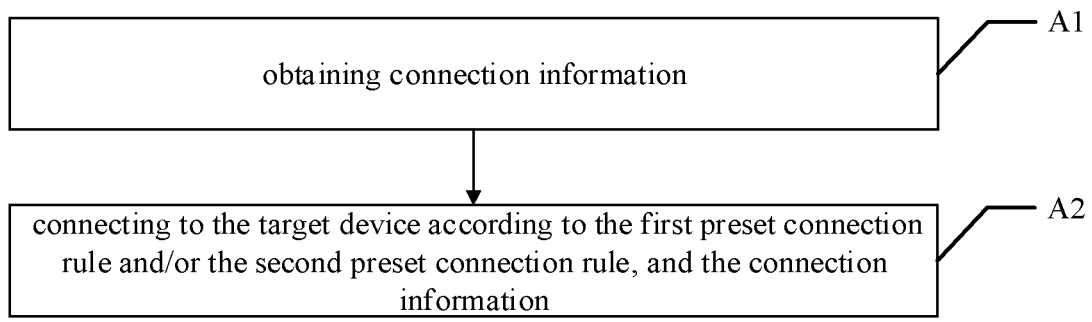
FIG. 8 is a schematic flowchart of the processing method according to an embodiment of the present application.

The present application provides a processing method. As shown in FIG. 8, FIG. 8 is a schematic flowchart of the processing method according to an embodiment of the present application.

The embodiment of the present application provides a processing method. Although a logical order is shown in the flowcharts, in some cases the steps shown or described may be performed in an order different from that shown or described herein. The processing method is applied to the initiator device. The processing method includes:

Operation A1, obtaining connection information, the connection information includes at least one first connection information and/or at least one second connection information, the first connection information is provided by the terminal, and the second connection information is provided by the target device.

In an embodiment, the first connection information or the second connection information may include at least one of the target device identification, the target device name, the target device address, the target device type, the target device quantity, the target device power, the target device state, and may also include at least one of connection user name, connection password and connection parameters.

In an embodiment, the connection information may also be provided by a terminal connected to the initiator device.

In an embodiment, terminal devices (such as smart phones, Portable Android Device (PAD), Tablet PC, etc.), wearable smart devices (such as smart watches, smart bracelets, smart earphones, etc.), smart home devices (such as smart TVs, smart speakers, etc.), and Internet of Vehicles devices (such as smart cars, vehicle terminals, etc.) will establish connections with each other during use to facilitate data exchange and provide users with corresponding functions. For example, the mobile phone establishes a connection with the smart speaker, so that the mobile phone is used as a sound source to output an audio signal, and the smart speaker is used as an output terminal to output a sound corresponding to the audio signal. The connection relationship is established through connection information, and the terminal is a device that has established a connection with the initiator device.

The initiator device acquires connection information. The connection information is provided by a terminal connected to the initiator device, or the first connection information is provided by the terminal and/or the second connection information is provided by the target device. It can be understood that the first connection information and the second connection information may be provided by different terminals, for example, the first connection information is provided by the smart watch, and the second connection information is provided by the smart phone.

Operation A2, connecting to the target device according to the first preset connection rule and/or the second preset connection rule, and the connection information.

In an embodiment, the initiator device can connect to the target device through the first preset connection rule and the connection information, or connect to the target device through the second preset connection rule and the connection information, or connect to the target device through the first preset connection rule, the second preset connection rule and the connection information. The initiator device is for determining whether to establish a connection with the target device and/or for determining attributes of the connection established between the initiator device and the target device. Different attributes can be regarded as different connections.

In an embodiment, the operation of connecting to the target device according to the first preset connection rule and/or the second preset connection rule, and the connection information includes:

Operation a, if the connection to the target device fails according to the first preset connection rule and the connection information, or if the connection to the target device fails according to the first preset connection rule and the connection information, or if the number of failed connections to the target device according to the first preset connection rule and the connection information reaches a preset value (preferably, such as 3 or 5 times), then connect the target device according to the second preset connection rule and the connection information.

In an embodiment, if the initiator device connects to the target device through the first preset connection rule and connection information, it is inconvenient for the target device to establish a connection with the initiator device. For example, the target device is establishing a connection with another device. Therefore, after the initiator device fails to connect to the target device, it can then connect to the target device according to the second preset connection rule and connection information.

In an embodiment, the connection information includes at least one of device identification, device name, device address, device type, device quantity, device power, and device state; and/or the connection information includes at least one of connection user name, connection password, and connection parameter.

In an embodiment, the above connection information includes at least one of device identification, device name, device address, device type, device quantity, device power, device state, connection user name, connection password, and connection parameter, or the above connection information includes at least one of device identification, device name, device address, device type, device quantity, device power, and device state, or the above connection information includes at least one of connection user name, connection password and connection parameter.

For the connection user name and connection password, when the devices are connected, in order to ensure the accuracy and security of the connection, the initiator device needs to use the connection username and the connection password to ensure that the connected device is the target device and not other connectable devices.

For the connection parameter, when the initiator device connects to the target device, the target device sets certain conditions for the connection through the connection parameters, so as to achieve the purpose of restricting the connection.

In an embodiment, one or more of the connection information is sorted according to a preset priority. The first preset connection rule is generated and/or determined according to the sorted connection information. One or more of the connection information is sorted according to the preset strategy (such as priority, shortest connection time consumption, least connection power consumption, best connection security, etc.). The first preset connection rule is generated and/or determined according to the sorted connection information. Or, the first preset connection rule is obtained by matching one or more of the connection information with the third preset connection rule.

In an embodiment, one or more of the above connection information is sorted according to the preset priority, and a first preset connection rule is generated according to the sorted connection information. By matching one or more of the above connection information with the third preset connection rule, the first preset connection rule is obtained. The third preset connection rule is a system preset connection rule, and the connection rule includes the first preset connection rule. The connection rule is a sorting manner for performing preset sorting on one or more items of the above connection information.

The preset priority may be set by the user of the initiator device, or may be preset by the system, which is not specifically limited in this embodiment.

The sorting one or more of the connection information according to the preset priority includes:

sorting the connection information according to the first preset priority; and/or sorting the connection information providing devices corresponding to the same connection information in the connection information according to the second preset priority.

In an embodiment, the connection information is sorted according to the first preset priority; and/or the connection information providing devices corresponding to the same connection information in the connection information is sorted according to the second preset priority.

The device state includes at least one of normal, abnormal, smooth, stuck, idle, overloaded, allowed to connect, not allowed to connect, restricted to connect, safe, not safe, worn, not worn, used, and not used.

During the operation of the device, there are various device states, including at least one of normal, abnormal, smooth, stuck, idle, overload, allowed to connect, not allowed to connect, restricted connection, safe, unsafe, worn, not worn, used, not used.

When the device state of the target device connected to the initiator device is at least one of abnormal, stuck, overloaded, not allowed to connect, unsafe, not worn, and not used, it is inconvenient for subsequent data exchange. For example, if the device state of the target device is stuck, during the subsequent data exchange process, the data processing process of the target device will be extremely long, affecting user experience.

The connection parameters include at least one of connection duration, connection rate, connection start time, connection end time, and connection location.

In an embodiment, the first preset connection rule includes at least one of the following:

if the device identification meets the first preset condition, connecting to the target device according to the device identification and the connection information, and/or, if the device identification does not meet the first preset condition, not connecting to the target device and/or outputting prompt information.

In an embodiment, if the device identification meets the first preset condition, the initiator device establishes a connection with the target device through at least one of the connection user name, the connection password, and the device identification, and/or, if the device identification does not meet the first preset condition, the initiator device does not connect to the target device and/or outputs a prompt information, In an embodiment, meeting the first preset condition means that the device identification includes a device identification of a historically connected device or is a special mark.

In an embodiment, during the process of establishing a connection, the initiator device identifies the target device through the device identification, and uses at least one of the connection user name and the connection password to complete the authentication between the initiator device and the target device, so as to establish the connection.

Figure 9:
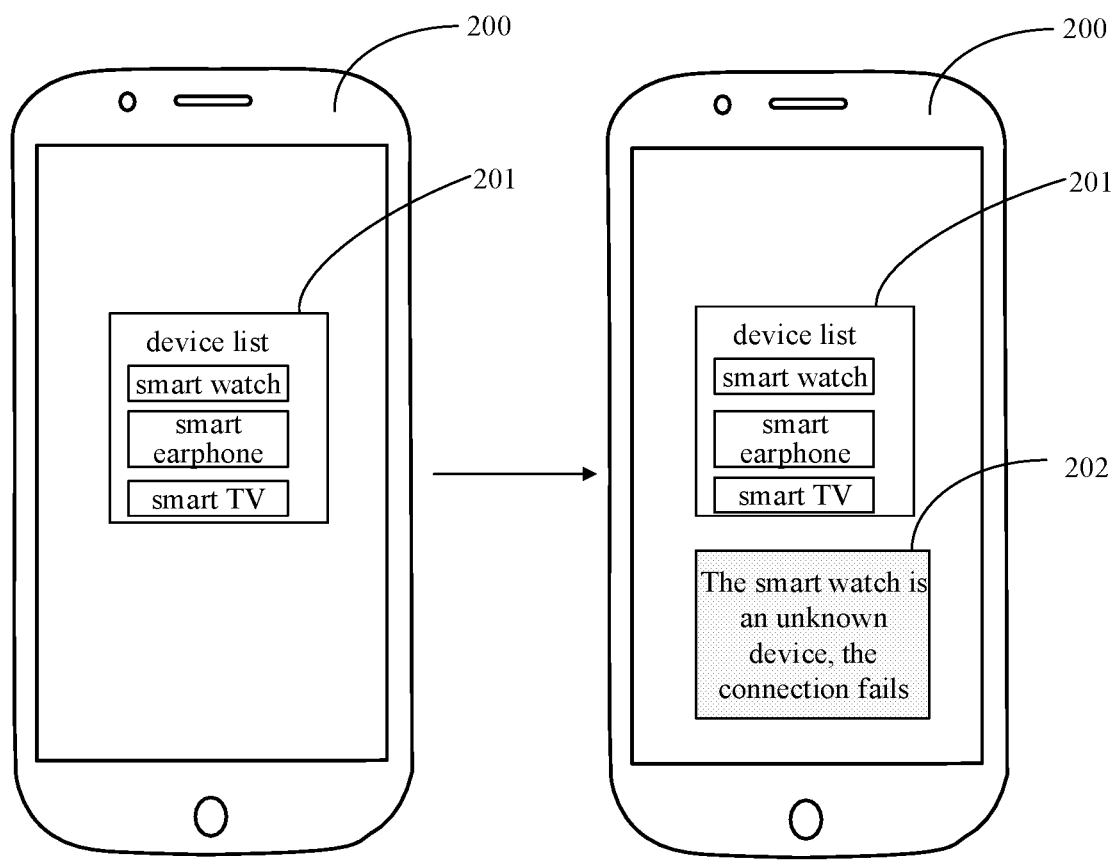
FIG. 9 is a schematic diagram of outputting text prompt information of the processing method of the present application.
Figure 10:
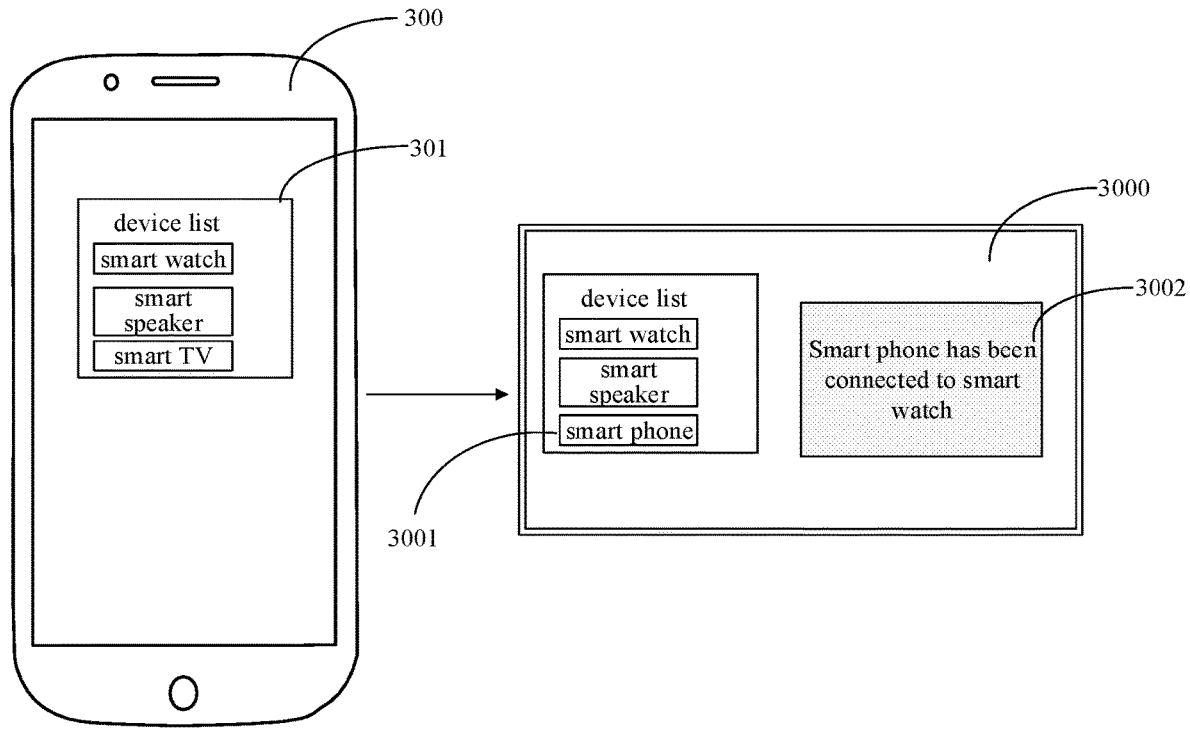
FIG. 10 is a schematic diagram of another output text prompt information of the processing method of the present application.

In an embodiment, the prompt information may include text information, voice information, etc. For example, as shown in FIG. 9, 200 is an initiator device. The device that establishes a connection with the initiator device is displayed through the device list 201. When the user tries to connect to the smart watch or the initiator device attempts to automatically connect to the smart watch, when the smart watch does not meet the first preset condition, the initiator device outputs a prompt information "This smart watch is an unknown device and connection establishment fails" through the pop-up box 202.

If the device name meets the second preset condition, connecting to the target device according to the device name and the connection information, and/or, if the device name does not meet the second preset condition, not connecting to the target device and/or outputting prompt information.

If the device name meets the second preset condition, the initiator device establishes a connection with the target device through at least one of the connection user name, the connection password, and the device name, and/or, if the device name does not meet the second preset condition, the initiator device does not connect to the target device and/or outputs a prompt information. In an embodiment, the meeting the second preset condition is that the device name includes a device name of a historically connected device.

In an embodiment, the process of establishing a connection is that the initiator device identifies the target device by the device name. The authentication between the initiator device and the target device is completed by at least one of the connection user name and the connection password, so as to complete the establishment of the connection.

In an embodiment, the prompt information may include text information, voice information, etc., such as outputting a prompt information "XXX is an unknown device, connection establishment failed".

If the device address meets the third preset condition, connecting to the target device according to the device address and the connection information, and/or, if the device address does not meet the third preset condition, not connecting to the target device and/or outputting prompt information.

In an embodiment, if the device address meets the third preset condition, the initiator device establishes a connection with the target device through at least one of the connection user name, the connection password, and the device address, and/or if the device address does not meet the third preset condition, the initiator device does not connect to the target device and/or outputs a prompt information. The meeting the third preset condition is that the device address includes a device address of a historically connected device.

In an embodiment, during the process of establishing a connection, the initiator device identifies the target device through the device address. The authentication between the initiator device and the target device is completed by at least one of the connection user name and the connection password, so as to establish the connection.

In an embodiment, the prompt information may include text information, voice information, etc., such as outputting a prompt information "XXX is an unknown device, connection establishment failed".

If the device type meets the fourth preset condition, connecting to the target device according to the device type and the connection information, and/or if the device type does not meet the fourth preset condition, not connecting to the target device and/or outputting prompt information.

In an embodiment, if the device type meets the fourth preset condition, the initiator device establishes a connection with the target device through at least one of the connection user name and connection password and the device type, and/or, if the device type does not meet the fourth preset condition, the initiator device does not connect to the target device and/or outputs a prompt information. In an embodiment, meeting the fourth preset condition means that the device type meets the current use condition of the initiator device.

In an embodiment, the current use conditions can be automatically judged by the initiator device, or can be set by the user of the initiator device. For example, if the user of the initiator device is playing a game, then the device type is a smart earphone for playing games, which meets the current use conditions of the initiator device. For another example, the user of the initiator device needs to turn on a smart air conditioner. If there are multiple smart air conditioners in the device type information providing device, one of the multiple smart air conditioners is turned on through the preset opening rules to meet the current use conditions of the initiator device. The preset turning-on rule may be turning on the smart air conditioner closest to the initiator device, turning on the smart air conditioner with the most usage times, and so on.

In an embodiment, the process of establishing a connection is that the initiator device identifies the target device through the device type. The authentication between the initiator device and the target device is completed by at least one of the connection user name and the connection password, so as to complete the establishment of the connection.

In an embodiment, the prompt information may include text information, voice information, etc., such as outputting a prompt information "currently there is no usable device suitable for the use environment, and connection establishment fails".

If the device quantity meets the fifth preset condition, connecting to the target device according to the device quantity and the connection information, and/or, if the device quantity does not meet the fifth preset condition, not connecting to the target device and/or outputting prompt information.

If the device quantity meets the fifth preset condition, the initiator device establishes a connection with the target device through at least one of the connection user name, the connection password, and the device quantity, and/or if the device quantity does not meet the fifth preset condition, the initiator device does not connect to the target device and/or outputs a prompt information. In an embodiment, meeting the fifth preset condition is that the device quantity does not exceed the maximum number of connectable devices of the target device.

In an embodiment, during the process of establishing a connection, the initiator device determines the target device with the second highest priority among the device quantity. The authentication between the initiator device and the target device is completed by at least one of the connection user name and the connection password, so as to complete the establishment of the connection.

In an embodiment, the prompt information may include text information, voice information, etc., such as outputting the prompt information "There is currently no device available for connection, and connection establishment failed".

If the device power meets the sixth preset condition, connecting to the target device according to the device power and the connection information, and/or, if the device power does not meet the sixth preset condition, not connecting to the target device and/or outputting prompt information.

In an embodiment, if the device power meets the sixth preset condition, the initiator device establishes a connection with the target device through at least one of the connection user name, the connection password, and the device power, and/or, if the device power does not meet the sixth preset condition, the initiator device does not connect to the target device and/or outputs a prompt information. In an embodiment, meeting the sixth preset condition means that the device power is greater than or equal to a preset power threshold.

In an embodiment, during the process of establishing a connection, the initiator device determines the target device with the second highest priority in the device power. The authentication between the initiator device and the target device is completed by at least one of the connection user name and the connection password, so as to complete the establishment of the connection.

The prompt information may include text information, voice information, etc., such as outputting a prompt information that "the power of the current device does not meet the usage requirements, and the establishment of a connection fails".

If the device state meets the seventh preset condition, connecting to the target device according to the device state and the connection information, and/or, if the device state does not meet the seventh preset condition, not connecting to the target device and/or outputting prompt information.

If the device state meets the seventh preset condition, the initiator device establishes a connection with the target device through at least one of the connection user name, the connection password, and the device state, and/or, if the device state does not meet the seventh preset condition, the initiator device does not connect to the target device and/or outputs a prompt information. The meeting the seventh preset condition means that the device state includes at least one of normal, smooth, idle, connection allowed, connection restricted, safe, worn, and used.

In an embodiment, during the process of establishing a connection, the initiator device determines the target device with the second highest priority in the device state. The authentication between the initiator device and the target device is completed by at least one of the connection user name and the connection password, so as to complete the establishment of the connection. In an embodiment, the method for determining the second preset priority in the device state is: the more items in the device state including normal, smooth, idle, allowed to connect, restricted connection, safe, worn, and used, the higher the second preset priority.

In an embodiment, the prompt information may include text information, voice information, etc., such as outputting a prompt information that "the device state of the current device does not meet the use requirements, and connection establishment fails".

If the connection parameters meet the eighth preset condition, connecting to the target device according to the connection parameters and the connection information, and/or, if the connection parameters do not meet the eighth preset condition, not connecting to the target device and/or outputting prompt information.

If the connection parameter meets the eighth preset condition, the initiator device establishes a connection with the target device through at least one of the connection user name, the connection password, and the connection parameters, and/or, if the device state does not meet the eighth preset condition, the initiator device does not connect to the target device and/or outputs prompt information.

In an embodiment, during the process of establishing a connection, the initiator device determines the target device corresponding to the connection parameter that meets the eighth preset condition among the connection parameters. The authentication between the initiator device and the target device is completed by at least one of the connection user name and the connection password, so as to complete the establishment of the connection.

In an embodiment, the prompt information may include text information, voice information, etc., such as outputting a prompt information that "currently there is no device that meets the connection requirements, and connection establishment fails".

In an embodiment, the meeting the eighth preset condition includes at least one of the following:
  the connection parameters include a connection duration, and the historical connection duration is less than or equal to the connection duration;
  the connection parameters include a connection rate, and the current connection rate is greater than or equal to the connection rate;
  the connection parameters include the connection start time, and the current time meets the start time requirements;
  the connection parameters include the connection end time, and the current time meets the end time requirements;
  the connection parameters include the connection location, and the current location meets the connection location requirements.

In an embodiment, before the operation A1, the processing method further includes:
  Operation A0, detecting whether a preset operation is received or whether it is in a preset mode, and if so, performing operation A1.

The initiator device detects whether a preset operation is received or whether it is in a preset mode, and if a preset operation is received or is currently in a preset mode, the operation of obtaining connection information is executed. If the preset operation is not received or the preset mode is not currently in, the operation of obtaining the connection information is not executed. The preset mode includes a smart mode, an automatic switching mode, and other modes that support the connection between devices through the first preset connection rule and/or the second preset connection rule.

In an embodiment, before the operation A2, the processing method further includes:

Operation b, performing operation A2 after receiving the feedback information from the target device, and/or receiving the connection confirmation instruction.

The initiator device receives the feedback information from the target device, and/or, after receiving the connection confirmation instruction, the operation of connecting the target device according to the first preset connection rule and/or the second preset connection rule and the connection information is executed.

The feedback information is whether the target device agrees to establish a connection with the initiator device. The confirmation connection instruction is an instruction entered by the user on the initiator device to confirm the establishment of a connection with the target device. Therefore, the initiator device user decides whether to establish a connection, making the process of establishing a connection more flexible and intelligent, and improving user experience.

In an embodiment, after the operation A2, the processing method further includes:

Operation A3, after the connection succeeds or fails, outputting prompt information to at least one of the initiator device, the terminal, and the target device.

In an embodiment, after the initiator device successfully or fails to connect to the target device, it outputs prompt information to at least one of the initiator device, the terminal, and the target device, so as to prompt the user whether the connection succeeds or fails, thereby improving user experience.

In an embodiment, the device state includes the state of the terminal and/or the state of the target device.

In an embodiment, the device state includes the state of the terminal and/or the state of the target device.

The device state cannot only be used as a basis for determining whether a connection between devices is established, but also as a basis for determining whether an established connection between devices is disconnected. The state of the terminal in the device state can be used to determine whether the terminal needs to disconnect from the initiator device. The state of the target device in the device state can be used to determine whether the target device is suitable for establishing a connection with the initiator device.

In an embodiment, the connection information includes at least one first connection information and/or at least one second connection information. The first connection information is provided by the terminal, and the second connection information is provided by the target device.

In an embodiment, the connection information includes at least one first connection information and/or at least one second connection information. The first connection information is provided by the terminal, and the second connection information is provided by the target device.

In an embodiment, the terminal has established a connection with the target device, and the terminal may provide the acquired first connection information of the target device to the initiator device. The unacquired second connection information of the target device may also be obtained after receiving the connection request of the initiator device, so as to provide the second connection information to the initiator device.

In an embodiment, the first preset connection rule is generated and/or determined according to the first connection information and/or the second connection information. Or, the first preset connection rule is obtained by matching one or more of the first connection information and/or the second connection information with a third preset connection rule.

In an embodiment, a first preset connection rule is generated according to the first connection information acquired by the terminal and/or the second connection information not acquired by the terminal. Or, the first preset connection rule is obtained by matching one or more of the first connection information acquired by the terminal and/or the second connection information not acquired by the terminal to the third preset connection rule.

In an embodiment, the second preset connection rule includes at least one of the following:

if the connection is successful, the initiator device and the target device will no longer be disconnected or disconnected at a fixed time or timeout; if the connection fails, the initiator device and the target device will no longer be connected or be connected regularly or periodically.

In an embodiment, if the initiator device is successfully connected to the target device, the initiator device and the target device are no longer disconnected or disconnected at a fixed time or timed out. If the connection between the initiator device and the target device fails, the initiator device and the target device will no longer be connected or connected regularly or periodically.

In an embodiment, the processing method further includes:

Operation c, after the initiator device is successfully connected to the target device, maintaining or disconnecting the connection between the terminal and the target device.

In an embodiment, after the initiator device is successfully connected to the target device, the connection between the terminal and the target device is maintained or disconnected.

In an embodiment, the target device and the terminal may be devices with similar functions. After the initiator device successfully connects with the target device, it disconnects the connection between the terminal and the target device. For example, the initiator device is a smart earphone, the terminal is a smart phone, and the target device is a PAD with similar functions to the smart phone. The target device and the terminal may also be devices with dissimilar functions. After the initiator device successfully connects with the target device, it maintains the connection between the terminal and the target device. For example, the initiator device is a smart earphone, the terminal is a smart phone, and the target device is a vehicle terminal.

In an embodiment, the processing method further includes:

Operation d, if the connection information changes, updating the corresponding preset connection rule.

If the connection information changes, the corresponding preset connection rule is updated.

In an embodiment, the first preset connection rule and the second preset connection rule are directly affected by the connection information. For example, the first preset priority of device identification in connection information is the highest, and the first preset priority of device number in connection information is second. The first preset connection rule is to give priority to the device identification for connection, and after the connection information changes, the device identification in the connection information is no longer considered. The device quantity ranked second originally in the first preset priority is changed to the first priority, and the first preset connection rule at this time is updated to give priority to the device quantity for connection.

In this embodiment, the processing method includes: A1, obtaining connection information, the connection information is provided by a terminal connected to the initiator device; A2, connecting to the target device according to the first preset connection rule and/or the second preset connection rule, and the connection information. After obtaining the connection information provided by the terminal, connecting the target device through the first preset connection rule and/or the second preset connection rule and connection information provides more optional connection solutions for the connection between the initiator device and the target device. The application makes the initiator device more flexible and intelligent when establishing a connection with the target device.

Figure 11:
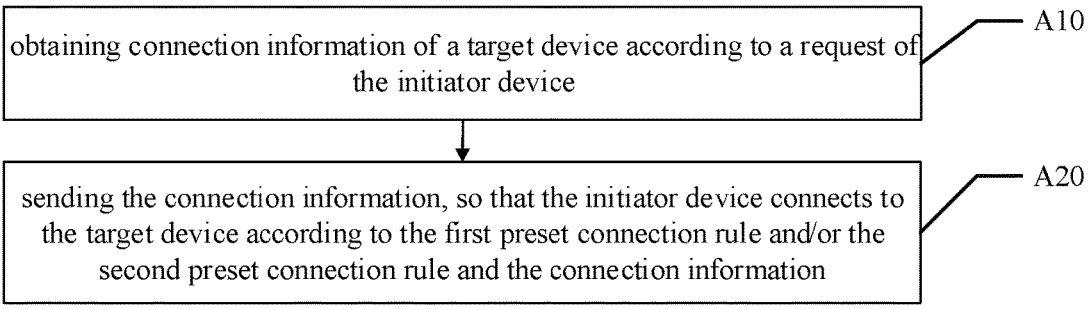
FIG. 11 is a schematic flowchart of the processing method according to another embodiment of the present application.

In an embodiment, as shown in FIG. 11, based on an embodiment of the processing method of the present application, another embodiment is proposed. Although a logical order is shown in the flowcharts, in some cases the steps shown or described may be performed in an order different from that shown or described herein. The processing method is applied to the terminal, and includes the following operations.

Operation A10, obtaining the connection information of the target device according to the request of the initiator device, the connection information includes at least one first connection information and/or at least one second connection information. The first connection information is provided by the terminal, and the second connection information is provided by the target device.

In an embodiment, the first connection information or the second connection information may include at least one of the target device identification, the target device name, the target device address, the target device type, the target device quantity, the target device power, and the target device state, and may also include at least one of connection user name, connection password and connection parameters.

In an embodiment, the connection information may also be provided by the terminal.

In an embodiment, the terminal obtains the obtained connection information of the target device according to the request of the initiator device, and/or obtains the connection information of the target device that has not been obtained.

In an embodiment, the initiator device is a computer (such as a PC or tablet), the terminal is a mobile phone, and the target device is a WIFI access point (which may be a WIFI hotspot from another mobile phone). The mobile phone has established a connection with the WIFI access point, and the computer has also established a connection with the mobile phone (such as Bluetooth, NFC, etc.), the computer can obtain the ID of the WIFI access point and/or the connection user name and/or the connection password through the mobile phone, so that the computer can connect to the WIFI access point through the obtained connection information. Furthermore, connection parameter information such as the maximum device quantity that the WIFI access point can allow access to or the fastest connection speed can be obtained by a mobile phone and provided to the computer, or can be sent by a WIFI access point through broadcasting, etc., and can be obtained by the computer through broadcasting. Through this implementation manner, the connection between devices can be made more convenient and intelligent, and more secure technical effects can be achieved (such as avoiding the input of multiple connection passwords, etc.).

Operation A20, sending the connection information, so that the initiator device connects to the target device according to the first preset connection rule and/or the second preset connection rule and the connection information.

In an embodiment, the terminal sends the connection information to the initiator device, so that the initiator device connects to the target device according to the first preset connection rule and/or the second preset connection rule and the connection information.

In an embodiment, the operation of sending the connection information includes:

Operation e, if the initiator device fails to connect to the target device according to the first preset connection rule and the connection information, or if the number of times the initiator device fails to connect to the target device according to the first preset connection rule and the connection information reaches a preset value (preferably, such as 3 times or 5 times), then connecting the target device according to the second preset connection rule and the connection information.

In an embodiment, if it is inconvenient for the target device to establish a connection with the initiator device when the initiator device connects to the target device through the first preset connection rule and connection information, for example, the target device is establishing a connection with other devices, after the initiator device fails to connect to the target device, it can then connect to the target device according to the second preset connection rule and connection information.

In an embodiment, the connection information includes at least one of device identification, device name, device address, device type, device quantity, device power, and device state; and/or, the connection information includes at least one of a connection user name, a connection password, and a connection parameter.

In an embodiment, the above connection information includes at least one of device identification, device name, device address, device type, device quantity, device power, device state, connection user name, connection password, and connection parameters, or the above connection information includes at least one of device identification, device name, device address, device type, device quantity, device power, and device state, or the above connection information includes at least one of connection user name, connection password and connection parameters.

For the connection user name and connection password, when connecting between devices, in order to ensure the accuracy and security of the connection, the initiator device needs to use the connection username and the connection password to ensure that the connected device is the target device and not other connectable devices.

For the connection parameters, when the initiator device connects to the target device, the target device sets certain conditions for the connection through the connection parameters, so as to achieve the purpose of restricting the connection.

The preset priority may be set by the user of the initiator device, or may be preset by the system, which is not specifically limited in this embodiment.

The sorting one or more of the connection information according to the preset priority includes:

sorting the connection information according to the first preset priority; and/or sorting the connection information providing devices corresponding to the same connection information in the connection information according to the second preset priority.

In an embodiment, the connection information is sorted according to the first preset priority; and/or the connection information providing devices corresponding to the same connection information in the connection information is sorted according to the second preset priority.

The device state includes at least one of normal, abnormal, smooth, stuck, idle, overloaded, allowed to connect, not allowed to connect, restricted to connect, safe, not safe, worn, not worn, used, and not used.

During the operation of the device, there are various device states, including at least one of normal, abnormal, smooth, stuck, idle, overload, allowed to connect, not allowed to connect, restricted connection, safe, unsafe, worn, not worn, used, not used.

When the device state of the target device connected to the initiator device is at least one of abnormal, stuck, overloaded, not allowed to connect, unsafe, not worn, and not used, it is inconvenient for subsequent data exchange. For example, if the device state of the target device is stuck, during the subsequent data exchange process, the data processing process of the target device will be extremely long, affecting user experience.

The connection parameters include at least one of connection duration, connection rate, connection start time, connection end time, and connection location.

In an embodiment, the first preset connection rule includes at least one of the following:
if the device identification meets the first preset condition, connecting to the target device according to the device identification and the connection information, and/or, if the device identification does not meet the first preset condition, not connecting to the target device and/or outputting prompt information.

If the device name meets the second preset condition, connecting to the target device according to the device name and the connection information, and/or, if the device name does not meet the second preset condition, not connecting to the target device and/or outputting prompt information.

If the device address meets the third preset condition, connecting to the target device according to the device address and the connection information, and/or, if the device address does not meet the third preset condition, not connecting to the target device and/or outputting prompt information.

In an embodiment, if the device address meets the third preset condition, the initiator device establishes a connection with the target device through at least one of the connection user name, the connection password, and the device address, and/or if the device address does not meet the third preset condition, the initiator device does not connect to the target device and/or outputs a prompt information. The meeting the third preset condition is that the device address includes a device address of a historically connected device.

In an embodiment, during the process of establishing a connection, the initiator device identifies the target device through the device address. The authentication between the initiator device and the target device is completed by at least one of the connection user name and the connection password, so as to establish the connection.

In an embodiment, the prompt information may include text information, voice information, etc., such as outputting a prompt information "XXX is an unknown device, connection establishment failed".

If the device type meets the fourth preset condition, connecting to the target device according to the device type and the connection information, and/or if the device type does not meet the fourth preset condition, not connecting to the target device and/or outputting prompt information.

If the device quantity meets the fifth preset condition, connecting to the target device according to the device quantity and the connection information, and/or, if the device quantity does not meet the fifth preset condition, not connecting to the target device and/or outputting prompt information.

If the device power meets the sixth preset condition, connecting to the target device according to the device power and the connection information, and/or, if the device power does not meet the sixth preset condition, not connecting to the target device and/or outputting prompt information.

If the device state meets the seventh preset condition, connecting to the target device according to the device state and the connection information, and/or, if the device state does not meet the seventh preset condition, not connecting to the target device and/or outputting prompt information.

In an embodiment, the meeting the eighth preset condition includes at least one of the following:
the connection parameters include a connection duration, and the historical connection duration is less than or equal to the connection duration;
the connection parameters include a connection rate, and the current connection rate is greater than or equal to the connection rate;
the connection parameters include the connection start time, and the current time meets the start time requirements;
the connection parameters include the connection end time, and the current time meets the end time requirements;
the connection parameters include the connection location, and the current location meets the connection location requirements.

In an embodiment, before the operation A10, the processing method further includes:
Operation A00, detecting whether receiving a preset operation or whether it is in a preset mode, and if so, performing operation A10.

The terminal detects whether the preset operation is received or whether it is in a preset mode. If the preset operation is received or currently in the preset mode, the operation of obtaining the connection information of the target device according to the request of the initiator device is performed. If the preset operation is not received or the preset mode is not currently in place, the operation of obtaining the connection information of the target device according to the request of the initiator device is not performed. The preset mode includes a smart mode, an automatic switching mode, and other modes that support the connection between devices through the first preset connection rule and/or the second preset connection rule. The preset operation is the response operation made by the end user to the request of the initiator device, including refusing to obtain the connection information of the target device and agreeing to obtain the connection information of the target device.

In an embodiment, before the operation of connecting the initiator device to the target device according to the first preset connection rule and/or the second preset connection rule and the connection information, the method further includes:

Operation f, performing operation A20 after receiving the feedback information from the target device, and/or receiving the connection confirmation instruction.

The initiator device receives the feedback information from the target device, and/or, after receiving the connection confirmation instruction, the operation of sending the connection information, such that the initiator device connects to the target device according to the first preset connection rule and/or the second preset connection rule and the connection information is executed.

In an embodiment, the feedback information is whether the target device agrees to establish a connection with the initiator device. The confirmation connection instruction is an instruction entered by the user on the initiator device to confirm the establishment of a connection with the target device. Therefore, the initiator device user decides whether to establish a connection, making the process of establishing a connection more flexible and intelligent, and improving user experience.

In an embodiment, after the operation of connecting the initiator device to the target device according to the first preset connection rule and/or the second preset connection rule and the connection information, the method further includes:

Operation A30, after the connection succeeds or fails, outputting prompt information to at least one of the initiator device, the terminal, and the target device.

In an embodiment, after the initiator device successfully or fails to connect to the target device, it outputs prompt information to at least one of the initiator device, the terminal, and the target device, so as to prompt the user whether the connection succeeds or fails, thereby improving user experience.

In an embodiment, the processing method further includes:

the terminal is also connected to the target device, and/or there are multiple target devices.

When the initiator device establishes a connection with the target device through the terminal, the terminal and the target device are in a connected state, and there are multiple target devices.

The second preset connection rules include at least one of the following:

if the connection is successful, the initiator device and the target device will no longer be disconnected or disconnected at a fixed time or timeout; if the connection fails, the initiator device and the target device will no longer be connected or be connected regularly or periodically.

After the initiator device fails to connect to the first target device for a preset number of times, the initiator device is triggered to connect to the second target device.

In an embodiment, after the initiator device tries to connect to the first target device for several times and fails, if the number of failures reaches the preset number of times, no longer attempts will be made to connect to the first target device, and the condition for the initiator device to connect to the second target device will be triggered. The preset times can be set by the user or preset by the system, and there is no specific limitation in this embodiment.

Outputting prompt information.

In an embodiment, after the initiator device fails to connect to the first target device, at least one of the terminal and the initiator device outputs prompt information to the user. The prompt information includes a reason for failing to connect to the first target device.

In an embodiment if the initiator device fails to connect to the second target device, it also includes at least one of the following:

controlling the initiator device to connect to the first target device.

The terminal may control the initiator device to connect to the first target device again.

controlling the initiator device to connect to the second target device again.

In an embodiment, the terminal may control the initiator device to try to connect to the second target device again.

After the number of connection failures reaches a preset number of times, the initiator device is controlled not to connect to the first target device or the second target device.

In an embodiment, after the initiator device fails to connect to the second target device for a preset number of times, the terminal controls the initiator device not to connect to the first target device or the second target device. The preset times can be set by the user or preset by the system, and there is no specific limitation in this embodiment.

Outputting prompt information.

In an embodiment, after the initiator device fails to connect to the second target device, at least one of the terminal and the initiator device outputs connection failure-related prompt information to the user, so as to prompt the user that the initiator device fails to connect to the second target device and the cause of the connection failure.

In an embodiment, the processing method further includes at least one of the following:

after the initiator device is successfully connected to the target device, maintaining or disconnecting the connection between the terminal and the target device.

In an embodiment, after the initiator device is successfully connected to the target device, the connection between the terminal and the target device is maintained or disconnected.

In an embodiment, the target device and the terminal may be devices with similar functions. After the initiator device successfully connects with the target device, it disconnects the connection between the terminal and the target device. For example, the initiator device is a smart earphone, the terminal is a smart phone, and the target device is a PAD with similar functions to the smart phone. The target device and the terminal may also be devices with dissimilar functions. After the initiator device successfully connects with the target device, it maintains the connection between the terminal and the target device. For example, the initiator device is a smart earphone, the terminal is a smart phone, and the target device is a vehicle terminal.

If the connection information changes, updating the corresponding preset connection rule.

If the connection information changes, the corresponding preset connection rule is updated.

In this embodiment, after obtaining the connection information of the target device according to the request of the initiator device, the connection information is sent to the initiator device, thereby making the initiator device connect to the target device through the first preset connection rule and/or the second preset connection rule and connection information, and providing more optional connection solutions for the connection between the initiator device and the target device, making the initiator device more flexible and intelligent when establishing a connection with the target device.

Figure 12:
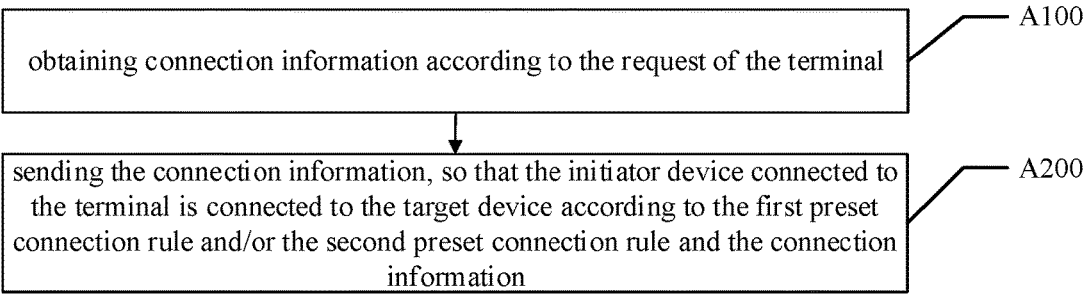
FIG. 12 is a schematic flowchart of the processing method according to still another embodiment of the present application.

In an embodiment, as shown in FIG. 12, based on an embodiment of the processing method of the present application, another embodiment is proposed. Although a logical order is shown in the flowcharts, in some cases the steps shown or described may be performed in an order different from that shown or described herein. The processing method is applied to the terminal, and includes the following operations.

Operation A100, obtaining the connection information of the target device according to the request of the terminal, the connection information includes at least one first connection information and/or at least one second connection information. The first connection information is provided by the terminal, and the second connection information is provided by the target device.

In an embodiment, the first connection information or the second connection information may include at least one of the target device identification, the target device name, the target device address, the target device type, the target device quantity, the target device power, and the target device state, and may also include at least one of connection user name, connection password and connection parameters.

In an embodiment, the connection information may also be provided by the terminal.

In an embodiment, the target device receives the connection information acquisition request sent by the terminal, and acquires the connection information.

Operation A200, sending the connection information, so that the initiator device connected to the terminal connects to the target device according to the first preset connection rule and/or the second preset connection rule and the connection information.

In an embodiment, the target device sends the connection information to the terminal, so that the initiator device connected to the terminal connects to the target device according to the first preset connection rule and/or the second preset connection rule and the connection information.

In an embodiment, the operation A200 includes:
Operation h, if failing to connect to the target device according to the first preset connection rule and the connection information, or failing to connect to the target device according to the first preset connection rule and the connection information, or if the number of times failing to connect to the target device according to the first preset connection rule and the connection information reaches a preset value (preferably, such as 3 times or 5 times), then connecting the target device according to the second preset connection rule and the connection information.

In an embodiment, if it is inconvenient for the target device to establish a connection with the initiator device when the initiator device connects to the target device according to the first preset connection rule and the connection information, for example, the target device is establishing a connection with other devices, after the initiator device fails to connect to the target device, it can then connect to the target device according to the second preset connection rule and connection information.

In an embodiment, the connection information includes at least one of device identification, device name, device address, device type, device quantity, device power, and device state; and/or the connection information includes at least one of a connection user name, a connection password, and a connection parameter.

In an embodiment, the above connection information includes at least one of device identification, device name, device address, device type, device quantity, device power, device state, connection user name, connection password, and connection parameters, or the above connection information includes at least one of device identification, device name, device address, device type, device quantity, device power, and device state, or the above connection information includes at least one of connection user name, connection password and connection parameters.

The device state includes at least one of normal, abnormal, smooth, stuck, idle, overloaded, allowed to connect, not allowed to connect, restricted to connect, safe, not safe, worn, not worn, used, and not used.

During the operation of the device, there are various device states, including at least one of normal, abnormal, smooth, stuck, idle, overload, allowed to connect, not allowed to connect, restricted connection, safe, unsafe, worn, not worn, used, not used.

When the device state of the target device connected to the initiator device is at least one of abnormal, stuck, overloaded, not allowed to connect, unsafe, not worn, and not used, it is inconvenient for subsequent data exchange. For example, if the device state of the target device is stuck, during the subsequent data exchange process, the data processing process of the target device will be extremely long, affecting user experience.

The connection parameters include at least one of connection duration, connection rate, connection start time, connection end time, and connection location.

In an embodiment, the first preset connection rule includes at least one of the following:
if the device identification meets the first preset condition, connecting to the target device according to the device identification and the connection information, and/or, if the device identification does not meet the first preset condition, not connecting to the target device and/or outputting prompt information.

In an embodiment, if the device identification meets the first preset condition, the initiator device establishes a connection with the target device through at least one of the connection user name, the connection password, and the device identification, and/or, if the device identification does not meet the first preset condition, the initiator device does not connect to the target device and/or outputs a prompt information. In an embodiment, meeting the first preset condition means that the device identification includes a device identification of a historically connected device or is a special mark.

In an embodiment, during the process of establishing a connection, the initiator device identifies the target device through the device identification, and uses at least one of the connection user name and the connection password to complete the authentication between the initiator device and the target device, so as to establish the connection.

In an embodiment, the prompt information may include text information, voice information, etc. For example, as shown in FIG. 9, when the user tries to connect to the smart watch or the initiator device attempts to automatically connect to the smart watch, and the smart watch does not meet the first preset condition, the initiator device outputs a prompt information "This smart watch is an unknown device and connection establishment fails".

If the device name meets the second preset condition, connecting to the target device according to the device name and the connection information, and/or, if the device name does not meet the second preset condition, not connecting to the target device and/or outputting prompt information.

If the device name meets the second preset condition, the initiator device establishes a connection with the target device through at least one of the connection user name, the connection password, and the device name, and/or, if the device name does not meet the second preset condition, the initiator device does not connect to the target device and/or outputs a prompt information. In an embodiment, the meeting the second preset condition is that the device name includes a device name of a historically connected device.

In an embodiment, the process of establishing a connection is that the initiator device identifies the target device by the device name. The authentication between the initiator device and the target device is completed by at least one of the connection user name and the connection password, so as to complete the establishment of the connection.

In an embodiment, the prompt information may include text information, voice information, etc., such as outputting a prompt information "XXX is an unknown device, connection establishment failed".

If the device address meets the third preset condition, connecting to the target device according to the device address and the connection information, and/or, if the device address does not meet the third preset condition, not connecting to the target device and/or outputting prompt information.

In an embodiment, if the device address meets the third preset condition, the initiator device establishes a connection with the target device through at least one of the connection user name, the connection password, and the device address, and/or if the device address does not meet the third preset condition, the initiator device does not connect to the target device and/or outputs a prompt information. The meeting the third preset condition is that the device address includes a device address of a historically connected device.

In an embodiment, during the process of establishing a connection, the initiator device identifies the target device through the device address. The authentication between the initiator device and the target device is completed by at least one of the connection user name and the connection password, so as to establish the connection.

In an embodiment, the prompt information may include text information, voice information, etc., such as outputting a prompt information "XXX is an unknown device, connection establishment failed".

If the device type meets the fourth preset condition, connecting to the target device according to the device type and the connection information, and/or if the device type does not meet the fourth preset condition, not connecting to the target device and/or outputting prompt information.

In an embodiment, if the device type meets the fourth preset condition, the initiator device establishes a connection with the target device through at least one of the connection user name and connection password and the device type, and/or, if the device type does not meet the fourth preset condition, the initiator device does not connect to the target device and/or outputs a prompt information. In an embodiment, meeting the fourth preset condition means that the device type meets the current use condition of the initiator device.

In an embodiment, the current use conditions can be automatically judged by the initiator device, or can be set by the user of the initiator device. For example, if the user of the initiator device is playing a game, then the device type is a smart earphone for playing games, which meets the current use conditions of the initiator device. For another example, the user of the initiator device needs to turn on a smart air conditioner. If there are multiple smart air conditioners in the device type information providing device, one of the multiple smart air conditioners is turned on through the preset opening rules to meet the current use conditions of the initiator device. The preset turning-on rule may be turning on the smart air conditioner closest to the initiator device, turning on the smart air conditioner with the most usage times, and so on.

In an embodiment, the process of establishing a connection is that the initiator device identifies the target device through the device type. The authentication between the initiator device and the target device is completed by at least one of the connection user name and the connection password, so as to complete the establishment of the connection.

In an embodiment, the prompt information may include text information, voice information, etc., such as outputting a prompt information "currently there is no usable device suitable for the use environment, and connection establishment fails".

If the device quantity meets the fifth preset condition, connecting to the target device according to the device quantity and the connection information, and/or, if the device quantity does not meet the fifth preset condition, not connecting to the target device and/or outputting prompt information.

If the device quantity meets the fifth preset condition, the initiator device establishes a connection with the target device through at least one of the connection user name, the connection password, and the device quantity, and/or if the device quantity does not meet the fifth preset condition, the initiator device does not connect to the target device and/or outputs a prompt information. In an embodiment, meeting the fifth preset condition is that the device quantity does not exceed the maximum number of connectable devices of the target device.

In an embodiment, during the process of establishing a connection, the initiator device determines the target device with the second highest priority among the device quantity. The authentication between the initiator device and the target device is completed by at least one of the connection user name and the connection password, so as to complete the establishment of the connection.

In an embodiment, the prompt information may include text information, voice information, etc., such as outputting the prompt information "There is currently no device available for connection, and connection establishment failed".

If the device power meets the sixth preset condition, connecting to the target device according to the device power and the connection information, and/or, if the device power does not meet the sixth preset condition, not connecting to the target device and/or outputting prompt information.

In an embodiment, if the device power meets the sixth preset condition, the initiator device establishes a connection with the target device through at least one of the connection user name, the connection password, and the device power, and/or, if the device power does not meet the sixth preset condition, the initiator device does not connect to the target device and/or outputs a prompt information. In an embodiment, meeting the sixth preset condition means that the device power is greater than or equal to a preset power threshold.

In an embodiment, during the process of establishing a connection, the initiator device determines the target device with the second highest priority in the device power. The authentication between the initiator device and the target device is completed by at least one of the connection user name and the connection password, so as to complete the establishment of the connection.

The prompt information may include text information, voice information, etc., such as outputting a prompt information that "the power of the current device does not meet the usage requirements, and the establishment of a connection fails".

If the device state meets the seventh preset condition, connecting to the target device according to the device state and the connection information, and/or, if the device state does not meet the seventh preset condition, not connecting to the target device and/or outputting prompt information.

If the device state meets the seventh preset condition, the initiator device establishes a connection with the target device through at least one of the connection user name, the connection password, and the device state, and/or, if the device state does not meet the seventh preset condition, the initiator device does not connect to the target device and/or outputs a prompt information. The meeting the seventh preset condition means that the device state includes at least one of normal, smooth, idle, connection allowed, connection restricted, safe, worn, and used.

In an embodiment, during the process of establishing a connection, the initiator device determines the target device with the second highest priority in the device state. The authentication between the initiator device and the target device is completed by at least one of the connection user name and the connection password, so as to complete the establishment of the connection. In an embodiment, the method for determining the second preset priority in the device state is: the more items in the device state including normal, smooth, idle, allowed to connect, restricted connection, safe, worn, and used, the higher the second preset priority.

In an embodiment, the prompt information may include text information, voice information, etc., such as outputting a prompt information that "the device state of the current device does not meet the use requirements, and connection establishment fails".

If the connection parameters meet the eighth preset condition, connecting to the target device according to the connection parameters and the connection information, and/or, if the connection parameters do not meet the eighth preset condition, not connecting to the target device and/or outputting prompt information.

If the connection parameter meets the eighth preset condition, the initiator device establishes a connection with the target device through at least one of the connection user name, the connection password, and the connection parameters, and/or, if the device state does not meet the eighth preset condition, the initiator device does not connect to the target device and/or outputs prompt information.

In an embodiment, during the process of establishing a connection, the initiator device determines the target device corresponding to the connection parameter that meets the eighth preset condition among the connection parameters. The authentication between the initiator device and the target device is completed by at least one of the connection user name and the connection password, so as to complete the establishment of the connection.

In an embodiment, the prompt information may include text information, voice information, etc., such as outputting a prompt information that "currently there is no device that meets the connection requirements, and connection establishment fails".

In an embodiment, the meeting the eighth preset condition includes at least one of the following:
the connection parameters include a connection duration, and the historical connection duration is less than or equal to the connection duration;
the connection parameters include a connection rate, and the current connection rate is greater than or equal to the connection rate;
the connection parameters include the connection start time, and the current time meets the start time requirements;
the connection parameters include the connection end time, and the current time meets the end time requirements;
the connection parameters include the connection location, and the current location meets the connection location requirements.

In an embodiment, before the operation A100, the processing method further includes:
Operation A000, detecting whether receiving a preset operation or whether it is in a preset mode, and if so, performing operation A100.

The target device detects whether the preset operation is received or whether it is in a preset mode. If the preset operation is received or currently in the preset mode, the operation of obtaining the connection information according to the request of the terminal is performed. If the preset operation is not received or the preset mode is not currently in place, the operation of obtaining the connection information according to the request of the terminal is not performed. The preset mode includes a smart mode, an automatic switching mode, and other modes that support the connection between devices through the first preset connection rule and/or the second preset connection rule. The preset operation is the response operation performed by the user of the target device to the request of the terminal, including obtaining the connection information of the target device and not obtaining the connection information of the target device.

In an embodiment, before the operation of connecting the initiator device to the target device according to the first preset connection rule and/or the second preset connection rule and the connection information, the processing method further includes:
Operation i, after receiving feedback information from the target device, and/or after receiving the connection confirmation instruction, performing the operation of sending the connection information so that the sender device connected to the terminal is connected to the target device according to the first preset connection rule and/or the second preset connection rule and the connection information.

In an embodiment, the initiator device performs the operation of sending the connection information only after receiving feedback information from the target device, and/or receiving the connection confirmation instruction.

In an embodiment, the feedback information is whether the target device agrees to establish a connection with the initiator device. The confirmation connection instruction is an instruction entered by the user on the initiator device to confirm the establishment of a connection with the target device. Therefore, the initiator device user decides whether to establish a connection, making the process of establishing a connection more flexible and intelligent, and improving user experience.

In an embodiment, after the operation of connecting the initiator device to the target device according to the first preset connection rule and/or the second preset connection rule and the connection information, the processing method further includes:

Operation A300, after the connection succeeds or fails, outputting prompt information to at least one of the initiator device, the terminal, and the target device.

In an embodiment, after the initiator device successfully or fails to connect to the target device, it outputs prompt information to at least one of the initiator device, the terminal, and the target device, so as to prompt the user whether the connection succeeds or fails, thereby improving user experience.

In an embodiment, the processing method further includes:

the terminal is also connected to the target device, and/or there are multiple target devices.

When the initiator device establishes a connection with the target device through the terminal, the terminal and the target device are in a connected state, and there are multiple target devices.

The second preset connection rules include at least one of the following:

if the connection is successful, the initiator device and the target device will no longer be disconnected or disconnected at a fixed time or timeout; if the connection fails, the initiator device and the target device will no longer be connected or be connected regularly or periodically.

If the connection between the initiator device and the target device is successful, the initiator device and the target device will no longer be disconnected or disconnected at a fixed time or timeout. If the connection between the initiator device and the target device fails, the initiator device and the target device will no longer be connected or connected regularly or periodically.

In an embodiment, the manner of obtaining the connection information includes at least one of the following:

obtaining the connection information locally;

obtaining the connection information through the server;

obtaining the connection information by other devices connected to the target device.

In an embodiment, in addition to obtaining its own connection information locally, the target device can also obtain connection information of all other devices that can establish a connection with the initiator device through the server; can also obtain the connection information through other devices connected to the target device. Other devices are all devices capable of establishing a connection with the initiator device.

In an embodiment, the processing method further includes:

If the first preset instruction is received or it is detected that the target device is in or switched to a preset mode, the processing method includes at least one of the following:

immediately or with a delay or timing disconnect the device connection or all connections of the target device;

if the second preset instruction is received, restoring to the previous state;

outputting prompt information.

In an embodiment, the processing method further includes at least one of the following:

after the initiator device is successfully connected to the target device, maintaining or disconnecting the connection between the terminal and the target device.

In an embodiment, after the initiator device is successfully connected to the target device, the connection between the terminal and the target device is maintained or disconnected.

If the connection information changes, updating the corresponding preset connection rule.

If the connection information changes, the corresponding preset connection rule is updated.

In this embodiment, the processing method includes: A100, obtaining the connection information according to the request of the terminal; A200, sending the connection information, so that the initiator device connected to the terminal connects to the target device according to the first preset connection rule and/or the second preset connection rule and the connection information. After obtaining the connection information of the target device according to the request of the terminal, the connection information is sent to the terminal, thereby making the initiator device connected to the terminal connect to the target device according to the first preset connection rule and/or the second preset connection rule and connection information, and providing more optional connection solutions for the connection between the initiator device and the target device, making the initiator device more flexible and intelligent when establishing a connection with the target device.

Figure 13:
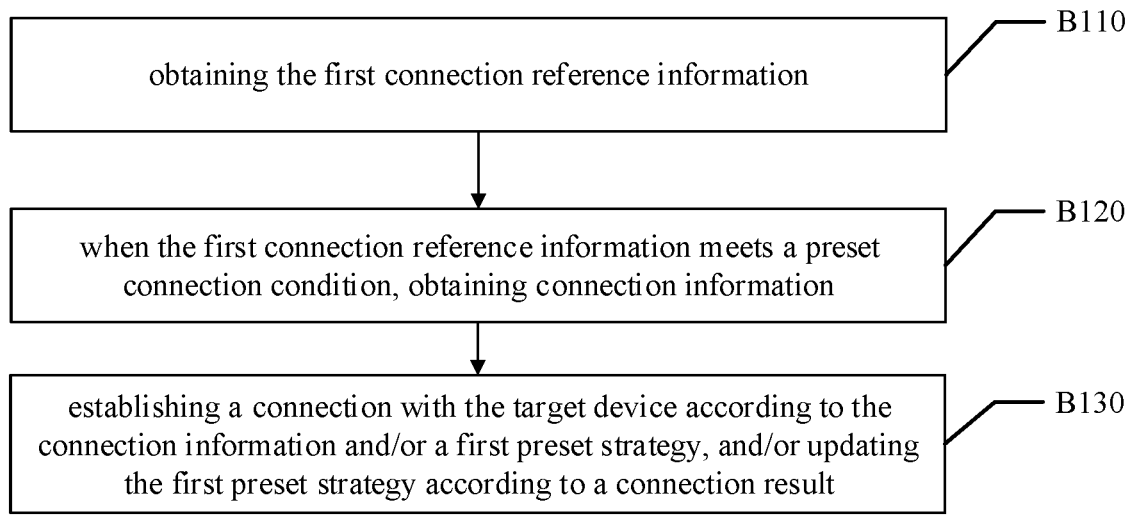
FIG. 13 is a schematic flowchart of the processing method according to an embodiment of the present application.
Figure 14:
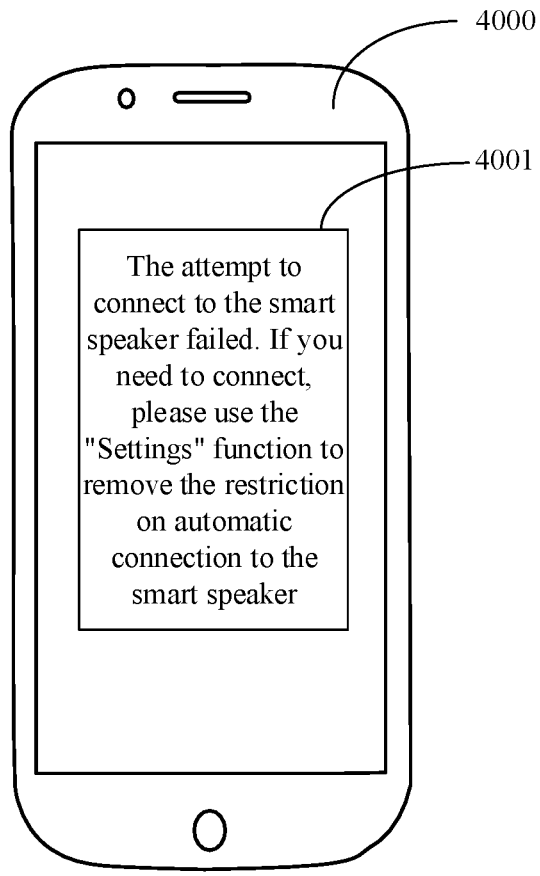
FIG. 14 is a schematic diagram of a result of the automatic connection between the initiator device and the target device in the processing method of this application.
Figure 15:
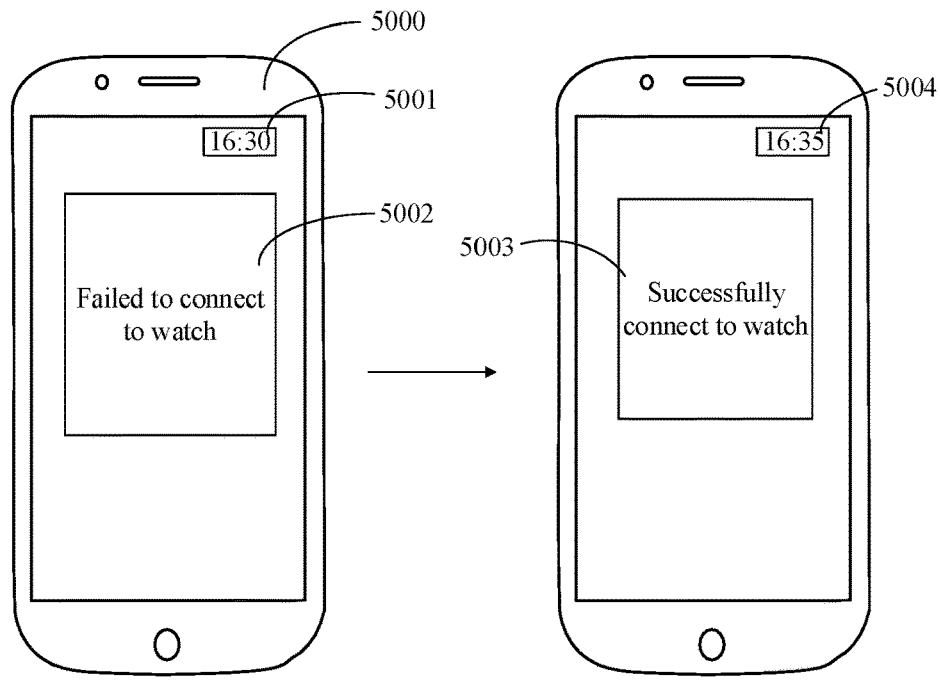
FIG. 15 is a schematic diagram of a result of re-establishing a connection after the connection between the initiator device and the target device fails to be established in the processing method of this application.

The present application provides a processing method. Referring to FIG. 13, FIG. 13 is a schematic flowchart of the processing method according to an embodiment of the present application.

The embodiment of the present application provides the processing method. Although a logical order is shown in the flowcharts, in some cases the steps shown or described may be performed in an order different from that shown or described herein. The processing method is applied to the initiator device, including:

Operation B110, obtaining the first connection reference information.

In an embodiment, the initiator device acquires the first connection reference information, and the initiator device determines whether a connection needs to be established with other devices according to the first connection reference information.

In an embodiment, the first connection reference information may be at least one of the following:

positioning information, time information, device use state information and instruction information.

In an embodiment, the positioning information includes the positioning information of the initiator device and the positioning information of the target device, and the initiator device determines the distance from the target device through the positioning information of the initiator device and the positioning information of the target device. The time information is the current time, which can be the local time of the initiator device or the network time obtained by the initiator device, for example, the current time is 18:00 Beijing time. The device use state information is provided by devices (including the target device) that can be searched around the initiator device, for example, the device is an earphone, and the device use state information of the earphone is that the user is not wearing it. The instruction information is an instruction input by the user received by the initiator device, for example, the user intends to enable the initiator device to remotely control the smart home through the Internet.

The device state includes at least one of normal, abnormal, smooth, stuck, idle, overloaded, allowed to connect, not allowed to connect, restricted to connect, safe, not safe, worn, not worn, used, and not used.

During the operation of the device, there are various device states, including at least one of normal, abnormal, smooth, stuck, idle, overload, allowed to connect, not allowed to connect, restricted connection, safe, unsafe, worn, not worn, used, not used.

By determining whether the first connection reference information meets the preset connection condition, and acquiring the connection information only when it is met, the accuracy of judging whether to establish a connection with the target device by the initiator device is improved, so that the process of device connection is more flexible and intelligent, and unnecessary connections can be reduced, thereby reducing power consumption.

Operation B120, when the first connection reference information meets a preset connection condition, obtaining connection information, the connection information is provided by the target device.

In an embodiment, when the first connection reference information meets a preset connection condition, the connection information is acquired. The connection information is provided by the target device, and the initiator device can obtain the connection information sent by the target device by actively searching for surrounding devices. The initiator device and the target device include any of terminal devices (such as smart phones, Portable Android Device (PAD), tablet computer etc.), wearable smart devices (such as smart watches, smart bracelets, smart earphones, etc.), smart home devices (such as smart TVs, smart speakers, etc.) and Internet of Vehicles devices (such as smart cars, vehicle terminals, etc.).

In an embodiment, the connection information is saved in the initiator device. For the situation where a connection has been established with the target device, the initiator device can save the connection information of the target device, so that when a connection needs to be established with the target device next time, the connection information saved in the initiator device can be directly used to establish a connection with the target device. Therefore, the target device does not need to provide connection information through broadcasting, which can save energy consumption.

Operation B130, establishing a connection with the target device according to the connection information and/or a first preset strategy, and/or updating the first preset strategy according to a connection result.

In an embodiment, the initiator device establishes a connection with the target device according to the connection information and the first preset strategy, and updates the first preset strategy according to the connection result. The first preset strategy includes at least one of setting the connection duration, setting the connection speed, setting the connection time, setting the connection location, setting the connection mode, setting the connection priority, setting the function restriction, setting the automatic trigger application and/or function and/or service, setting execution of preset control instruction, setting the direct connection, and setting the indirect connection.

The method further includes:
if the connection is successful or the number of successful connections reaches a preset value (such as 3 or 5 times), obtaining the second connection reference information, and if the second connection reference information is different from the first connection reference information, changing the first preset strategy to the second preset strategy.
if the connection fails or the number of connection failures reaches a preset value (such as 3 times or 5 times), updating the first preset strategy is: the initiator device and the target device are no longer connected or connected regularly or periodically;
if the connection is successful or the number of successful connections reaches a preset value (such as 3 or 5 times), obtaining the second connection reference information, if the second connection reference information meets a preset condition, changing the first preset strategy to a second preset strategy.

In an embodiment, the second connection reference information meets preset conditions, including at least one of the following:
the second connection reference information is different from the first connection reference information;
the value of the second connection parameter meets a preset condition.

In an embodiment, the second connection reference information may be the same as or different from the first connection reference information, and specifically may include at least one of the following: positioning information, time information, device use state information, and instruction information. Exemplarily, when the first connection reference information is the positioning information, the second connection reference information may be positioning information or time information.

In an embodiment, the initiator device is a mobile phone, and the target device is an earphone. When the user wants to use the mobile phone to establish a connection with the earphone, according to the technical solution of this application, it can first determine whether the current geographic location of the mobile phone meets the conditions (such as at home, not in a conference room or in a car, etc.), if so, connect the earphone according to the connection information provided by the earphone, and connect to the earphone according to the first preset strategy (such as the connection mode being always connected and/or automatically playing preset songs, etc.): If the mobile phone detects that the battery of the earphone is insufficient (for example, only 20% left, etc.), the first preset strategy can be updated to only connect for a preset duration, and then automatically disconnect; or if the mobile phone detects that the location information has changed (such as starting from home to the car), the first preset strategy can be updated to disconnect or stop playing. Updating the original connection strategy through the connection results can achieve more flexible and intelligent technical effects, and in some application scenarios (such as driving, sleeping, etc.), it can also achieve safer and healthier technical effects.

Table 1 below shows some typical implementations of the first preset strategy and the second preset strategy (taking the initiator as a mobile phone and the receiver as an earphone or watch as an example). It can be seen that after the connection succeeds or fails, the connection strategy can be updated again according to the connection reference information, thereby making the connection between devices more flexible and intelligent. In some scenarios, technical effects such as reduced power consumption and greater security can also be achieved, thereby improving user experience.

In an embodiment, the update connection strategy is jointly determined by connection results and information changes, so that more combinations of technical solutions can be generated, and some typical examples are also given in Table 1 below.

TABLE 1

| First preset strategy | Connection result | Information change (optional) | Second preset strategy | Technical effect | Note |
|---|---|---|---|---|---|
| Time | Succeed | Initiator and/or receiver low on battery | Automatically disconnect after a preset period of time, or reduce the connection speed, or reduce the amount of transmitted data and/or transmission time, etc. | Smarter, lower power consumption | Output prompt information, or connect to another earphone with sufficient power (one mobile phone can be connected to multiple earphones at the same time) |
| Time | Fail | None | Reconnect at another time point or time period | Smarter | Support periodic automatic reconnection |
| Location | Succeed | Location change (such as changing from home to car, or changing from office area to conference room, etc.) | Automatically disconnect or automatically stop playing | Smarter, safer, lower power consumption | When the location changes again, it can automatically reconnect |
| Device use state | Succeed | State change (initiator and/or receiver running state changes from normal to stuck) | Pause playback, or automatically disconnect | Smarter, lower power consumption | When the state returns to normal, it can automatically reconnect |
| Device use state | Fail | State change (e.g., switching from airplane mode back to normal mode, or changing from non-use to use) | Re-initiate connection | Smarter and safer | Support only connect once or multiple times |
| Instruction information | Fail | None | Automatically establish a connection with the target device that meets the preset connection conditions | Smarter | When there are multiple target devices that meet the preset connection conditions, prompt information can also be output for the user to choose |
| Instruction information | Succeed | State change (earphones change from wearing state to non-wearing state, smart terminal changes from safe state to non-safe state) | Automatically disconnect | Smarter and safer | Output prompt information |

In an embodiment, the initiator device is a smart home control center (such as a smart terminal, mobile phone, etc.), and the target device is a speaker. When the user wants to be woken up by the sound of music in the morning, according to the technical solution of this application, the smart home control center first determines whether the current time meets the preset conditions (such as the alarm clock time set by the user, the user's habitual wake-up time, etc.). If so, the connection information provided by the speaker is obtained. A connection with the speaker is established according to the connection information and the first preset strategy. Since usually the time from waking up to going out to work for the user is fixed, the connection can be established according to the first preset strategy, such as setting the duration of the connection (controlling the playing time of the speaker, controlling the closing time of the speaker, etc.), setting the automatic playback of music (automatically playing the music in the music list played last time, playing the music of the user's favorite type of music, etc.), etc. If the connection is successful, continue to determine whether the current time meets the second preset condition (such as whether the preset playback time of the speaker is reached, whether the preset turn-off time of the speaker is reached), whether the user has gone out. If so, the first preset strategy is changed to the second preset strategy. The second preset strategy can be to turn off the currently playing speaker, turn off the lights in the room, and start the sweeping robot to perform cleaning mode lights. If the connection fails, the first default strategy is changed to a second default strategy. The second preset strategy may be to connect the user's wearable device to perform the music playback function. For example, when the connection to the speaker fails, the smart home control center establishes a connection with the user's smart watch or earphone to play music, thereby waking up the user. The above method can realize more flexible and intelligent technical effects.

The method further includes at least one of the following:
the functional limitations described include: the preset system functions and/or preset application functions and/or preset services (which may be foreground services or background services) of the initiator device and/or the target device are restricted from normal use.

In an embodiment, the function restriction includes: restricting that the preset system function and/or the preset application function of the initiator device and/or the target device cannot be used normally.

The performing the preset control instruction includes: performing the preset control instruction of the initiator device and/or the preset control instruction of the target device.

In an embodiment, the preset control instruction of the initiator device and/or the preset control instruction of the target device are performed.

In an embodiment, when the initiator device establishes a connection with the target device, the initiator device outputs a preset control instruction to the target device. Alternatively, when the initiator device establishes a connection with the target device, the target device outputs a preset control instruction to the initiator device. In an embodiment, the initiator device outputting preset control instructions to the target device is taken as an example, the preset control instruction is an instruction for the initiator device to control the target device to perform a corresponding device control operation, for example, the initiator device adjusts the volume of the target device. In an embodiment, it can also combine the external environment information to output the preset control instruction. For example, when the user is in a noisy environment and the smart earphone is connected to the smartphone, the smartphone can set the volume of the smart earphone to a higher volume and automatically turn on the noise reduction function of the smart earphone. When the user is in a quiet environment, the smart phone can set the volume of the smart earphone to a lower volume to adapt to the corresponding external environment information. In an embodiment, the preset control instruction can also be output in combination with the mode information of the device. For example, when a smart watch is connected to a smart speaker, the smart watch is in the sports mode, and the smart watch outputs the preset control instruction to the smart speaker to make the smart speaker perform corresponding device control operations. For example, the smart speaker prompts the user whether to turn on the music he or she likes to listen to while exercising according to the user's preference.

The indirect connection includes: the initiator is connected to a third-party device, and the third-party device is connected to the target device.

In an embodiment, the initiator device is connected to the third-party device, and the third-party device is connected to the target device.

In an embodiment, when the initiator device establishes a connection with the target device, the initiator device first establishes a connection with a third-party device (in a connected state with the target device), and then establishes a connection with the target device through the third-party device.

In this embodiment, the processing method includes: obtaining first connection reference information; when the first connection reference information meets a preset connection condition, obtaining connection information, the connection information being provided by the target device; establishing a connection with the target device according to the connection information and/or a first preset strategy, and/or updating the first preset strategy according to a connection result. It realizes establishing a connection with the target device through the first preset strategy, and provides more optional connection schemes when connecting with the target device, so that the initiator device is more flexible and intelligent when establishing a connection with the target device.

In an embodiment, the present application provides another embodiment of the processing method. After the operation of establishing a connection with the target device according to the connection information and/or the first preset strategy, the processing method further includes:

Operation a, the initiator device and/or the target device outputting prompt information.

In an embodiment, the initiator device and/or the target device outputs prompt information.

In an embodiment, the prompt information includes at least one of the following: text information, voice information, light information and vibration information.

In this embodiment, the initiator device and/or the target device outputs prompt information, so that the user can obtain information that the connection between the initiator device and the target device is successfully established through the prompt information, thereby making the device connection process more flexible and intelligent.

Figure 16:
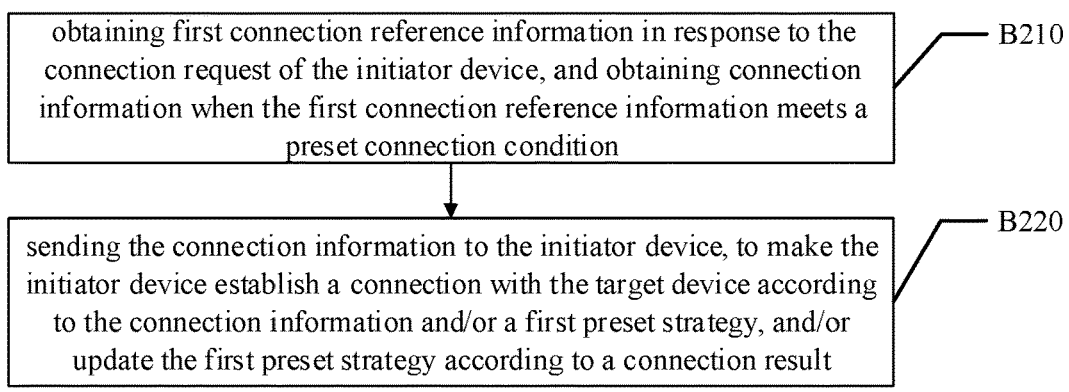
FIG. 16 is a schematic flowchart of the processing method according to another embodiment of the present application.
Figure 17:
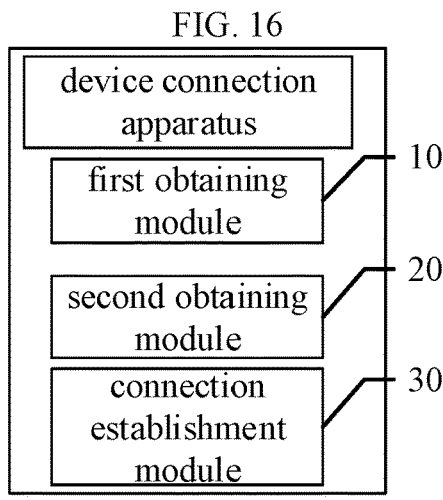
FIG. 17 is a schematic diagram of a functional module of the processing device according to a preferred embodiment of the present application.

In an embodiment, referring to FIG. 16, another embodiment of the application processing method is proposed. Although a logical order is shown in the flowcharts, in some cases the steps shown or described may be performed in an order different from that shown or described herein. The processing method is applied to the target device, and the processing method includes:

Operation B210, obtaining first connection reference information in response to the connection request of the initiator device, and obtaining connection information when the first connection reference information meets a preset connection condition.

In an embodiment, in response to the connection request of the initiator device, the first connection reference information is acquired, and when the first connection reference information meets the preset connection condition, the connection information is acquired.

In an embodiment, the first connection reference information may include at least one of the following:
positioning information, time information, device use stat information and instruction information.

By determining whether the first connection reference information meets the preset connection condition, and acquiring the connection information only when it is met, the accuracy of judging whether to establish a connection with the target device by the initiator device is improved, so that the process of device connection is more flexible and intelligent, and unnecessary connections can be reduced, thereby reducing power consumption.

In an embodiment, the connection information may include at least one of device identification, device name, device address, device type, device quantity, device power, and device state; and/or, the connection information includes at least one of a connection user name, a connection password, and a connection parameter.

In an embodiment, the above connection information includes at least one of device identification, device name, device address, device type, device quantity, device power, device state, connection user name, connection password, and connection parameter, or the above connection information includes at least one of device identification, device name, device address, device type, device quantity, device power, and device state, or the above connection information includes at least one of connection user name, connection password and connection parameter.

Operation B220, sending the connection information to the initiator device, to make the initiator device establish a connection with the target device according to the connection information and/or a first preset strategy, and/or update the first preset strategy according to a connection result.

In an embodiment, the target device sends connection information to the initiator device, so that the initiator device establishes a connection with the target device according to the connection information and the first preset strategy, and updates the first preset strategy according to the connection result.

In an embodiment, for setting the direct connection, when the target device establishes a connection with the initiator device, the target device directly establishes a connection with the initiator device without establishing a connection with the initiator device through a third-party device.

The above connection modes include at least one of the following:
- if the connection is successful, the target device and the initiator device are no longer disconnected or disconnected at a fixed time or timed out; and/or,
- if the connection fails, the target device and the initiator device are no longer connected or connected regularly or periodically.

The above method may further include:
- If the connection is successful or the number of successful connections reaches a preset value (such as 3 or 5 times), obtaining the second connection reference information, if the second connection reference information is different from the first connection reference information, changing the first preset strategy to the second preset strategy.
- If the connection fails or the number of connection failures reaches a preset value (such as 3 times or 5 times), then updating the first preset strategy is: the initiator device and the target device are no longer connected or connected regularly or periodically.
- If the connection is successful or the number of successful connections reaches a preset value (such as 3 or 5 times), obtaining the second connection reference information, and if the second connection reference information meets a preset condition, changing the first preset strategy to a second preset strategy.

In an embodiment, the second connection reference information meets the preset condition, including at least one of the following:
- the second connection reference information is different from the first connection reference information;
- the value of the second connection parameter meets the preset condition.

In an embodiment, the second connection reference information may be the same as or different from the first connection reference information, and specifically may include at least one of the following: positioning information, time information, device use state information, and instruction information. Exemplarily, when the first connection reference information is positioning information, the second connection reference information may be positioning information or time information.

In an embodiment, if the second connection reference information (such as device use state information) is different from the first connection reference information (such as positioning information), it may be determined that the second connection reference information meets the preset condition.

In another embodiment, if the value of the second connection reference information (such as the current location, or the current time point or time period, or device use state, etc.) meets the preset condition (for example, the current location is the preset location, or within the range of the preset location, and if the current time point is the preset time point or within the range of the preset time period), it can be determined that the second connection reference information meets the preset condition.

Table 2 below shows some typical implementations of the first preset strategy and the second preset strategy (taking the initiator as a mobile phone and the receiver as an earphone or watch as an example). It can be seen that after the connection succeeds or fails, the connection strategy can be updated again according to the connection reference information, thereby making the connection between devices more flexible and intelligent. In some scenarios, technical effects such as reduced power consumption and greater security can also be achieved, thereby improving user experience. In an embodiment, the update connection strategy is jointly determined by connection results and information changes, so that more combinations of technical solutions can be generated, and some typical examples are also given in Table 2 below.

TABLE 2

| First preset strategy | Connection result | Information change (optional) | Second preset strategy | Technical effect | Note |
|---|---|---|---|---|---|
| Time | Succeed | Initiator and/or receiver low on battery | Automatically disconnect after a preset period of time, or reduce the connection speed, or reduce the amount of transmitted data and/or transmission time, etc. | Smarter, lower power consumption | Output prompt information, or connect to another earphone with sufficient power (one mobile phone can be connected to multiple earphones at the same time) |
| Time | Fail | None | Reconnect at another time point or time period | Smarter | Support periodic automatic reconnection |

TABLE 2-continued

| First preset strategy | Connection result | Information change (optional) | Second preset strategy | Technical effect | Note |
|---|---|---|---|---|---|
| Location | Succeed | Location change (such as changing from home to car, or changing from office area to conference room, etc.) | Automatically disconnect or automatically stop playing | Smarter, safer, lower power consumption | When the location changes again, it can automatically reconnect |
| Device use state | Succeed | State change (initiator and/or receiver running state changes from normal to stuck) | Pause playback, or automatically disconnect | Smarter, lower power consumption | When the state returns to normal, it can automatically reconnect |
| Device use state | Fail | State change (e.g., switching from airplane mode back to normal mode, or changing from non-use to use) | Re-initiate connection | Smarter and safer | Support only connect once or multiple times |
| Instruction information | Fail | None | Automatically establish a connection with the target device that meets the preset connection conditions | Smarter | When there are multiple target devices that meet the preset connection conditions, prompt information can also be output for the user to choose |
| Instruction information | Succeed | State change (earphones change from wearing state to non-wearing state, smart terminal changes from safe state to non-safe state) | Automatically disconnect | Smarter and safer | Output prompt information |
| Set connection priority | Succeed | Environment changes (the environment where the earphone is located changes from quiet to noisy) | Execute preset control instruction | Smarter | When the environment changes from noisy to quiet, it can return to the state before executing the preset control instruction |
| Set connection speed | Succeed | State changes (such as watch power changes from insufficient to sufficient) | Set the connection speed (faster than the connection speed of the first preset strategy) | Smarter | When the power changes again, the connection speed can be limited again |

In an embodiment, the initiator device is a smart home control center (such as a smart terminal, mobile phone, etc.), and the target device is a speaker. When the user wants to be woken up by the sound of music in the morning, according to the technical solution of this application, the smart home control center first judges whether the current time meets the preset conditions (such as the alarm clock time set by the user, the user's habitual wake-up time, etc.), If so, the connection information provided by the speaker is obtained, and a connection with the speaker is established according to the connection information and the first preset strategy. Since the time from waking up to going to work is usually fixed for the user, the connection can be established according to the first preset strategy, such as setting the duration of the connection (controlling the playing time of the speaker, controlling the closing time of the speaker, etc.), setting automatic playback of music (automatically play the music in the music list played last time, play the music of the user's favorite music type, etc.), and the like. If the connection is successful, continue to determine whether the current time meets the second preset condition, and if so, the first preset strategy is changed to the second preset strategy. The second preset strategy may be to turn off the currently playing speakers, turn off the lights in the room, and start the sweeping robot to perform cleaning mode lights. If the connection fails, the first default strategy is changed to a second default strategy. The second preset strategy may be to connect the user's wearable device to perform the music playback function. For example, when the connection to the speaker fails, the smart home control center establishes a connection with the user's smart watch or earphone to play music, thereby waking up the user. The above method can realize more flexible and intelligent technical effects.

The above method also includes at least one of the following:

the functional limitations described include: the preset system functions and/or preset application functions and/or preset services (which may be foreground services or background services) of the initiator device and/or the target device are restricted from normal use.

In an embodiment, the functional restriction includes: restricting that the preset system function and/or the preset application function of the initiator device and/or the target device cannot be used normally.

The automatic triggering of applications or functions includes: automatically triggering and running at least one of the following of the initiator device and/or the target device: a preset system application, a preset system function, a preset application, a preset application function.

In an embodiment, at least one of the following items of the initiator device and/or the target device is automatically triggered to run: a preset system application, a preset system function, a preset application, and a preset application function.

The performing the preset control instruction includes: performing he preset control instruction of the initiator device and/or the preset control instruction of the target device.

In an embodiment, a preset control instruction of the initiator device and/or a preset control instruction of the target device are executed.

The indirect connection includes: the initiator is connected to a third-party device, and the third-party device is connected to the target device.

In an embodiment, the initiator is connected to the third-party device, and the third-party device is connected to the target device.

In an embodiment, when the target device establishes a connection with the initiator device, the initiator device first establishes a connection with a third-party device (connected to the target device), and then establishes a connection with the target device through the third-party device.

In this embodiment, the processing method includes: obtaining first connection reference information in response to the connection request of the initiator device, and obtaining the connection information when the first connection reference information meets a preset connection condition; sending the connection information to the initiator device, to make the initiator device establish a connection with the target device according to the connection information and/or a first preset strategy, and/or update the first preset strategy according to a connection result. It realizes establishing a connection with the initiator device through the first preset strategy, and provides more optional connection schemes when connecting with the initiator device, so that the target device is more flexible and intelligent when establishing a connection with the initiator device.

In an embodiment, the present application provides another embodiment of the processing method. The processing method further includes:

Operation b, determining whether the connection request meets preset connection requirements.

In an embodiment, the target device needs to perform preset condition judgment on the connection request sent by the initiator device, that is, determine whether the connection requirement meets the preset connection requirement.

Operation c, if the connection request meets the preset connection requirements, feeding back that the connection is possible.

After the above steps of determining whether the connection request meets the preset requirements, the method also includes:

Operation d, if the connection request does not meet the preset connection requirements, feeding back that the connection is possible but set the data exchange permission after the connection is established with the initiator device.

In an embodiment, if the connection request sent by the initiator device does not meet the preset connection requirements set by the target device, the target device will set the data exchange permission after establishing a connection with the initiator device while feeding back the connection to the initiator device. For example, the data exchange authority may restrict the exchange of text file data. The data exchange right not only restricts the target device from transmitting the restricted exchanged data to the initiator device, but also restricts the target device from receiving the restricted exchanged data sent by the initiator device.

The preset connection requirements above include security requirements.

In this embodiment, by determining whether the connection request meets the preset connection requirements, including security requirements, and feedback that it is possible to connect when it meets the requirements, and setting the data exchange authority while feedback that it is possible to connect when it does not meet the requirements, which enables a secure connection regardless of whether the connection request meets the preset connection requirements.

Figure 18:
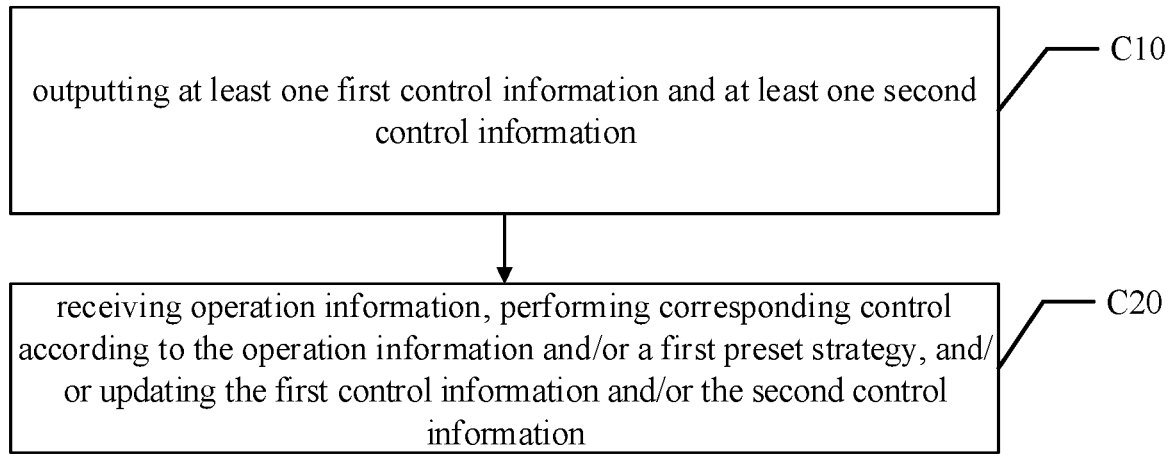
FIG. 18 is a schematic flow chart of the processing method according to an embodiment of the present application.

The present application provides a processing method. Referring to FIG. 18, FIG. 18 is a schematic flowchart of the processing method according to an embodiment of the present application.

The embodiment of the present application provides the processing method. Although a logical order is shown in the flowcharts, in some cases the steps shown or described may be performed in an order different from that shown or described herein. The processing method can be applied to management devices, including but not limited to personal computers and smart phones. For the convenience of description, the following steps are omitted to describe the processing method of the execution subject, and the processing method includes:

Operation C10, outputting at least one first control information and at least one second control information, the first control information corresponds to a first device directly connected to the management device, and the second control information corresponds to a second device indirectly connected to the management device.

In an embodiment, before the operation of outputting at least one first control information and/or at least one second control information, the method further includes: detecting whether a preset event occurs. If yes, the operation of outputting at least one first control information and/or at least one second control information is performed; and/or, if not, the operation of outputting at least one first control information and/or at least one second control information is not performed.

In an embodiment, the preset event includes at least one of switching of the control center, or establishing or disconnecting the connection between the first device and the management device, or establishing or disconnecting the connection between the second device and the management device, or the change of the function and/or interface of the system and/or application on the first device and/or the second device (such as alarm clock ringing, application opening or exiting, etc.), or the state information of the first device and/or the second device (for example, the remaining power is lower than a certain preset value, such as 10%; or the change of the environment, such as changing from day to night, or from work to home, etc.).

In an embodiment, the state information of the device includes at least one of device identification, device name, device address, device type, device quantity, device power, and device use state.

In an embodiment, the device user state may include at least one of the environment of the device (such as time, location, etc.), storage space information, use information (such as traffic information, use habit information, and currently used application information, etc.), the running state being normal, the running state being abnormal, the running state being smooth, the running state being stuck, the device being idle, the device being overloaded, the device being in the state of allowing connection, the device being in the state of not allowing connection, the device being in the state of restricting connection, the device being in a safe state or mode, the device being in a non-secure state or mode, the device being in the wearing state, the device being in the non-wearing state, the device being in use and the device being not in use.

In an embodiment, outputting at least one first control information and/or at least one second control information, the first control information corresponds to the first device connected to the management device, and the second control information corresponds to the second device connected to the management device. The management device, the first device and the second device include any one of terminal devices (such as smart phones, Portable Android Device, Tablet PC), etc.), wearable smart devices (such as smart watches, smart bracelets, smart earphones, etc.), smart home devices (such as smart TVs, smart speakers, etc.) and Internet of Vehicles devices (such as smart cars, vehicle terminals, etc.).

The content of the above-mentioned first control information and/or the above-mentioned second control information includes at least one of the following: the device information of the first device and/or the second device; the application information and/or function information and/or service information of the first device; the application information and/or function information and/or service information of the second device; the operation interface information of the first device and/or the operation interface information of the second device.

In an embodiment, the content of the first control information and/or the above-mentioned second control information includes at least one of the device information of the first device and/or the second device; the application information and/or function information of the first device; the application information and/or function information of the second device; the operation interface information of the first device and/or the operation interface information of the second device.

For the device information of the first device and/or the second device, it includes information such as the device name and device identification for the user to distinguish between devices, for example, the device name is "smart TV", the user can know that the device is a smart TV through the device name, and will not mistake the smart TV for a smart phone. It also includes device address, such as Bluetooth address, WIFI address and other information used for data exchange between devices, which is the unique identity information of each device.

For the application information and/or function information of the first device, the application information of the first device includes system application (such as camera, recording) information (such as application name, application icon), paid application (such as game application, office application) information (such as application name, application icon), or the like. The function information of the first device includes functions in applications of the first device, such as taking pictures, recording videos, playing audio, creating new files, and the like.

For the application information and/or function information of the second device, the application information of the second device includes system application (such as camera, recording) information (such as application name, application icon), paid application (such as game application, office application) information (such as application name, application icon), or the like. The function information of the second device includes functions in applications of the second device, such as taking pictures, recording videos, playing audio, creating new files, and the like.

For the operation interface information of the first device and/or the operation interface information of the second device, the operation interface information includes the interface currently displayed by the device, which can realize remote control of the first device and/or the second device.

The output form of the above-mentioned first control information and/or the above-mentioned second control information includes at least one of the following: one device corresponds to one window or page or control or card; all devices are correspondingly displayed in the same window or page or control or card; the first control information is displayed in a first display area or a first display screen; the second control information is displayed in a second display area or a second display screen; the first control information and/or the second control information are simultaneously displayed in a display area or a display screen.

Figure 19:
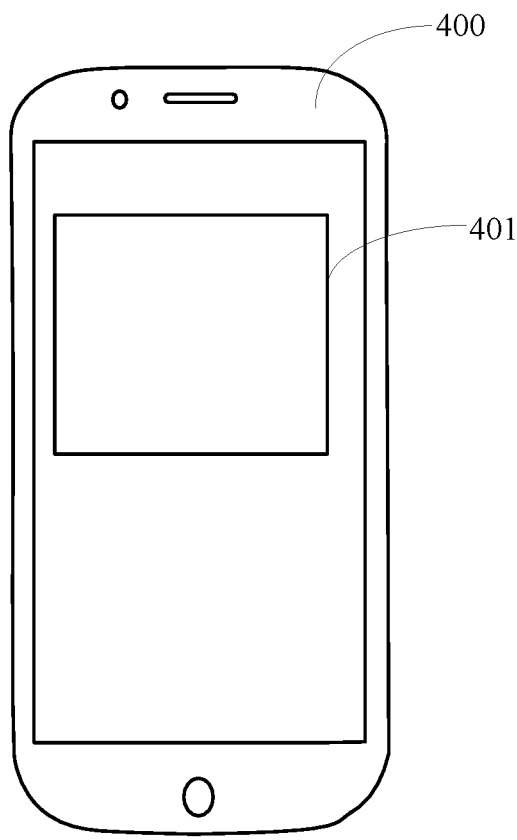
FIG. 19 is a schematic diagram of a pop-up screen of the processing method of the present application.
Figure 20:
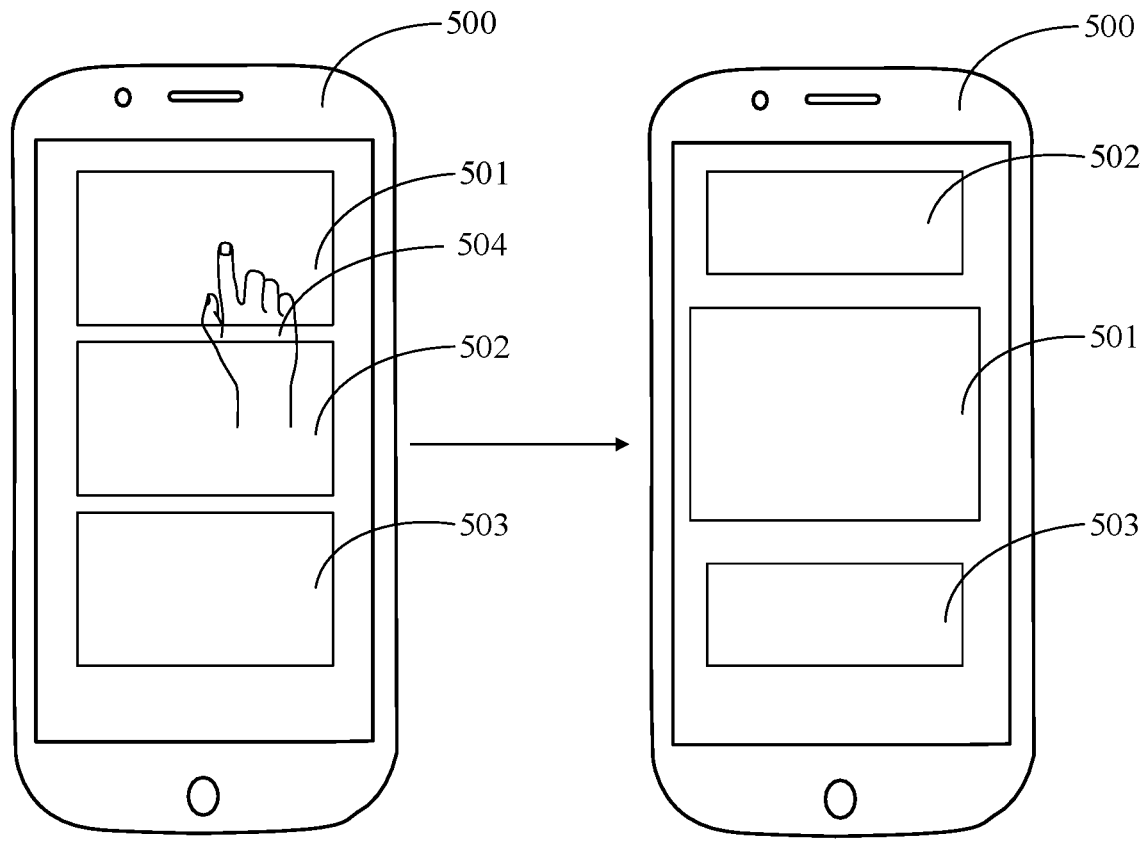
FIG. 20 is a schematic diagram of display position adjustment of the operation interface of the processing method of the present application.

In an embodiment, a window generally refers to a display mode that does not completely occupy the entire screen for display, such as a pop-up frame. Referring to FIG. 19, 400 is a smart phone, and 401 is a pop-up frame. As for the page, it generally takes up the entire screen for display, such as the web page of the browser. As for controls, it generally refers to sub-windows, such as list boxes, edit boxes, and so on. As for the display and window or page or control or card, it determines the expression form of the first control information and/or the second control information, that is, the presented shape.

For the display area and the display screen, what is determined is the display position of the first control information and/or the second control information. The display area is part of the display screen. It can be understood that the management device may have one or more display screens.

In an embodiment, the management device is a data processing center, for example, acquiring the first control information from the first device.

The above method further includes at least one of the following: the first device is directly or indirectly connected to the management device; the second device is directly or indirectly connected to the management device.

In an embodiment, the connection type includes direct connection and indirect connection, the first device may be directly or indirectly connected to the management device, and the second device may also be directly or indirectly connected to the management device. For example, the first device is directly connected to the management device, the first device is directly connected to the second device, and the management device is indirectly connected to the second device.

Operation C20, receiving operation information, performing corresponding control according to the operation information and/or a first preset strategy, and/or updating the first control information and/or the second control information.

In an embodiment, receive operational information, perform corresponding control according to the operation information and the first preset strategy, or update the first control information and/or the second control information, or perform corresponding control and update the first control information and/or the second control information according to the operation information and the first preset strategy. The operation information is information corresponding to the outputted first control information and/or second control information. For example, after the management device outputs the first control information and/or the second control information, the user operates on the output control information, thereby generating operation information.

In an embodiment, the purpose of updating the first control information and/or the second control information is to distinguishably display the first control information and/or the second control information corresponding to the operation information for the user, to make the user to determine the object being operated by the first control information and/or the second control information that are displayed differently.

Before the above operation C20, it is detected whether the management device currently outputting the control information meets the first preset rule, and if so, the operation C20 is executed.

In an embodiment, detect whether the management device currently outputting the control information meets the first preset rule, and if so, perform receiving operation information, and perform corresponding control steps according to the operation information and/or the first preset strategy. The introduction of the first preset rule avoids the misoperation of the user. It can be understood that the misoperation is an operation generated by the user without the intention of the operation, that is, there is no need to obtain operation information.

The above meeting the first preset rule includes at least one of the following: the management device is a control center; the management device is in a preset mode; the interface of the management device is in an operable state; the authentication information is output and the authentication passes; and a preset operation instruction is received.

In an embodiment, the meeting the first preset rule includes at least one of the following: the management device is a control center, it can be understood that the control center acquires the first control information and/or the second control information; the management device is in the preset mode; the interface of the management device is in the operable state; the authentication information is output and the authentication is passed; the preset operation instruction is received.

In an embodiment, the preset modes include smart mode, shortcut operation mode, automatic switching mode and other modes for performing functions related to the control center.

In an embodiment, being in an operable state on the interface of the management device may include that the device is in an unlocked state.

In an embodiment, for the authentication information, it can ensure that the user currently operating the device is an authorized user.

In an embodiment, the preset operation instruction is equivalent to a secondary confirmation instruction, including a preset gesture instruction, a preset voice instruction, a preset combination key instruction, and the like.

If the operation information is a switching connection operation, change the connection type of the first device, and/or change the connection type of the second device.

In an embodiment, if the operation information is a switching connection operation, change the connection type of the first device, or change the connection type of the second device, or change the connection type of the first device and change the connection type of the second device. For example, the management device is directly connected to the first device and indirectly connected to the second device, and after performing a switching connection operation, is directly connected to the second device and indirectly connected to the first device.

If the operation information is an operation of establishing a connection, establish a connection between the first device and the second device.

In an embodiment, if the operation information is an operation of establishing a connection, a connection is established between the first device and the second device. For example, after the management device is respectively connected to the first device and the second device, the first device and the second device can also establish a connection through operations on the management device. Understandably, since the management device has respectively established connections with the first device and the second device, establishing the connection between the first device and the second device through the management device can avoid the process of connection verification (such as device security verification), and improve the efficiency of establishing a connection between the first device and the second device.

If the operation information is a disconnection operation, disconnection setting information is output, and at least one of disconnection time, disconnection duration, and reconnection strategy according to the setting instruction is set.

If the operation information is a setting operation, the setting information is output, and the corresponding setting is performed according to the setting instruction.

In an embodiment, if the operation information is a setting operation, the setting information is output, and the corresponding setting is performed according to the setting instruction. The setting instruction can act on the management device, the first device and/or the second device, for example, the management device, the first device and/or the second device display the same display page (such as the display page of the first device) through the setting instruction.

Make corresponding settings according to the setting instruction includes at least one of the following: turn on or off the system function, application function, and service of the first device (which may be foreground and/or background service, and may be system and/or application and/or third-party services), display at least one item in the interface; turn on or off at least one of the system function, application function, service (which may be foreground and/or background service, can be system and/or application and/or third party service), and display interface of the second device; set connection parameters between the management device and the first device and/or the second device; set working parameters of the first device and/or the second device.

The above connection parameters include at least one of the following:
  connection rate, connection delay, connection duration, connection time, connection location, connection mode.

The above working parameters include at least one of the following:
  device speed, device power, device brightness, device volume, device driving path, device working mode.

In an embodiment, the working parameters include at least one of device speed, device power, device brightness, device volume, device driving path, and work mode. When the first device and/or the second device is a sweeping robot, the working parameter may be the cleaning path of the sweeping robot. When the first device and/or the second device is a vehicle terminal, the working parameter may be vehicle speed. When the first device and/or the second device are smart TVs, the working parameters may be brightness and/or volume of the TV. When the first device and/or the second device is an intelligent air conditioner, the working parameter may be the working power of the air conditioner. When the first device and/or the second device is a smart speaker, the working parameter may be the working mode of the speaker (such as music playing mode, sleeping mode, accompanying mode, etc.).

If the operation information is a transfer information operation, at least one information on the first device is transferred to the second device; and/or at least one information on the second device is transferred to the first device; and/or at least one information on the management device is transferred to the first device and/or the second device.

In an embodiment, if the operation information is a transfer information operation, at least one information on the first device is transferred to the second device; and/or at least one information on the second device is transferred to the first device; and/or at least one information on the management device is transferred to the first device and/or the second device. The transfer information includes transferring at least one of system functions, application functions, and display interfaces. For example, the audio playback function of the management device is transferred to the first device for playback, and/or the display interface of the management device is transferred to the second device for playback, and/or the control function of the first device is transferred to the second device for control.

If the above-mentioned first control information and/or the second control information includes the corresponding device information, updating the first control information and/or the second control information includes at least one of the following: differentially displaying the corresponding device information; hiding the corresponding device information; outputting prompt information corresponding to the control result.

If the first control information and/or the second control information includes the corresponding device information, the first control information and/or the second control information is updated by differentially displaying the corresponding device information and/or hiding the corresponding device information. The corresponding device information is device information corresponding to the operation information.

Differential displaying includes at least one of the following: adjusting the display size of the corresponding device information, for example, increasing the display font size of the corresponding device information; adjusting the display position of the corresponding device information, for example, adjusting the display position of the corresponding device information to the top of the device list corresponding to the corresponding device information; adjusting the display color of the corresponding device information, for example, adjusting the font display color of the corresponding device information to be different from the font display color of other device information; adjusting the display font of the corresponding device information, such as bolding or italicizing the text of the corresponding device information; adjusting the display animation of the corresponding device information, for example, adjusting the display animation of the corresponding device information from static display to dynamic display (such as heartbeat display).

If the first control information and/or the second control information includes application information and/or function information and/or operation interface information of the corresponding device, the control result is fed back by outputting prompt information corresponding to the control result.

The output prompt information includes at least one of the following: feeding back connection results, for example, the first device has been changed to an indirect connection, the second device has been disconnected for 1 hour, the first device has established a connection with the second device, etc.; feeding back setting results, for example, the first device has started the music playback function, the connection delay of the first device has been adjusted to 20 ms, and the playback volume value of the second device has been adjusted to 30.

The ways of outputting prompt information may include: text, sound, screen, etc., for example, displaying a text prompt of disconnection through a pop-up box on the screen.

If the first control information and/or the second control information include corresponding application information and/or function information and/or service information, updating the first control information and/or the second control information includes at least one of the following:
  turning on or off the corresponding application and/or function and/or service;
  increasing or decreasing the parameter value of the corresponding application and/or function and/or service.

If the first control information and/or the second control information includes corresponding application information and/or function information and/or service information, the first control information and/or the second control information are updated by opening or closing the corresponding application and/or function, and/or increasing or decreasing the parameter value of the corresponding application and/or function. In an embodiment, the corresponding application information and/or function information is application information and/or function information corresponding to the operation information.

The parameter value is a parameter value corresponding to a corresponding application and/or function, for example, adjusting a playback volume of a music application.

If the first control information and/or the second control information include corresponding operation interface information, updating the first control information and/or the second control information includes at least one of the following:
adjusting the display parameters of the corresponding operation interface;
transferring the operation interface corresponding to the first control information to the device corresponding to the second control information;
transferring the operation interface corresponding to the second control information to the device corresponding to the first control information;
closing or hiding or suspending or fixing or reducing or enlarging the corresponding operation interface.

In an embodiment, the method further includes:
Operation C30, in response to the occurrence of a first preset event, switching a first preset strategy to a second preset strategy for control.

In an embodiment, the first preset strategy and the second preset strategy may be the same or different. For example, the preset event is an incoming call while playing music through the smart earphone, and the second preset strategy is not to disconnect the smart earphone when the current time is the disconnection time. When the preset event is that the power of the smart earphone is too low, the second preset strategy is not to establish a connection with the smart earphone when the current time is the connection time. When the preset event is that the battery of the smart earphone is too low, the first preset strategy is to establish a connection with the smart earphone when the current time is the connection time. The second preset strategy is also to establish a connection with the smart earphone when the current time is the connection time.

In this embodiment, after the management device is connected with the first device and/or the second device, outputting corresponding first control information and/or second control information and receiving operation information corresponding to the first control information and/or second control information, so as to execute corresponding control through the operation information and the first preset strategy, which avoids that after the management device is connected with the first device and/or the second device, only simple control interaction can be performed, so that the control interaction between the devices after establishing connection with each other is more intelligent, convenient and fast. In addition, since it can support the control interaction between directly connected devices and indirectly connected devices, the function is more powerful, and the experience is more intelligent, convenient and fast.

Figure 21:
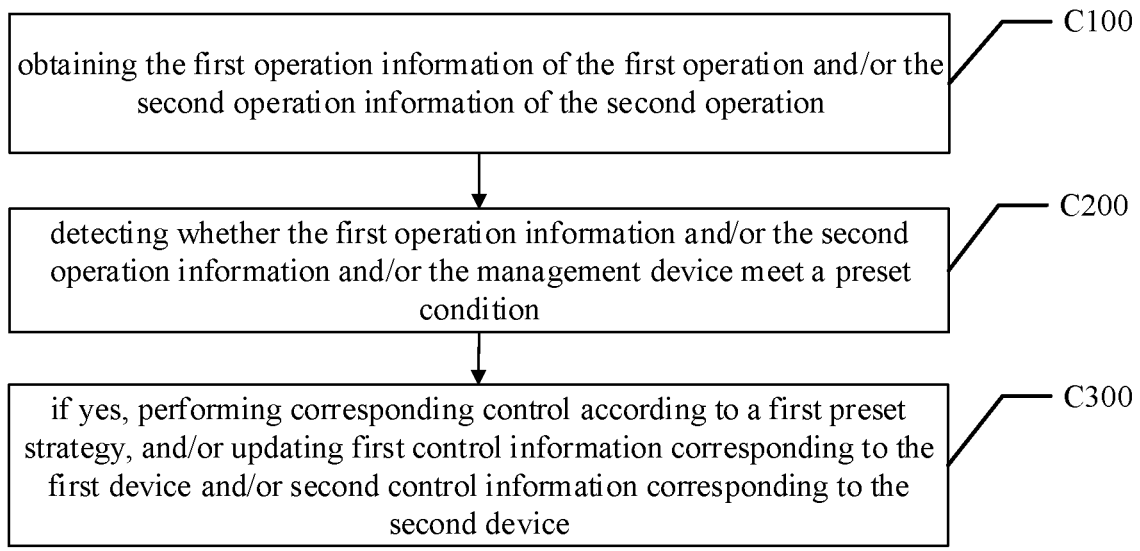
FIG. 21 is a schematic flowchart of the processing method according to another embodiment of the present application.
Figure 22:
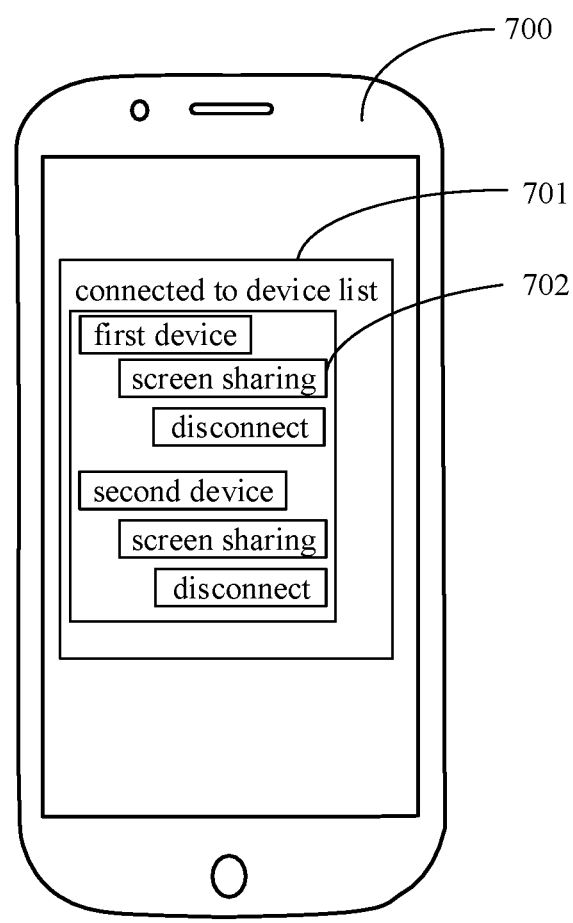
FIG. 22 is a schematic diagram of the UI composition of the processing method of the present application.
Figure 23:
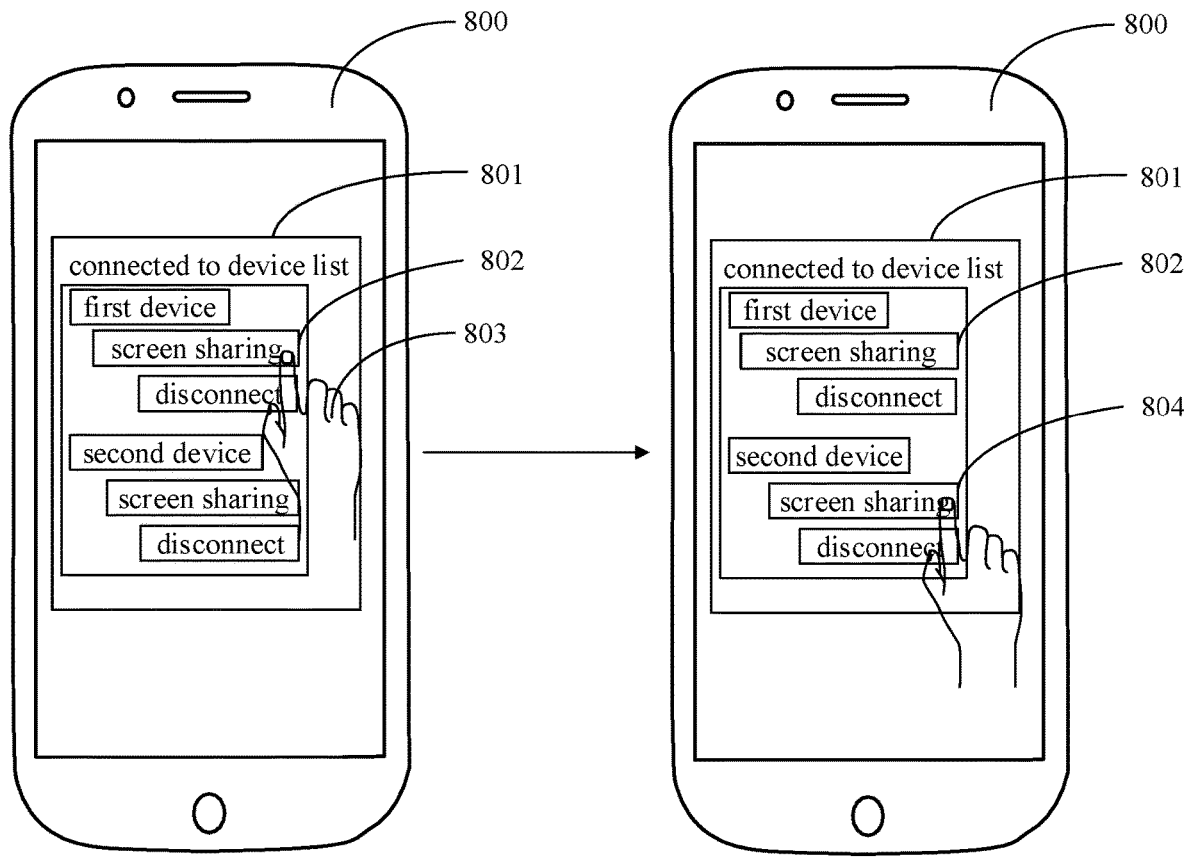
FIG. 23 is a schematic diagram of user operation of the processing method of the present application.
Figure 24:
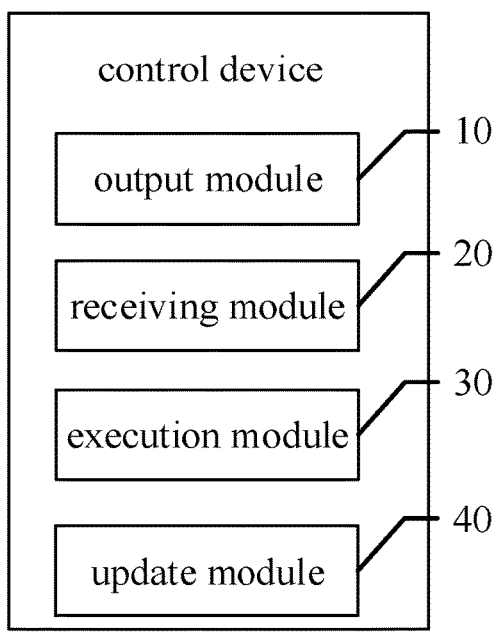
FIG. 24 is a schematic diagram of a functional module of the processing device according to an embodiment of a preferred embodiment the present application.

As shown in FIG. 21 and FIG. 22, in another embodiment of the present application, the process of user interface (UI) responding to user operations is described. Although a logical order is shown in the flowcharts, in some cases the steps shown or described may be performed in an order different from that shown or described herein. The processing method can be applied to management devices, including but not limited to personal computers and smart phones. For the convenience of description, the following steps are omitted to describe the processing method of the execution subject, and the processing method includes:
Operation C100, obtaining the first operation information of the first operation and/or the second operation information of the second operation, the first operation information corresponds to a first device directly connected to the management device, and the second operation information corresponds to a second device indirectly connected to the management device.

In an embodiment, the first operation information of the first operation, or the second operation information of the second operation, or the first operation information of the first operation and the second operation information of the second operation input by the user are obtained. The first operation information corresponds to the first device directly connected to the management device, and the second operation information corresponds to the second device indirectly connected to the management device. The management device, the first device and the second device include any one of terminal devices (such as smart phones, PAD (Portable Android Device, Tablet PC), etc.), wearable smart devices (such as smart watches, smart bracelets, smart earphones, etc.), smart home devices (such as smart TVs, smart speakers, etc.) and Internet of Vehicles devices (such as smart cars, vehicle terminals, etc.).

Operation C200, detecting whether the first operation information and/or the second operation information and/or the management device meet a preset condition.

Operation C300, if yes, performing corresponding control according to a first preset strategy, and/or updating first control information corresponding to the first device and/or second control information corresponding to the second device.

In an embodiment, whether the first operation information and/or the second operation information and/or the management device meets a preset condition is detected. If the first operation information and/or the second operation information and/or the management device meets a preset condition, corresponding control according to the first preset strategy is performed, and/or the first control information corresponding to the first device and/or the second control information corresponding to the second device are updated. If the first operation information and/or the second operation information and/or the management device does not meet a preset condition, then there is no need to perform corresponding control and no need to update the first control information corresponding to the first device and/or the second control information corresponding to the second device.

The operation C300 includes at least one of the following: changing the first device to an indirect connection, and/or changing the second device to a direct connection; establishing a connection between the first device and the second device; outputting disconnection setting information, and setting at least one of disconnection time, disconnection duration, and reconnection strategy according to the setting instruction; output setting information, and making corresponding settings according to setting instructions; transferring at least one information on the first device to the second device; and/or transferring at least one information on the second device to the first device; and/or transferring at least one information on the management device to the first device and/or the second device.

The above-mentioned corresponding settings are performed according to the setting instructions, including at least one of the following: opening or closing at least one of the system function, application function, service (which can be foreground and/or background services, system and/or application and/or third party services), and display interface of the first device; turning on or off at least one of the system function, application function, service (which can be foreground and/or background services, system and/or application and/or third party services), and display interface of the second device; setting the connection parameters between the management device and the first device and/or the second device; setting the working parameters of the first device and/or the second device.

The above connection parameters include at least one of the following:
connection rate, connection delay, connection duration, connection time, connection location, connection mode.

In an embodiment, the connection parameters include at least one of connection rate, connection delay, connection duration, connection time, connection location, and connection mode.

In an embodiment, for the connection rate, the rate of data transmission can be limited by setting the connection rate, for example, if the connection rate is 100 KB/s, the data transmission rate between connected devices is less than or equal to 100 KB/s.

In an embodiment, for the connection delay, the delay in data transmission between connected devices can be set. For example, if the connection delay is 5 seconds, it means that the data receiver will receive the data 5 seconds after the data sender sends the data.

In an embodiment, for the connection duration, after the connection reaches the connection duration, the connection is automatically disconnected. For example, if the connection duration is 5 minutes, the connection will be automatically disconnected after 5 minutes after the connection between the devices is established; or, after the setting is completed and the connection duration is reached, the corresponding device will automatically establish a connection.

In an embodiment, for the connection location, when the current location is the connection location, the connection between corresponding devices is automatically established, for example, the connection location is home, and after the user arrives at home, the corresponding device automatically establishes the connection.

In an embodiment, for the connection mode, there is at least one of two situations: if the connection is successful, the initiator device and the target device are no longer disconnected or disconnected at a fixed time or timed out; and/or
if the connection fails, the initiator device and the target device are no longer connected or regularly connected or periodically connected.

It can be understood that the above corresponding device automatically establishes a connection for establishing a direct connection with the currently indirectly connected second device.

The above working parameters include at least one of the following:
device speed, device power, device brightness, device volume, device driving path, device working mode.

In an embodiment, the working parameters include at least one of device speed, device power, device brightness, device volume, device driving path, and device working mode.

For example, when the first device and/or the second device is a sweeping robot, the working parameter may be the cleaning path of the sweeping robot. When the first device and/or the second device is a vehicle terminal, the working parameter may be vehicle speed. When the first device and/or the second device are smart TVs, the working parameters may be brightness and/or volume of the TV. When the first device and/or the second device is an intelligent air conditioner, the working parameter may be the working power of the air conditioner. When the first device and/or the second device is a smart speaker, the working parameter may be the working mode of the speaker (such as music playing mode, sleeping mode, accompanying mode, etc.).

In an embodiment, at least one information on the first device is transferred to the second device; and/or at least one information on the second device is transferred to the first device; and/or at least one information on the management device is transferred to the first device and/or the second device. The transfer information includes transferring at least one of system functions, application functions, and display interfaces, such as transferring the audio playback function of the management device to the first device for playback, and/or transferring the display interface of the management device to the second device for playback, and/or transferring the control function of the first device to the second device for control.

In an embodiment, this embodiment can also include:
operation C400, in response to the occurrence of a preset event, switching the first preset strategy to the second preset strategy for control.

In an embodiment, the processing method further includes:
operation C500, if the preset condition is not met, not responding to the first operation information and/or the second operation information, and/or outputting prompt information.

In an embodiment, detecting whether the first operation information and/or the second operation information and/or the management device meets the preset condition. If the first operation information and/or the second operation information and/or the management device meets the preset condition, a corresponding control is performed according to the first preset strategy. If the first operation information and/or the second operation information and/or the management device does not meet the preset condition, the corresponding control is performed according to other strategies, or do not respond to the first operation information and/or the second operation information, and/or output prompt information (for example, prompting the user to operate incorrectly or fail to operate). The introduction of preset conditions is to avoid user misoperation. It can be understood that a misoperation is an operation generated by the user without the intention of the operation, that is, the instruction corresponding to the operation does not need to be performed.

The first operation corresponding to the first device information and the second operation corresponding to the second device information are two independent operations, or belong to two parts of the same operation.

The first operation belongs to the start operation of the same operation, and the second operation belongs to the end operation of the same operation.

In an embodiment, when the first operation and the second operation belong to two parts of the same operation, the first operation belongs to the start operation of the same operation, and the second operation belongs to the end operation of the same operation. Alternatively, the second operation belongs to the start operation of the same operation, and the first operation belongs to the end operation of the same operation. For example, the user starts to slide and maintains the sliding state as the first operation, that is, the start operation of the same operation, and the user ends the slide as the second operation, that is, the end operation of the same operation.

The above-mentioned preset conditions are met, including at least one of the following:
The management device is a control center;
The management device is in a preset mode;
The current interface of the management device is in an operable state;
Output the authentication information and pass the authentication;
Receive preset operation instructions;
The trigger area of the first operation and/or the second operation is a preset area; the trigger mode of the first operation and/or the second operation is a preset mode;
At least one of the first number of operations, or duration, or pressure value meets a first preset requirement;
At least one of the second number of operations, duration or pressure value meets a second preset requirement;
At least one of the first numbers of operations and/or the second number of operations, or time interval or location information meets a third preset requirement.

The method further includes at least one of the following: the first device is directly or indirectly connected to the management device;
the second device is directly or indirectly connected to the management device.

In an embodiment, the connection type includes direct connection and indirect connection, the first device may be directly or indirectly connected to the management device, and the second device may also be directly or indirectly connected to the management device. For example, the first device is directly connected to the management device, the first device is directly connected to the second device, and the management device is indirectly connected to the second device.

The content of the first control information and/or the second control information includes at least one of the following:
device information of the first device and/or the second device;
application information and/or function information and/or service information of the first device;
application information and/or function information and/or service information of the second device;
the operation interface information of the first device and/or the operation interface information of the second device.

In an embodiment, the content of the first control information and/or the second control information includes: device information of the first device and/or the second device; application information and/or function information of the first device; application information and/or function information of the second device; at least one of the first device operation interface information and/or the second device operation interface information.

The device information of the first device and/or the second device includes information such as a device name, a device identifier, etc., which are used to facilitate users to distinguish between devices. For example, if the device name is "smart TV", the user can know that the device is a smart TV through the device name, and will not mistake the smart TV for a smart phone. The device information also includes device address, such as Bluetooth address, WIFI address and other information used for data exchange between devices, which is the unique identity information of each device.

For the application information and/or function information of the first device, the application information of the first device includes system application (such as camera, recording) information (such as application name, application icon), paid application (such as game application, office application) information (such as application name, application icon), or the like. The function information of the first device includes functions in applications of the first device, such as taking pictures, recording videos, playing audio, creating new files, and the like.

For the application information and/or function information of the second device, the application information of the second device includes system application (such as camera, recording) information (such as application name, application icon), paid application (such as game application, office application) information (such as application name, application icon), or the like. The function information of the second device includes the functions in the application of the first device, such as taking pictures, video recording, playing audio, creating new files, and so on.

For the operation interface information of the first device and/or the operation interface information of the second device, the operation interface information includes the interface currently displayed by the device, which can realize remote control of the first device and/or the second device.

The output form of the above-mentioned first control information and/or the above-mentioned second control information includes at least one of the following:
one device corresponds to one window or page or control or card;
all devices are correspondingly displayed in the same window or page or control or card;
the first control information is displayed in a first display area or a first display screen;
the second control information is displayed in a second display area or a second display screen;
the first control information and/or the second control information are simultaneously displayed in a display area or a display screen.

In an embodiment, the output form of the first control information and/or the second control information includes at least one of the following: one device corresponds to one window or page or control or card; all devices are correspondingly displayed in the same window or page or control or card; the first control information is displayed in the first display area or the first display screen; the second control information is displayed in the second display area or the second display screen; the first control information and/or the second control information are simultaneously displayed in a display area or a display screen.

In an embodiment, window generally refers to a display method that does not completely occupy the entire screen for display, such as a pop-up box. Referring to FIG. 19, 400 is a smart phone, 401 is a pop-up box; and for a page, it generally occupies the entire screen for display, such as a web page of a browser. For controls, it generally refers to sub-windows, such as list boxes, edit boxes, and so on. For the display and window or page or control or card, it determines the expression form of the first control information and/or the second control information, that is, the presented shape.

For the display area and the display screen, what is determined is the display position of the first control information and/or the second control information. In an embodiment, the display area is part of the display screen. It can be understood that the management device may have one or more display screens.

In an embodiment, the management device is a data processing center, for example, obtaining the first control information from the first device.

If the first control information and/or the second control information includes corresponding device information, updating the first control information and/or the second control information includes at least one of the following: differentially displaying the corresponding device information; hiding the corresponding device information; outputting prompt information corresponding to the control result.

In an embodiment, if the first control information and/or the second control information includes the corresponding device information, the first control information and/or the second control information are updated by differentially displaying the corresponding device information and/or hiding the corresponding device information. The corresponding device information is device information corresponding to the operation information.

In an embodiment, the differentiated display includes at least one of the following: adjusting the display size of the corresponding device information, for example, increasing the display font size of the corresponding device information; adjusting the display position of the corresponding device information, for example, adjusting the display position of the corresponding device information to the top of the device list corresponding to the corresponding device information; adjusting the display color of the corresponding device information, for example, adjusting the font display color of the corresponding device information to be different from the font display color of other device information; adjusting the display font of the corresponding device information, such as bolding or italicizing the text of the corresponding device information; adjusting the display animation of the corresponding device information, for example, adjusting the display animation of the corresponding device information from static display to dynamic display (such as heartbeat display).

In an embodiment, if the first control information and/or the second control information includes application information and/or function information and/or operation interface information of the corresponding device, the control result is fed back by outputting prompt information corresponding to the control result.

In an embodiment, the output prompt information includes at least one of the following: feeding back connection results, for example, the first device has been changed to an indirect connection, the second device has been disconnected for 1 hour, the first device has established a connection with the second device, etc.; feeding back setting results, for example, the first device has started the music playback function, the connection delay of the first device has been adjusted to 20 ms, and the playback volume value of the second device has been adjusted to 30.

In an embodiment, the manner of outputting the prompt information may include: text, sound, screen, etc., for example, displaying a text prompt of disconnection through a pop-up box on the screen.

If the first control information and/or the second control information include corresponding application information and/or function information and/or service information, updating the first control information and/or the second control information includes at least one of the following:
 opening or closing the corresponding application and/or function and/or service;
 increasing or decreasing the parameter value of the corresponding application and/or function and/or service.

In an embodiment, if the first control information and/or the second control information includes corresponding application information and/or function information and/or service information, the first control information and/or the second control information are updated by opening or closing the corresponding application and/or function and/or in a manner of increasing or decreasing the parameter value of the corresponding application and/or function. In an embodiment, the corresponding application information and/or function information is application information and/or function information corresponding to the operation information.

In an embodiment, the parameter value is a parameter value corresponding to a corresponding application and/or function, for example, adjusting a playback volume of a music application.

If the first control information and/or the second control information includes corresponding operation interface information, updating the first control information and/or the second control information includes at least one of the following:
 adjusting the display parameter of the corresponding operation interface;
 transferring the operation interface corresponding to the first control information to the device corresponding to the second control information;
 transferring the operation interface corresponding to the second control information to the device corresponding to the first control information;
 closing or hiding or suspending or fixing or reducing or enlarging the corresponding operation interface.

The method further includes: after the closing or hiding or floating or fixing or reducing or enlarging the corresponding operation interface, if a preset operation is received, displaying the corresponding operation interface again.

In this embodiment, detecting whether the first operation information and/or the second operation information and/or the management device meets a preset condition and performs corresponding control according to a first preset strategy when the preset condition is met avoids that after the management device is connected with the first device and/or the second device, only simple control interaction can be performed, so that the control interaction between the devices after establishing connection with each other is more intelligent, convenient and fast. In addition, because it can support the control interaction between directly connected devices and indirectly connected devices, the function is more powerful, and the experience is more intelligent, convenient and fast.

The present application further provides a processing method, including the following operations:
 outputting at least one first control information and/or at least one second control information;
 receiving operation information, switching at least one information on the management device and/or at least one information on the first device to the second device according to the operation information, and/or switching at least one information on the management device and/or at least one information on the second device to the first device, and/or switching at least two information among at least one information on the management device, at least one information on the first device, and at least one information on the second device to the third device.

The present application provides a processing method. As shown in FIG. 26, FIG. 26 is a schematic flowchart of an embodiment of the processing method of the present application.

The embodiment of the present application provides the processing method. Although a logical order is shown in the flowcharts, in some cases the steps shown or described may be performed in an order different from that shown or described herein. The processing method is applied to at least one control center, including:

operation D110: when a preset event occurs in the connection network, generating and/or determine a response instruction of the target device corresponding to the preset event.

operation D120: obtaining control judgment information, and when the control judgment information meets the control condition, the control center sends the response instruction to the target device, and/or, the control center performs a preset control operation.

For application information, the application information may be information about installation applications and/or running applications. For example, if there is no security protection application (such as Kingsoft Antivirus, 360 Security Guard, etc.) in the installation application or running application, there may be security risks or risks as the control center.

In an embodiment, the connection information includes at least one of the following: connection state information and network rate information.

The use information includes at least one of the following: traffic information, use habit information, and currently used application information.

The state information includes at least one of the following: terminal state information, power information, and storage space information.

In an embodiment, in the above connection network, the terminal state information can be judged by the data processing capability of the device, whether the data processing capability of the device is strong or weak. Moreover, it is not that the current data processing capability of the corresponding device is good if the hardware condition is good. It is understandable that the current data processing capability of the device with good hardware condition in a dead state will be very weak. The terminal state information can also be whether the device is in a charging state. It can be understood that electric energy is required during the use of the device, and the electric energy is generally provided by a battery, and the battery needs to be charged when the battery is exhausted or is about to be exhausted. For power information, different devices connected to the network will have batteries with different capacities, and the batteries will have different remaining power or different battery life. For example, the battery capacity of a mobile phone is generally larger than that of a smart watch. In addition, there are also situations where the remaining power of the mobile phone is less than the current power of the smart watch due to the fact that the mobile phone is not charged. Devices connected to the network will exchange data during use and need to store the received data. The storage space information of the device can affect the performance of the device and even determine the work that the device can support, for example, the size of the storage space of the device is not enough to support the size of the data that must be downloaded for its work.

In an embodiment, the control judgment information meeting the control conditions includes at least one of the following:

the user physiological parameter information meets the first preset condition;

the connection information meets the second preset condition;

the use information meets the third preset condition;

the distance information meets the fourth preset condition;

the application information meets the fifth preset condition;

the state information meets the sixth preset condition.

In an embodiment, the control judgment information that meets the control conditions includes at least one of the following: the user physiological parameter information meets the first preset condition, the connection information meets the second preset condition, the use information meets the third preset condition, the distance information meets the fourth preset condition, the application information meets the fifth preset condition, and the state information meets the sixth preset condition.

the control center outputs first prompt information, and/or controls a device directly or indirectly connected to the control center to output second prompt information.

Outputting the first prompt information to the control center, and/or controlling a device directly or indirectly connected to the control center to output the second prompt information. It can be understood that the purpose of the first prompt information and the second prompt information may be to enable the user to understand the reason why the control center sends the response instruction to the target device and the control operation performed by the target device in response to the response instruction.

Figure 27:
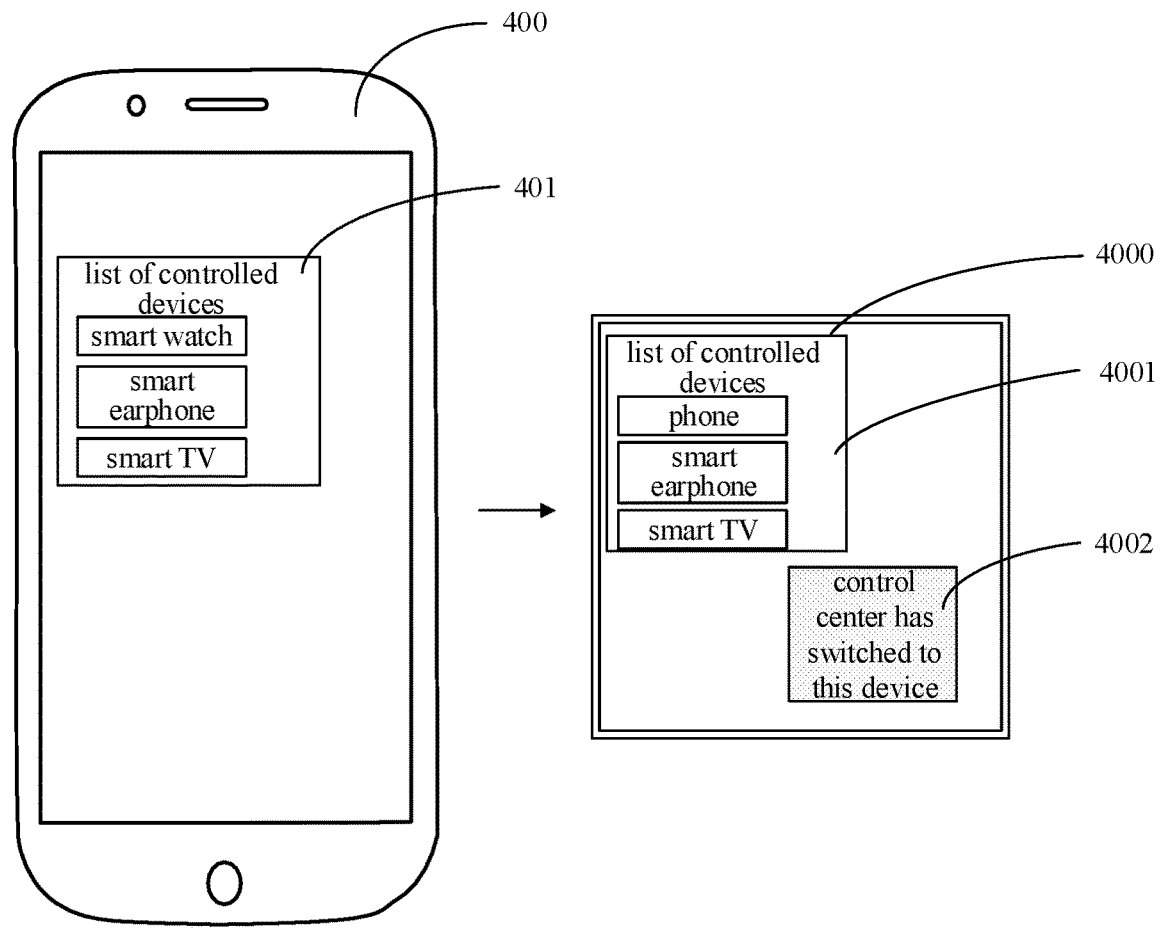
FIG. 27 is a schematic diagram of a control function switching effect of the processing method of the present application.
Figure 28:
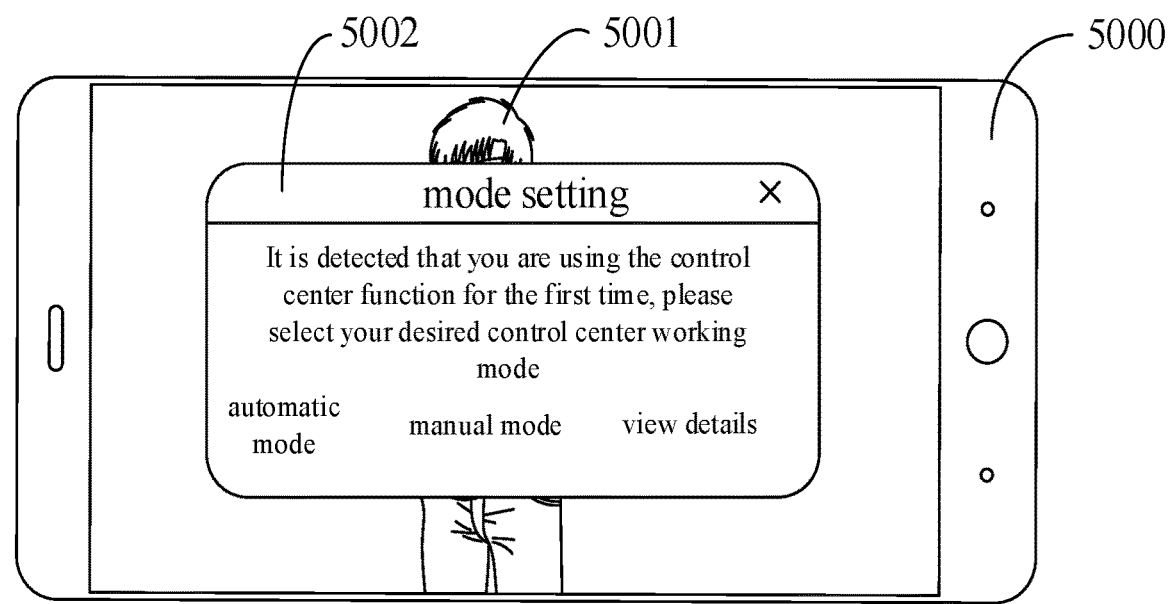
FIG. 28 is a schematic diagram of a prompt information effect of the processing method of the present application.

For example, as shown in FIG. 27, 400 is a control center, which is a mobile phone, and 401 is a list of devices controlled by the mobile phone, including smart watches, smart earphones and smart TVs. 4000 is the target device, which is a smart watch controlled by a mobile phone. 4001 is the list of devices controlled by the smart watch after the control center is switched to the smart watch, including the control center mobile phone, smart earphones and smart TV. 4002 is the pop-up box prompt information output by the target device after the control function of the control center is switched from the control center to the target device. Of course, the pop-up box can also be output by the control center.

In an embodiment, the above is the situation where the control center sends a response instruction to the target device or the control center to perform a preset control operation. For the situation where the control center sends a response instruction to the target device and the control center to perform a preset control operation, it can be understood that, when the control judgment information meets the control condition, the control center needs to execute a preset control operation while sending the response instruction to the target device. For example, when the preset event is that the user needs to take a break or sleep, the control center is a mobile phone. When the control center generates a response instruction to turn off the light and sends the response instruction to the corresponding light, it also needs to transfer the control function to the smart watch connected to the network, to facilitate the user to use the control function of the control center when waking up, thus the user experience is improved, and the control center is more flexible and intelligent when performing the control function.

In this embodiment, the processing method includes: when a preset event occurs in the connection network, generating and/or determining a response instruction of the target device corresponding to the preset event; obtaining control judgment information, when the control judgment information meets a control condition, the control center sends the response instruction to the target device, and/or, the control center performs a preset control operation. When a preset event occurs in the connection network, the control center can generate a corresponding response instruction, and control itself or the target device to make a corresponding response through the response instruction, which makes the control interaction between the devices more flexible and intelligent after the devices are connected to each other.

Therefore, when the control center transfers the control function of the control center to the target device, at least one of connection information data, setting item parameter data and relevant download data in the control center can be migrated or transferred to the target device. For example, migrating or transferring the connection information data to the target device, so that the target device can establish a connection relationship with other devices controlled by the control center according to the connection information data. The target device directly initiates a connection request to the device corresponding to the device's physical address according to the device's physical address in the connection information data, without first searching for devices within the connectable range of the target device to obtain the device's physical address, thereby initiating a connection request.

This embodiment provides a variety of migration or transfer solutions for relevant data, so that there are more implementation methods for relevant data when migrating or transferring, which meets more user demands, improves user experience, and makes the control center more flexible and intelligent when performing control functions.

In an embodiment, referring to FIG. 30, the present application further provides another embodiment of the processing method. Although a logical order is shown in the flowcharts, in some cases the steps shown or described may be performed in an order different from that shown or described herein. The processing method is applied in at least one control center, including: operation DOO, when a preset event occurs in the connection network, obtaining control judgment information, and when the control judgment information meets the control condition, performing operation D10;

operation D10, acquiring the preset information and/or the preset strategy;

operation D20, determining and/or performing a corresponding control strategy according to the preset information and/or the preset strategy.

When a preset event occurs in the connection network, the control judgment information is obtained, and when the control judgment information meets the control condition, the steps of obtaining the preset information and the preset strategy are executed. After the preset information and the preset strategy are acquired, a corresponding control strategy is determined and/or executed according to the preset information and the preset strategy.

In an embodiment, the control judgment information meeting the control condition includes at least one of the following:

the control center is in a preset mode;
    the user physiological parameter information meets the preset rules of physiological parameters;
    the connection information meets the connection preset rules;
    the use information meets the preset rules of usage;
    the distance information meets the distance preset rule;
    the application information meets application preset rules;
    the state information meets state preset rules.

In an embodiment the control judgment information meeting the control condition includes at least one of: the control center is in a preset mode; the user physiological parameter information meets the preset rules of physiological parameters; the connection information meets the connection preset rules; the use information meets the preset rules of usage; the distance information meets the distance preset rule; the application information meets application preset rules; the state information meets state preset rules.

In this embodiment, a first available time threshold may also be set for the comparison between the available time corresponding to the power of other devices controlled by the control center and the available time corresponding to the power of the control center. For example, when the available time corresponding to the power of other devices controlled by the control center is longer than or equal to the sum of the available time corresponding to the power of the control center and the first available time threshold, it is determined that the power information meets the preset state rule; and/or, when there is no other device controlled by the control center, the available time corresponding to the power of the device is longer than or equal to the sum of the available time corresponding to the power of the control center and the first available time threshold, that is, when the available time corresponding to the power of other devices controlled by the control center is less than the sum of the available time corresponding to the power of the control center and the first available time threshold, it is determined that the power information does not meet the preset state rule.

For example, the available time corresponding to the power of the control center is 200 minutes, the first available time threshold is 30 minutes, and there are other devices controlled by the control center with the corresponding available time of 170 minutes. At this time, when the available time corresponding to the power of other devices controlled by the control center is equal to the sum of the available time corresponding to the power of the control center and the first available time threshold, it is determined that the power information meets the preset state rule.

In other embodiments, a second available time threshold may also be set, and the second available time threshold is the minimum available time that does not affect the ability of the control center to provide management services. If the available time corresponding to the power of the control center is longer than or equal to the second available time threshold, it is determined that the power information does not conform to the preset state rule; and/or, if the available time corresponding to the power of the control center is shorter than the second available time threshold, it is determined that the power information meets the preset state rule.

In an embodiment, the operation of determining and/or performing a corresponding control strategy according to the preset information and the preset strategy includes at least one of the following:

if the connection state information meets a first preset rule, performing a corresponding device control operation according to a first preset strategy;
    if the network rate information meets a second preset rule, performing a corresponding device control operation according to a second preset strategy;
    if the terminal state information meets a third preset rule, performing a corresponding device control operation according to a third preset strategy;

if the power information meets a fourth preset rule, performing a corresponding device control operation according to a fourth preset strategy;

if the storage space information meets a fifth preset rule, performing a corresponding device control operation according to a fifth preset strategy;

if the external environment information meets a sixth preset rule, performing a corresponding device control operation according to a sixth preset strategy;

if the use environment information meets a seventh preset rule, performing a corresponding device control operation according to a seventh preset strategy;

if the traffic information meets an eighth preset rule, performing a corresponding device control operation according to an eighth preset strategy;

if the use habit information meets a ninth preset rule, performing a corresponding device control operation according to a ninth preset strategy;

if the distance information meets a tenth preset rule, performing a corresponding device control operation according to a tenth preset strategy;

if the user physiological parameter information meets an eleventh preset rule, performing a corresponding device control operation according to an eleventh preset strategy.

Figure 31:
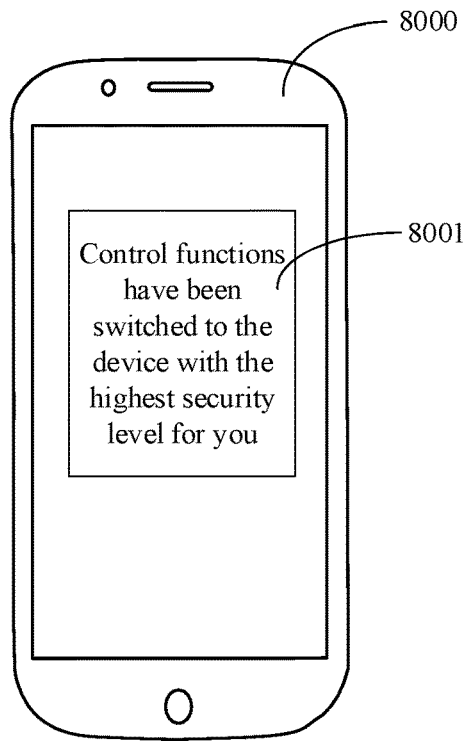
FIG. 31 is a schematic diagram of another control function switching effect of the processing method of the present application.

For example, referring to FIG. 31, if the target device is the device with the highest security level, the control center 8000 can output the first prompt information through the pop-up box 8001: "The control function has been switched to the device with the highest security level for you".

In this embodiment, the processing method includes: D00, when a preset event occurs in the connection network, obtaining control judgment information, and when the control judgment information meets the control condition, performing operation D10; D10, obtaining preset information and/or a preset strategy; D20, determining and/or performing a corresponding control strategy according to the preset information and/or the preset strategy. When a preset event occurs in the connection network, the control center obtains the control judgment information. When the control judgment information meets the control conditions, the preset information and the preset strategy are obtained to determine and/or execute the corresponding control strategy, so that the control interaction between the devices is more flexible and intelligent after the devices are connected to each other.

In an embodiment, based on still another embodiment of the processing method of the present application, an embodiment is proposed, the relevant data further includes at least one first relevant data and/or at least one second relevant data. The operation of migrating or transferring or backing up relevant data in the control center to the target device includes at least one of the following:

only backing up or transferring the first relevant data in the control center to the target device;

only backing up or transferring the second relevant data in the control center to the target device;

in addition to backing up or transferring the first relevant data in the control center to the target device, backing up or transferring second relevant data corresponding to the first relevant data to the target device;

backing up or transferring the first relevant data and corresponding update data in the control center to the target device;

backing up or transferring the second relevant data and corresponding update data in the control center to the target device;

backing up or transferring the first relevant data and the corresponding update data in the control center, and the update data of the second relevant data to the target device.

Therefore, when the control center transfers the control function of the control center to the target device, at least one of connection information data, setting item parameter data and relevant download data in the control center can be migrated or transferred to the target device. For example, migrating or transferring the connection information data to the target device, so that the target device can establish a connection relationship with other devices controlled by the control center according to the connection information data. The target device directly initiates a connection request to the device corresponding to the device's physical address according to the device's physical address in the connection information data, without first searching for devices within the connectable range of the target device to obtain the device's physical address, thereby initiating a connection request.

This embodiment provides a variety of migration or transfer solutions for relevant data, so that there are more implementation methods for relevant data when migrating or transferring, which meets more user demands, improves user experience, and makes the control center more flexible and intelligent when performing control functions.

Figure 32:
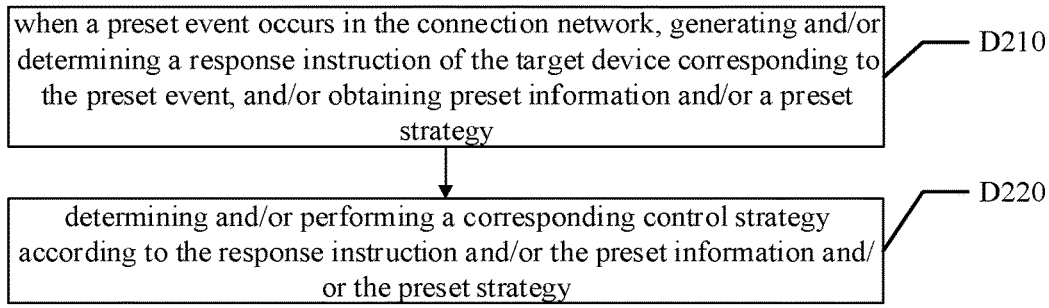
FIG. 32 is a schematic flowchart of the processing method according to another embodiment of the present application.

In an embodiment, referring to FIG. 32, another embodiment of the application processing method is proposed. Although a logical order is shown in the flowcharts, in some cases the steps shown or described may be performed in an order different from that shown or described herein. The processing method is applied to at least one control center, including:

D210, when a preset event occurs in the connection network, generating and/or determining a response instruction of the target device corresponding to the preset event, and obtaining preset information and/or a preset strategy.

D220, determining and/or performing a corresponding control strategy according to the response instruction, the preset information and/or the preset strategy.

As another implementation, the processing method includes the operations of:

D210, obtaining preset information and/or preset strategy when a preset event occurs in the connection network; generating and/or determining a response instruction corresponding to the target device for the preset event;

D220, determining and/or performing a corresponding control strategy according to the response instruction, the preset information and/or the preset strategy.

The difference between this embodiment and the previous embodiment lies in that the sequence of steps for generating the response instruction of the target device corresponding to the preset event is different.

As the operation D210, when a preset event occurs in the connection network, generate and/or determine a response instruction corresponding to the target device for the preset event, and obtain the preset information and/or the preset strategy.

In an embodiment, when a preset event occurs in the connection network where the control center is located, generating and/or determining a response instruction of the target device corresponding to the preset event, and obtaining the preset information and/or the preset strategy. In an embodiment, for the user physiological parameter information, in the above connection network, the device has the ability to obtain the user physiological parameter information to provide corresponding services. For example, health services are provided by obtaining physiological information such as the user's heart rate, blood pressure, pulse, blood oxygen, and blood sugar.

Operation D220, determining and/or performing a corresponding control strategy according to the response instruction, the preset information and/or the preset strategy.

In an embodiment, the operation D220 includes at least one of the following:
  determining and/or performing a corresponding control strategy according to the response instruction and the preset information;
  determining and/or performing a corresponding control strategy according to the response instruction and the preset strategy;
  determining and/or performing a corresponding control strategy according to the preset information and the preset strategy;
  determining and/or performing a corresponding control strategy according to the response instruction, the preset information and the preset strategy.

In an embodiment, the corresponding control strategy is determined and/or performed according to the response instruction, the preset information and the preset strategy. In an embodiment, the control center sends a response instruction to the target device, so that the target device determines the type of the preset event through the response instruction, so as to respond to the response instruction accordingly, for example, output corresponding prompt information (for example, when the preset information meets the preset rule, migrate or transfer the relevant data of the control center to the target device).

In an embodiment, the operation D220 includes at least one of the following:
  obtaining control judgment information, and when the control judgment information meets a control condition, the control center sending the response instruction to the target device;
  the control center performs a preset control operation;
  if the connection state information meets the first preset rule, performing a corresponding device control operation according to the first preset strategy;
  if the network rate information meets the second preset rule, performing a corresponding device control operation according to the second preset strategy;
  if the terminal state information meets the third preset rule, performing a corresponding device control operation according to the third preset strategy;
  if the power information meets the fourth preset rule, performing a corresponding device control operation according to the fourth preset strategy;
  if the storage space information meets the fifth preset rule, performing a corresponding device control operation according to the fifth preset strategy;
  if the external environment information meets the sixth preset rule, performing a corresponding device control operation according to the sixth preset strategy;
  if the use environment information meets the seventh preset rule, performing the corresponding device control operation according to the seventh preset strategy;
  if the traffic information meets the eighth preset rule, performing a corresponding device control operation according to the eighth preset strategy;
  If the use habit information meets the ninth preset rule, performing a corresponding device control operation according to the ninth preset strategy;
  If the distance information meets the tenth preset rule, performing a corresponding device control operation according to the tenth preset strategy;
  If the user physiological parameter information meets the eleventh preset rule, performing a corresponding device control operation according to the eleventh preset strategy.

In an embodiment, the control judgment information meeting the control condition includes at least one of the following:
  the user physiological parameter information meets the first preset condition;
  the connection information meets the second preset condition;
  the use information meets the third preset condition;
  the distance information meets the fourth preset condition;
  the application information meets the fifth preset condition;
  the state information meets the sixth preset condition.

If the connection state information meets the first preset rule, a corresponding device control operation is executed according to the first preset strategy.

If the network rate information meets the second preset rule, a corresponding device control operation is performed according to the second preset strategy.

If the terminal state information meets the third preset rule, a corresponding device control operation is performed according to the third preset strategy.

If the power information meets the fourth preset rule, a corresponding device control operation is executed according to the fourth preset strategy.

If the storage space information meets the fifth preset rule, a corresponding device control operation is executed according to the fifth preset strategy.

If the external environment information meets the sixth preset rule, a corresponding device control operation is performed according to the sixth preset strategy.

If the use environment information meets the seventh preset rule, the corresponding device control operation is performed according to the seventh preset strategy.

If the traffic information meets the eighth preset rule, a corresponding device control operation is performed according to the eighth preset strategy.

If the use habit information meets the ninth preset rule, a corresponding device control operation is performed according to the ninth preset strategy.

Whether the use habit information meets the ninth preset rule is detected, and if the use habit information meets the ninth preset rule, a corresponding device control operation is performed according to the ninth preset strategy.

If the distance information meets the tenth preset rule, a corresponding device control operation is performed according to the tenth preset strategy.

If the user physiological parameter information meets the eleventh preset rule, a corresponding device control operation is performed according to the eleventh preset strategy.

In an embodiment, the control center performing a preset control operation, or performing a corresponding device control operation includes at least one of the following:
  the control center immediately or delays or regularly or periodically sends the response instruction to the target device;
  switching some or all of the control functions to the target device;
  duplicating some or all of the control functions to the target device;

activating some or all of the control functions on the target device;

migrating or transferring or backing up the relevant data of the control center to the target device;

the control center outputs first prompt information, and/or controls a device directly or indirectly connected to the control center to output second prompt information.

For example, referring to FIG. 31, if the target device is the device with the highest security level, the control center 8000 can output the first prompt information through the pop-up box 8001: "The control function has been switched to the device with the highest security level for you".

In this embodiment, the processing method includes: when a preset event occurs in the connection network, generating and/or determining a response instruction of the target device corresponding to the preset event, and obtaining the preset information and/or the preset strategy; according to the response instruction, the preset information and/or the preset strategy determining and/or performing a corresponding control strategy. When a preset event occurs in the connection network, the control center can generate the corresponding response instruction and obtain the preset information and/or the preset strategy, and determine and/or execute the corresponding control strategy through response instructions, preset information and/or preset strategies, which makes the control interaction between the devices more flexible and intelligent after the devices are connected to each other.

In an embodiment, based on another embodiment of the processing method of the present application, another embodiment is proposed, the relevant data further includes at least one first relevant data and/or at least one second relevant data. The operation of migrating or transferring or backing up relevant data in the control center to the target device includes at least one of the following:

only backing up or transferring the first relevant data in the control center to the target device;

only backing up or transferring the second relevant data in the control center to the target device;

in addition to backing up or transferring the first relevant data in the control center to the target device, backing up or transferring second relevant data corresponding to the first relevant data to the target device;

backing up or transferring the first relevant data and corresponding update data in the control center to the target device;

backing up or transferring the second relevant data and corresponding update data in the control center to the target device;

backing up or transferring the first relevant data and the corresponding update data in the control center, and the update data of the second relevant data to the target device.

In an embodiment, the relevant data may also include at least one first relevant data and/or at least one second relevant data. After the target device is determined, the relevant data in the control center can be selectively backed up or transferred to the target device, so that the target device can perform the control function according to the relevant data.

Therefore, when the control center transfers the control function of the control center to the target device, at least one of connection information data, setting item parameter data and related download data in the control center can be migrated or transferred to the target device. For example, migrating or transferring the connection information data to the target device, so that the target device can establish a connection relationship with other devices controlled by the control center according to the connection information data. If the target device directly initiates a connection request to the device corresponding to the device's physical address according to the device's physical address in the connection information data, there is no need to first search for devices within the connectable range of the target device to obtain the physical address of the device, so as to initiate a connection request.

This embodiment provides a variety of migration or transfer solutions for relevant data, so that there are more implementation methods for relevant data when migrating or transferring, which meets more user demands, improves user experience, and makes the control center more flexible and intelligent when performing control functions.

Figure 33:
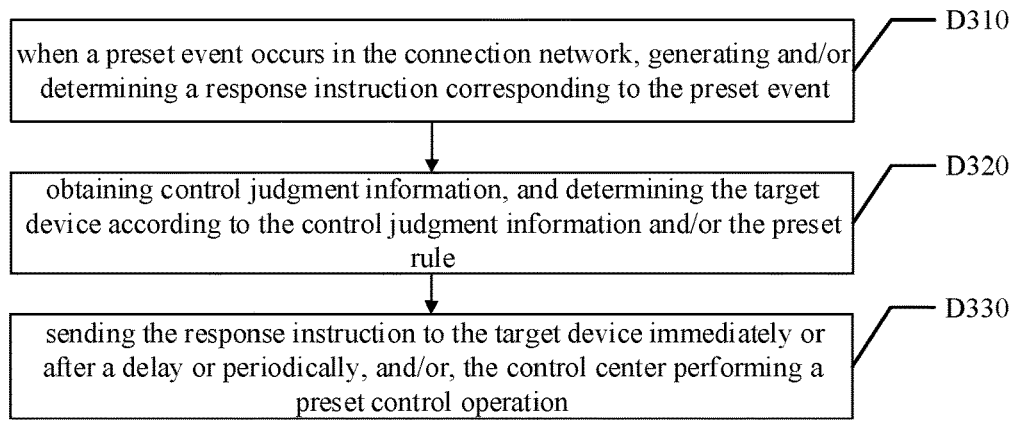
FIG. 33 is a schematic flowchart of the processing method according to an embodiment of the present application.
Figure 34:
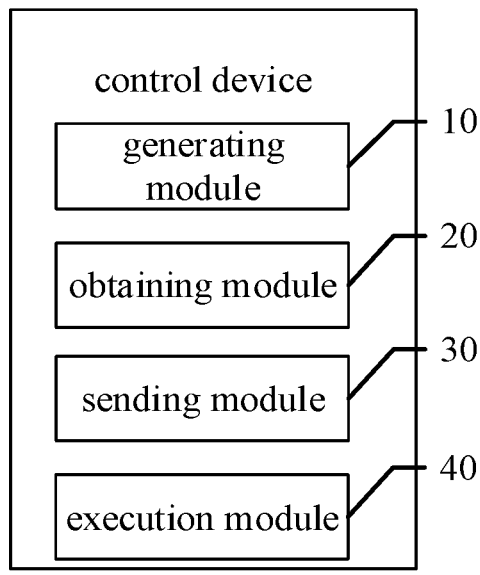
FIG. 34 is a schematic diagram of a functional module of the processing device according to a preferred embodiment of the present application.

Referring to FIG. 33, an embodiment of the processing method of the present application is proposed. Although a logical order is shown in the flowcharts, in some cases the steps shown or described may be performed in an order different from that shown or described herein. The processing method is applied to at least one control center, including:

operation D310, when a preset event occurs in the connection network, generating and/or determining a response instruction corresponding to the preset event;

operation D320, obtaining control judgment information, and determining the target device according to the control judgment information and/or the preset rule;

operation D330, sending the response instruction to the target device immediately or after a delay or periodically, and/or, the control center performing a preset control operation.

As another embodiment, the processing method includes the following operations:

operation D310, when a preset event occurs in the connection network, obtaining control judgment information, and determining the target device according to the control judgment information and/or the preset rule;

operation D320, generating and/or determining a response instruction corresponding to the preset event;

operation D330, sending the response instruction to the target device immediately or after a delay or periodically, and/or, the control center performing a preset control operation.

The difference between this embodiment and the previous embodiment lies in that the sequence of steps for generating the response instruction of the target device corresponding to the preset event is different.

Operation D310, when a preset event occurs in the connection network, generating a response instruction corresponding to the preset event.

When a preset event occurs in the connection network where the control center is located, a response instruction corresponding to the preset event is generated.

When a preset event occurs in the connection network, the operation of generating and/or determining a response instruction corresponding to the preset event includes at least one of the following:

when a preset event occurs in the connection network, outputting prompt information for selecting a preset mode, and generating and/or determining the response instruction based on the selected preset mode;

when a preset event occurs in the connection network, according to the correspondence between the preset event and the response instruction, automatically triggering to generate and/or determine the response instruction;

when a preset event occurs in the connection network, generating and/or determining the response instruction based on the input control instruction.

Operation D320, obtaining control judgment information, and determining the target device according to the control judgment information and the preset rule.

The control judgment information is obtained, and the target device is determined according to the control judgment information and the preset rule.

The above control judgment information includes at least one first control judgment information and/or at least one second control judgment information, and the first control judgment information and/or second control judgment information includes at least one of the following:

user physiological parameter information, connection information, use information, di stance information, application information, state information.

Determining the target device according to the control judgment information and the preset rule includes at least one of the following:

determining the target device according to the priority of the first control judgment information and/or the second control judgment information;

determining the first or last device or any device in the middle that initiates the connection as the target device;

determining the device with the strongest processing capability or the smoothest state, or any processing capability that meets the requirements (for example, CPU main frequency exceeds a certain preset value, such as 800 M) or any state that meets the conditions (for example, the system resource occupancy rate does not exceed a certain threshold, such as 50%) as the target device;

determining the device with the largest battery capacity or the most remaining power or the current power value meets the conditions (such as the remaining power exceeds 20%) as the target device;

determining the device preset by the system as the target device;

determining the device with the highest priority or any priority that meets the conditions (such as higher than or equal to the preset priority) as the target device;

determining the device with the shortest or longest distance or any distance that meets the conditions (such as greater than or equal to the preset distance value) as the target device;

determining the device with the highest security level or any security level that meets the conditions (such as higher than or equal to the preset security level) as the target device;

determining the target device based on user selection or user habits;

determining that the device whose physiological parameter information of the user meets the first preset condition is the target device;

determining that the device whose connection information meets the second preset condition is the target device;

determining that the device whose usage information meets the third preset condition is the target device;

determining that the device whose distance information meets the fourth preset condition is the target device;

determining that the device whose application information meets the fifth preset condition is the target device;

determining that the device whose state information meets the sixth preset condition is the target device.

For example, referring to FIG. 31, if the target device is the device with the highest security level, the control center 8000 can output the first prompt information through the pop-up box 8001: "The control function has been switched to the device with the highest security level for you".

In an embodiment, weights are set for the first control judgment information and/or the second control judgment information, the higher the weight, the higher the corresponding priority, and the target device is determined in order of priority from high to low. For example, the first control judgment information and/or the second control judgment information include user physiological parameter information and connection information, and the weight of the user physiological parameter information is 5, and the weight of the connection information is 4, then the priority of the user physiological parameter information is higher than that of the connection information. When determining the target device, the user physiological parameter information is used for judgment first, and when the user physiological parameter information does not meet the conditions for being a target device, the connection information is used for judgment.

For the user physiological parameter information meeting the first preset condition, in an embodiment, when it is detected that the user physiological parameter information reaches the preset physiological parameter information threshold, it is determined that the user physiological parameter information meets the first preset condition.

For the connection information meeting the second preset condition, the second preset condition may include determining whether the control center exits the connection network by detecting the connection state information. If the control center exits the connection network, the connection state information meets the second preset condition, and/or, if the control center does not exit the connection network, the connection state information does not meet the second preset condition. In an embodiment, it may be that the number of connections of the control center exceeds a preset threshold or maximum value, then the connection state information meets the second preset condition. In another embodiment, it may be that the connection state of the control center is not smooth or the number of disconnections exceeds a preset number of times, then the connection state information meets the second preset condition.

For the use information meeting the third preset condition, the third preset condition may include a rule for detecting traffic information to determine whether the control center is suitable to continue to serve as the control center to provide control functions. In order not to affect the linkage of various devices in the connection network, it is necessary to select a device with a large amount of remaining traffic as the control center. It may be that the remaining traffic of other devices controlled by the control center is greater than the remaining traffic of the control center, to determine that the traffic information meets the third preset condition.

For the distance information meeting the fourth preset condition, the fourth preset condition may include a rule for detecting the distance information to determine whether the control center is suitable to continue to serve as the control center to provide control functions.

For the application information meeting the fifth preset condition, in an embodiment, the application information may be information about installation applications and/or running applications. For example, if there is no security protection application (such as Kingsoft Antivirus, 360 Security Guard, etc.) in the installation application or running application, there may be security risks or risks as the control center, and it is determined that the application information meets the fifth preset condition.

For the state information meeting the sixth preset condition, the sixth preset condition may include a rule for detecting the terminal state information to determine whether the control center is suitable to continue serving as the control center to provide control functions. In order not to affect the linkage of various devices in the connection network, it is necessary to select a device with a short response time corresponding to the terminal state as the control center.

Operation D330, sending the response instruction to the target device immediately or after a delay or periodically, and/or, the control center performs a preset control operation.

In an embodiment, the control center sends a response instruction to the target device immediately or after a delay, and/or, the control center performs a preset control operation.

For example, referring to FIG. 27, 400 is a control center, which is a mobile phone, and 401 is a list of devices controlled by the mobile phone, including smart watches, smart earphones and smart TVs. 4000 is the target device, which is a smart watch controlled by a mobile phone. 4001 is the list of devices controlled by the smart watch after the control center is switched to the smart watch, including the control center mobile phone, smart earphones and smart TV. 4002 is the pop-up box prompt information output by the target device after the control function of the control center is switched from the control center to the target device. Of course, the pop-up box can also be output by the control center.

In this embodiment, the processing method includes: when a preset event occurs in the connection network, generating and/or determining a response instruction corresponding to the preset event; obtaining control judgment information, and determining a target device according to the control judgment information and/or the preset rule; sending the response instruction to the target device immediately or with a delay or at regular intervals or periodically, and/or, the control center performs a preset control operation. When a preset event occurs in the connection network, the control center can generate a corresponding response instruction, and control itself or the target device to make a corresponding response through the response instruction, which makes the control interaction between the devices more flexible and intelligent after the devices are connected to each other.

In an embodiment, based on an embodiment of the processing method of the present application, another embodiment is proposed. The relevant data also includes at least one first relevant data and/or at least one second relevant data. The operation of migrating or transferring or backing up relevant data in the control center to the target device includes at least one of the following:

only backing up or transferring the first relevant data in the control center to the target device;

only backing up or transferring the second relevant data in the control center to the target device;

in addition to backing up or transferring the first relevant data in the control center to the target device, backing up or transferring second relevant data corresponding to the first relevant data to the target device;

backing up or transferring the first relevant data and corresponding update data in the control center to the target device;

backing up or transferring the second relevant data and corresponding update data in the control center to the target device;

backing up or transferring the first relevant data and the corresponding update data in the control center, and the update data of the second relevant data to the target device.

Therefore, when the control center transfers the control function of the control center to the target device, at least one of connection information data, setting item parameter data and relevant download data in the control center can be migrated or transferred to the target device. For example, the connection information data is migrates or transferred to the target device, so that the target device can establish a connection relationship with other devices controlled by the control center according to the connection information data. For example, the target device directly initiates a connection request to the device corresponding to the device's physical address according to the device's physical address in the connection information data, without first searching for devices within the connectable range of the target device to obtain the device's physical address, thereby initiating a connection request.

This embodiment provides a variety of migration or transfer solutions for relevant data, so that there are more implementation methods for relevant data when migrating or transferring, which meets more user instructions, improves user experience, and makes the control center more flexible and intelligent when performing control functions.

Figure 35:
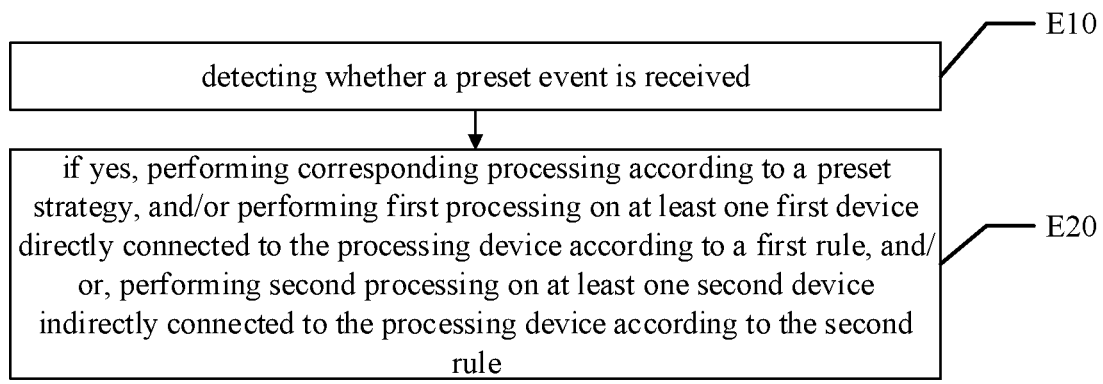
FIG. 35 is a schematic flowchart of the processing method according to an embodiment of the present application.

The present application provides a processing method. Referring to FIG. 35, FIG. 35 is a schematic flowchart of a processing method according to an embodiment of the present application.

The embodiment of the present application provides the processing method. Although a logical order is shown in the flowcharts, in some cases the steps shown or described may be performed in an order different from that shown or described herein. The processing method can be applied to a processing device including but not limited to a personal computer, a smart phone, and the like. For the convenience of description, the following steps are omitted to describe the processing method of the execution subject, and the processing method includes:

Operation E10, detecting whether a preset event is received.

In an embodiment, it is detected whether a preset event occurs in the connection network, such as detecting whether a preset event occurred in the connection network is received.

The preset event includes at least one of the following:
a first preset event occurs in the processing device;
a second preset event occurs on the first device, and in an embodiment, the first device is directly connected to the processing device;
a third preset event occurs on the second device, and in an embodiment, the second device is indirectly connected to the processing device.

In an embodiment, the preset event includes at least one of a first preset event occurring on the processing device, a second preset event occurring on the first device, and a third preset event occurring on the second device. In an embodiment, the first device is directly connected to the device, and the second device is indirectly connected to the device.

Figure 36:
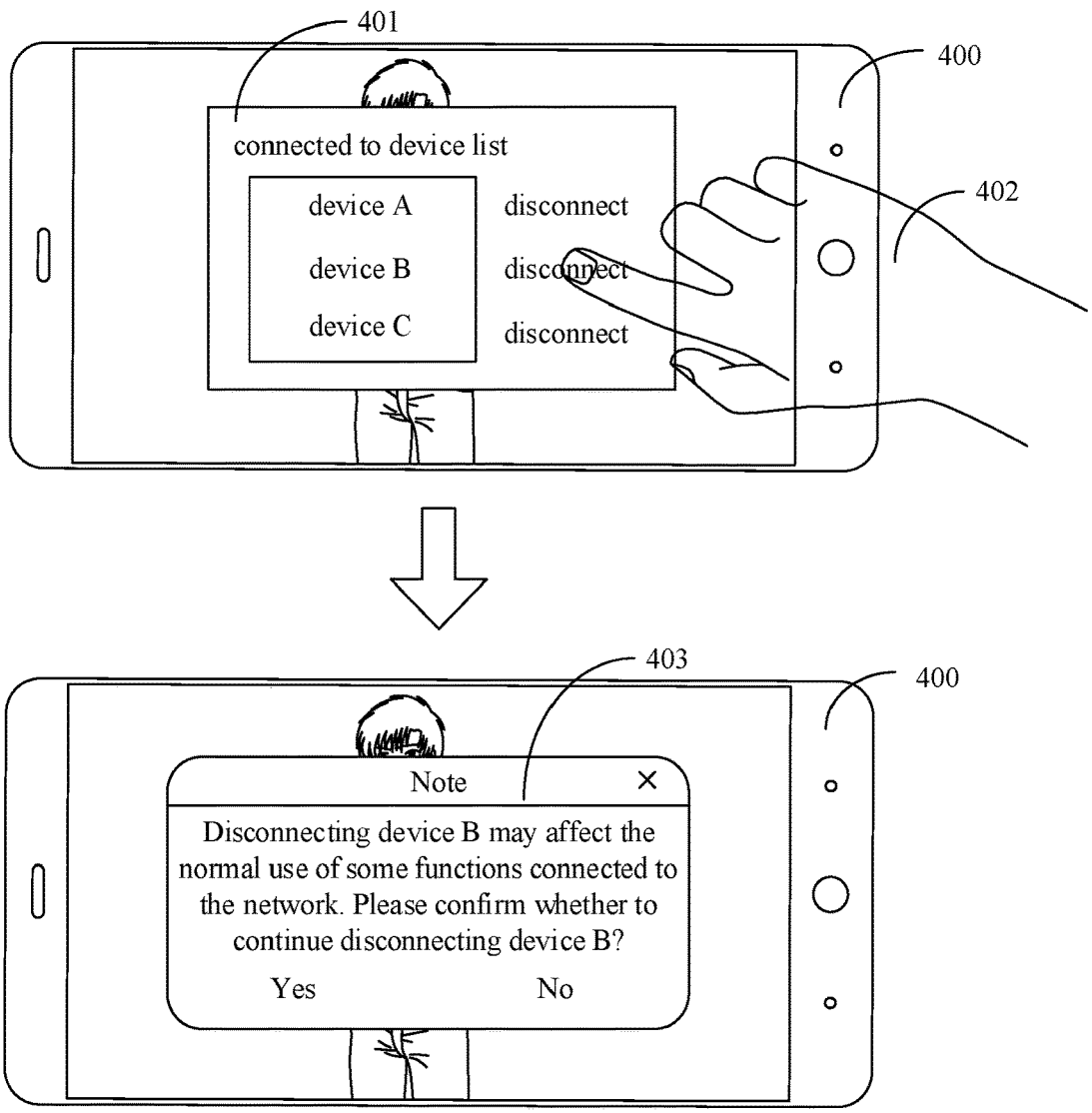
FIG. 36 is a schematic diagram of the screen pop-up effect of the processing method of the present application.
Figure 37:
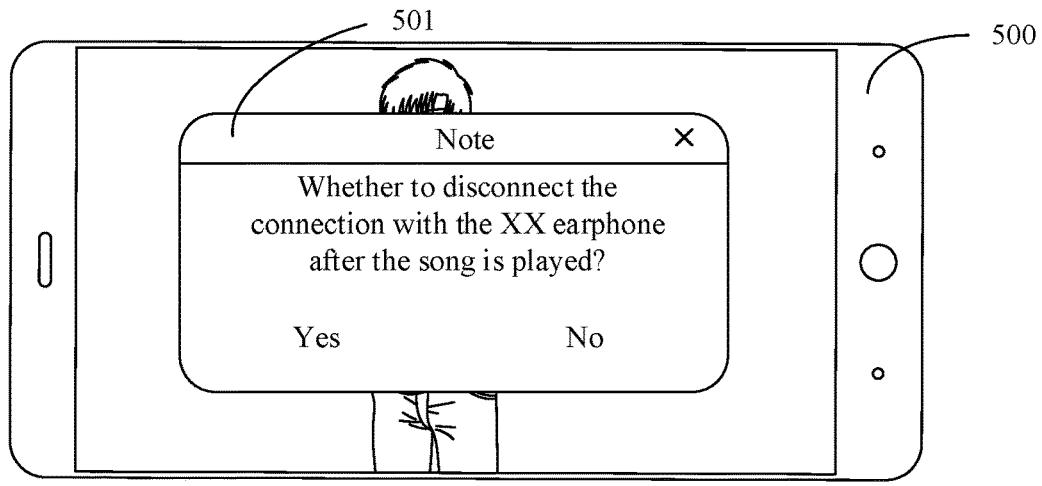
FIG. 37 is a schematic diagram of another screen pop-up effect of the processing method of the present application.

For example, as shown in FIG. 36, 400 is a mobile phone, and 401 is a list of connected devices in the connection network output by the mobile phone. When the user triggers the disconnection of device B in the connection network through the hand 402, the mobile phone 400 outputs prompt information through the pop-up box 403.

The processing device stores a device information table corresponding to the connection network, and the device information table is used to indicate all device information of the connection network.

Operation E20, if yes, performing corresponding processing according to a preset strategy, and/or performing first processing on at least one first device directly connected to the processing device according to a first rule, and/or, performing the second processing on at least one second device indirectly connected to the processing device according to the second rule.

Figure 38:
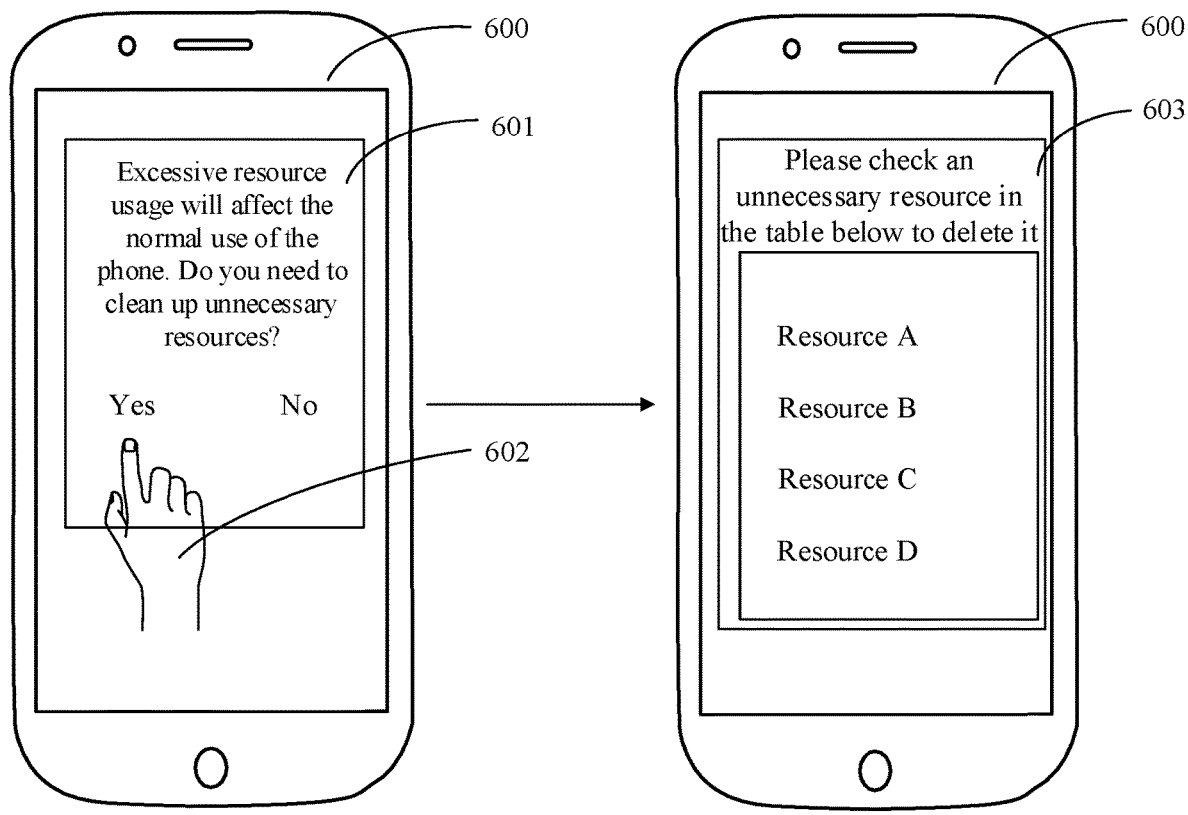
FIG. 38 is a schematic diagram of another screen pop-up effect of the processing method of the present application.

In an embodiment, the operation option and/or the prompt information corresponding to the preset event are output on the processing device. For example, the preset event is that the resource occupation value of the first device is greater than or equal to the preset resource threshold, and the operation option can be one-click cleaning of unimportant resources (whether it is important or not is selected by the user, just list the items that can be cleaned up and a brief description of each item that can be cleaned up). The prompt information may be to prompt the user that the resource occupation value of the first device is greater than or equal to the preset resource threshold, and the prompt method includes pop-up box output or voice output on the screen. For example, referring to FIG. 38, 600 is the first device, 601 is a screen pop-up box output by the first device 600, which is used to prompt the user that the resource occupation value of the first device is greater than or equal to the preset resource threshold. After the user obtains the information of the screen pop-up box 601, and clicks "Yes" in the screen pop-up box 601 with the finger of the hand 602, the first device 600 outputs the screen pop-up box 603, so as to facilitate the user to clean up unimportant resources.

In this embodiment, the processing method includes: detecting whether a preset event is received; if yes, performing corresponding processing according to a preset strategy, and/or performing the first processing on at least one first device directly connected to the processing device according to a first rule, and/or, performing the second processing on at least one second device indirectly connected to the processing device according to the second rule. After receiving the preset event, the corresponding processing is performed through the preset strategy, and the first processing is performed on the first device, and/or the second processing is performed on the second device, which avoids that after the connection is established through the network, only simple information processing can be performed between each device, so that the information processing after each device establishes a connection with each other is more intelligent, convenient and flexible. In addition, since it can support information processing between directly connected devices and indirectly connected devices, the function is more powerful, and the experience is more intelligent, convenient and flexible.

Based on the above embodiments, the present application provides another embodiment of the processing method. Performing the corresponding processing according to the preset strategy includes at least one of the following:
 if the processing device has a control information table, updating the control information corresponding to the preset event into the control information table;
 if the processing device does not have a control information table, generating and/or determining the control information table, and updating the control information corresponding to the preset event into the control information table;
 converting the preset event to obtain at least one new event;
 disconnecting the processing device from the connection network;
 connecting the processing device to other networks.

This embodiment provides a variety of solutions for corresponding processing according to preset policies, with more powerful functions and more intelligent, convenient and flexible experience.

Based on the above-mentioned embodiment, another embodiment of the processing method of the present application is proposed, the first processing and/or the second processing includes at least one of the following:
 transmitting or updating the preset event, transmitting the preset event after conversion, the processing device is disconnected from the connection network, the processing device is connected to other networks, the processing device and at least one of the first device and the second device open preset applications and/or services, the processing device and at least one of the first device and the second device close preset applications and/or services.

In an embodiment, the method further includes at least one of the following:
 the first rule is: transmitting to all the first devices, or the preset first devices, or the authenticated first devices;
 the second rule is: transmitting to all the second devices, or the preset second devices, or the authenticated second devices.

This embodiment provides multiple solutions for performing the first processing on at least one first device directly connected to the processing device according to the first rule, and/or performing the second processing on at least one second device indirectly connected to the processing device according to the second rule, which makes it more intelligent when responding to the first event and the second event.

Figure 39:
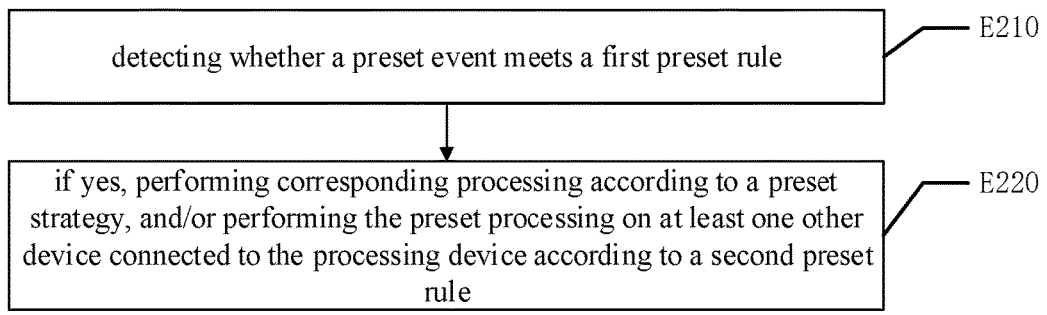
FIG. 39 is a schematic flowchart of the processing method according to another embodiment of the present application.
Figure 40:
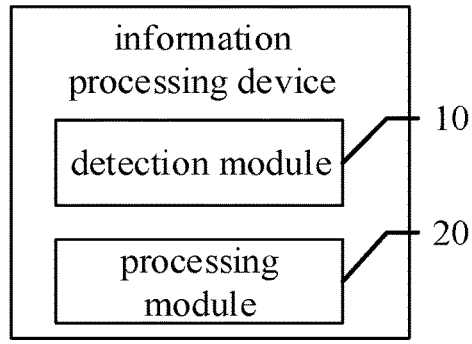
FIG. 40 is a schematic diagram of a functional module of the processing device according to a preferred embodiment of the present application.

As shown in FIG. 39, in an embodiment of the present application, although a logical order is shown in the flowcharts, in some cases the steps shown or described may be performed in an order different from that shown or described herein. The processing method can be applied to a processing device including, but not limited to, a personal computer, a smart phone, and the like. For the convenience of description, the following steps are omitted to describe the processing method of the execution subject, and the processing method includes:
 operation E210, detecting whether a preset event meets a first preset rule. In an embodiment, the preset event at least includes at least one first event and at least one second event.

In an embodiment, it is detected whether the first event and the second event meet the first preset rule.

In an embodiment, whether the first preset rule is met includes at least one of the following:
 the first event and/or the second event is triggered by the processing device;
 the at least one other device includes at least one first device directly connected to the processing device, and/or at least one second device indirectly connected to the processing device, the first event and/or the second event is triggered by the first device and/or the second device;

the time and/or location triggered by the first event and/or the second event meet a first preset condition;

the order in which the first event and/or the second event are triggered meets a second preset condition;

the priority of the first event and/or the second event meets a third preset condition;

the content information of the first event and/or the second event meets a fourth preset condition.

Operation E220, if yes, performing corresponding processing according to a preset strategy, and/or performing the preset processing on at least one other device connected to the processing device according to a second preset rule.

If the first preset rule is met, the corresponding processing is performed according to a preset strategy, and/or the preset processing is performed on at least one other device connected to the device according to a second preset rule. It can be understood that when the first preset rule is not met, the problems corresponding to the first event and the second event may not be dealt with, for example, the mobile phone cannot be charged when the user is not at home without power.

In an embodiment, operation options and/or prompt information corresponding to preset events are output on the processing device. For example, the preset event is that the resource occupation value of the first device is greater than or equal to the preset resource threshold, and the operation option can be one-click cleaning of unimportant resources (whether it is important or not is selected by the user, just list the items that can be cleaned up and a brief description of each item that can be cleaned up). The prompt information may be to prompt the user that the resource occupation value of the first device is greater than or equal to the preset resource threshold, and the prompt method includes pop-up box output or voice output on the screen. For example, referring to FIG. 38, 600 is the first device, 601 is a screen pop-up box output by the first device 600, which is used to prompt the user that the resource occupation value of the first device is greater than or equal to the preset resource threshold. After the user obtains the information of the screen pop-up box 601, and clicks "Yes" in the screen pop-up box 601 with the finger of the hand 602, the first device 600 outputs the screen pop-up box 603, so as to facilitate the user to clean up unimportant resources.

In this embodiment, the method includes: detecting whether the preset event meets the first preset rule, the preset events include at least one first event and at least one second event; if so, performing corresponding processing according to a preset strategy, and/or performing the preset processing on at least one other device connected to the processing device according to a second preset rule. When the first event and the second event meet the first preset rule, the preset processing is performed on at least one device according to the second preset rule, which avoids that after the connection is established through the network, only simple information processing can be performed between each device, so that the information processing after each device establishes a connection with each other is more intelligent, convenient and flexible.

Based on the above-mentioned embodiments, another embodiment of the processing method of the present application is proposed. The corresponding processing according to the preset strategy includes at least one of the following:

if the processing device has a control information table, updating the control information corresponding to the preset event into the control information table;

if the processing device does not have a control information table, generating and/or determining the control information table, and updating the control information corresponding to the preset event into the control information table;

converting the preset event to obtain at least one new event;

the processing device is disconnected from the connection network;

the processing device is connected to other networks.

This embodiment provides a variety of solutions for corresponding processing according to the preset strategy, with more powerful functions and more intelligent, convenient and flexible experience.

Based on the above-mentioned embodiments, another embodiment of the processing method of the present application is proposed, the first processing and/or the second processing includes at least one of the following:

transmitting or updating the preset event, transmitting the preset event after conversion, disconnecting the processing device from a connection network, connecting the processing device to another network, the processing device and at least one of the first device and the second device open preset applications and/or services, the processing device and at least one of the first device and the second device close preset applications and/or services.

In an embodiment, the method further includes at least one of the following:

the first rule is: transmitting to all the first devices, or the preset first devices, or the authenticated first devices;

the second rule is: transmitting to all the second devices, or the preset second devices, or the authenticated second devices.

This embodiment provides multiple solutions for performing the first processing on at least one first device directly connected to the processing device according to the first rule, and/or performing the second processing on at least one second device indirectly connected to the processing device according to the second rule, which makes it more intelligent when responding to the first event and the second event.

Figure 41:
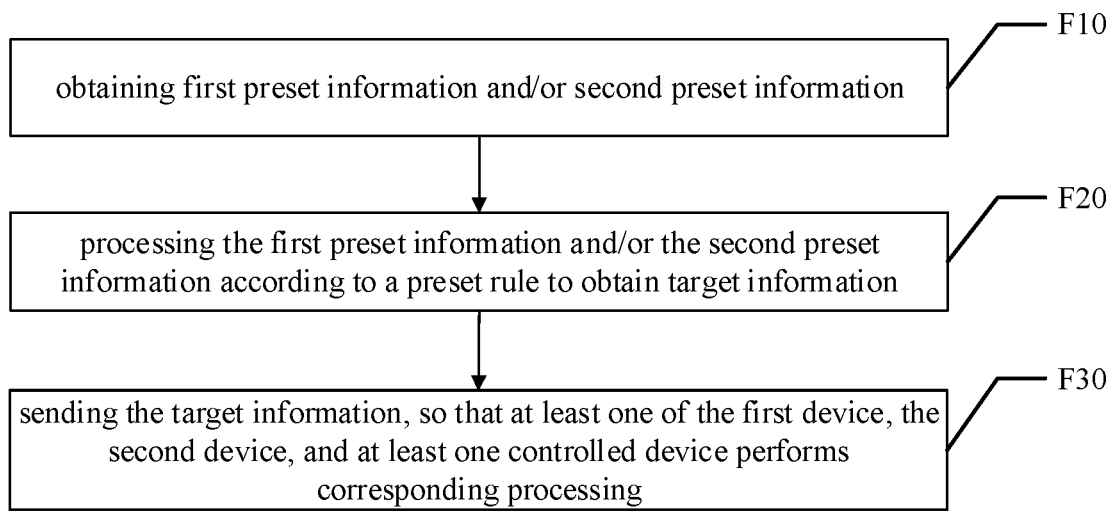
FIG. 41 is a schematic flowchart of the processing method according to an embodiment of the present application.

This application provides a processing method. Referring to FIG. 41, FIG. 41 is a schematic flowchart of a processing method according to an embodiment of the present application.

The embodiment of the present application provides the processing method. Although a logical order is shown in the flowcharts, in some cases the steps shown or described may be performed in an order different from that shown or described herein. The processing method can be applied to a processing device including, but not limited to, a personal computer, a smart phone, and the like. The processing method includes:

operation F10, obtaining first preset information and/or second preset information, the first preset information is provided by at least one first device directly connected to the processing device, and the second preset information is provided by at least one second device indirectly connected to the processing device.

In an embodiment, before the operation F10, the method further includes at least one of the following:

outputting prompt information on the first device to prompt the processing device to obtain the first preset information;

outputting prompt information on the second device to prompt the processing device to obtain the second preset information.

Figure 42:
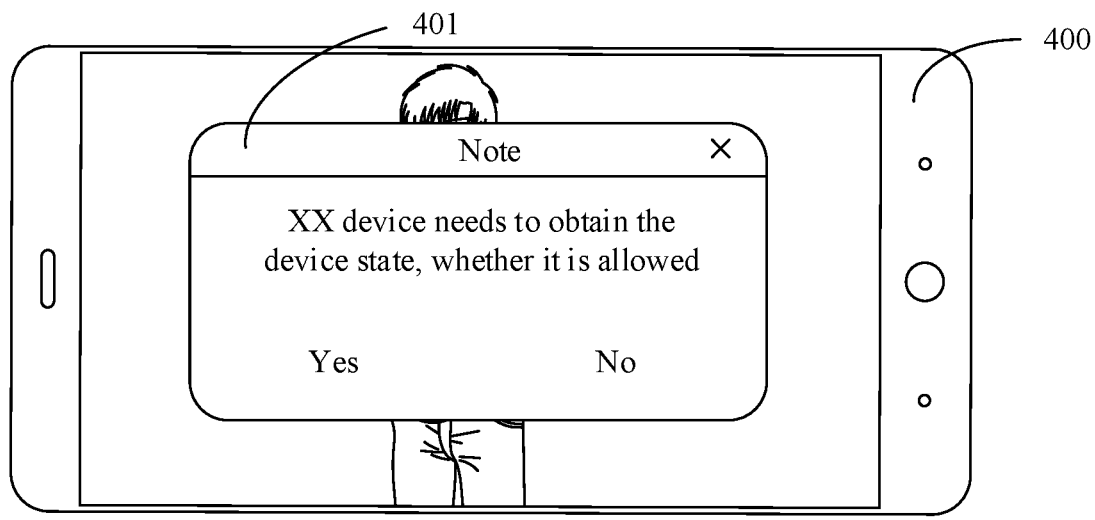
FIG. 42 is a schematic diagram of the effect of a pop-up box of the processing method of the present application.
Figure 43:
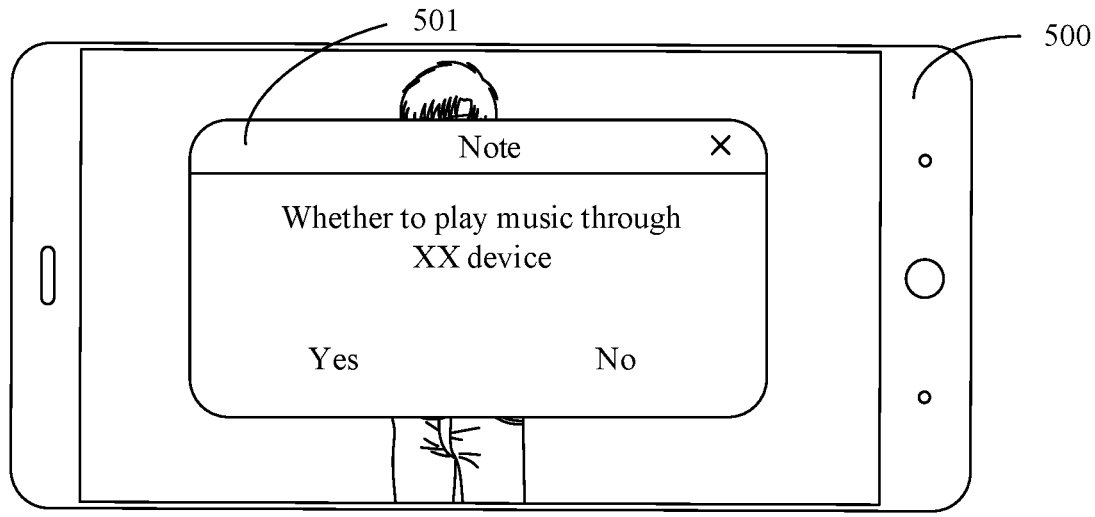
FIG. 43 is a schematic diagram of another pop-up box effect of the processing method of the present application.

In an embodiment, the processing device may directly obtain the corresponding first preset information without obtaining the permission of the first device, or may output prompt information on the first device before obtaining the first preset information, to prompt the user to process the device to obtain the first preset information. Similarly, the processing device may directly obtain the corresponding second preset information without obtaining the permission of the second device, or may output prompt information on the second device before obtaining the second preset information, to prompt the user to process the device to obtain the second preset information. For example, referring to FIG. 42, 400 is a mobile phone, and 401 is a pop-up box output by the mobile phone 400, and the pop-up box includes prompt information.

In an embodiment, before the operation F20, the method further includes:
  determining whether to process the first preset information and/or the second preset information according to the preset rule.

In an embodiment, at least one parameter value in the first preset information and/or the second preset information meeting the preset rule includes at least one of the following:
  the user physiological parameter value meets the first preset condition;
  the application information on the device corresponding to the preset information and/or at least one other device directly or indirectly connected to the corresponding device meets the second preset condition;
  the system information of the device corresponding to the preset information and/or at least one other device directly or indirectly connected to the corresponding device meets the third preset condition;
  the device information of the device corresponding to the preset information and/or at least one other device directly or indirectly connected to the corresponding device meets the fourth preset condition;
  the environment information of the device corresponding to the user or the preset information and/or at least one other device directly or indirectly connected to the corresponding device meets the fifth preset condition;
  the device operation information of the device corresponding to the preset information and/or at least one other device directly or indirectly connected to the corresponding device meets the sixth preset condition.

In an embodiment, the user physiological parameter value meeting the first preset condition includes at least one of the following:
  the user physiological parameter value is less than or equal to the first preset physiological parameter threshold;
  the user physiological parameter value is greater than the second preset physiological parameter threshold.

In an embodiment, the user physiological parameter value meets the first preset condition.

In an embodiment, the preset information corresponding to the application information on the device and/or at least one other device directly or indirectly connected to the corresponding device meets the second preset condition.

In an embodiment, the application information on the device corresponding to the preset information and/or at least one other device directly or indirectly connected to the corresponding device meets the second preset condition.

In an embodiment, the system information of the device corresponding to the preset information and/or at least one other device directly or indirectly connected to the corresponding device meets a third preset condition.

In an embodiment, the device information of the device corresponding to the preset information and/or at least one other device directly or indirectly connected to the corresponding device meets a fourth preset condition.

In an embodiment, the environment information of the device corresponding to the user or preset information and/or at least one other device directly or indirectly connected to the corresponding device meets the fifth preset condition.

In an embodiment, the device operation information of the device corresponding to the preset information and/or at least one other device directly or indirectly connected to the corresponding device meeting the sixth preset condition includes at least one of the following:
  if the device operation information includes gesture information, and the gesture information meets the preset gesture operation requirements;
  if the device operation information includes voice information, and the voice information meets the preset voice control requirements;
  if the device operation information includes sensing information, and the sensing information meets the preset sensing information requirements;
  if the device operation information includes touch operation information, and the touch operation information meets the preset touch operation information requirements.

In an embodiment, operation F20 includes: processing the first preset information and/or the second preset information according to the preset rule to obtain target information.

In an embodiment, the preset rule is determined by the content and/or type of the first preset information and/or the second preset information.

In an embodiment, the processing device processes the first preset information, the second preset information, or the first preset information and the second preset information according to the preset rule to obtain target information.

In an embodiment, the operation F20 includes at least one of the following:
  if the first preset information and/or the second preset information is at least one of physiological parameters and exercise parameters, analyzing the first preset information and/or the second preset information according to preset health rules to obtain health control information;
  if the first preset information and/or the second preset information is at least one of application and/or service type, application and/or service name, application and/or service state, application and/or service data, analyzing the first preset information and/or the second preset information according to preset application rules to obtain application control information;
  if the first preset information and/or the second preset information is at least one of system type, system name, system state, and system data, analyzing the first preset information and/or the second preset information according to preset system rules to obtain system control information;
  if the first preset information and/or the second preset information is at least one of device type, device name, device state, and device data, analyzing the first preset information and/or the second preset information according to preset device rules to obtain device control information;
  if the first preset information and/or the second preset information is at least one of time, location, brightness, noise, altitude, road slope, weather, temperature, humidity, air pressure, wind level, and wind direction, analyzing the first preset information and/or the second preset information according to preset environment rules to obtain environment control information;

if the first preset information and/or the second preset information is at least one of gesture information, voice information, sensing information, and touch operation information, analyzing the first preset information and/or the second preset information according to preset operation rules to obtain operation control information.

In an embodiment, in addition to the above-mentioned embodiments, in another embodiment, various combinations of different first preset information and/or second preset information may also be processed according to preset rules to obtain target information.

In an embodiment, the operation F20 further includes:

determining a processing rule according to the type of preset information, and processing the preset information according to the processing rule to obtain target information.

In an embodiment, in addition to determining the processing rule based on the content of the preset information (such as physiological parameter value), the processing rule can also be determined according to the type of the preset information, and the preset information is processed according to the processing rule to obtain the target information.

In an embodiment, the method further includes at least one of the following:

the health data type includes at least one of physiological parameters and exercise parameters;

the application and/or service data type includes at least one of application and/or service type, application and/or service name, application and/or service state, and application and/or service data;

the system data type includes at least one of system type, system name, system state, and system data;

the device data type includes at least one of device type, device name, device state, and device data;

the type of environment data includes at least one of time, location, brightness, noise, altitude, road slope, weather, temperature, humidity, air pressure, wind level, and wind direction;

the type of operation data includes at least one of gesture information, voice information, sensing information, and touch operation information.

In an embodiment, processing the preset information according to the processing rule to obtain target information includes at least one of the following:

if the type of the preset information is a health data type, analyzing the preset information according to a preset health rule to obtain health control information;

if the type of the preset information is an application and/or service data type, analyzing the preset information according to a preset application rule to obtain application control information;

if the type of the preset information is a system data type, analyzing the preset information according to a preset system rule to obtain system control information;

if the type of the preset information is a device data type, analyzing the preset information according to a preset device rule to obtain device control information;

if the type of the preset information is an environmental data type, analyzing the preset information according to a preset environmental rule to obtain environment control information;

if the type of the preset information is an operation data type, analyzing the preset information according to a preset operation rule to obtain device operation control information.

Operation F30, sending the target information, so that at least one of the first device, the second device, and at least one controlled device performs corresponding processing.

In an embodiment, the operation F30 further includes:

the processing device performs corresponding processing according to a preset strategy.

In this embodiment, through obtaining the first preset information and/or the second preset information other than self information, sending the target information obtained after processing the first preset information and/or the second preset information back to the first device and/or the second device corresponding to the first preset information and/or the second preset information, the processing device may respond to the first preset information and/or the second preset information of the first device and/or the second device other than its own information. In this way, the device response process after each device establishes a connection with each other is more intelligent, convenient and fast.

Figure 44:
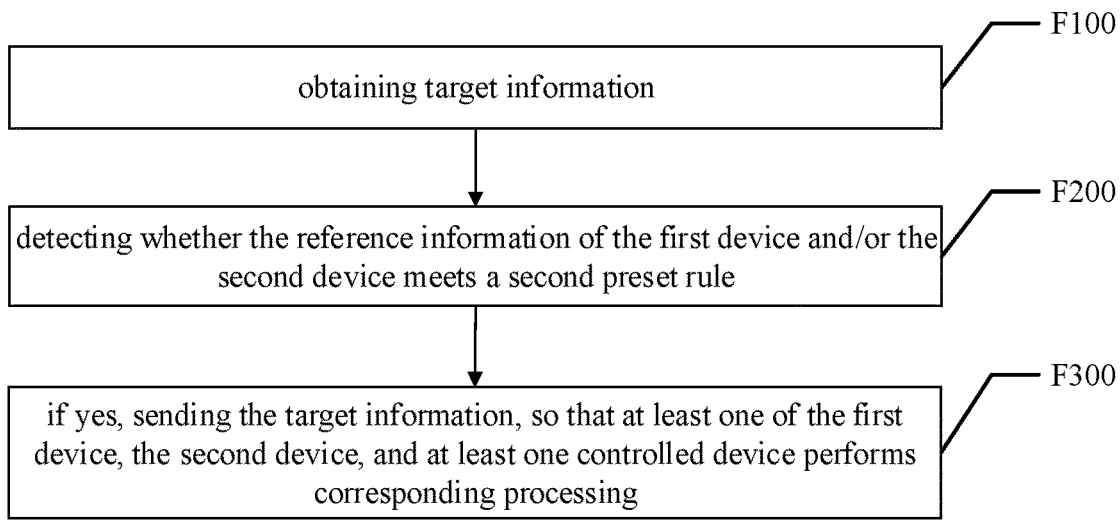
FIG. 44 is a schematic flowchart of the processing method according to another embodiment of the present application.

As shown in FIG. 44, another embodiment of the present application is proposed. Although a logical order is shown in the flowcharts, in some cases the steps shown or described may be performed in an order different from that shown or described herein. The processing method can be applied to a processing device including, but not limited to, a personal computer, a smart phone, and the like. The processing method includes:

operation F100, obtaining target information, the target information is obtained by the processing device processing first preset information provided by at least one first device and/or second preset information provided by at least one second device based on a first preset rule.

In an embodiment, the first preset rule is determined by the content and/or type of the first preset information and/or the second preset information.

In an embodiment, the processing device acquires target information. The target information is obtained by the processing device processing first preset information provided by at least one first device and/or second preset information provided by at least one second device based on a first preset rule.

In an embodiment, the first preset information includes at least one of the following: first user physiological parameters, first device application information, first device system information, first device information, first environment information, first device operation information.

The second preset information includes at least one of the following: second user physiological parameters, second device application information, second device system information, second device information, second environment information, and second device operation information.

In an embodiment, the first preset information includes at least one of: the first user physiological parameters, the first device application information, the first device system information, the first device information, the first environment information, the first device operation information. The second preset information includes at least one of: the second user physiological parameters, the second device application information, the second device system information, the second device information, the second environment information, and the second device operation information.

In an embodiment, the fourth device is directly or indirectly connected to the second device. The second preset information also includes at least one of the following: the fourth user physiological parameters, the fourth device application information, the fourth device system information, the fourth device information, the fourth environment information, and the fourth device operation information provided by the fourth device.

In an embodiment, in addition to the above embodiments, in another embodiment, a combination of various preset information may also be processed according to preset rules to obtain target information.

Operation F200, detecting whether the reference information of the first device and/or the second device meets a second preset rule.

In an embodiment, the second preset rule is determined by content and/or type of reference information of the first device and/or the second device.

In an embodiment, the reference information includes at least one of the following: device state information, device function information, device parameter information, and device application information.

Operation F300, if yes, send the target information, so that at least one of the first device, the second device and at least one controlled device performs corresponding processing.

In an embodiment, the processing device sends the target information to at least one of the first device, the second device and at least one controlled device, such that at least one of the first device, the second device and at least one controlled device performs corresponding processing, such as performing a control operation corresponding to the target information.

In an embodiment, the first device and/or the second device can not only undertake the function of providing the first preset information and/or the second preset information, but also perform the corresponding processing according to the target information obtained by processing the first preset information and/or the second preset information. When the first device and/or the second device do not support or cannot perform corresponding processing, the target information may also be sent to at least one controlled device for corresponding processing. The controlled device is directly or indirectly connected to the processing device.

In an embodiment, the operation F300 includes: sending the target information to a preset fifth device, so that the fifth device performs the preset processing.

In an embodiment, the processing device sends the target information to the preset fifth device, that is, the fifth device may also respond to the target information obtained by processing the first preset information provided by at least one first device and/or the second preset information provided by at least one second device based on the first preset rule by the processing device, so that the third device performs the preset processing.

In an embodiment, the preset processing includes:
outputting prompt information corresponding to the target information through the fifth device.

Figure 45:
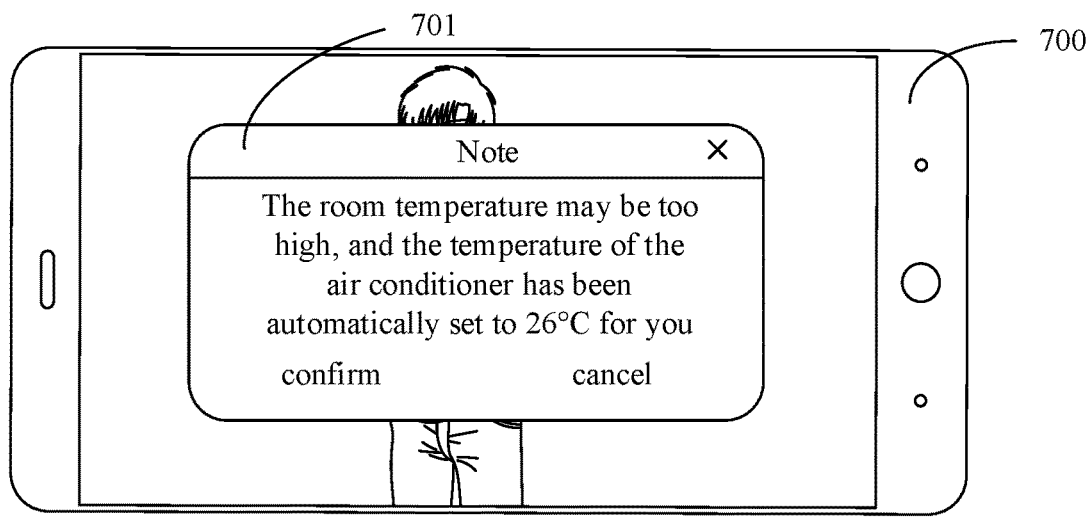
FIG. 45 is a schematic diagram of another pop-up effect of the processing method of the present application.

In an embodiment, the processing device outputs prompt information corresponding to the target information through the fifth device, and the prompt information is used to prompt the user of the device control operation corresponding to the target information and/or the device response result after the device control operation is performed. For example, referring to FIG. 45, 700 is a mobile phone, and 701 is a pop-up box output by the mobile phone 700, and the pop-up box prompts information.

In this embodiment, through obtaining the first preset information and/or the second preset information other than self information, and when the state information of the first device and/or the second device meets the second preset rule, the target information obtained after processing the first preset information and/or the second preset information is sent back to the first device and/or the second device corresponding to the first preset information and/or the second preset information, such that the processing device may respond to the first preset information and/or the second preset information of the first device and/or the second device other than its own information. In this way, the device response process after each device establishes a connection with each other is more intelligent, convenient and fast.

Figure 46:
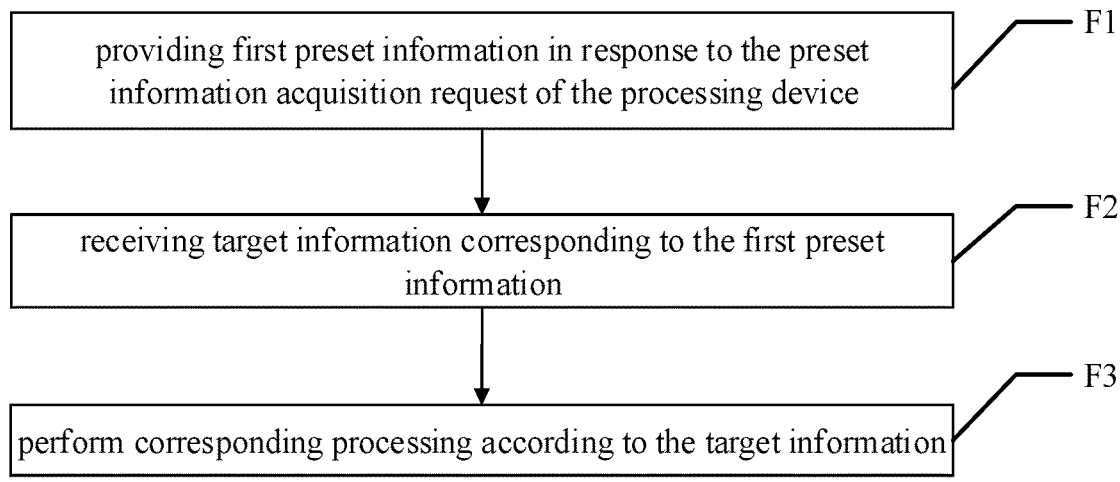
FIG. 46 is a schematic flowchart of the processing method according to another embodiment of the present application.

In an embodiment, as shown in FIG. 46, yet another embodiment of the present application is proposed. Although the logical sequence is shown in the flowchart, in some cases, the steps shown or described may be performed in a different order than here. The processing method is applicable to a first device directly connected to the processing device. The first device includes, but is not limited to, a personal computer, a smart phone, and the like. The processing method includes:

operation F1, providing the first preset information in response to the preset information acquisition request of the processing device.

In an embodiment, the first device provides the first preset information in response to the preset information acquisition request of the processing device.

In an embodiment, the first preset information includes at least one of the following: first user physiological parameters, first device application information, first device system information, first device information, first environment information, first device operation information;

The second preset information includes at least one of the following: second user physiological parameters, second device application information, second device system information, second device information, second environment information, and second device operation information.

Operation F2, receiving the target information corresponding to the first preset information. The target information is obtained by processing the first preset information and/or the second preset information according to the preset rule by the processing device. The second preset information is provided by at least one second device indirectly connected to the processing device.

In an embodiment, the preset rule is determined by the content and/or type of the first preset information and/or the second preset information.

In an embodiment, the first device receives the target information corresponding to the first preset information. The target information is obtained by processing the first preset information and/or the second preset information according to the preset rule by the processing device.

In an embodiment, the target information is obtained by processing the first preset information and/or the second preset information according to preset rules by the processing device, including:

if the first preset information and/or the second preset information is at least one of physiological parameters and exercise parameters, analyzing the first preset information and/or the second preset information according to preset health rules to obtain health control information;

if the first preset information and/or the second preset information is at least one of application and/or service type, application and/or service name, application and/or service state, application and/or service data, analyzing the first preset information and/or the second preset information according to preset application rules to obtain application control information;

if the first preset information and/or the second preset information is at least one of system type, system name, system state, and system data, analyzing the first preset information and/or the second preset information according to preset system rules to obtain system control information;

if the first preset information and/or the second preset information is at least one of device type, device name, device state, and device data, analyzing the first preset information and/or the second preset information according to preset device rules to obtain device control information;

if the first preset information and/or the second preset information is at least one of time, location, brightness, noise, altitude, road slope, weather, temperature, humidity, air pressure, wind level, and wind direction, analyzing the first preset information and/or the second preset information according to preset environmental rules to obtain environmental control information;

if the first preset information and/or the second preset information is at least one of gesture information, voice information, sensing information, and touch operation information, analyzing the first preset information and/or the second preset information according to preset operation rules to obtain operation control information.

In an embodiment, if the first preset information and/or the second preset information is at least one of physiological parameters and exercise parameters, the first preset information and/or the second preset information are analyzed according to the preset health rules to obtain health control information. In an embodiment, the preset health rule is a rule for determining the correspondence between different physiological parameters and/or exercise parameters and different health control information.

In an embodiment, if the first preset information and/or the second preset information is at least one of application and/or service type, application and/or service name, application and/or service state, application and/or service data, the first preset information and/or the second preset information are analyzed according to the preset application rule to obtain the application control information. The preset application rule is a rule for determining the correspondence between at least one of different application types, application names, application states, and application data and different application control information.

In an embodiment, if the first preset information and/or the second preset information is at least one of system type, system name, system state, and system data, the first preset information and/or the second preset information are analyzed according to the preset system rules to obtain system control information. The preset system rule is a rule for determining the correspondence between at least one of different system types, system names, system states, and system data and different system control information.

In an embodiment, if the first preset information and/or the second preset information is at least one of device type, device name, device state, and device data, the first preset information and/or the second preset information are analyzed according to the preset device rules to obtain device control information. The preset device rule is a rule for determining the correspondence between at least one of different device types, device names, device states, and device data and different device control information.

In an embodiment, if the first preset information and/or the second preset information is at least one of time, location, brightness, noise, altitude, road slope, weather, temperature, humidity, air pressure, wind level, and wind direction, the first preset information and/or the second preset information are analyzed according to preset environmental rules to obtain environment control information. The preset environment rule is a rule for determining the correspondence between at least one of different time, location, brightness, noise, altitude, road slope, weather, temperature, humidity, air pressure, wind level, and wind direction and different environment control information.

In an embodiment, if the type of the preset information is an operation data type, the preset information is analyzed according to a preset operation rule to obtain device operation control information. The preset operation rule is a rule for determining the corresponding relationship between at least one of different gesture information, voice information, sensing information, touch operation information and different operation control information.

Operation F3, performing the corresponding processing according to the target information.

In an embodiment, the first device and/or the second device performs the corresponding processing according to the target information, and performs the control operation corresponding to the target information.

In an embodiment, before the operation F3, the processing method further includes:

outputting the prompt information corresponding to the target information;

if the cancel execution instruction corresponding to the prompt information is not received (it may not be received within a preset time), performing the operation F3; and/or, if the cancel execution instruction is received, not performing the operation F3 and/or outputting the corresponding prompt information (the prompt information output mode can be interface display or voice broadcast or light prompt, etc.).

In an embodiment, the method further includes:

determining whether the historical number of consecutive receptions of the cancellation execution instruction is less than or equal to the preset number of times;

if the historical number of consecutive receptions of the cancellation execution instruction is less than or equal to the preset number of times, when the target information is received, performing the operation of outputting the prompt information corresponding to the target information.

In an embodiment, the first device and/or the second device judges whether the number of historical consecutive receptions of the cancel execution instruction is less than or equal to a preset number of times.

In an embodiment, this solution further includes:

when the target information meets the preset safety condition, performing the operation of determining whether the number of historical consecutive reception times of the cancel execution instruction is less than or equal to the preset number of times.

In an embodiment, the method further includes:

obtaining update data corresponding to the first preset information and/or the second preset information, and processing the update data according to the preset rule to obtain updated target information.

In an embodiment, the corresponding processing is only performed if the updated target information is the same as the target information; or the corresponding process is only performed if the updated target information is different from the target information.

In an embodiment, the first device and/or the second device obtains update data corresponding to the first preset information and/or the second preset information, processes the update data according to preset rules, and obtains updated target information. If the updated target information is the same as the target information, the corresponding processing is performed.

In an embodiment, before the operation F3, the method includes:
- when the target information meets a preset requirement, performing the corresponding processing.

In an embodiment, before performing the corresponding processing, the first device and/or the second device further need to determine whether the target information meets a preset requirement, and only performs the corresponding processing when the preset requirement is met.

In this embodiment, by responding to the preset information acquisition request of the processing device, providing the first preset information, and after receiving the corresponding target information, executing the processing corresponding to the target information, the device response process after each device establishes a connection with each other is more intelligent, convenient and fast.

Figure 47:
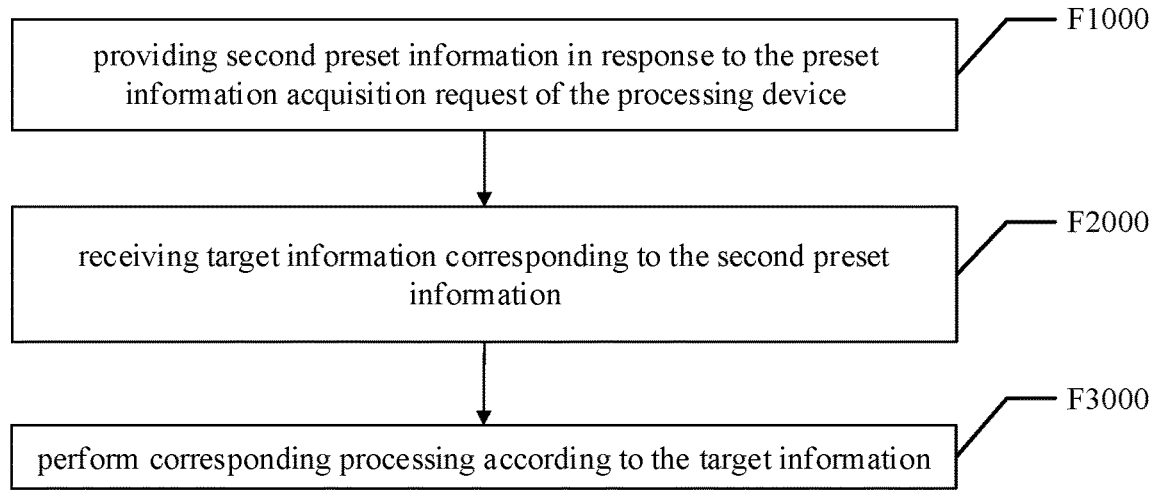
FIG. 47 is a schematic flowchart of the processing method according to an embodiment of the present application.
Figure 48:
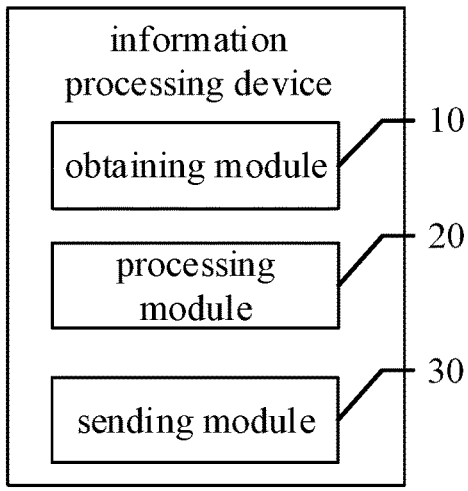
FIG. 48 is a schematic diagram of a functional module of the processing device according to a preferred embodiment the present application.

As shown in FIG. 47, an embodiment of the present application is proposed. Although a logical order is shown in the flowcharts, in some cases the steps shown or described may be performed in an order different from that shown or described herein. The processing method can be applied to a second device that is indirectly connected to the processing device, and the second device includes but is not limited to a personal computer, a smart phone, and the like. The processing method includes:
- operation F1000, providing second preset information in response to the preset information acquisition request of the processing device.

In an embodiment, the first device provides the first preset information in response to the preset information acquisition request of the processing device.

In an embodiment, the first preset information includes at least one of the following: first user physiological parameters, first device application information, first device system information, first device information, first environment information, first device operation information;

The second preset information includes at least one of the following: second user physiological parameters, second device application information, second device system information, second device information, second environment information, and second device operation information.

In an embodiment, the first user physiological parameter, the second user physiological parameter, the third user physiological parameter or the fourth user physiological parameter may include at least one of physiological parameters and exercise parameters of the same user or different users.

In an embodiment, the first device application information, the second device application information, the third device application information or the fourth device application information may include at least one of application type, application name, application state, and application data.

In an embodiment, the first device system information, the second device system information, the third device system information or the fourth device system information may include at least one of system type, system name, system state, and system data.

In an embodiment, the above-mentioned first device information, the second device information, the third device information or the fourth device information includes at least one of device type, device name, device state, and device data.

Operation F2000, receiving target information corresponding to the second preset information, the target information is obtained by the processing device processing the first preset information and/or the second preset information according to preset rules, the first preset information is provided by at least one first device directly connected to the processing device.

The preset rule is determined by the content and/or type of the first preset information and/or the second preset information.

The second device receives target information corresponding to the second preset information, and the target information is obtained by processing the first preset information and/or the second preset information according to preset rules by the processing device. The processing device, the first device and the second device include any one of terminal devices (such as smartphones, PADs, Tablets, etc.), wearable smart devices (such as smart watches, smart bracelets, smart headphones, etc.), smart home devices (such as smart TVs, smart speakers, etc.) and Internet of Vehicles devices (such as smart cars, vehicle terminals, etc.).

Operation F3000, performing the corresponding processing according to the target information.

In an embodiment, the first device and/or the second device performs the corresponding processing according to the target information, and performs the control operation corresponding to the target information.

In an embodiment, before the operation F3000, the processing method further includes:
- outputting the prompt information corresponding to the target information;
- if the cancel execution instruction corresponding to the prompt information is not received (it may not be received within a preset time), performing the operation F3000; and/or, if the cancel execution instruction is received, not performing the operation F3000 and/or outputting the corresponding prompt information (the prompt information output mode can be interface display or voice broadcast or light prompt, etc.).

In an embodiment, before the operation F3000, the method includes:
- when the target information meets a preset requirement, performing the corresponding processing.

In an embodiment, before performing the corresponding processing, the first device and/or the second device further need to determine whether the target information meets a preset requirement, and only performs the corresponding processing when the preset requirement is met. It can be understood that when the corresponding processing conflicts with the corresponding preset requirement, the preset requirement shall prevail, that is, the preset system setting shall not be changed. For example, the corresponding processing is to adjust the volume of the earphone to be greater than 80% of the total volume, while the preset requirement is that the volume of the earphone cannot be greater than 80% of the total volume, At this time, the corresponding processing conflicts with the preset requirement, and the corresponding processing is not executed, or a corresponding prompt information is output to allow the user to decide whether to execute the corresponding processing.

In this embodiment, the method includes: F1000, providing second preset information in response to the preset information acquisition request of the processing device; F2000, receiving target information corresponding to the second preset information, the target information is obtained by processing the first preset information and/or the second preset information according to preset rules by the processing device, the first preset information is provided by at least one first device indirectly connected to the processing device; F3000, performing the corresponding processing according to the target information. By responding to the preset information acquisition request of the processing device, providing the second preset information, and after receiving the corresponding target information, executing the processing corresponding to the target information, the device response process after each device establishes a connection with each other is more intelligent, convenient and fast.

Figure 49:
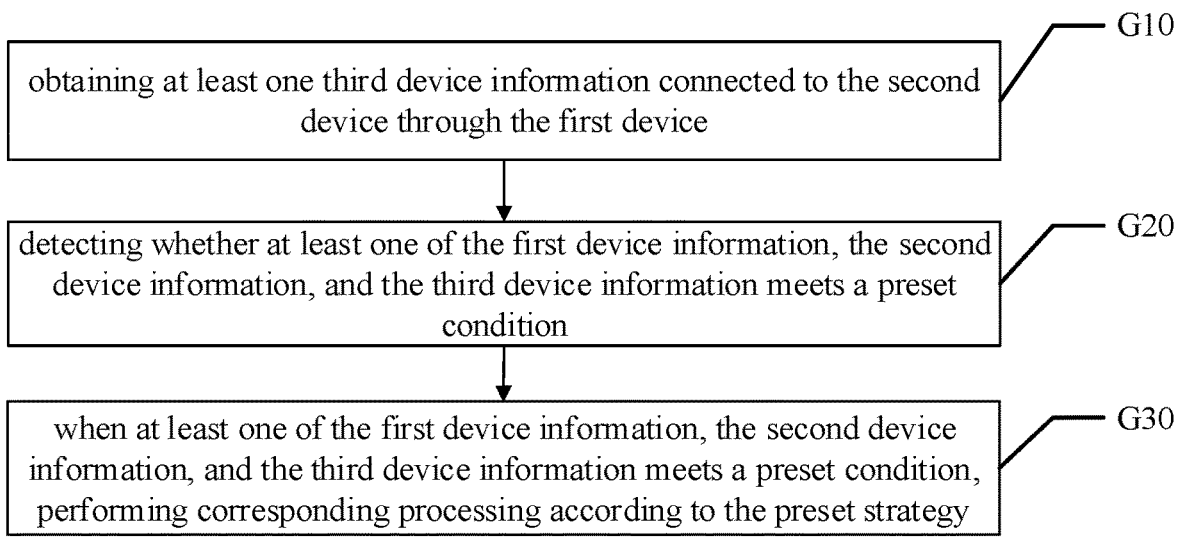
FIG. 49 is a schematic flowchart of the processing method according to an embodiment of the present application.
Figure 50:
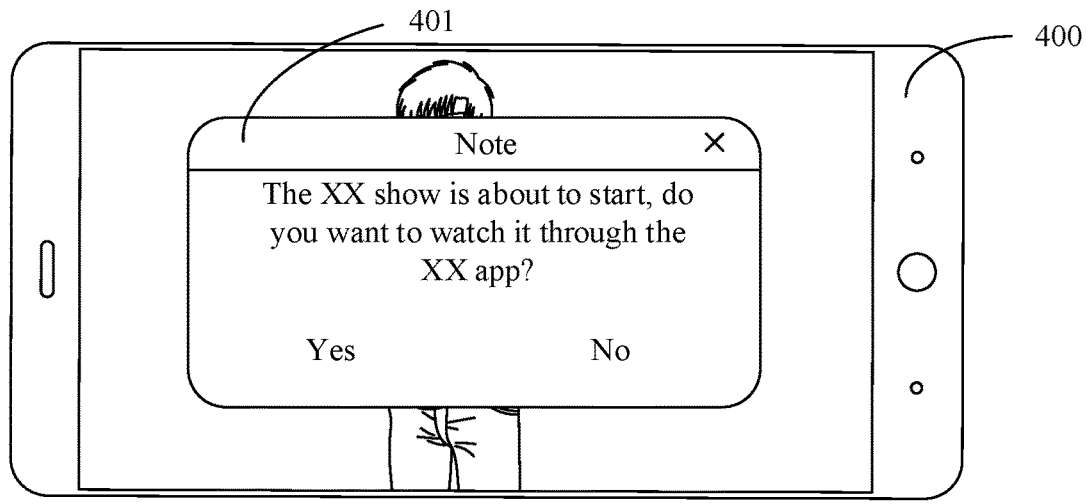
FIG. 50 is a schematic diagram of the effect of a pop-up box in the processing method of the present application.

The present application provides a processing method. As shown in FIG. 49, FIG. 49 is a schematic flowchart of the processing method according to an embodiment of the present application.

The embodiment of the present application provides a processing method. Although a logical order is shown in the flowcharts, in some cases the steps shown or described may be performed in an order different from that shown or described herein. The processing method is applied to a second device connected to the first device. The first device is directly connected to the second device, and the second device includes but is not limited to a personal computer, a smart phone, and the like. The processing method includes:

operation G10, obtaining information about at least one third device connected to the second device through the first device.

In an embodiment, the second device and the third device are indirectly connected.

In an embodiment, the second device acquires at least one third device information through the first device, and the third device corresponding to the third device information is indirectly connected or directly connected to the second device. The connection methods between devices include indirect connection and direct connection. For the direct connection, it is to establish a connection through a preset connection method (such as Bluetooth, WIFI, personal hotspot, etc.), for example, if device A establishes a connection with device B through Bluetooth, then the connection method between device A and device B is a direct connection. For the indirect connection, it is through a third party device. It can be understood that the third-party device has a connection relationship with the device that establishes the indirect connection, that is, the device that establishes the connection relationship of the indirect connection can perform data interaction through the third-party device. For example, the connection relationship between device A and device C is direct connection or indirect connection, the connection relationship between device B and device C is direct connection or indirect connection, the connection relationship between the device A and the device B is not directly connected, and the connection relationship between the device A and the device B is an indirect connection relationship. The first device, the second device and the third device belong to the same connection network, include any one of terminal devices (such as smartphones, PADs, Tablets, etc.), wearable smart devices (such as smart watches, smart bracelets, smart headphones, etc.), smart home devices (such as smart TVs, smart speakers, etc.) and Internet of Vehicles devices (such as smart cars, vehicle terminals, etc.).

Operation G20, detecting whether at least one of the first device information, the second device information and the third device information meets a preset condition.

In an embodiment, the second device detects whether at least one of the first device information, the second device information and the third device information meets a preset condition.

In an embodiment, the operation G20 includes at least one of the following:
a first preset event occurring on the first device;
a second preset event occurring on the second device;
a third preset event occurring on the third device.

In an embodiment, the operation of detecting whether at least one of the first device information, the second device information and the third device information meets a preset condition includes at least one of a first preset event occurring on the first device, a second preset event occurring on the second device, and a third preset event occurring on the third device. Understandably, when a first preset event occurs on the first device, a second preset event occurs on the second device, and/or a third preset event occurs on the third device, at least one of the first device information, the second device information and the third device information meets the preset condition.

In an embodiment, the first preset event or the second preset event or the third preset event includes at least one of the following:
the user physiological parameter information meets the first preset condition;
the corresponding device system information meets the second preset condition;
the corresponding device communication information meets the third preset condition;
the corresponding device application information meets the fourth preset condition;
the corresponding device reminder information meets the fifth preset condition;
the corresponding device detection information meets the sixth preset condition;
the corresponding device state information meets the seventh preset condition;
the corresponding device environment information meets the eighth preset condition.

In an embodiment, the first preset event or the second preset event or the third preset event includes at least one of: the user physiological parameter information meets the first preset condition; the corresponding device system information meets the second preset condition; the corresponding device communication information meets the third preset condition; the corresponding device application information meets the fourth preset condition; the corresponding device reminder information meets the fifth preset condition; the corresponding device detection information meets the sixth preset condition; the corresponding device state information meets the seventh preset condition; the corresponding device environment information meets the eighth preset condition.

The second preset condition is that the corresponding device system information meets the preset device system information rule. For example, if the system state is stuck, then the corresponding device in the system state cannot normally handle the tasks that the device needs to process, and the system state meets the preset device system information rule.

The third preset condition is that the corresponding device communication information meets the preset device communication information rule. For example, when the device communication signal strength is lower than the preset device communication signal strength threshold, the device communication signal strength meets the preset device communication information rule.

The fourth preset condition is that the corresponding device application information meets the preset device application information rules. For example, when the device application name information meets the preset response operation trigger condition (for example, it is recognized by the application name that the device is running a game application, and it is recognized by the application name that the "WeChat" application has call access), the device application data information meets the preset device application information rule.

The fifth preset condition is that the corresponding device reminder information meets the preset device reminder information rule. For example, when the time information in the reminder information is consistent with the current time, a condition for outputting reminder information to the user is triggered.

The sixth preset condition is that the corresponding device detection information meets the preset device detection information rule. For example, when the current working state of the device hardware meets the preset working state requirements (for example, the vehicle terminal detects that the car door is not closed), the current working state of the device hardware meets the preset device detection information rule.

The seventh preset condition is that the corresponding device state information meets the preset device state information rule, for example, the running state is stuck.

The eighth preset condition is that the corresponding device environment information meets the preset device environment information rule, for example, the device use environment information is that the user is driving.

Operation G30, if yes, performing the corresponding processing according to a preset strategy.

In an embodiment, if at least one of the first device information, the second device information, and the third device information meets a preset condition, the corresponding processing is performed according to a preset strategy. If the first device information, the second device information and the third device information does not meet the preset condition, the first device information, the second device information and the third device information is not responded to.

In an embodiment, the operation G30 includes at least one of the following:
the first device performs processing according to a first preset strategy;
the second device performs processing according to a second preset strategy;
the third device performs processing according to a third preset strategy.

In an embodiment, if at least one of the first device information, the second device information, and the third device information meets the preset condition, performing the corresponding processing according to the preset strategy includes at least one of: the first device performs processing according to a first preset strategy; the second device performs processing according to a second preset strategy; the third device performs processing according to a third preset strategy.

In an embodiment, the first preset strategy or the second preset strategy or the third preset strategy includes at least one of the following:
transmitting or updating the corresponding preset event, transmitting the corresponding preset event after conversion, disconnecting at least one of the first device and the second device and the third device from the connection network, connecting at least one of the first device, the second device, and the third device to other networks, at least one of the first device, the second device, and the third device opening preset applications and/or services, at least one of the first device, the second device, and the third device closing preset applications and/or services, changing the parameters of the currently running application and/or service of at least one of the first device, the second device, and the third device, switching the current mode of at least one of the first device, the second device, and the third device, changing a strategy for processing current data of at least one of the first device, the second device, and the third device.

In an embodiment, the operation G30 includes at least one of the following:
outputting operation options and/or prompt information corresponding to the preset event on the first device;
outputting operation options and/or prompt information corresponding to the preset event on the second device;
outputting operation options and/or prompt information corresponding to the preset event on the third device.

In this embodiment, the processing method includes: G10, obtaining at least one third device information indirectly connected to the second device through the first device; G20, detecting whether at least one of information on the first device, the second device, and the third device meets a preset condition; G30: if yes, performing corresponding processing according to the preset strategy. When at least one of information on the first device, the second device, and the third device indirectly connected to the second device meets a preset condition, the corresponding processing is performed according to a preset strategy. In this way, the device response process after each device establishes a connection with each other is more intelligent, convenient and fast.

Figure 51:
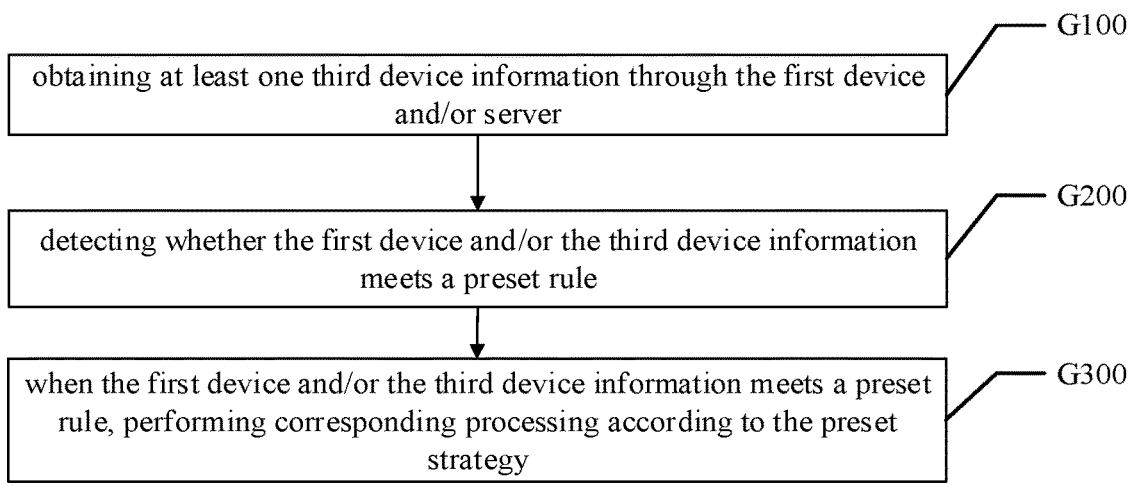
FIG. 51 is a schematic flowchart of the processing method according to another embodiment of the present application.

In an embodiment, another embodiment of the processing method of the present application is proposed. Although a logical order is shown in the flowcharts, in some cases the steps shown or described may be performed in an order different from that shown or described herein. The processing method is applied to a second device connected to the first device. The first device can be directly connected to the second device, and the second device includes but is not limited to a personal computer and a smart phone. Referring to FIG. 51, the processing method includes:
operation G100, obtaining at least one third device information through the first device and/or the server.

In an embodiment, the third device is directly or indirectly connected to the first device.

In an embodiment, the second device obtains at least one third device information through the first device or the server, and the third device corresponding to the third device information is indirectly connected or directly connected to the second device.

Operation G200, detecting whether the first device and/or the third device information meets a preset rule.

In an embodiment, the second device detects whether the first device and/or the third device information meets a preset rule.

In an embodiment, in the process of detecting whether the first device and/or the third device information meets a preset rule, the second device may also perform detection in combination with its own information.

In an embodiment, the operation G200 includes at least one of the following:
a first preset event occurring on the first device;
a second preset event occurring on the second device;
a third preset event occurring on the third device.

In an embodiment, the operation of detecting whether at least one of the first device information, the second device information and the third device information meets a preset condition includes at least one of a first preset event occurring on the first device, a second preset event occurring on the second device, and a third preset event occurring on the third device. Understandably, when a first preset event occurs on the first device, a second preset event occurs on the second device, and/or a third preset event occurs on the third device, at least one of the first device information, the second device information and the third device information meets the preset condition.

In an embodiment, the first preset event or the second preset event or the third preset event includes at least one of the following:
the user physiological parameter information meets the first preset condition;
the corresponding device system information meets the second preset condition;
the corresponding device communication information meets the third preset condition;
the corresponding device application information meets the fourth preset condition;
the corresponding device reminder information meets the fifth preset condition;
the corresponding device detection information meets the sixth preset condition;
the corresponding device state information meets the seventh preset condition;
the corresponding device environment information meets the eighth preset condition.

In an embodiment, the first preset event or the second preset event or the third preset event includes at least one of: the user physiological parameter information meets the first preset condition; the corresponding device system information meets the second preset condition; the corresponding device communication information meets the third preset condition; the corresponding device application information meets the fourth preset condition; the corresponding device reminder information meets the fifth preset condition; the corresponding device detection information meets the sixth preset condition; the corresponding device state information meets the seventh preset condition; the corresponding device environment information meets the eighth preset condition.

The first preset condition is that the user physiological parameter reaches the preset user physiological parameter threshold, for example, the user's heart rate reaches the preset user's heart rate threshold.

The corresponding device system information includes system type, system name, system state, or the like. The system type is used to distinguish different types of systems, such as Android system, Symbian system, Apple system, etc., and the deep customization system based on Android system (such as MIUI (Mobile Internet UI, Xiaomi mobile operating system)). Different systems will provide users with different services during operation, for example, the operating mechanisms of the Apple system and the Android system are different.

The second preset condition is that the corresponding device system information meets the preset device system information rule. For example, if the system state is stuck, then the corresponding device in the system state cannot normally handle the tasks that the device needs to process, and the system state meets the preset device system information rule.

The third preset condition is that the corresponding device communication information meets the preset device communication information rule. For example, when the device communication signal strength is lower than the preset device communication signal strength threshold, the device communication signal strength meets the preset device communication information rule.

The fourth preset condition is that the corresponding device application information meets the preset device application information rules. For example, when the device application name information meets the preset response operation trigger condition (for example, it is recognized by the application name that the device is running a game application, and it is recognized by the application name that the "WeChat" application has call access), the device application data information meets the preset device application information rule.

The fifth preset condition is that the corresponding device reminder information meets the preset device reminder information rule. For example, when the time information in the reminder information is consistent with the current time, a condition for outputting reminder information to the user is triggered.

The sixth preset condition is that the corresponding device detection information meets the preset device detection information rule. For example, when the current working state of the device hardware meets the preset working state requirements (for example, the vehicle terminal detects that the car door is not closed), the current working state of the device hardware meets the preset device detection information rule.

The seventh preset condition is that the corresponding device state information meets the preset device state information rule, for example, the running state is stuck.

The eighth preset condition is that the corresponding device environment information meets the preset device environment information rule, for example, the device use environment information is that the user is driving.

Operation G300, if yes, performing the corresponding processing according to a preset strategy.

In an embodiment, if at least one of the first device information, the second device information, and the third device information meets a preset condition, the corresponding processing is performed according to a preset strategy. If the first device information, the second device information and the third device information does not meet the preset condition, the first device information, the second device information and the third device information is not responded to.

In an embodiment, the operation G300 includes at least one of the following:
the first device performs processing according to a first preset strategy;
the second device performs processing according to a second preset strategy;
the third device performs processing according to a third preset strategy.

In an embodiment, if at least one of the first device information, the second device information, and the third device information meets the preset condition, performing the corresponding processing according to the preset strategy includes at least one of: the first device performs processing according to a first preset strategy; the second device performs processing according to a second preset strategy; the third device performs processing according to a third preset strategy.

In an embodiment, the first preset strategy or the second preset strategy or the third preset strategy includes at least one of the following:

transmitting or updating the corresponding preset event, transmitting the corresponding preset event after conversion, disconnecting at least one of the first device and the second device and the third device from the connection network, connecting at least one of the first device, the second device, and the third device to other networks, at least one of the first device, the second device, and the third device opening preset applications and/or services, at least one of the first device, the second device, and the third device closing preset applications and/or services, changing the parameters of the currently running application and/or service of at least one of the first device, the second device, and the third device, switching the current mode of at least one of the first device, the second device, and the third device, changing a strategy for processing current data of at least one of the first device, the second device, and the third device.

In an embodiment, if at least one of the first device, the second device, and the third device is within a preset time period (such as 12:00 am to 3:00 am), it can be considered that a preset event has occurred (for example, the reminder information of the corresponding device meets the fifth preset condition). The second device (such as a mobile phone) can disconnect from the network or enter power saving mode or enter sleep mode or enter silent mode, the third device (such as a watch) can enter the off-screen state or enable sleep monitoring services (such as monitoring the user's heart rate, blood oxygen, etc.), and the first device (such as a TV) can sleep or even shut down.

In an embodiment, the operation G300 includes at least one of the following:

outputting operation options and/or prompt information corresponding to the preset event on the first device;
outputting operation options and/or prompt information corresponding to the preset event on the second device;
outputting operation options and/or prompt information corresponding to the preset event on the third device.

In an embodiment, if at least one of the first device information, the second device information, and the third device information meets a preset condition, the corresponding processing according to the preset strategy includes at least one of: outputting operation options and/or prompt information corresponding to the preset event on the first device; outputting operation options and/or prompt information corresponding to the preset event on the second device; outputting operation options and/or prompt information corresponding to the preset event on the third device.

Figure 52:
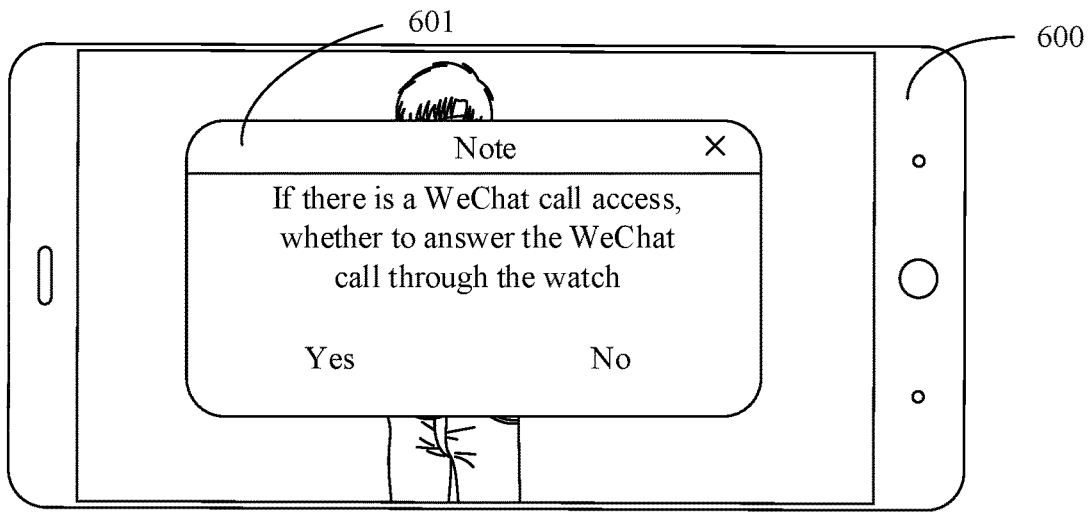
FIG. 52 is a schematic diagram of another pop-up box effect of the processing method of the present application.
Figure 53:
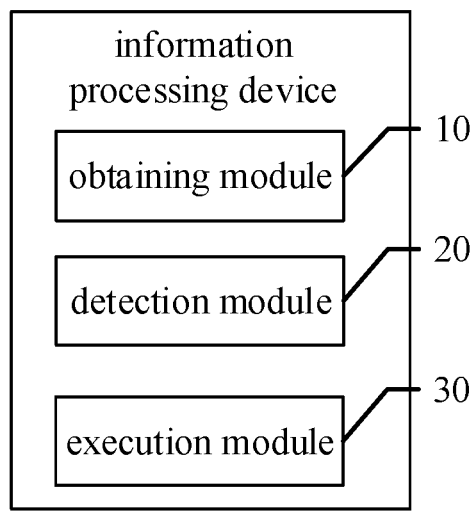
FIG. 53 is a schematic diagram of a functional module of the processing device according to a preferred embodiment of the present application.

In an embodiment, the above-mentioned operation options are choices made by the user for the preset event, for example, the mobile phone outputs the operation options to allow the user to choose whether to answer the WeChat call through the watch. The prompt information is to prompt the user that a preset event has occurred in at least one of the first device, the second device, and the third device. Referring to FIG. 52, 600 is the mobile phone, and 601 is the pop-up prompt information and operation options output by the mobile phone 600.

In an embodiment, the method further includes: receiving operation information for the operation option, and updating and/or transmitting the preset event according to the operation information.

In an embodiment, the second device receives operation information for the above operation options (for example, confirming the compression operation), and updates and/or transmits the preset event according to the operation information (for example, updates the preset event to replace the original video file with the compressed video file).

In this embodiment, the processing method includes: G100, obtaining at least one third device information through the first device and/or the server; G200, detecting whether the information of the first device and/or the third device meets a preset rule; G300, if yes, performing the corresponding processing according to a preset strategy. When at least one of the information of the first device and the third device obtained through the first device or the server meets a preset condition, the corresponding processing is performed according to a preset strategy. In this way, the device response process after each device establishes a connection with each other is more intelligent, convenient and fast.

Figure 54:
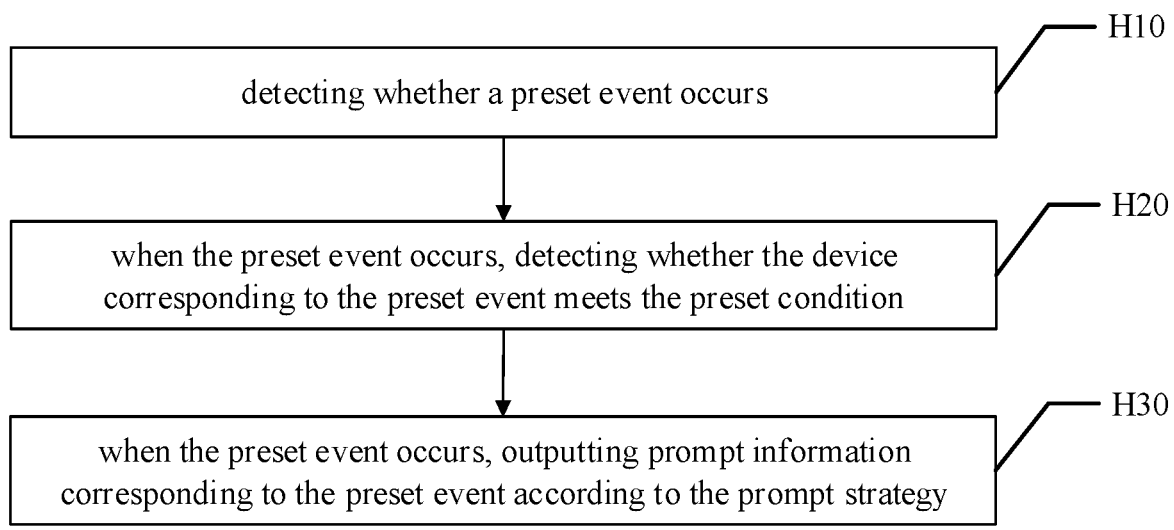
FIG. 54 is a schematic flowchart of the processing method according to an embodiment of the present application.

The present application provides a processing method. Referring to FIG. 54, FIG. 54 is a schematic flowchart of a processing method according to an embodiment of the present application.

The embodiment of the present application provides a processing method. Although a logical order is shown in the flowcharts, in some cases the steps shown or described may be performed in an order different from that shown or described herein. The processing method can be applied to a processing device including, but not limited to, a personal computer, a smart phone, and the like. The processing method includes:

operation H10, detecting whether a preset event occurs.

In an embodiment, the processing device detects whether a preset event occurs.

In an embodiment, the processing device is in a connection network, and the connection network includes the processing device, the first device and the second device. The occurrence of preset events includes at least one of the following:

a first preset event occurs on the processing device;
a second preset event occurs on the first device;
a third preset event occurs on the second device.

In an embodiment, the above-mentioned processing device is in the connection network, and the connection network includes the processing device, the first device and the second device, that is, the processing device, the first device and the second device belong to the same connection network. The first device is directly connected to the processing device, and the second device is indirectly connected to the processing device.

In an embodiment, the aforementioned occurrence of a preset event includes at least one of a first preset event occurring on the processing device, a second preset event occurring on the first device, and a third preset event occurring on the second device.

In an embodiment, the first preset event or the second preset event or the third preset event includes at least one of the following:

at least one of the processing device, the first device and the second device is in or switched to a preset mode;
at least one of the processing device, the first device and the second device is in or switched to a preset environment;
at least one of the processing device, the first device, and the second device detects that the user physiological information meets a first preset condition;
at least one of the processing device, the first device, and the second device detects that the user state meets a second preset condition;

at least one preset parameter detected by at least one of the processing device, the first device, and the second device meets a parameter condition;

at least one device is newly added in the connection network or the maximum number of connected devices has been reached;

at least one device in the connection network is disconnected or the minimum number of connected devices has been reached;

at least one of the processing device, the first device and the second device receives at least one message;

the power value of at least one of the processing device, the first device and the second device is lower than or equal to a preset power threshold;

the connection signal value of at least one of the processing device, the first device and the second device is less than or equal to a preset signal threshold;

the resource occupancy value of at least one of the processing device, the first device, and the second device is greater than or equal to a preset resource threshold;

the running state of at least one of the processing device, the first device and the second device is stuck or not smooth;

the preset application and/or preset function of at least one of the processing device, the first device, and the second device is turned on;

the security level of at least one of the processing device, the first device, and the second device is less than or equal to a preset security level threshold;

the working time of at least one of the processing device, the first device and the second device is greater than or equal to a preset working time threshold;

at least one of the processing device, the first device and the second device is at a preset position.

In an embodiment, at least one of the processing device, the first device and the second device is in or switched to a preset mode. The preset mode can be set by the system or set by the user or selected by the user, and the preset mode can be an intelligent mode or an interconnected mode or a linkage mode or a transfer mode, etc.

At least one preset parameter (such as speed) detected by at least one of the processing device, the first device, and the second device meets a parameter condition (such as greater than or less than or equal to a preset parameter range).

At least one device is newly added in the connection network or the maximum number of connected devices has been reached.

At least one device in the connection network is disconnected or the minimum number of connected devices has been reached.

At least one of the processing device, the first device and the second device receives at least one message.

The power value of at least one of the processing device, the first device and the second device is lower than or equal to a preset power threshold.

The connection signal value of at least one of the processing device, the first device and the second device is less than or equal to a preset signal threshold.

The resource occupancy value of at least one of the processing device, the first device, and the second device is greater than or equal to a preset resource threshold.

The running state of at least one of the processing device, the first device and the second device is stuck or not smooth.

The preset application and/or preset function of at least one of the processing device, the first device, and the second device is turned on.

The security level of at least one of the processing device, the first device, and the second device is less than or equal to a preset security level threshold.

The working time of at least one of the processing device, the first device and the second device is greater than or equal to a preset working time threshold.

At least one of the processing device, the first device and the second device is at a preset position.

Figure 55:
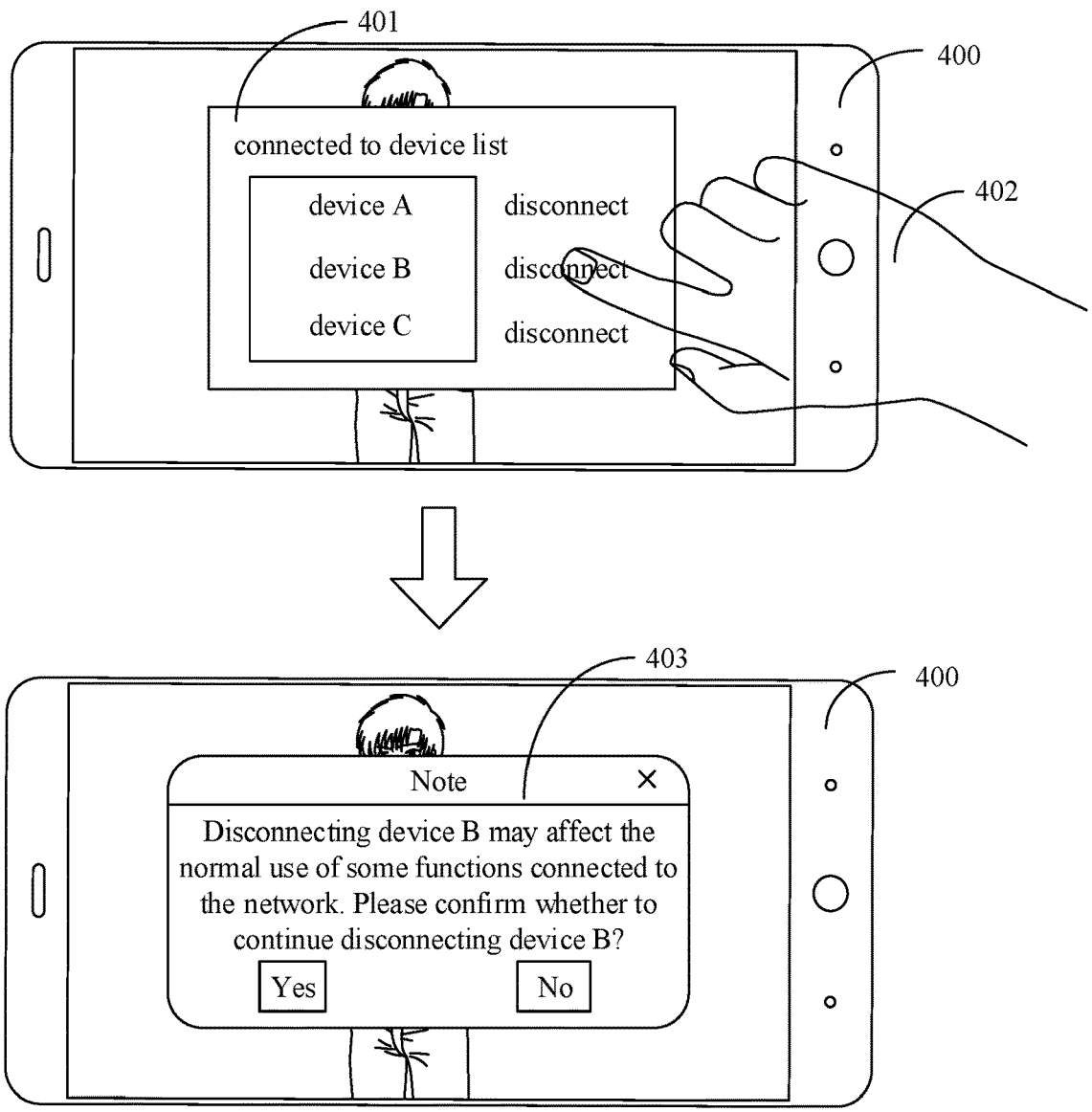
FIG. 55 is a schematic diagram of the pop-up effect of the processing method of the present application.
Figure 56:
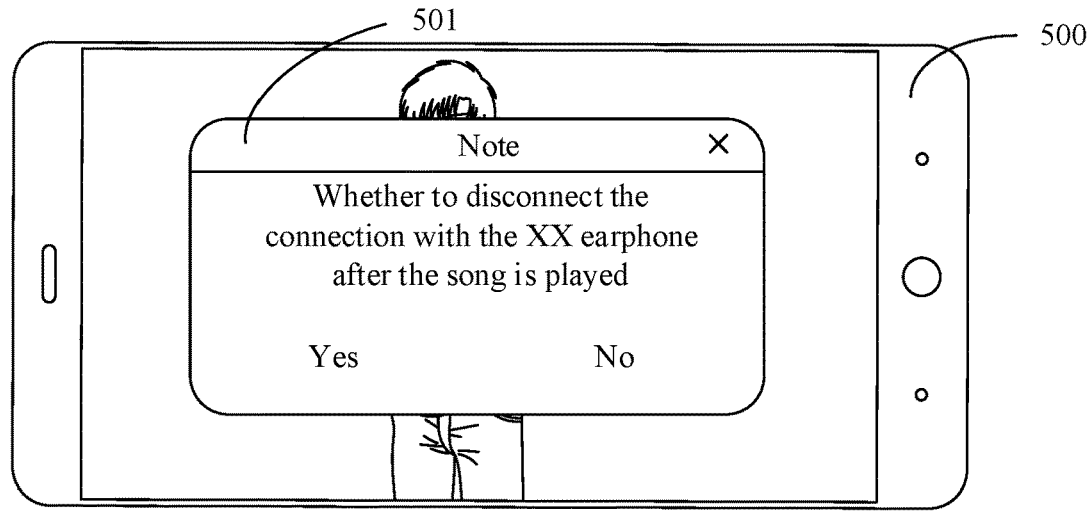
FIG. 56 is a schematic diagram of another pop-up effect of the processing method of the present application.

For example, as shown in FIG. 55, 400 is a mobile phone, and 401 is a list of connected devices in the connection network output by the mobile phone. When the user triggers the disconnection of device B in the connection network through the hand 402, the mobile phone 400 outputs prompt information through the pop-up box 403.

Operation H20, if yes, detecting whether the device corresponding to the preset event meets the preset condition.

In an embodiment, if a preset event occurs, it is detected whether the device corresponding to the preset event meets the preset condition; if the preset event does not occur, it is not detected whether the device corresponding to the preset event meets the preset condition.

In an embodiment, there is only one preset event, and the satisfaction of preset conditions includes at least one of the following:

the preset event is triggered by at least one of the processing device, the first device, and the second device;

the time and/or place triggered by the preset event meets the first preset condition;

the content information of the preset event meets the second preset condition.

In an embodiment, the preset event is a first preset event, a second preset event or a third preset event. Meeting the preset condition includes at least one of: the preset event is triggered by at least one of the processing device, the first device, and the second device; the time and/or location of the preset event trigger meet the first preset condition; the content information of the preset event meets the second preset condition.

In an embodiment, the first preset condition is that the trigger location of the preset event is a preset location, and/or the trigger time of the preset event is a preset time.

In an embodiment, the second preset condition is that the content information of the preset event is the preset content information. The preset content information may be keywords, key sentences set by the user or preset by the system, or determined according to use habits or machine learning.

In an embodiment, the preset event includes at least two, and the meeting the preset condition includes at least one of the following:

the preset event is triggered by the processing device, the first device and/or the second device;

the time and/or place triggered by the preset event meets the third preset condition;

the trigger sequence of the preset events meets the fourth preset condition;

the priority of the preset event meets the fifth preset condition;

the content information of the preset event meets the sixth preset condition.

In an embodiment, the preset events include at least two of the first preset event, the second preset event and the third preset event. The meeting the preset condition includes at least one of: the preset event is triggered by the processing device, the first device and/or the second device; the time and/or place triggered by the preset event meets the third preset condition; the trigger sequence of the preset events meets the fourth preset condition; the priority of the preset event meets the fifth preset condition; the content information of the preset event meets the sixth preset condition.

Operation H30, if yes, outputting prompt information corresponding to the preset event according to the prompt strategy.

In an embodiment, if the device corresponding to the preset event meets the preset condition, the prompt information corresponding to the preset event is output according to the prompt strategy; if the device corresponding to the preset event does not meet the preset condition, no prompt information is output.

In an embodiment, the outputting the prompt information corresponding to the preset event according to the prompt strategy includes at least one of the following:
  outputting operation options and/or prompt information corresponding to the preset event on the processing device;
  outputting operation options and/or prompt information corresponding to the preset event on the first device;
  outputting operation options and/or prompt information corresponding to the preset event on the second device.

Figure 57:
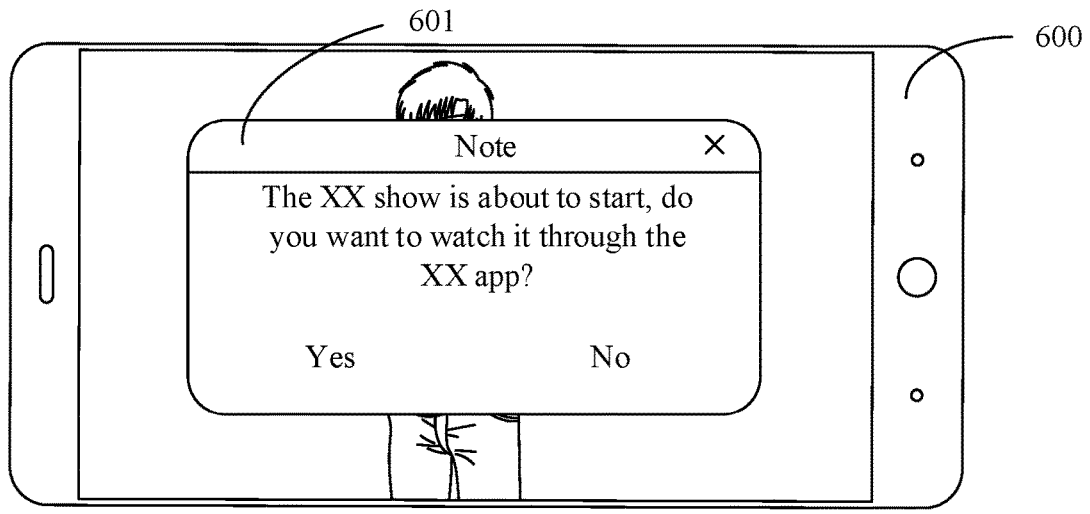
FIG. 57 is a schematic diagram of another pop-up effect of the processing method of the present application.

In an embodiment, the above operation options are choices made by the user for the preset event, for example, the mobile phone outputs the operation options to allow the user to choose whether to enter the preset TV program playback application. The prompt information is to remind the user that at least one of the processing device, the first device and the second device has occurred a preset event. For example, referring to FIG. 57, 600 is a mobile phone, and 601 is the pop-up prompt information and operation options output by the mobile phone 600.

In an embodiment, the method further includes: receiving the operation information for the operation option, and updating and/or transmitting the preset event according to the operation information.

In an embodiment, the processing device receives operation information for the above operation options (for example, confirms the compression operation), and updates and/or transmits (for example, updates the preset event to replace the original video file with the compressed video file) the preset event according to the operation information.

In this embodiment, when it is detected that the preset event occurs and the device corresponding to the preset event meets the preset condition, the prompt information corresponding to the preset event is output according to the prompt strategy, so that when the device is disconnected from the connection network where it is located, the user can obtain the message that the device is disconnected from the connection network where it is located through the prompt information. Therefore, it is more intelligent, convenient and faster for the user to obtain the message that the device is disconnected from the connection network where it is located.

Figure 58:
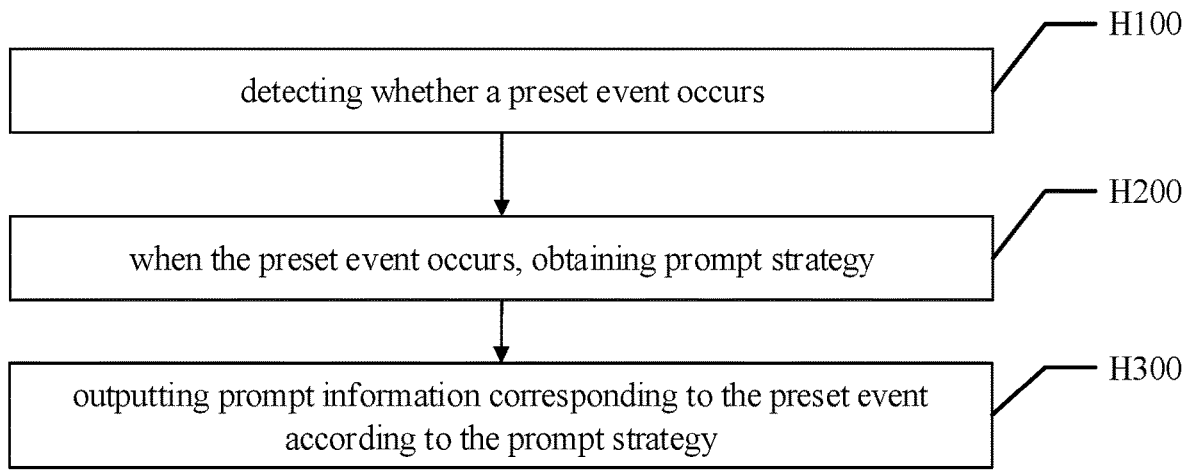
FIG. 58 is a schematic flowchart of the processing method according to another embodiment of the present application.

Another embodiment of the processing method of the present application is proposed. As shown in FIG. 58, FIG. 58 is a schematic flowchart of the processing method according to another embodiment of the present application.

The embodiment of the present application provides the processing method. Although a logical order is shown in the flowcharts, in some cases the steps shown or described may be performed in an order different from that shown or described herein. The processing method can be applied to a processing device including, but not limited to, a personal computer, a smart phone, and the like. The processing method includes:

Operation H100, detecting whether a preset event occurs.

In an embodiment, the processing device detects whether the preset event occurs.

The processing device is in a connection network, the connection network includes the processing device, the first device, and the second device, and the occurrence of a preset event includes at least one of the following:
  a first preset event occurs on the processing device;
  a second preset event occurs on the first device;
  a third preset event occurs on the second device.

In an embodiment, the above-mentioned processing device is in the connection network, and the connection network includes the processing device, the first device and the second device, that is, the processing device, the first device and the second device belong to the same connection network. The first device is directly connected to the processing device, and the second device is indirectly connected to the processing device. It can be understood that the direct connection is a direct connection between devices. The indirect connection means that there is no connection between the devices, but the two devices that have not established the connection establish a connection with another device at the same time, that is, the two devices that have not established the connection can exchange data through the other device. The processing device, the first device and the second device include any one of terminal devices (such as smartphones, PADs, tablets, etc.), wearable smart devices (such as smart watches, smart bracelets, smart earphones, etc.), smart home devices (such as smart TVs, smart speakers, etc.) and Internet of Vehicles devices (such as smart cars, vehicle terminals, etc.).

In an embodiment, the aforementioned occurrence of a preset event includes at least one of a first preset event occurring on the processing device, a second preset event occurring on the first device, and a third preset event occurring on the second device.

In an embodiment, the first preset event or the second preset event or the third preset event includes at least one of the following:
  at least one of the processing device, the first device and the second device is in or switched to a preset mode;
  at least one of the processing device, the first device and the second device is in or switched to a preset environment;
  at least one of the processing device, the first device, and the second device detects that the user physiological information meets a first preset condition;
  at least one of the processing device, the first device, and the second device detects that the user state meets a second preset condition;
  at least one preset parameter detected by at least one of the processing device, the first device, and the second device meets a parameter condition;
  at least one device is newly added in the connection network or the maximum number of connected devices has been reached;
  at least one device in the connection network is disconnected or the minimum number of connected devices has been reached;
  at least one of the processing device, the first device and the second device receives at least one message;
  the power value of at least one of the processing device, the first device and the second device is lower than or equal to a preset power threshold;

the connection signal value of at least one of the processing device, the first device and the second device is less than or equal to a preset signal threshold;

the resource occupancy value of at least one of the processing device, the first device, and the second device is greater than or equal to a preset resource threshold;

the running state of at least one of the processing device, the first device and the second device is stuck or not smooth;

the preset application and/or preset function of at least one of the processing device, the first device, and the second device is turned on;

the security level of at least one of the processing device, the first device, and the second device is less than or equal to a preset security level threshold;

the working time of at least one of the processing device, the first device and the second device is greater than or equal to a preset working time threshold;

at least one of the processing device, the first device and the second device is at a preset position.

In an embodiment, at least one of the processing device, the first device and the second device is in or switched to a preset mode. The preset mode can be set by the system or set by the user or selected by the user, and the preset mode can be an intelligent mode or an interconnected mode or a linkage mode or a transfer mode, etc.

At least one preset parameter (such as speed) detected by at least one of the processing device, the first device, and the second device meets a parameter condition (such as greater than or less than or equal to a preset parameter range).

At least one device is newly added in the connection network or the maximum number of connected devices has been reached.

At least one device in the connection network is disconnected or the minimum number of connected devices has been reached.

At least one of the processing device, the first device and the second device receives at least one message.

The power value of at least one of the processing device, the first device and the second device is lower than or equal to a preset power threshold.

The connection signal value of at least one of the processing device, the first device and the second device is less than or equal to a preset signal threshold.

The resource occupancy value of at least one of the processing device, the first device, and the second device is greater than or equal to a preset resource threshold.

The running state of at least one of the processing device, the first device and the second device is stuck or not smooth.

The preset application and/or preset function of at least one of the processing device, the first device, and the second device is turned on.

The security level of at least one of the processing device, the first device, and the second device is less than or equal to a preset security level threshold.

The working time of at least one of the processing device, the first device and the second device is greater than or equal to a preset working time threshold.

At least one of the processing device, the first device and the second device is at a preset position.

In an embodiment, the processing device, the first device and the second device belong to the same connection network, and the processing device, the first device and the second device can all serve as management devices to manage other devices in the connection network.

In an embodiment, the first preset event, the second preset event, or the third preset event may be that at least one of the processing device, the first device, and the second device is in or switched to a preset mode. The preset mode can be set by the system or set by the user or selected by the user, and the preset mode can be an intelligent mode, an interconnected mode, a linked mode, or a transfer mode, etc.

Operation H200, if yes, obtaining a prompt strategy;

Operation H300, outputting prompt information corresponding to the preset event according to the prompt strategy.

In an embodiment, if a preset event occurs, a prompt strategy is obtained, and the prompt information corresponding to the preset event is output according to the prompt strategy; if a preset event does not occur, the prompt strategy is not obtained.

In an embodiment, the outputting prompt information corresponding to the preset event according to the prompt strategy includes at least one of the following:

outputting operation options and/or prompt information corresponding to the preset event on the processing device;

outputting operation options and/or prompt information corresponding to the preset event on the first device;

outputting operation options and/or prompt information corresponding to the preset event on the second device.

In an embodiment, the processing device outputting the prompt information corresponding to the preset event according to the prompt strategy includes at least one of: outputting operation options and/or prompt information corresponding to the preset event on the processing device; outputting operation options and/or prompt information corresponding to the preset event on the first device; outputting operation options and/or prompt information corresponding to the preset event on the second device.

In an embodiment, the above operation options are choices made by the user for the preset event, for example, the mobile phone outputs the operation options to allow the user to choose whether to enter the preset TV program playback application. The prompt information is to remind the user that at least one of the processing device, the first device and the second device has occurred a preset event. For example, referring to FIG. 57, 600 is a mobile phone, and 601 is the pop-up prompt information and operation options output by the mobile phone 600.

In an embodiment, the method further includes: receiving the operation information for the operation option, and updating and/or transmitting the preset event according to the operation information.

In an embodiment, the processing device receives operation information for the above operation options (for example, confirms the compression operation), and updates and/or transmits (for example, updates the preset event to replace the original video file with the compressed video file) the preset event according to the operation information.

In this embodiment, the processing method includes: H100, detecting whether a preset event occurs; H200, when the preset event occurs, obtaining a prompt strategy; H300, outputting prompt information corresponding to the preset event according to the prompt strategy. When it is detected that when the preset event occurs, the prompt strategy is obtained, the prompt information corresponding to the preset event is output according to the prompt strategy, so that when the device is disconnected from the connection network where it is located, the user can obtain the message that the device is disconnected from the connection network where it is located through the prompt information. Therefore, it is more intelligent, convenient and faster for the user to obtain the message that the device is disconnected from the connection network where it is located.

Figure 59:
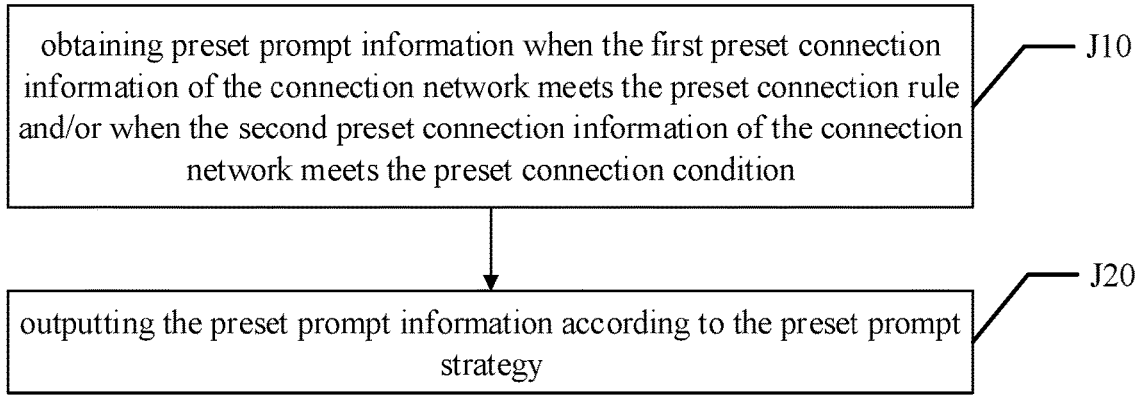
FIG. 59 is a schematic flowchart of the processing method according to another embodiment of the present application.
Figure 60:
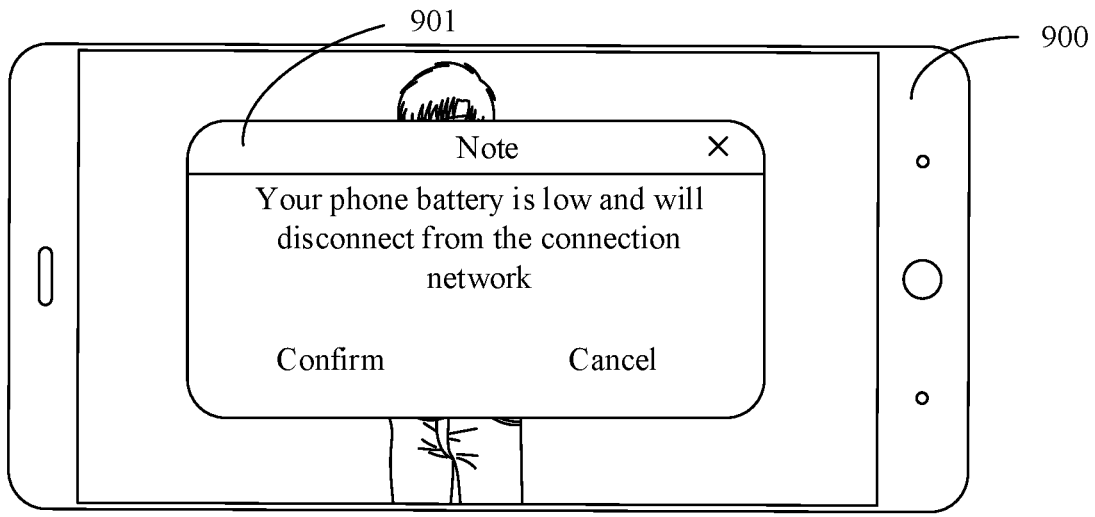
FIG. 60 is a schematic diagram of another pop-up effect of the processing method of the present application.
Figure 61:
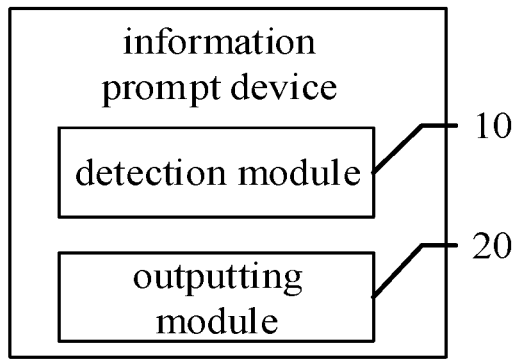
FIG. 61 is a schematic diagram of a functional module of the processing device according to a preferred embodiment of the present application.

Another embodiment of the processing method of the present application is proposed. As shown in FIG. 59, FIG. 59 is a schematic flowchart of the processing method according to yet another embodiment of the present application.

The embodiment of the present application provides the processing method. Although a logical order is shown in the flowcharts, in some cases the steps shown or described may be performed in an order different from that shown or described herein. The processing method can be applied to a processing device including, but not limited to, a personal computer, a smart phone, and the like. For the convenience of description, the operations used by the executive subject to describe the processing method are omitted below. The processing method includes:

Operation J10, obtaining preset prompt information when the first preset connection information of the connection network meets the preset connection rule and/or when the second preset connection information of the connection network meets the preset connection condition.

In an embodiment, the preset prompt information is obtained when the first preset connection information of the connection network meets the preset connection rule and/or when the second preset connection information of the connection network meets the preset connection condition. The connection network consists of one or more devices. The one or more devices include any one of a terminal device (such as a smart phone, a PAD, a Tablet PC, etc.), a wearable smart device, a smart home device (such as a smart TV, a smart speaker, etc.), and an Internet of Vehicles device (such as a smart car, a vehicle terminal, etc.).

In an embodiment, the first preset connection information includes at least one of the following:

power information, timing shutdown information, location information, time information, user identity information and use habit information, connection state information, use state information and environment information.

In an embodiment, the first preset connection information includes at least one of: the power information, the timing shutdown information, the location information, the time information, the user identity information and the use habit information, the connection state information, the use state information and the environment information.

In an embodiment, the method further includes:
when the first preset connection information includes the power information and the power information meets a first preset connection rule, obtaining first preset prompt information;
when the first preset connection information includes the timing shutdown information and the timing shutdown information meets a second preset connection rule, obtaining second preset prompt information;
when the first preset connection information includes the location information and the location information meets a third preset connection rule, obtaining third preset prompt information;
when the first preset connection information includes the time information and the time information meets a fourth preset connection rule, obtaining fourth preset prompt information;
when the first preset connection information includes the user identity information and the user identity information meets a fifth preset connection rule, obtaining fifth preset prompt information;
when the first preset connection information includes the use habit information and the use habit information meets a sixth preset connection rule, obtaining sixth preset prompt information;
when the second preset connection information includes the device type information and the device type information meets a seventh preset connection rule, obtaining seventh preset prompt information;
when the second preset connection information includes the connection state information and the connection state information meets an eighth preset connection rule, obtaining eighth preset prompt information;
when the second preset connection information includes the use state information and the use state information meets a ninth preset connection rule, obtaining ninth preset prompt information;
when the second preset connection information includes the environment information and the environment information meets a tenth preset connection rule, obtaining tenth preset prompt information.

Operation J20, outputting the preset prompt information according to the preset prompt strategy.

In an embodiment, the preset prompt information is output according to the preset prompt strategy. Different preset prompt information is output through different or the same preset prompt strategy. The preset prompt strategy may include setting the output duration of the preset prompt information, setting the output mode of the preset prompt information, and the like.

In this embodiment, the processing method includes: when the first preset connection information of the connection network meets the preset connection rule and/or when the second preset connection information of the connection network meets the preset connection condition, obtaining the preset prompt information; outputting the preset prompt information according to a preset prompt strategy. Setting certain restrictions as the requirements for obtaining preset prompt information, and outputting preset prompt information according to the preset prompt strategy make it more intelligent, convenient and faster for users to obtain the message that the device is disconnected from the connection network where it is located.

Figure 62:
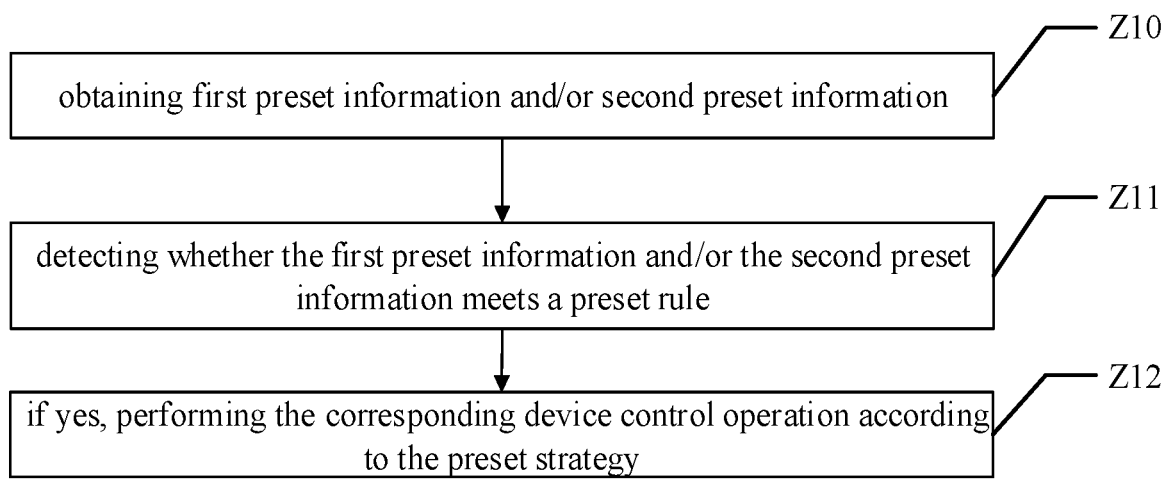
FIG. 62 is a schematic flowchart of the processing method according to an embodiment of the present application.

An embodiment of the processing method of the present application is proposed. Referring to FIG. 62, FIG. 62 is a schematic flowchart of the processing method according to an embodiment of the present application.

The embodiment of the present application provides the processing method. Although a logical order is shown in the flowcharts, in some cases the steps shown or described may be performed in an order different from that shown or described herein. The processing method can be applied to the first control center, which includes but not limited to personal computers and smart phones. For the convenience of description, the following steps are omitted to describe the processing method of the execution subject, and the processing method includes:

Z10, obtaining first preset information and/or second preset information.

In an embodiment, the first preset information and/or the second preset information is acquired.

In an embodiment, the first preset information is provided by the first control center and/or other devices controlled by the first control center.

In an embodiment, the first preset information is provided by the first control center and/or other devices controlled by the first control center.

In an embodiment, the first control center and other devices controlled by the first control center are in a network. The first control center and other devices controlled by the first control center can be terminal devices (such as mobile phones, PAD, tablet computers), etc.), wearable smart devices (such as smart watches, smart bracelets, smart earphones, etc.), smart home devices (such as smart TVs, smart speakers, etc.), Internet of Vehicles devices (such as smart cars, vehicle terminals, etc.). The networking is maintained by establishing a connection relationship between each device.

In an embodiment, the second preset information is provided by the second control center and/or other devices controlled by the second control center.

In an embodiment, the second preset information is provided by the second control center and/or other devices controlled by the second control center. The second control center and other devices controlled by the second control center can be in a network (it can be the same network as the first control center, or can be different). The second control center and other devices controlled by the second control center can be terminal devices (such as mobile phones, PAD, tablet computers), etc.), wearable smart devices (such as smart watches, smart bracelets, smart earphones, etc.), smart home devices (such as smart TVs, smart speakers, etc.), Internet of Vehicles devices (such as smart cars, vehicle terminals, etc.). The networking is maintained by establishing a connection relationship between each device.

In an embodiment, both the first control center and the second control center are directly or indirectly connected to at least one third device.

In an embodiment, both the first control center and the second control center are directly or indirectly connected to at least one third device. It can be understood that the third device can interact with the first control center and/or the second control center. Direct connection establishes a direct connection between devices. The indirect connection means that there is no connection between the devices, but the two devices that have not established the connection establish a connection with another device at the same time, that is, the two devices that have not established the connection can exchange data through the other device.

Both the first control center and the second control center are bound to at least one fourth device.

Figure 63:
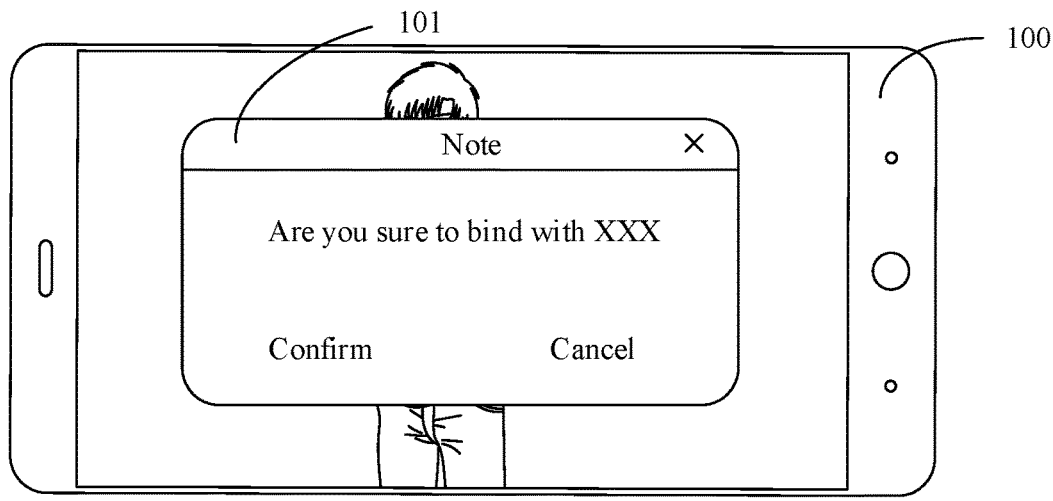
FIG. 63 is a schematic diagram of the pop-up effect of the processing method of the present application.
Figure 64:
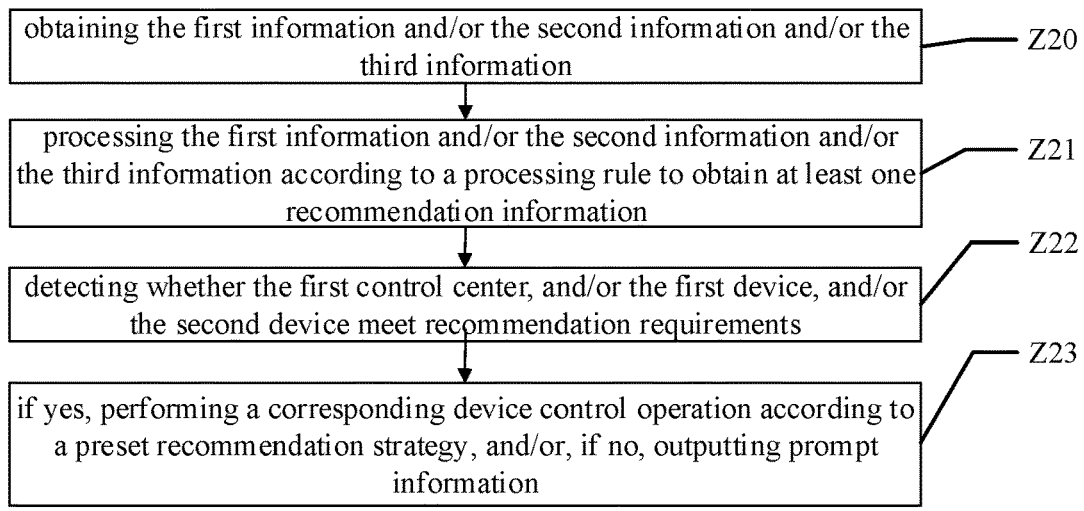
FIG. 64 is a schematic flowchart of the processing method according to another embodiment of the present application.
Figure 65:
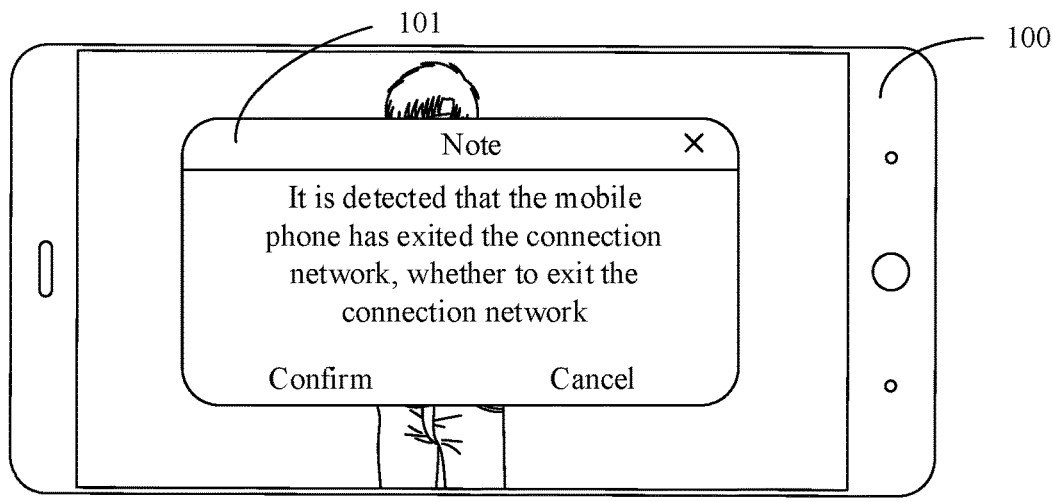
FIG. 65 is a schematic diagram of another pop-up effect of the processing method of the present application.

In an embodiment, both the first control center and the second control center are bound to at least one fourth device. The binding can be understood as that only devices that have established a binding relationship can implement the interaction function corresponding to the binding. For example, the watch can only be indirectly operated through the mobile phone after the mobile phone is bound to the watch. When not bound, the mobile phone and the watch can only perform simple data interaction, such as the watch transmitting the detected health data to the mobile phone. Referring to FIG. 63, 100 is a mobile phone, and 101 is a pop-up box output by the mobile phone 100.

After the first control center transfers or duplicates control functions and/or relevant data to the second control center, the first control center is disconnected from the fourth device or maintains a normal connection state in a non-control mode (e.g., similar to two devices with equal state).

In an embodiment, the control center determination strategy includes at least one of the following:

same as the user's last selection;
selecting the first control center or the second control center by default;
setting the target control center as the one with the most successes or the least failures within a certain period of time (such as the past week, or the past month, or within a complete historical period);
selecting one at random;
the one that is most convenient (such as being used) according to the user use habits or operation.

Z11, detecting whether the first preset information and/or the second preset information meets a preset rule;

Z12, when the first preset information and/or the second preset information meets the preset rule, performing the corresponding device control operation according to the preset strategy.

Figure 66:
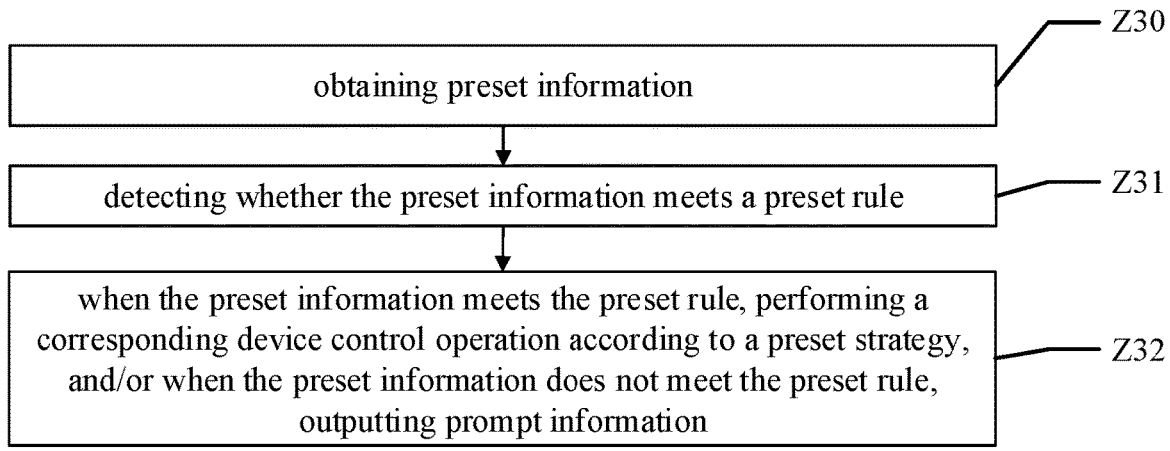
FIG. 66 is a schematic flowchart of the processing method according to another embodiment of the present application.
Figure 67:
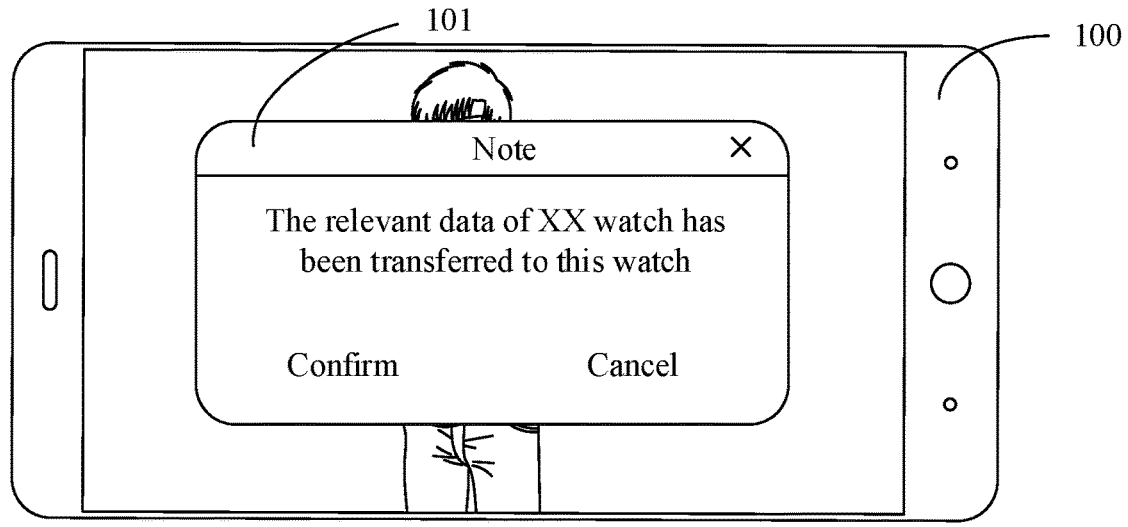
FIG. 67 is a schematic diagram of another pop-up effect of the processing method of the present application.

The present application provides another embodiment of the processing method. As shown in FIG. 66, FIG. 66 is a schematic flowchart of another embodiment of the processing method of the present application.

The embodiment of the present application provides the processing method. Although a logical order is shown in the flowcharts, in some cases the steps shown or described may be performed in an order different from that shown or described herein. The processing method can be applied to terminal devices, including but not limited to personal computers and smart phones. For the convenience of description, the following steps are omitted to describe the processing method of the execution subject, and the processing method includes:

Operation Z30, obtaining the preset information, the preset information is provided by the group where the first control center and/or the second control center belong.

In an embodiment, the preset information is obtained. The preset information is provided by the group where the first control center and/or the second control center are located. A group consists of a control center and other devices controlled by the control center, the control center and the other devices are in a network. The control center and the other devices can be terminal devices (such as mobile phones, PADs, tablet PC, etc.), wearable smart devices (such as smart watches, smart bracelets, smart earphones, etc.), smart home devices (such as smart TVs, smart speakers, etc.), car networking devices (such as smart cars, vehicle terminals, etc.). The networking is maintained by establishing a connection relationship between each device. The first control center and second control center may or may not belong to the same network.

Operation Z31, detecting whether the preset information meets the preset rule;

Operation Z32, when the preset information meets the preset rule, performing the corresponding device control operation according to the preset strategy, and/or, when the preset information does not meet the preset rule, outputting the prompt information.

In an embodiment, it is detected whether the preset information meets the preset rule; if the preset information meets the preset rule, a corresponding device control operation is performed according to the preset strategy, and/or, if the preset information does not meet the preset rule, the prompt information is output.

In an embodiment, the purpose of performing the corresponding device control operations according to the preset strategy can be transferring the relevant data and/or control functions of the first control center and/or the group where the first control center is located, or the second control center and/or the group where the second control center is located, may also be outputting prompts and the like.

In an embodiment, the preset information includes at least one of the following:
- connection information including at least one of the following: connection state information, network rate information;
- state information including at least one of the following: device state information, power information, storage space information;
- environment information including at least one of the following: external environment information, use environment information;
- use information including at least one of the following: traffic information, use habit information, and currently used application information;
- distance information;
- user physiological information.

In an embodiment, for the connection information, the connection information includes at least one of the following: connection state information, network rate information.

In an embodiment, the operation Z31 includes at least one of the following:
- detecting whether the connection state information meets a first preset rule;
- detecting whether the network rate information meets a second preset rule;
- detecting whether the device state information meets a third preset rule;
- detecting whether the power information meets the fourth preset rule;
- detecting whether the storage space information meets the fifth preset rule;
- detecting whether the external environment information meets the sixth preset rule;
- detecting whether the use environment information meets the seventh preset rule;
- detecting whether the traffic information meets the eighth preset rule;
- detecting whether the use habit information meets the ninth preset rule;
- detecting whether the currently used application information meets the tenth preset rule;
- detecting whether the distance information meets the eleventh preset rule;
- detecting whether the user physiological information meets a twelfth preset rule.

In an embodiment, for detecting whether the connection state information meets the first preset rule.

In an embodiment, it is detected whether the connection state information meets the first preset rule. The first preset rule is to determine whether the first control center or the second control center in the network exits the network by detecting connection state information. If the first control center or the second control center withdraws from the network, the connection state information meets the first preset rule, and/or, if the first control center or the second control center does not withdraw from the network, the connection state information does not meet the first preset rule.

Detecting whether the network rate information meets a second preset rule.

In an embodiment, it is detected whether the network rate information meets the second preset rule. The second preset rule is a rule determined by detecting network rate information that the first control center or the second control center in the network is not suitable to continue to serve as a control center to provide control functions. In order not to affect the linkage of each device in the network, it is necessary to select a device with a high network rate as the control center.

Detecting whether the device state information meets a third preset rule.

In an embodiment, it is detected whether the device state information meets the third preset rule. The third preset rule is a rule determined by detecting device state information that the first control center or the second control center in the network is not suitable to continue to serve as a control center to provide control functions.

In other embodiments, for a device in a stuck state, since the first control center or the second control center may not be able to well control other devices because it cannot respond well to the user's operation, it may be determined that the device state information meets the third preset rule.

Detecting whether the power information meets a fourth preset rule.

In an embodiment, it is detected whether the power information meets the fourth preset rule. The fourth preset rule is a rule determined by detecting power information that the first control center or the second control center in the network is not suitable to continue to serve as a control center to provide control functions.

Detecting whether the storage space information meets a fifth preset rule.

In an embodiment, it is detected whether the storage space information meets the fifth preset rule. The fifth preset rule is a rule determined by detecting storage space information that the first control center or the second control center in the network is not suitable to continue to serve as a control center to provide control functions. In order not to affect the linkage of each device in the network, it is necessary to select a device with a large remaining storage space as the control center. It may be that the remaining storage space of other devices controlled by the first control center or the second control center in the network is greater than the remaining storage space of the first control center or the second control center, it is determined that the storage space information meets the fifth preset rule.

Detecting whether the external environment information meets a sixth preset rule.

In an embodiment, it is detected whether the external environment information meets the sixth preset rule. The sixth preset rule is a rule that determines by detecting external environment information that the first control center or the second control center in the network is not suitable for continuing to serve as a control center to provide control functions.

In an embodiment, when it is detected that the brightness of the external ambient light reaches the brightness threshold and/or the loudness of the external environmental noise reaches the loudness threshold, it is determined that the external environment information meets the sixth preset rule; and/or, when it is detected that the brightness of external ambient light does not reach the brightness threshold and/or the loudness of external environmental noise does not reach the loudness threshold, it is determined that the external environment information does not meet the sixth preset rule.

In another embodiment, the external environment information may be time information and/or geographic information. If it is inconvenient to use the first control center or the second control center (for example, it is inconvenient to use mobile phones during working duration, or in the early hours of the morning), or the place where the first control center or the second control center is not allowed to be carried (such as the place where the mobile phone is not allowed to enter), it is determined that the external environment information meets the sixth preset rule.

Detecting whether the use environment information meets a seventh preset rule.

In an embodiment, it is detected whether the use environment information meets the seventh preset rule. The seventh preset rule is a rule determined by detecting the use environment information that the first control center or the second control center in the network is not suitable to continue to serve as the control center to provide control functions.

In an embodiment, if the user is in a sports environment, it is obvious that the user is inconvenient to use devices such as mobile phones and PADs, but it is convenient to use wearable devices such as smart bracelets and smart watches. Therefore, before the user is in the exercise environment, when the first control center or the second control center is one of the devices that are inconvenient for the user to use when exercising, such as mobile phones and PADs, it is determined that the use environment information meets the seventh preset rule; and/or, before the user is in the exercise environment, when the first control center or the second control center is one of the devices that are convenient for the user to use during exercise, such as smart bracelets and smart watches, it is determined that the use environment information does not meet the seventh preset rule.

Detecting whether the traffic information meets an eighth preset rule.

In an embodiment, it is detected whether the traffic information meets the eighth preset rule. The eighth preset rule is a rule determined by detecting traffic information that the first control center or the second control center in the network is not suitable to continue to serve as a control center to provide control functions. In order not to affect the linkage of each device in the network, it is necessary to select a device with a large amount of remaining traffic as the control center. It may be that the remaining traffic of other devices controlled by the first control center or the second control center in the network is greater than the remaining traffic of the first control center or the second control center, it is determined that the traffic information meets the eighth preset rule.

Detecting whether the use habit information meets a ninth preset rule.

In an embodiment, it is detected whether the use habit information meets the ninth preset rule. The ninth preset rule is a rule for determining that the first control center or the second control center in the network is not suitable for continuing to serve as a control center to provide control functions by detecting use habit information.

In an embodiment, if users are used to running with smart earphones or smart watches at a certain time in the morning, watching videos on a PAD at a certain time in the evening, and using mobile phones to read at a certain time in the morning on weekends, the first control center or the second control center at the corresponding time point is not a device conforming to the user habits, it may be determined that the ninth preset rule is met.

detecting whether the currently used application information meets a tenth preset rule.

In an embodiment, it is detected whether the currently used application information meets the tenth preset rule. The tenth preset rule is a rule for determining that the first control center or the second control center in the network is not suitable to continue to serve as a control center to provide control functions by detecting the currently used application information.

In an embodiment, if the user is making a phone call, video chatting, or conference call, and it is inconvenient for the user to switch interfaces or controls at this time, it is determined that the currently used application information meets the tenth preset rule.

Detecting whether the distance information meets an eleventh preset rule.

In an embodiment, it is detected whether the distance information meets the eleventh preset rule. The eleventh preset rule is a rule for determining that the first control center or the second control center in the network is not suitable for continuing to serve as a control center to provide control functions by detecting distance information.

In an embodiment, when the distance between the user and the first control center or the second control center exceeds a preset range, it is determined that the distance information meets the eleventh preset rule.

In an embodiment, each device in the network will have a certain relative distance when used by the user. When the distance between the first control center or the second control center and other devices controlled by it is greater than or equal to a preset distance threshold, it is determined that the distance information meets the eleventh preset rule; and/or, when the distance between the first control center or the second control center and other devices controlled by it is less than a preset distance threshold, it is determined that the distance information does not meet the eleventh preset rule.

In an embodiment, before the operation Z30, the method includes:

determining whether the device is in the preset mode;
performing the operation Z30 when the device is in the preset mode.

In an embodiment, before obtaining the preset information, it is necessary to determine whether the relevant device is in the preset mode, and if so, the operation of obtaining the preset information is performed; if not, the operation of obtaining the preset information is not performed. The preset mode includes the group switching mode, that is, the preset information is acquired only when the device is in the group switching mode.

In this embodiment, the processing method includes: Z30, obtaining preset information, the preset information is provided by the group where the first control center and/or the second control center are located; Z31, detecting whether the preset information meets a preset rule; Z32, when the preset information meets the preset rule, performing a corresponding device control operation according to a preset strategy, and/or, when the preset information does not meet the preset rule, outputting prompt information. When the preset information meets the preset rule, the corresponding device control operations are performed according to the preset strategy, making the devices in the group more intelligent, convenient and faster during use.

The specific implementation manner of the processing device of the present application is basically the same as that of the embodiments of the above processing method, and will not be repeated here.

Figure 68:
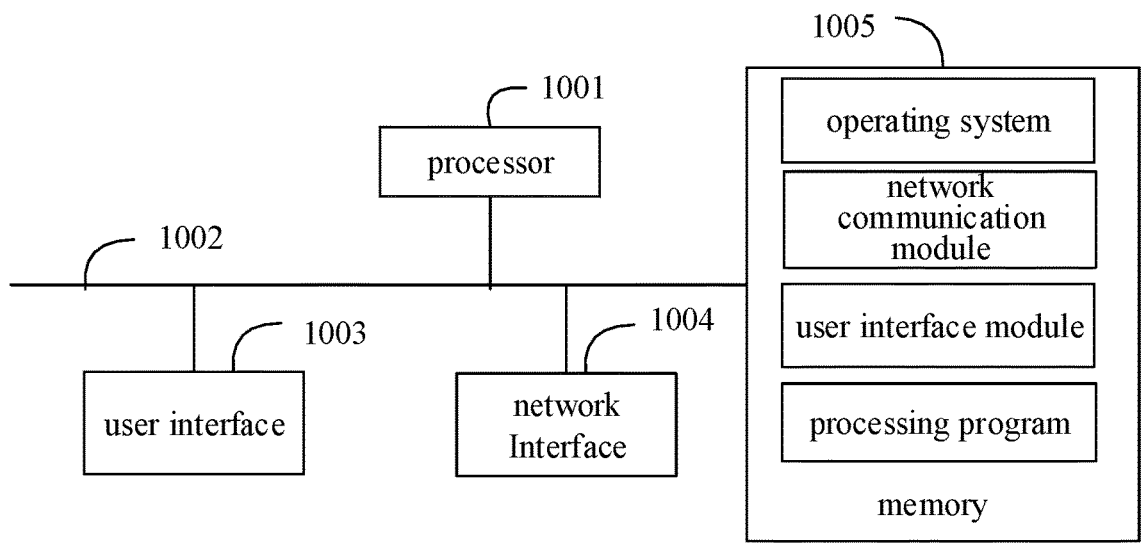
FIG. 68 is a schematic structural diagram of the hardware operating environment involved in the solution of the embodiment of the present application.

In an embodiment, the present application further provides a processing device, which is applied to the first control center and other devices controlled by the first control center in the network. As shown in FIG. 68, FIG. 68 is a schematic structural diagram of the hardware operating environment involved in the solution of the embodiment of the present application.

As shown in FIG. 68, the processing device may include a processor 1001 such as a CPU, a memory 1005, a user interface 1003, a network interface 1004, and a communication bus 1002. The communication bus 1002 is used to realize communication between these components. The user interface 1003 may include a display, and an input unit such as a keyboard. The user interface 1003 may also include standard wired interfaces and wireless interfaces. The network interface 1004 may include a standard wired interface and a wireless interface (such as a WI-FI interface). The memory 1005 may be a high-speed random access memory (RAM), or a non-volatile memory, such as a disk memory. The memory 1005 may also be a storage device independent of the aforementioned processor 1001.

The processing device may further include a radio frequency (RF) circuit, a sensor, an audio circuit, a WiFi module, and the like.

Those skilled in the art can understand that the processing device structure shown in FIG. 68 does not constitute a limitation on the processing device, and may include more or less components than those shown in the Figure, or a combination of components, or differently arranged components.

As shown in FIG. 68, the memory 1005 as a computer storage medium may include an operating system, a network communication module, a user interface module, and a device processing program. The operating system is a program that manages and controls the hardware and software resources of the device, and supports the operation of the device processing program and other software or programs.

In the processing device shown in FIG. 68, the user interface 1003 is mainly configured to connect to the terminal and perform data communication with the terminal, such as receiving an image to be steganographically sent by the terminal. The network interface 1004 is mainly configured for the background server to communicate data with the background server. The processor 1001 may be configured to call the device processing program stored in the memory 1005, and perform the operations of the processing method described above.

The specific implementation manners of the processing device of the present application are basically the same as the above embodiments of the processing method, and will not be repeated herein.

The present application also provides a device, the device including: a memory, a processor, and a computer program stored in the memory and operable on the processor. The computer program implements the operations of the above method when executed by the processor.

The present application also provides a computer storage medium, on which a computer program is stored. The computer program implements the operations of the above method when executed by the processor.

The present application also provides a computer program product, and the computer program product includes computer program code. When the computer program code is run on the computer, the computer is made to execute the methods described in the above various possible implementation manners.

The present application also provides a chip, including a memory and a processor, the memory is configured to store computer programs. The processor is configured to call and run the computer program from the memory, so that the device installed with the chip executes the methods described in the above various possible implementation manners.

Step codes such as S11 and S12 are used herein, the purpose of which is to express the corresponding content more clearly and concisely, and does not constitute a substantive limitation on the order. Those skilled in the art may perform S12 first and then S11 etc. during specific implementation, but these should all be within the protection scope of the present application.

The terms "comprising", "including" or any other variation thereof are intended to cover a non-exclusive inclusion. Thus, a process, a method, an article, or an apparatus including a set of elements includes not only those elements but also other elements not expressly listed, or includes elements inherent in such a process, a method, an article, or an apparatus. Without further limitations, an element defined by the phrase "comprising a . . . " does not preclude the presence of additional identical elements in the process, the method, the article, or the apparatus including that element. Components, features, and elements with the same name in different embodiments of the present application may have the same or different meanings, and the specific meaning thereof needs to be determined according to its explanation in the specific embodiment or further combined with the context in the specific embodiment.

It should be understood that although the terms first, second, third, etc. may be used herein to describe various information, the information should not be limited to these terms. These terms are only used to distinguish information of the same type from one another. For example, without departing from the scope of the present application, first information may also be called second information, and similarly, second information may also be called first information. Depending on the context, the word "if" as used herein may be interpreted as "when" or "in response to determining". Furthermore, as used herein, the singular forms "a", "an" and "the" are intended to include the plural forms as well, unless the context indicates otherwise. It should be further understood that the terms "comprising", "including" indicate the existence of the described features, steps, operations, elements, components, items, species, and/or groups, However, it does not exclude the existence, occurrence or addition of one or more other features, steps, operations, elements, components, items, species, and/or groups. The terms "or", "and/or", "comprising at least one of" and the like used in the present application may be interpreted as inclusive, or mean any one or any combination. For example, "comprising at least one of: A, B, C" means "any of: A; B; C; A and B; A and C; B and C; A and B and C". As another example, "A, B, or C" or "A, B, and/or C" means "any of the following: A; B; C; A and B; A and C; B and C; A and B and C. Exceptions to this definition will only arise when combinations of elements, functions, steps or operations are inherently mutually exclusive in some way.

It should be understood that although the various steps in the flowchart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages. These sub-steps or stages are not necessarily executed at the same time, but can be executed at different times. The execution sequence thereof is not necessarily performed sequentially, but may be performed alternately or alternately with at least a part of other steps or sub-steps or stages of other steps.

Depending on the context, the words "if" as used herein may be interpreted as "when" or "in response to determining" or "in response to detecting". Similarly, depending on the context, the phrases "if determined" or "if detected (the stated condition or event)" could be interpreted as "when determined" or "in response to determining" or "when detected (the stated condition or event)" or "in response to detecting (the stated condition or event)".

The serial numbers of the above embodiments of the present application are for description only, and do not represent the advantages and disadvantages of the embodiments.

In the present application, for the description of the same or similar term concepts, technical solutions and/or application scenarios, generally, it is only described in detail when it appears for the first time, and when it appears repeatedly later, for the sake of brevity, it is not repeated. When understanding the content of the technical solutions of the present application, for the same or similar term concepts, technical solutions and/or application scenario descriptions that are not described in detail later, the previous relevant detailed descriptions can be referred to.

In the present application, the description of each embodiment has its own emphasis. For the parts that are not detailed or recorded in a certain embodiment, please refer to the relevant descriptions of other embodiments.

The various technical features of the technical solution of the present application can be combined arbitrarily. For the sake of concise description, all possible combinations of the various technical features in the above-mentioned embodiments are not described. However, as long as there is no contradiction in the combination of these technical features, it should be considered as within the scope of the present application.

Through the description of the above embodiment, those skilled in the art can clearly understand that the above-mentioned embodiments can be implemented by software plus a necessary general hardware platform, it can also be implemented by hardware, but in many cases the former is a better implementation. Based on this understanding, the technical solution of the present application can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, a device, or a network device, etc.) to execute the method described in each embodiment of the present application.

The above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. A processing method applied to a first control center, comprising following operations:
    obtaining preset information;
    detecting whether the preset information meets a preset rule; and
    in response that the preset information meets the preset rule, performing a corresponding device control operation according to a preset strategy, to transfer or migrate or duplicate or backup relevant data and/or control function of the first control center,
    wherein the preset information comprises at least one of the following:
    connection information comprising at least one of the following: connection state information, and network rate information;
    state information comprising at least one of the following: device state information, power information, and storage space information;
    environment information comprising at least one of the following: external environment information, and use environment information;
    use information comprising at least one of the following: traffic information, use habit information, and currently used application information;
    distance information; and
    user physiological information; and
    wherein the detecting whether the preset information meets the preset rule comprises:
    detecting whether the connection state information meets a first preset rule;
    detecting whether the network rate information meets a second preset rule;
    detecting whether the device state information meets a third preset rule;
    detecting whether the power information meets a fourth preset rule;
    detecting whether the storage space information meets a fifth preset rule;
    detecting whether the external environment information meets a sixth preset rule;
    detecting whether the use environment information meets a seventh preset rule;
    detecting whether the traffic information meets an eighth preset rule;
    detecting whether the use habit information meets a ninth preset rule;
    detecting whether the currently used application information meets a tenth preset rule;
    detecting whether the distance information meets an eleventh preset rule; and
    detecting whether the user physiological information meets a twelfth preset rule.

2. A processing method applied to a processing device, comprising following operations:
    detecting whether a preset event occurs;
    in response that the preset event occurs, detecting whether the device corresponding to the preset event meets a preset condition; and
    in response that the device corresponding to the preset event meets the preset condition, outputting prompt information corresponding to the preset event according to a prompt strategy,
    wherein the processing device is in a connection network, the connection network comprises the processing device, a first device and a second device, and the occurrence of the preset event comprises at least one of the following:
    a first preset event occurs on the processing device;
    a second preset event occurs on the first device; and
    a third preset event occurs on the second device;
    wherein the first preset event or the second preset event or the third preset event comprises at least one of the following:
    at least one of the processing device, the first device and the second device is in or switched to a preset mode;

at least one of the processing device, the first device and the second device is in or switched to a preset environment;
at least one of the processing device, the first device, and the second device detects that the user physiological information meets a first preset condition;
at least one of the processing device, the first device, and the second device detects that the user state meets a second preset condition;
at least one preset parameter detected by at least one of the processing device, the first device, and the second device meets a parameter condition;
at least one new device is newly added in the connection network or the maximum number of connection devices has been reached;
at least one device in the connection network is disconnected or the minimum number of connection devices has been reached;
at least one of the processing device, the first device and the second device receives at least one message;
a power value of at least one of the processing device, the first device and the second device is lower than or equal to a preset power threshold;
a connection signal value of at least one of the processing device, the first device and the second device is less than or equal to a preset signal threshold;
a resource occupancy value of at least one of the processing device, the first device, and the second device is greater than or equal to a preset resource threshold;
a running state of at least one of the processing device, the first device and the second device is stuck or not smooth;
a preset application and/or a preset function of at least one of the processing device, the first device, and the second device is turned on;
a security level of at least one of the processing device, the first device, and the second device is less than or equal to a preset security level threshold;
a working duration of at least one of the processing device, the first device and the second device is greater than or equal to a preset working duration threshold; and
at least one of the processing device, the first device and the second device is at a preset position.

3. A processing method, comprising following operations:
in response that first preset connection information of a connection network meets a preset connection rule and/or second preset connection information of a connection network meets a preset connection condition, obtaining preset prompt information; and
outputting the preset prompt information according to a preset prompt strategy,
wherein the first preset connection information comprises at least one of the following:
power information, timing shutdown information, location information, time information, user identity information, use habit information, device type information, connection state information, use state information, and environment information; and
wherein in response that the first preset connection information comprises the power information and the power information meets a first preset connection rule, obtaining first preset prompt information;
in response that the first preset connection information comprises the timing shutdown information and the timing shutdown information meets a second preset connection rule, obtaining second preset prompt information;
in response that the first preset connection information comprises the location information and the location information meets a third preset connection rule, obtaining third preset prompt information;
in response that the first preset connection information comprises the time information and the time information meets a fourth preset connection rule, obtaining fourth preset prompt information;
in response that the first preset connection information comprises the user identity information and the user identity information meets a fifth preset connection rule, obtaining fifth preset prompt information;
in response that the first preset connection information comprises the use habit information and the use habit information meets a sixth preset connection rule, obtaining sixth preset prompt information;
in response that the second preset connection information comprises the device type information and the device type information meets a seventh preset connection rule, obtaining seventh preset prompt information;
in response that the second preset connection information comprises the connection state information and the connection state information meets an eighth preset connection rule, obtaining eighth preset prompt information;
in response that the second preset connection information comprises the use state information and the use state information meets a ninth preset connection rule, obtaining ninth preset prompt information; and
in response that the second preset connection information comprises the environment information and the environment information meets a tenth preset connection rule, obtaining tenth preset prompt information.

4. A processing method, comprising following operations:
obtaining first preset information and/or second preset information;
detecting whether the first preset information and/or the second preset information meets a preset rule; and
in response that the first preset information and/or the second preset information meets the preset rule, performing a corresponding device control operation according to a preset strategy,
the first preset information is provided by a first control center and/or other devices controlled by the first control center;
the second preset information is provided by a second control center and/or other devices controlled by the second control center;
both the first control center and the second control center are directly or indirectly connected to at least one third device;
both the first control center and the second control center are bound to at least one fourth device;
the first control center and the second control center are the same device or different devices;
in response that the first control center detects that once the connection between the second control center and the fourth device is established, transferring or duplicating a control function and/or relevant data on the first control center to the second control center according to a binding switching strategy; and
after the first control center transfers or replicates the control function and/or the relevant data to the second control center, disconnecting the first control center from the fourth device or maintaining a normal connection state in a non-control mode, wherein the binding switching strategy comprises at least one of the following:
only transferring or duplicating the control function on the first control center to the second control center immediately or with a delay or timing;
only transferring or duplicating the relevant data on the first control center to the second control center immediately or with a delay or timing;
transferring or duplicating the control function and/or the relevant data on the first control center to the second control center immediately or with a delay or timing; and
outputting prompt information at the first control center and/or the second control center, determining whether to transfer or duplicate the control function and/or the relevant data on the first control center to the second control center immediately or with a delay or timing according to the user operation.

5. The method of claim 4, wherein in response that the first control center and the second control center are different devices, and only one effective control center is allowed in the connection network at the same time, the currently effective control center is determined according to a strategy determined by the control center.

6. A processing method, comprising following operations:
obtaining first information and/or second information and/or third information, wherein the first information is provided by at least one first device directly connected to a first control center, the second information is provided by at least one second device indirectly connected to the first control center, and the third information is provided by a web server connected to at least one of the first control center, the first device, and the second device;
processing the first information and/or the second information and/or the third information according to a processing rule to obtain at least one recommendation information;
detecting whether the first control center, and/or the first device, and/or the second device meet recommendation requirements; and
in response that the first control center, and/or the first device, and/or the second device meet the recommendation requirements, performing a corresponding device control operation according to a preset recommendation strategy, and/or in response that the first control center, and/or the first device, and/or the second device do not meet the recommendation requirements, outputting prompt information, wherein the processing the first information and/or the second information and/or the third information according to a processing rule to obtain at least one recommendation information comprises at least one of the following:
processing the first information according to a first processing rule to obtain at least one first recommendation information;
processing the second information according to a second processing rule to obtain at least one second recommendation information;
processing the third information according to a third processing rule to obtain at least one third recommendation information; and
processing at least two of the first information, the second information and the third information according to a fourth processing rule to obtain at least one third recommendation information, wherein the first processing rule and/or the second processing rule and/or the third processing rule and/or the fourth processing rule comprise at least one of the following:
obtaining corresponding recommendation information according to local and/or network data analysis or artificial intelligence algorithms;
extracting an information keyword and/or a corresponding parameter value, and obtaining corresponding recommendation information according to a preset keyword and/or a parameter value recommendation strategy; and
determining corresponding recommendation information according to user habit or setting or selection.

7. A processing method, comprising following operations:
obtaining preset information;
detecting whether the preset information meets a preset rule; and
in response that the preset information meets the preset rule, performing a corresponding device control operation according to a preset strategy, and/or in response that the preset information does not meet the preset rule, outputting prompt information, wherein the preset information comprises at least one of the following:
connection information comprising at least one of the following: connection state information, network rate information;
state information comprising at least one of the following: device state information, power information, storage space information;
environment information comprising at least one of the following: external environment information, use environment information;
use information comprising at least one of the following: traffic information, use habit information, and currently used application information;
distance information; and
user physiological information, wherein the detecting whether the preset information meets the preset rule comprises at least one of the following:
detecting whether the connection state information meets a first preset rule;
detecting whether the network rate information meets a second preset rule;
detecting whether the device state information meets a third preset rule;
detecting whether the power information meets a fourth preset rule;
detecting whether the storage space information meets a fifth preset rule;
detecting whether the external environment information meets a sixth preset rule;
detecting whether the use environment information meets a seventh preset rule;
detecting whether the traffic information meets an eighth preset rule;
detecting whether the use habit information meets a ninth preset rule;
detecting whether the currently used application information meets a tenth preset rule;
detecting whether the distance information meets an eleventh preset rule; and
detecting whether the user physiological information meets a twelfth preset rule.

8. A device, comprising a memory, a processor and a device processing program stored on the memory and operable on the processor, when the device processing program is executed by the processor, the operations of the processing method according to claim 1 are realized.

9. A non-transitory computer-readable storage medium, wherein a device processing program is stored on the non-transitory computer-readable storage medium, and when the device processing program is executed by a processor, the operations of the processing method according to claim 1 are implemented.

* * * * *